(12) United States Patent
Kondo et al.

(10) Patent No.: US 7,536,049 B2
(45) Date of Patent: *May 19, 2009

(54) IMAGE PROCESSING APPARATUS AND METHOD, AND IMAGE PICKUP APPARATUS

(75) Inventors: Tetsujiro Kondo, Tokyo (JP); Naoki Fujiwara, Tokyo (JP); Junichi Ishibashi, Saitama (JP); Takashi Sawao, Tokyo (JP); Takahiro Nagano, Kanagawa (JP); Toru Miyake, Tokyo (JP); Seiji Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1397 days.

This patent is subject to a terminal disclaimer.

(21) Appl. No.: 10/362,580

(22) PCT Filed: Jun. 25, 2002

(86) PCT No.: PCT/JP02/06339

§ 371 (c)(1),
(2), (4) Date: Sep. 15, 2003

(87) PCT Pub. No.: WO03/001456

PCT Pub. Date: Jan. 3, 2003

(65) Prior Publication Data

US 2005/0259870 A1 Nov. 24, 2005

(51) Int. Cl.
*G06K 9/34* (2006.01)
*H04N 9/74* (2006.01)
*G09G 5/00* (2006.01)

(52) U.S. Cl. .................. 382/173; 382/164; 348/586; 345/619

(58) Field of Classification Search .............. 382/164, 382/171, 173; 348/586; 345/619, 629; 358/1.9
See application file for complete search history.

(56) References Cited

U.S. PATENT DOCUMENTS 5,812,787 A * 9/1998 Astle ................... 709/247

(Continued)

FOREIGN PATENT DOCUMENTS

EP 0 771 107 5/1997

(Continued)

OTHER PUBLICATIONS

Mitsunaga T et al: "Key extraction by image differentiation" Proceedings of the International Conference on Image Processing. (ICIP). Washington, Oct. 23-26, 1995, Los Alamitos, IEEE Comp. Soc. Press, US, vol. vol. 3, Oct. 23, 1995, pp. 248-251, XP010197071 ISBN: 0-7803-3122-2.

*Primary Examiner*—Aaron W Carter
(74) *Attorney, Agent, or Firm*—Frommer Lawrence & Haug LLP; William S. Frommer

(57) ABSTRACT

An object of the present invention is to enable the detection of a mixture ratio indicating the mixture state of a plurality of objects, such as a background image and a moving object image. A normal-equation adder 541 extracts mixed pixel data according to a motion, and also extracts background pixel data corresponding to the mixed pixel data so as to generate relational expressions for a designated pixel. A normal-equation calculator 542 detects the mixture ratio indicating the mixture state of the objects based on the relational expressions. The normal-equation adder 541 generates the plurality of relational expressions based on a first approximation in which foreground object components change substantially linearly, and a second approximation in which the mixture ratio changes substantially linearly. The present invention is applicable to a signal processing apparatus for processing images.

40 Claims, 96 Drawing Sheets

U.S. PATENT DOCUMENTS

| | | | | |
|---|---|---|---|---|
| 5,960,111 A | * | 9/1999 | Chen et al. | 382/173 |
| 6,134,346 A | | 10/2000 | Berman et al. | |
| 6,205,260 B1 | * | 3/2001 | Crinon et al. | 382/284 |
| 6,249,613 B1 | * | 6/2001 | Crinon et al. | 382/236 |
| 6,259,828 B1 | * | 7/2001 | Crinon et al. | 382/305 |
| 6,301,385 B1 | * | 10/2001 | Chen et al. | 382/173 |
| 6,404,901 B1 | * | 6/2002 | Itokawa | 382/103 |
| 6,738,424 B1 | * | 5/2004 | Allmen et al. | 375/240.08 |
| 6,741,755 B1 | * | 5/2004 | Blake et al. | 382/284 |
| 6,873,723 B1 | * | 3/2005 | Aucsmith et al. | 382/154 |
| 6,977,664 B1 | * | 12/2005 | Jinzenji et al. | 345/629 |
| 7,054,479 B2 | * | 5/2006 | Aucsmith et al. | 382/154 |
| 7,130,464 B2 | * | 10/2006 | Kondo et al. | 382/190 |
| 7,154,541 B2 | * | 12/2006 | Kondo et al. | 348/222.1 |
| 7,181,080 B2 | * | 2/2007 | Kondo et al. | 382/254 |
| 7,221,778 B2 | * | 5/2007 | Kondo et al. | 382/107 |
| 7,340,106 B2 | * | 3/2008 | Kondo et al. | 382/264 |
| 7,352,917 B2 | * | 4/2008 | Kondo et al. | 382/291 |
| 7,409,074 B2 | * | 8/2008 | Kondo et al. | 382/103 |
| 2002/0154695 A1 | * | 10/2002 | Cornog et al. | 375/240.16 |
| 2002/0191846 A1 | * | 12/2002 | Crinon et al. | 382/173 |
| 2003/0031253 A1 | * | 2/2003 | Itokawa | 375/240.08 |
| 2005/0053278 A1 | * | 3/2005 | Li | 382/164 |

FOREIGN PATENT DOCUMENTS

| | | |
|---|---|---|
| EP | 0 933 727 | 8/1999 |
| EP | 1 164 545 | 12/2001 |
| EP | 1 292 129 | 3/2003 |
| EP | 1 361 540 | 11/2003 |
| EP | 1 361 542 | 11/2003 |
| EP | 1 379 080 | 1/2004 |
| EP | 1 396 818 | 3/2004 |
| EP | 1 396 819 | 3/2004 |
| EP | 1 408 451 | 4/2004 |
| EP | 1 411 473 | 4/2004 |
| JP | 7-336688 | 12/1995 |
| JP | 10-164436 | 6/1998 |
| JP | 2000-30040 | 1/2000 |
| JP | 2001-250119 | 9/2001 |
| JP | 2002-190015 | 7/2002 |
| JP | 2002-190016 | 7/2002 |
| JP | 2002-190028 | 7/2002 |
| WO | WO 02 067200 | 8/2002 |
| WO | WO 02 087335 | 11/2002 |

\* cited by examiner

FIG. 5
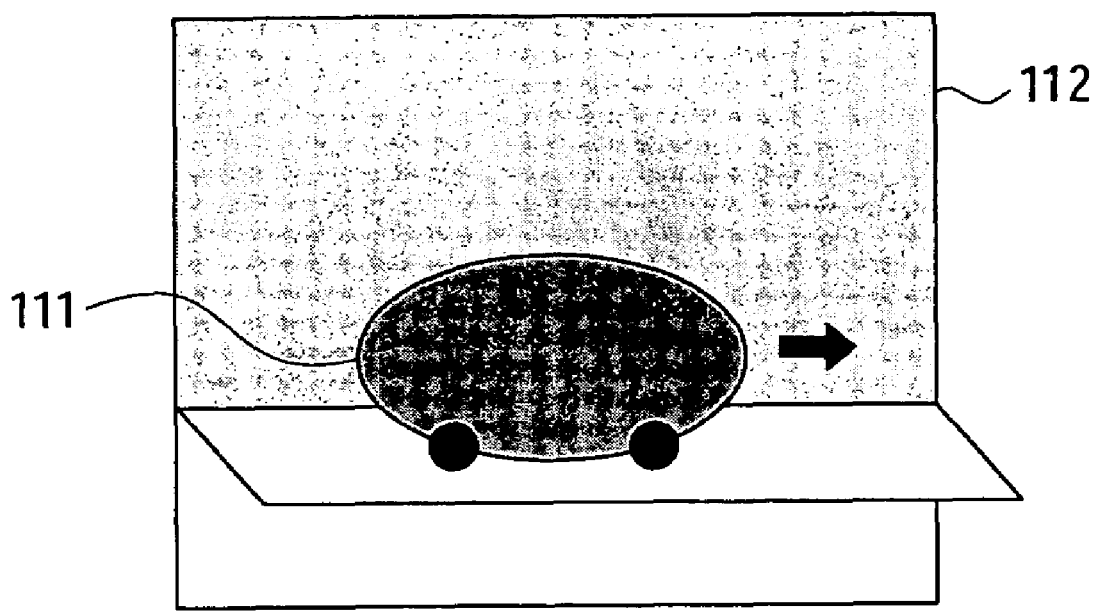
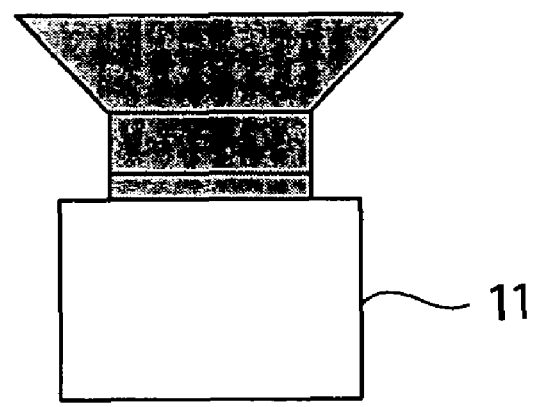

| AREA | | DESCRIPTION |
|---|---|---|
| BACKGROUND AREA | | STATIONARY PORTION |
| FOREGROUND AREA | | MOVING PORTION |
| MIXED AREA | COVERED BACKGROUND AREA | PORTION CHANGING FROM BACKGROUND TO FOREGROUND |
| | UNCOVERED BACKGROUND AREA | PORTION CHANGING FROM FOREGROUND TO BACKGROUND |

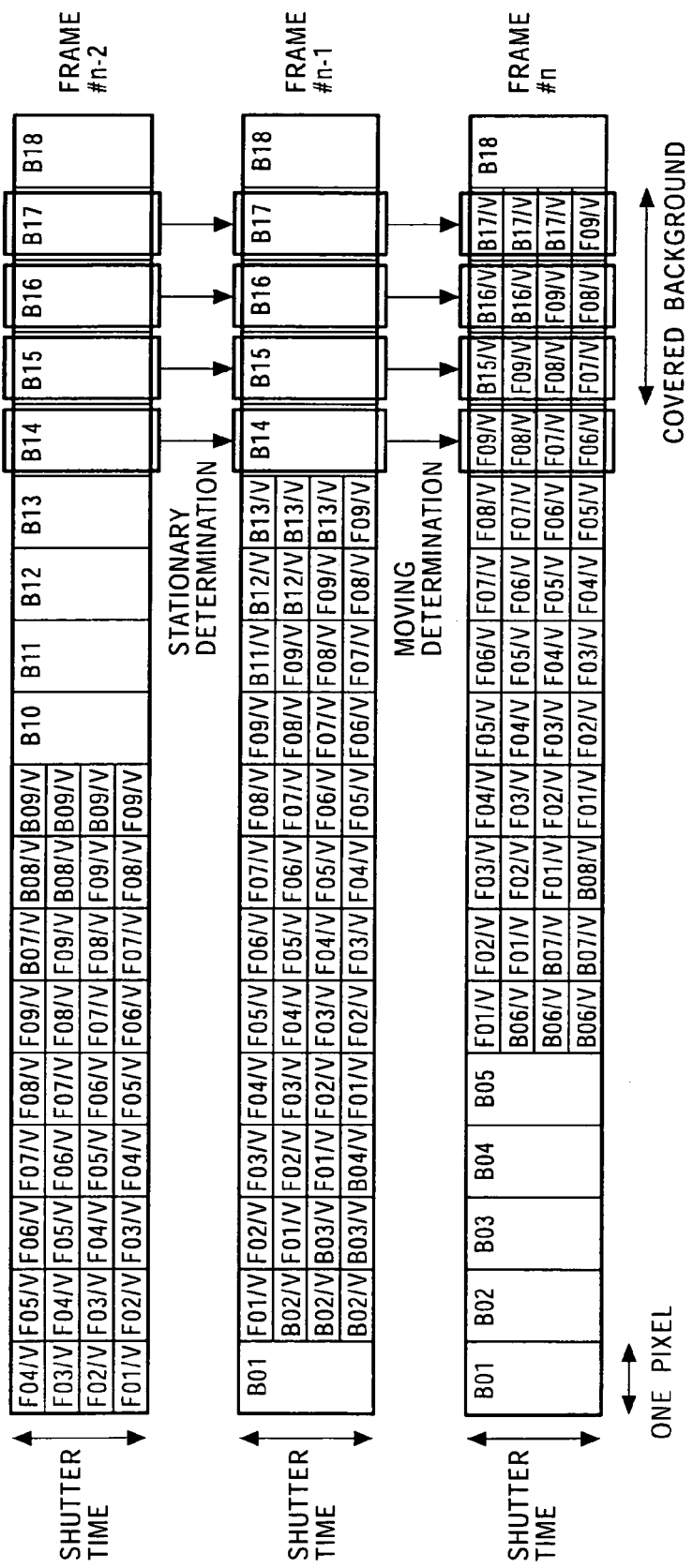

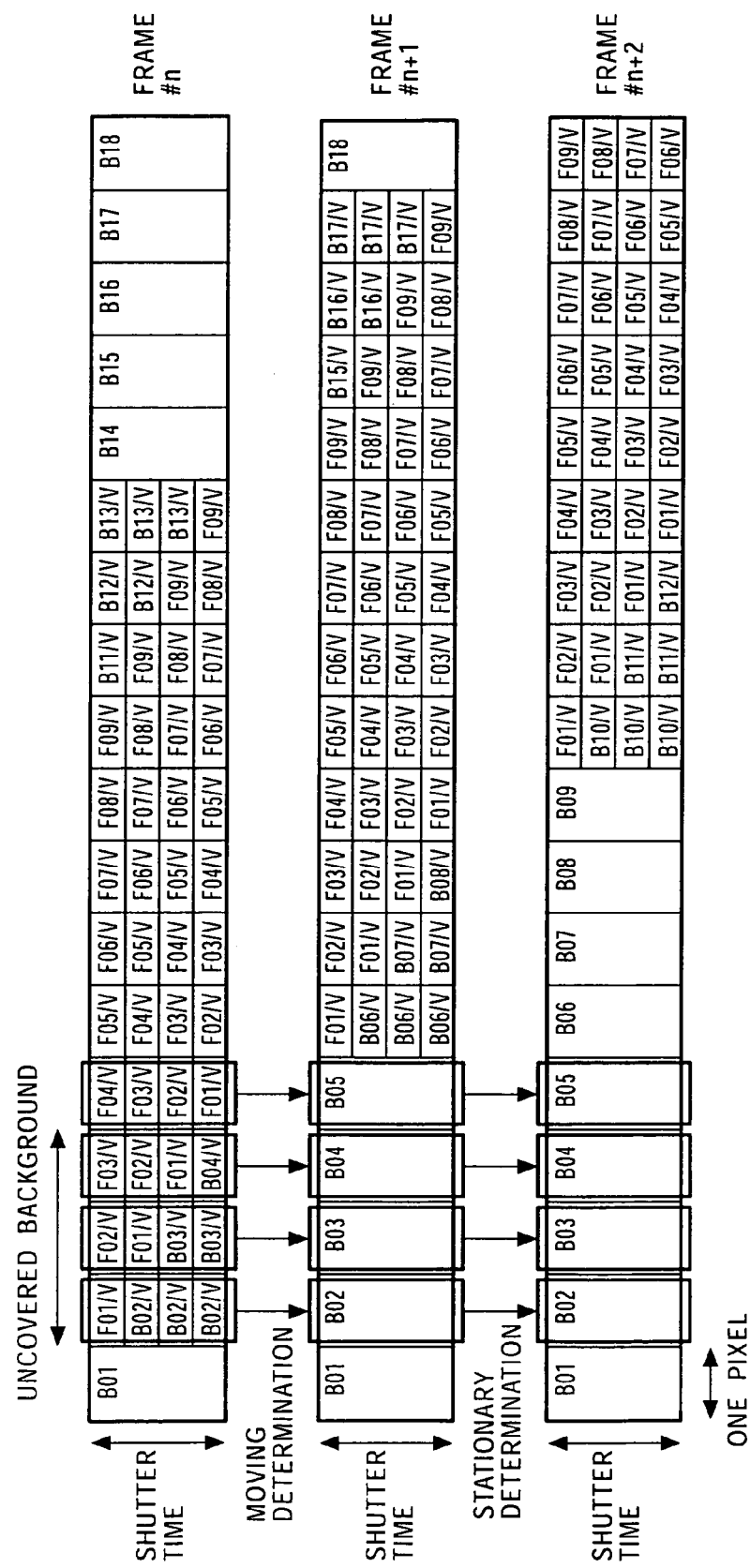

FIG. 27

| AREA DETERMINATION | STATIONARY/MOVING DETERMINATION BETWEEN FRAME #n-2 AND FRAME #n-1 | STATIONARY/MOVING DETERMINATION BETWEEN FRAME #n-1 AND FRAME #n | STATIONARY/MOVING DETERMINATION BETWEEN FRAME #n AND FRAME #n+1 | STATIONARY/MOVING DETERMINATION BETWEEN FRAME #n+1 AND FRAME #n+2 |
|---|---|---|---|---|
| COVERED-BACKGROUND-AREA DETERMINATION | STATIONARY | MOVING | — | — |
| STATIONARY-AREA DETERMINATION | — | STATIONARY | STATIONARY | — |
| MOVING-AREA DETERMINATION | — | MOVING | MOVING | — |
| UNCOVERED-BACKGROUND-AREA DETERMINATION | — | — | MOVING | STATIONARY |

FIG. 35A

| $X_0$ | $X_1$ | $X_2$ |
|---|---|---|
| $X_3$ | $X_4$ | $X_5$ |
| $X_6$ | $X_7$ | $X_8$ |

FIG. 35B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 36A

| $X_0$ | $X_1$ | $X_2$ |
|---|---|---|
| $X_3$ | $X_4$ | $X_5$ |
| $X_6$ | $X_7$ | $X_8$ |

FIG. 36B

| $Y_0$ | $_1$ | $Y_2$ |
|---|---|---|
| $Y_3$ | $Y_4$ | $Y_5$ |
| $Y_6$ | $Y_7$ | $Y_8$ |

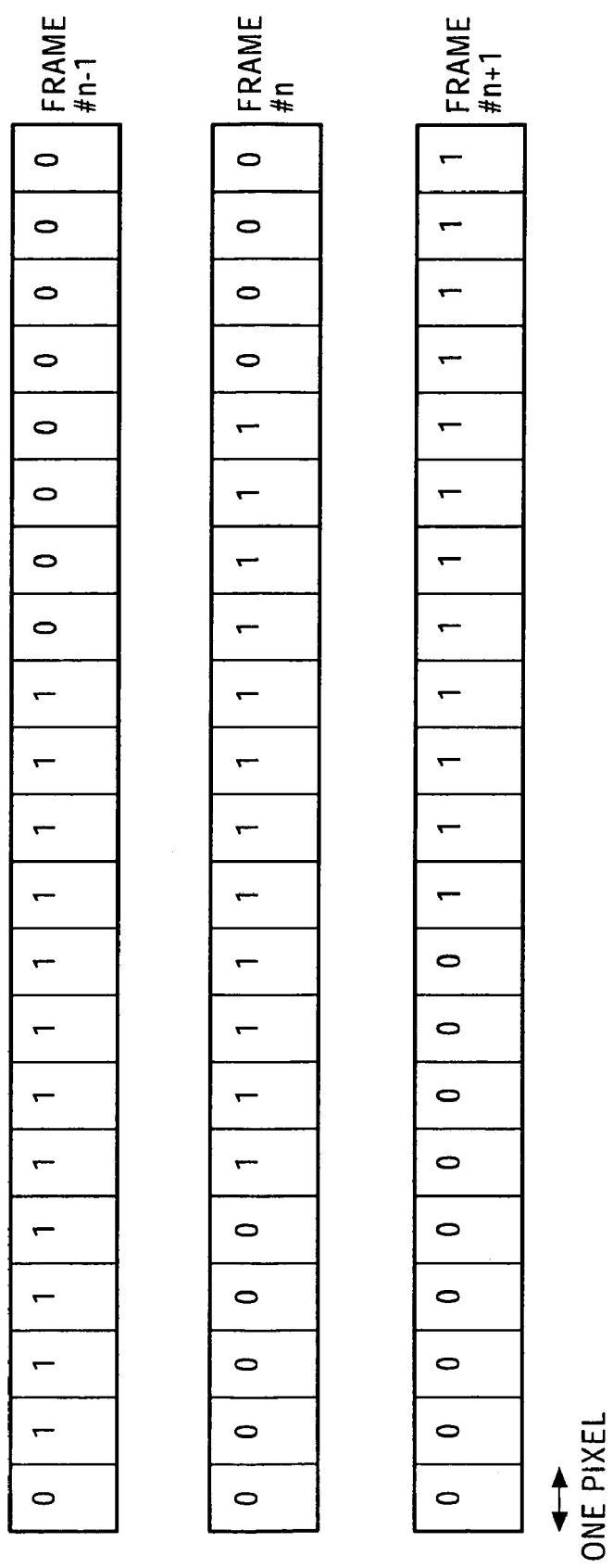

FIG. 39

| | BACKGROUND AREA | FOREGROUND AREA | COVERED BACKGROUND AREA | UNCOVERED BACKGROUND AREA |
|---|---|---|---|---|
| FRAME #n-1 | — | 1 | 0 | — |
| FRAME #n | 0 | 1 | 1 | 1 |
| FRAME #n+1 | — | 1 | — | 0 |

FIG. 73A
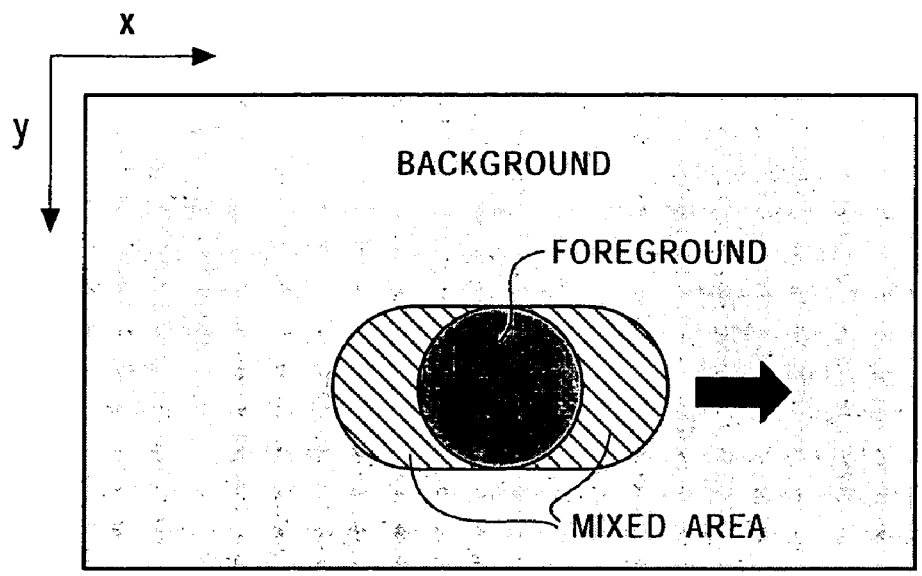
SEPARATE FOREGROUND
AND BACKGROUND
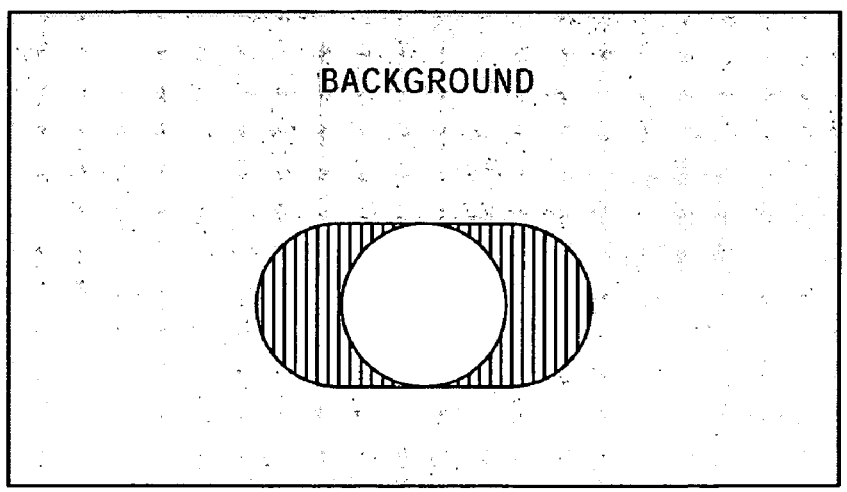
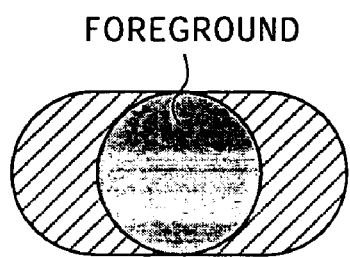

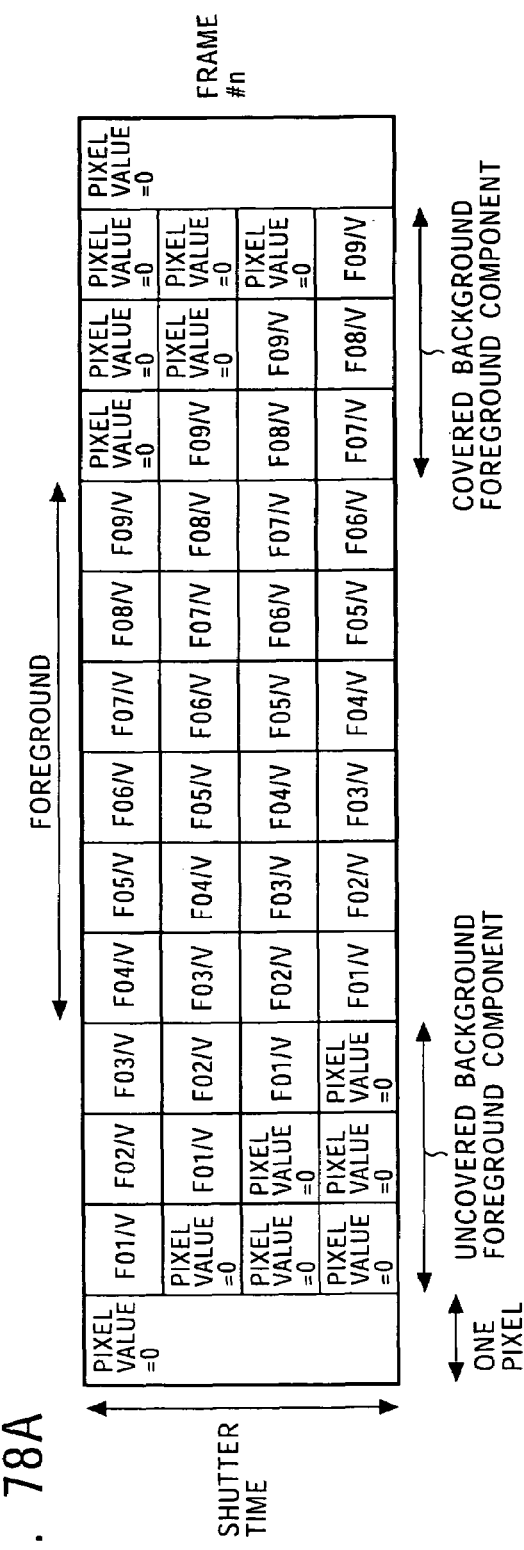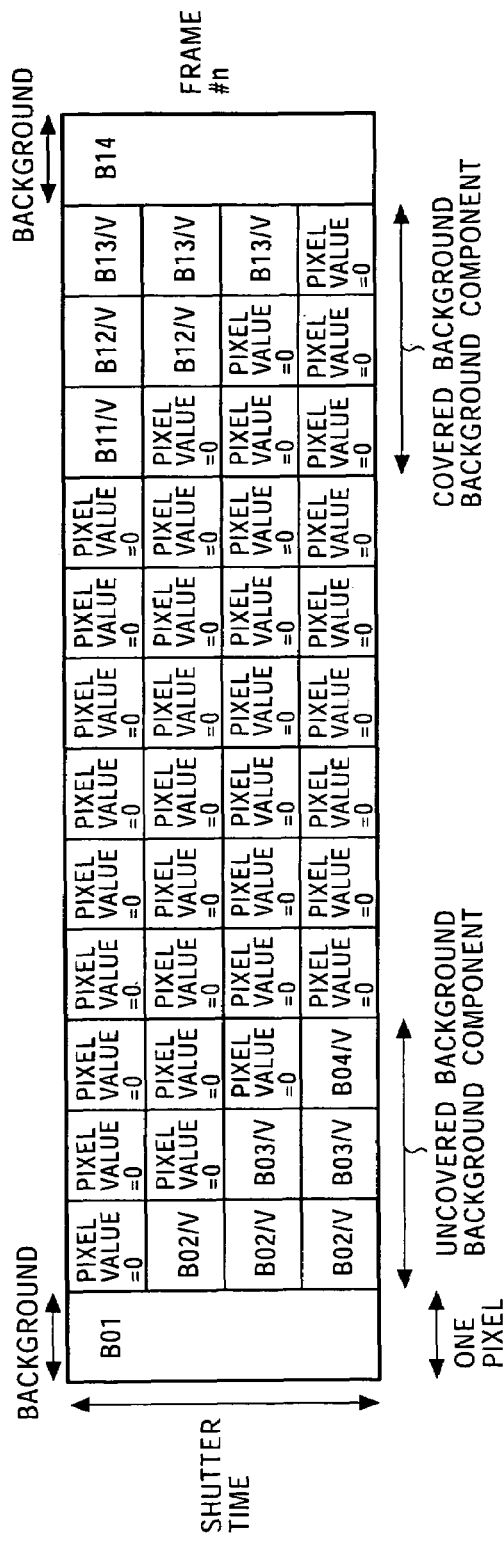
FIG. 78A
FIG. 78B

IMAGE PROCESSING APPARATUS AND METHOD, AND IMAGE PICKUP APPARATUS

TECHNICAL FIELD

The present invention relates to image processing apparatuses and methods, and image-capturing apparatuses, and more particularly, to an image processing apparatus and method, and an image-capturing apparatus in which a difference between a signal detected by a sensor and the real world is taken into consideration.

BACKGROUND ART

A technique for detecting incidents occurring in the real world by a sensor and for processing sampled data output from the image sensor is widely used.

For example, motion blur occurs in an image obtained by capturing an object moving in front of a predetermined stationary background with a video camera if the moving speed is relatively high.

However, when an object is moving in front of a stationary background, not only does motion blur caused by the mixture of the moving object itself occur, but also the mixture of the background image and the object image occurs. Hitherto, it has not been considered to detect the mixture state of the background image and the moving object.

DISCLOSURE OF INVENTION

The present invention has been made in view of the above-described background. Accordingly, it is an object of the present invention to make it possible to detect the mixture ratio indicating the mixture state of a plurality of objects, such as a background image and a moving object image.

A first image processing apparatus of the present invention includes: relational-expression generating means for extracting, in correspondence with a designated pixel of a designated frame of image data, mixed pixel data, which is pixel data, in which a plurality of objects contained in the image data are mixed, from the designated frame and a peripheral frame around the designated frame in accordance with a motion of a foreground object which forms a foreground of the plurality of objects, and also for extracting, in correspondence with the mixed pixel data, background pixel data, which is the pixel data, corresponding to a background object which forms a background of the plurality of objects, the background pixel data being associated with the corresponding mixed pixel data, from a frame different from the frames from which the mixed pixel data are extracted in accordance with a motion of the background object so as to generate a plurality of relational expressions indicating relationships between the mixed pixel data and the background pixel data concerning the designated pixel; and mixture-ratio detection means for detecting a mixture ratio indicating a mixture state of the plurality of objects in the real world concerning the designated pixel based on the relational expressions. The relational-expression generating means generates the plurality of relational expressions based on a first approximation in which components of the foreground object contained in the mixed pixel data change substantially linearly with respect to the positions of the pixels, and a second approximation in which the mixture ratio of the mixed pixel data extracted from the designated frame changes substantially linearly with respect to the positions of the pixels.

The image processing apparatus may further include foreground/background separation means for separating the image data into a foreground object image consisting of only the foreground object components which form the foreground object in the image data and a background object image consisting of only background object components which form the background object in the image data based on the mixture ratio corresponding to the designated pixel.

The mixture-ratio detection means may detect the mixture ratio by solving the plurality of relational expressions according to a method of least squares.

A first image processing method of the present invention includes: a relational-expression generating step of extracting, in correspondence with a designated pixel of a designated frame of image data, mixed pixel data, which is pixel data, in which a plurality of objects contained in the image data are mixed, from the designated frame and a peripheral frame around the designated frame in accordance with a motion of a foreground object which forms a foreground of the plurality of objects, and also of extracting, in correspondence with the mixed pixel data, background pixel data, which is the pixel data, corresponding to a background object which forms a background of the plurality of objects, the background pixel data being associated with the corresponding mixed pixel data, from a frame different from the frames from which the mixed pixel data are extracted in accordance with a motion of the background object, so as to generate a plurality of relational expressions indicating relationships between the mixed pixel data and the background pixel data concerning the designated pixel; and a mixture-ratio detection step of detecting a mixture ratio indicating a mixture state of the plurality of objects in the real world concerning the designated pixel based on the relational expressions. In the relational-expression generating step, the plurality of relational expressions are generated based on a first approximation in which components of the foreground object contained in the mixed pixel data change substantially linearly with respect to the positions of the pixels, and a second approximation in which the mixture ratio of the mixed pixel data extracted from the designated frame changes substantially linear with respect to the positions of the pixels.

The image processing method may further include a foreground/background separation step of separating the image data into a foreground object image consisting of only the foreground object components which form the foreground object in the image data and a background object image consisting of only background object components which form the background object in the image data based on the mixture ratio corresponding to the designated pixel.

In the mixture-ratio detection step, the mixture ratio may be detected by solving the plurality of relational expressions according to a method of least squares.

A program of a first recording medium of the present invention includes: a relational-expression generating step of extracting, in correspondence with a designated pixel of a designated frame of image data, mixed pixel data, which is pixel data, in which a plurality of objects contained in the image data are mixed, from the designated frame and a peripheral frame around the designated frame in accordance with a motion of a foreground object which forms a foreground of the plurality of objects, and also of extracting, in correspondence with the mixed pixel data, background pixel data, which is the pixel data, corresponding to a background object which forms a background of the plurality of objects, the background pixel data being associated with the corresponding mixed pixel data, from a frame different from the frames from which the mixed pixel data are extracted in accordance with a motion of the background object, so as to generate a plurality of relational expressions indicating relationships between the mixed pixel data and the background pixel data concerning the designated pixel; and a mixture-ratio detection step of detecting a mixture ratio indicating a mixture state of the plurality of objects in the real world concerning the designated pixel based on the relational expressions. In the relational-expression generating step, the plurality of relational expressions are generated based on a first approximation in which components of the foreground object contained in the mixed pixel data change substantially linearly with respect to the positions of the pixels, and a second approximation in which the mixture ratio of the mixed pixel data extracted from the designated frame changes. substantially linear with respect to the positions of the pixels.

The program may further include a foreground/background separation step of separating the image data into a foreground object image consisting of only the foreground object components which form the foreground object in the image data and a background object image consisting of only background object components which form the background object in the image data based on the mixture ratio corresponding to the designated pixel.

In the mixture-ratio detection step, the mixture ratio may be detected by solving the plurality of relational expressions according to a method of least squares.

A first program of the present invention allows a computer to execute: a relational-expression generating step of extracting, in correspondence with a designated pixel of a designated frame of image data, mixed pixel data, which is pixel data, in which a plurality of objects contained in the image data are mixed, from the designated frame and a peripheral frame around the designated frame in accordance with a motion of a foreground object which forms a foreground of the plurality of objects, and also of extracting, in correspondence with the mixed pixel data, background pixel data, which is the pixel data, corresponding to a background object which forms a background of the plurality of objects, the background pixel data being associated with the corresponding mixed pixel data, from a frame different from the frames from which the mixed pixel data are extracted in accordance with a motion of the background object so as to generate a plurality of relational expressions indicating relationships between the mixed pixel data and the background pixel data concerning the designated pixel; and a mixture-ratio detection step of detecting a mixture ratio indicating a mixture state of the plurality of objects in the real world concerning the designated pixel based on the relational expressions. In the relational-expression generating step, the plurality of relational expressions are generated based on a first approximation in which components of the foreground object contained in the mixed pixel data change substantially linearly with respect to the positions of the pixels, and a second approximation in which the mixture ratio of the mixed pixel data extracted from the designated frame changes substantially linear with respect to the positions of the pixels.

The program may further include a foreground/background separation step of separating the image data into a foreground object image consisting of only the foreground object components which form the foreground object in the image data and a background object image consisting of only background object components which form the background object in the image data based on the mixture ratio corresponding to the designated pixel.

In the mixture-ratio detection step, the mixture ratio may be detected by solving the plurality of relational expressions according to a method of least squares.

A first image-capturing apparatus of the present invention includes: image-capturing means for outputting a subject image captured by an image-capturing device including a predetermined number of pixels having a time integrating function as image data consisting of a predetermined number of pixel data; relational-expression generating means for extracting, in correspondence with a designated pixel of a designated frame of the image data, mixed pixel data, which is the pixel data, in which a plurality of objects contained in the image data are mixed, from the designated frame and a peripheral frame around the designated frame in accordance with a motion of a foreground object which forms a foreground of the plurality of objects, and also for extracting, in correspondence with the mixed pixel data, background pixel data, which is the pixel data, corresponding to a background object which forms a background of the plurality of objects, the background pixel data being associated with the corresponding mixed pixel data, from a frame different from the frames from which the mixed pixel data are extracted in accordance with a motion of the background object so as to generate a plurality of relational expressions indicating relationships between the mixed pixel data and the background pixel data concerning the designated pixel; and mixture-ratio detection means for detecting a mixture ratio indicating a mixture state of the plurality of objects in the real world concerning the designated pixel based on the relational expressions. The relational-expression generating means generates the plurality of relational expressions based on a first approximation in which components of the foreground object contained in the mixed pixel data change substantially linearly with respect to the positions of the pixels, and a second approximation in which the mixture ratio of the mixed pixel data extracted from the designated frame changes substantially linearly with respect to the positions of the pixels.

The image-capturing apparatus may further include foreground/background separation means for separating the image data into a foreground object image consisting of only the foreground object components which form the foreground object in the image data and a background object image consisting of only background object components which form the background object in the image data based on the mixture ratio corresponding to the designated pixel.

The mixture-ratio detection means may detect the mixture ratio by solving the plurality of relational expressions according to a method of least squares.

A second image processing apparatus of the present invention includes: relational-expression generating means for extracting, in correspondence with a designated pixel of a designated frame of image data, pixel data of a peripheral frame around the designated frame as background pixel data corresponding to a background object of a plurality of objects of the image data, and also for extracting designated pixel data of the designated pixel and proximity pixel data of a pixel located in close proximity with the designated pixel in the designated frame so as to generate a plurality of relational expressions indicating relationships of the designated pixel data, the proximity pixel data, and the background pixel data corresponding to the designated pixel data or the proximity pixel data concerning the designated pixel; and mixture-ratio detection means for detecting a mixture ratio indicating a mixture state of the plurality of objects in the real world concerning the designated pixel based on the relational expressions. The relational-expression generating means generates the plurality of relational expressions based on an approximation in which the mixture ratio corresponding to the designated pixel and the proximity pixel is uniform.

The relational-expression generating means may generate the plurality of relational expressions based on an approximation in which components of a foreground object of the plurality of objects contained in the designated pixel data and the proximity pixel data are uniform.

The relational-expression generating means may generate the plurality of relational expressions based on an approximation in which components of a foreground object of the plurality of objects contained in the designated pixel data and the proximity pixel data change substantially linearly with respect to the positions of the pixels.

The image processing apparatus may include foreground/background separation means for separating the image data into a foreground object image consisting of only the foreground object components which form the foreground object in the image data and a background object image consisting of only background object components which form the background object in the image data based on the mixture ratio corresponding to the designated pixel.

The mixture-ratio detection means may detect the mixture ratio by solving the plurality of relational expressions according to a method of least squares.

A second image processing method of the present invention includes: a relational-expression generating step of extracting, in correspondence with a designated pixel of a designated frame of the image data, pixel data of a peripheral frame around the designated frame as background pixel data corresponding to a background object of a plurality of objects of the image data, and also of extracting designated pixel data of the designated pixel and proximity pixel data of a pixel located in close proximity with the designated pixel in the designated frame so as to generate a plurality of relational expressions indicating relationships of the designated pixel data, the proximity pixel data, and the background pixel data corresponding to the designated pixel data or the proximity pixel data concerning the designated pixel; and a mixture-ratio detection step of detecting a mixture ratio indicating a mixture state of the plurality of objects in the real world concerning the designated pixel based on the relational expressions. In the relational-expression generating step, the plurality of relational expressions are generated based on an approximation in which the mixture ratio corresponding to the designated pixel and the proximity pixel is uniform.

In the relational-expression generating step, the plurality of relational expressions may be generated based on an approximation in which components of a foreground object of the plurality of objects contained in the designated pixel data and the proximity pixel data are uniform.

In the relational-expression generating step, the plurality of relational expressions may be generated based on an approximation in which components of a foreground object of the plurality of objects contained in the designated pixel data and the proximity pixel data change substantially linearly with respect to the positions of the pixels.

The image processing method may further include a foreground/background separation step of separating the image data into a foreground object image consisting of only the foreground object components which form the foreground object in the image data and a background object image consisting of only background object components which form the background object in the image data based on the mixture ratio corresponding to the designated pixel.

In the mixture-ratio detection step, the mixture ratio may be detected by solving the plurality of relational expressions according to a method of least squares.

A program of a second recording medium of the present invention includes: a relational-expression generating step of extracting, in correspondence with a designated pixel of a designated frame of image data, pixel data of a peripheral frame around the designated frame as background pixel data corresponding to a background object of a plurality of objects of the image data, and also of extracting designated pixel data of the designated pixel and proximity pixel data of a pixel located in close proximity with the designated pixel in the designated frame so as to generate a plurality of relational expressions indicating relationships of the designated pixel data, the proximity pixel data, and the background pixel data corresponding to the designated pixel data or the proximity pixel data concerning the designated pixel; and a mixture-ratio detection step of detecting a mixture ratio indicating a mixture state of the plurality of objects in the real world concerning the designated pixel based on the relational expressions. In the relational-expression generating-step, the plurality of relational expressions are generated based on an approximation in which the mixture ratio corresponding to the designated pixel and the proximity pixel is uniform.

In the relational-expression generating step, the plurality of relational expressions may be generated based on an approximation in which components of a foreground object of the plurality of objects contained in the designated pixel data and the proximity pixel data are uniform.

In the relational-expression generating step, the plurality of relational expressions may be generated based on an approximation in which components of a foreground object of the plurality of objects contained in the designated pixel data and the proximity pixel data change substantially linearly with respect to the positions of the pixels.

The program may include a foreground/background separation step of separating the image data into a foreground object image consisting of only the foreground object components which form the foreground object in the image data and a background object image consisting of only background object components which form the background object in the image data based on the mixture ratio corresponding to the designated pixel.

In the mixture-ratio detection step, the mixture ratio may be detected by solving the plurality of relational expressions according to a method of least squares.

A second program of the present invention allows a computer to execute: a relational-expression generating step of extracting, in correspondence with a designated pixel of a designated frame of image data, pixel data of a peripheral frame around the designated frame as background pixel data corresponding to a background object of a plurality of objects of the image data, and also of extracting designated pixel data of the designated pixel and proximity pixel data of a pixel located in close proximity with the designated pixel in the designated frame so as to generate a plurality of relational expressions indicating relationships of the designated pixel data, the proximity pixel data, and the background pixel data corresponding to the designated pixel data or the proximity pixel data concerning the designated pixel; and a mixture-ratio detection step of detecting a mixture ratio indicating a mixture state of the plurality of objects in the real world concerning the designated pixel based on the relational expressions. In the relational-expression generating step, the plurality of relational expressions are generated based on an approximation in which the mixture ratio corresponding to the designated pixel and the proximity pixel is uniform.

In the relational-expression generating step, the plurality of relational expressions may be generated based on an approximation in which components of a foreground object of the plurality of objects contained in the designated pixel data and the proximity pixel data are uniform.

In the relational-expression generating step, the plurality of relational expressions may be generated based on an approximation in which components of a foreground object of the plurality of objects contained in the designated pixel data and the proximity pixel data change substantially linearly with respect to the positions of the pixels.

The program may further include a foreground/background separation step of separating the image data into a foreground object image consisting of only the foreground object components which form the foreground object in the image data and a background object image consisting of only background object components which form the background object in the image data based on the mixture ratio corresponding to the designated pixel.

In the mixture-ratio detection step, the mixture ratio may be detected by solving the plurality of relational expressions according to a method of least squares.

A second image-capturing apparatus of the present invention includes: image-capturing means for outputting a subject image captured by an image-capturing device including a predetermined number of pixels having a time integrating function as image data consisting of a predetermined number of pixel data; relational-expression generating means for extracting, in correspondence with a designated pixel of a designated frame of the image data, pixel data of a peripheral frame around the designated frame as background pixel data corresponding to a background object of a plurality of objects of the image data, and also for extracting designated pixel data of the designated pixel and proximity pixel data of a pixel located in close proximity with the designated pixel in the designated frame so as to generate a plurality of relational expressions indicating relationships of the designated pixel data, the proximity pixel data, and the background pixel data corresponding to the designated pixel data or the proximity pixel data concerning the designated pixel; and mixture-ratio detection means for detecting a mixture ratio indicating a mixture state of the plurality of objects in the real world concerning the designated pixel based on the relational expressions. The relational-expression generating means generates the plurality of relational expressions based on an approximation in which the mixture ratio corresponding to the designated pixel and the proximity pixel is uniform.

The relational-expression generating means may generate the plurality of relational expressions based on an approximation in which components of a foreground object of the plurality of objects contained in the designated pixel data and the proximity pixel data are uniform.

The relational-expression generating means may generate the plurality of relational expressions based on an approximation in which components of a foreground object of the plurality of objects contained in the designated pixel data and the proximity pixel data change substantially linearly with respect to the positions of the pixels.

The image-capturing apparatus may further include foreground/background separation means for separating the image data into a foreground object image consisting of only the foreground object components which form the foreground object in the image data and a background object image consisting of only background object components which form the background object in the image data based on the mixture ratio corresponding to the designated pixel.

The mixture-ratio detection means may detect the mixture ratio by solving the plurality of relational expressions according to a method of least squares.

In correspondence with a designated pixel of a designated frame of image data, mixed pixel data, which is pixel data, in which a plurality of objects contained in the image data are mixed, are extracted from the designated frame and a peripheral frame around the designated frame in accordance with a motion of a foreground object which forms a foreground of the plurality of objects. Also, in correspondence with the mixed pixel data, background pixel data, which is the pixel data, corresponding to a background object which forms a background of the plurality of objects, the background pixel data being associated with the corresponding mixed pixel data, are extracted from a frame different from the frames from which the mixed pixel data are extracted in accordance with a motion of the background object. A plurality of relational expressions indicating relationships between the mixed pixel data and the background pixel data are generated concerning the designated pixel. A mixture ratio indicating a mixture state of the plurality of objects in the real world is detected concerning the designated pixel based on the relational expressions. In the generation of the relational expressions, the plurality of relational expressions are generated based on a first approximation in which components of the foreground object contained in the mixed pixel data change substantially linearly with respect to the positions of the pixels, and a second approximation in which the mixture ratio of the mixed pixel data extracted from the designated frame changes substantially linearly with respect to the positions of the pixels.

In correspondence with a designated pixel of a designated frame of the image data, pixel data of a peripheral frame around the designated frame are extracted as background pixel data corresponding to a background object of a plurality of objects of the image data. Also, designated pixel data of the designated pixel and proximity pixel data of a pixel located in close proximity with the designated pixel in the designated frame are extracted. A plurality of relational expressions indicating relationships of the designated pixel data, the proximity pixel data, and the background pixel data corresponding to the designated pixel data or the proximity pixel data are generated concerning the designated pixel. A mixture ratio indicating a mixture state of the plurality of objects in the real world is detected concerning the designated pixel based on the relational expressions. In the generation of the relational expression, the plurality of relational expressions are generated based on an approximation in which the mixture ratio corresponding to the designated pixel and the proximity pixel is uniform.

With this arrangement, the mixture ratio indicating the mixture state of a plurality of objects, such as a background image and a moving object image, can be detected.

BRIEF DESCRIPTION OF THE DRAWINGS

FIG. 5 illustrates the image capturing performed by a sensor.

FIG. 25 illustrates a model in which pixel values are expanded in the time direction and the period corresponding to the shutter time is divided.

FIG. 26 illustrates a model in which pixel values are expanded in the time direction and the period corresponding to the shutter time is divided.

FIG. 27 illustrates the conditions for determining the area.

FIG. 35A illustrates the calculation of a correlation value.

FIG. 35B illustrates the calculation of a correlation value.

FIG. 36A illustrates the calculation of a correlation value.

FIG. 36B illustrates the calculation of a correlation value.

FIG. 37 illustrates an example of the binary object image.

FIG. 39 illustrates determinations made by an area determining portion 342.

FIG. 73A illustrates an input image, a foreground component image, and a background component image.

FIG. 78A illustrates an example of a separated foreground component image.

FIG. 78B illustrates an example of a separated background component image.

BEST MODE FOR CARRYING OUT THE INVENTION

Figure 1:
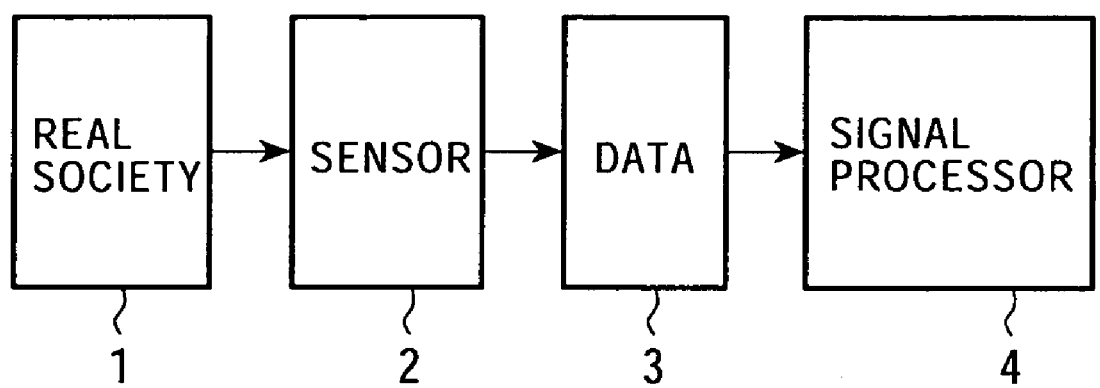
FIG. 1 illustrates the principle of the present invention.

FIG. 1 illustrates the principle of the present invention. As shown in FIG. 1, a first signal, which is information of a real society 1 having a space and a time axis, is obtained by a sensor 2, and is formed into data. Data 3, which is the detection signal obtained by the sensor 2, is information obtained by projecting the information of the real society 1 onto a time space having a dimension lower than the real society. Accordingly, the projected information has distortion caused by the projection. In other words, the data 3 output from the sensor 2 has distortion with respect to the information of the real society 1. Although the data 3 has distortion caused by the projection, it contains significant information for correcting for the distortion.

Accordingly, in the present invention, by performing signal processing on the data output from the sensor 2 by a signal processor 4, significant information can be extracted.

By using this significant information, the distortion can be removed, reduced, or adjusted.

Figure 2:
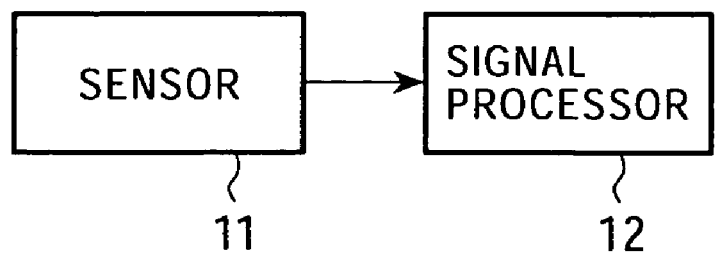
FIG. 2 is a block diagram illustrating an example of the configuration to which the present invention is applied.

FIG. 2 illustrates an example of the configuration of a signal processing apparatus to which the present invention is applied. A sensor 11, which is formed of, for example, a video camera, captures an image of the real society, and outputs the obtained image data to a signal processor 12. The signal processor 12, which is formed of, for example, a personal computer, processes the data input from the sensor 11, adjusts the amount of distortion caused by the projection, specifies the area in which significant information is embedded by the projection, extracts the significant information from the specified area, or processes the input data based on the extracted significant information.

The above-described significant information is, for example, the mixture ratio, which is discussed below.

It can be considered that the information indicating the area in which the significant information embedded by the projection is contained is also significant information. The area information, which is described below, corresponds to the significant information.

The area in which the significant information is contained is, for example, a mixed area, which is discussed below.

Figure 3:
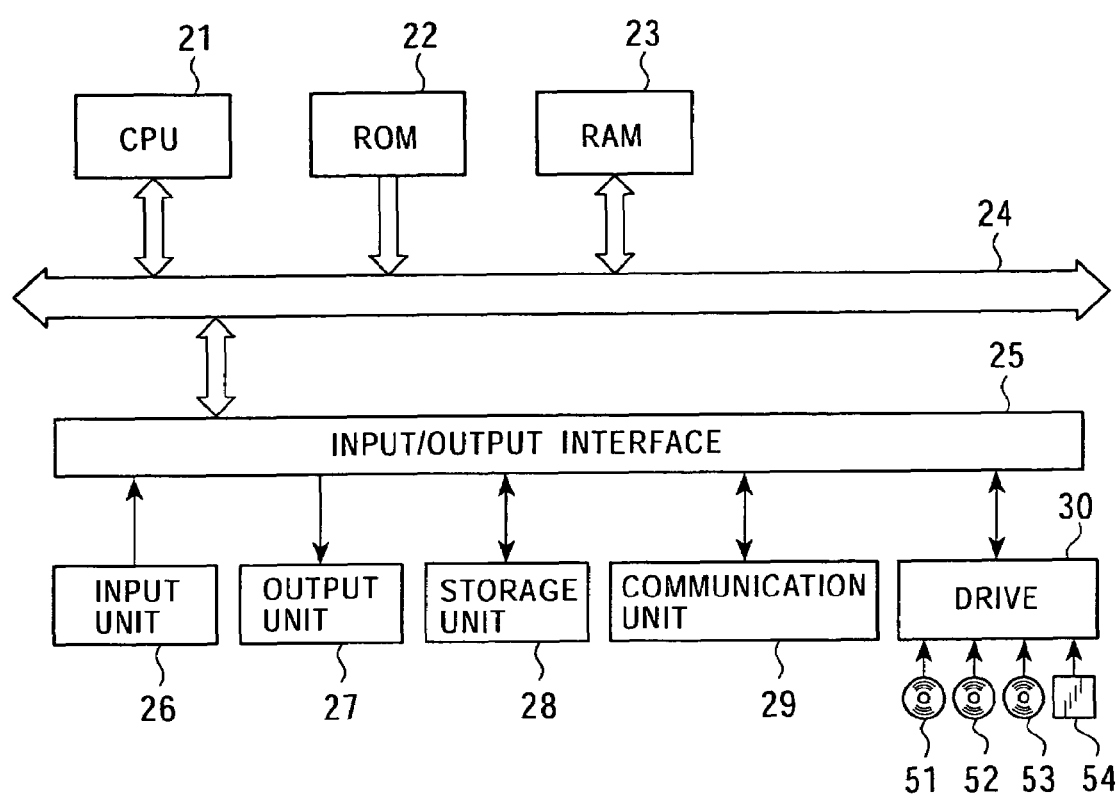
FIG. 3 is a block diagram illustrating an example of the configuration of a signal processor 12 shown in FIG. 2.

The signal processor 12 is configured, for example, as shown in FIG. 3. A CPU (Central Processing Unit) 21 executes various types of processing according to programs stored in a ROM (Read Only Memory) 22 or in a storage unit 28. Programs executed by the CPU 21 and data are stored in a RAM (Random Access Memory) 23 as required. The CPU 21, the ROM 22, and the RAM 23 are connected to each other by a bus 24.

An input/output interface 25 is also connected to the CPU 21 via the bus 24. An input unit 26, which is formed of a keyboard, a mouse, a microphone, and so on, and an output unit 27, which is formed of a display, a speaker, and so on, are connected to the input/output interface 25. The CPU 21 executes various types of processing in response to a command input from the input unit 26. The CPU 21 then outputs an image or sound obtained as a result of the processing to the output unit 27.

The storage unit 28 connected to the input/output interface 25 is formed of, for example, a hard disk, and stores programs executed by the CPU 21 and various types of data. A communication unit 29 communicates with an external device via the Internet or another network. In this example, the communication unit 29 serves as an obtaining unit for obtaining an output of a sensor.

Alternatively, a program may be obtained via the communication unit 29 and stored in the storage unit 28.

A drive 30 connected to the input/output interface 25 drives a magnetic disk 51, an optical disc 52, a magneto-optical disk 53, a semiconductor memory 54, or the like, when such a recording medium is attached to the drive 30, and obtains a program or data stored in the corresponding medium. The obtained program or data is transferred to the storage unit 28 and stored therein if necessary.

By taking a more specific example, a description is now given of a signal processing apparatus which performs processing, such as specifying an area having significant information embedded therein or extracting significant information embedded therein from data obtained by a sensor. In the subsequent example, a CCD line sensor or a CCD area sensor corresponds to the sensor, the area information or the mixture ratio corresponds to the significant information, and the mixture state of a foreground and a background or motion blur in a mixed area corresponds to distortion.

Figure 4:
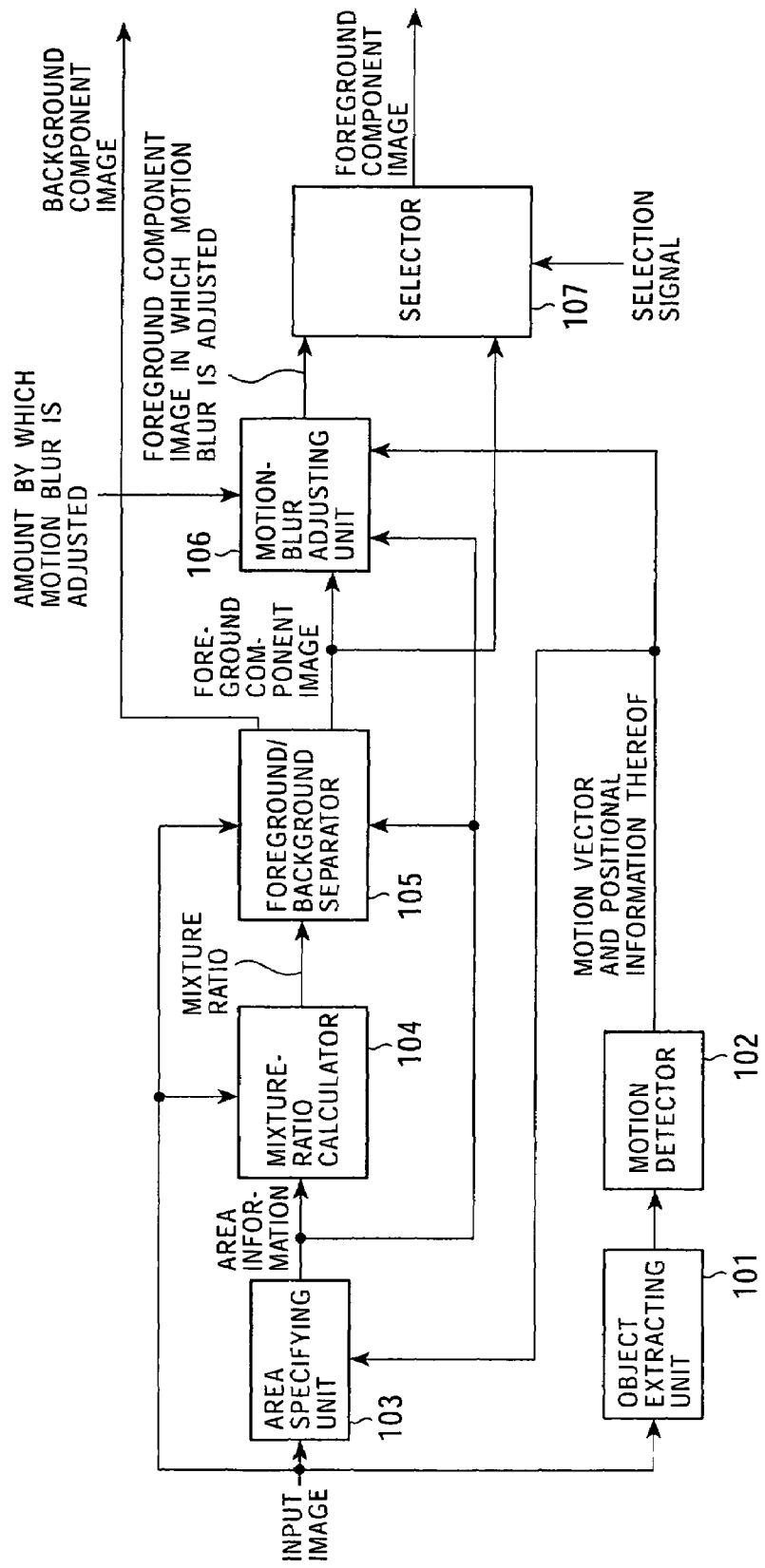
FIG. 4 is a block diagram illustrating the signal processor 12.

FIG. 4 is a block diagram illustrating the signal processor 12.

It does not matter whether the individual functions of the signal processor 12 are implemented by hardware or software. That is, the block diagrams of this specification may be hardware block diagrams or software functional block diagrams.

Motion blur is a distortion contained in an image corresponding to a moving object caused by the movement of an object to be captured in the real world and the image-capturing characteristics of the sensor 11.

In this specification, an image to be captured corresponding to an object in the real world is referred to as an image object.

An input image supplied to the signal processor 12 is supplied to an object extracting unit 101, an area specifying unit 103, a mixture-ratio calculator 104, and a foreground/background separator 105.

The object extracting unit 101 extracts a rough image object corresponding to a foreground object contained in the input image, and supplies the extracted image object to a motion detector 102. The object extracting unit 101 detects, for example, an outline of the foreground image object contained in the input image so as to extract a rough image object corresponding to the foreground object.

The object extracting unit 101 extracts a rough image object corresponding to a background object contained in the input image, and supplies the extracted image object to the motion detector 102. The object extracting unit 101 extracts a rough image object corresponding to the background object from, for example, the difference between the input image and the extracted image object corresponding to the foreground object.

Alternatively, for example, the object extracting unit 101 may extract the rough image object corresponding to the foreground object and the rough image object corresponding to the background object from the difference between the background image stored in a built-in background memory and the input image.

The motion detector 102 calculates a motion vector of the roughly extracted image object corresponding to the foreground object according to a technique, such as block matching, gradient, phase correlation, or pel-recursive technique, and supplies the calculated motion vector and the motion-vector positional information (which is information for specifying the positions of the pixels corresponding to the motion vector) to the area specifying unit 103, the mixture-ratio calculator 104, and a motion-blur extracting unit 106.

The motion vector output from the motion detector 102 contains information corresponding to the amount of movement v.

The motion detector 102 may output the motion vector of each image object, together with the pixel positional information for specifying the pixels of the image object, to the motion-blur adjusting unit 106.

The amount of movement v is a value indicating a positional change in an image corresponding to a moving object in units of the pixel pitch. For example, if an object image corresponding to a foreground is moving such that it is displayed at a position four pixels away from a reference frame when it is positioned in the subsequent frame, the amount of movement v of the object image corresponding to the foreground is 4.

The object extracting unit 101 and the motion detector 102 are needed when adjusting the amount of motion blur corresponding to a moving object.

The area specifying unit 103 determines to which of a foreground area, a background area, or a mixed area each pixel of the input image belongs, and supplies information indicating to which area each pixel belongs (hereinafter referred to as "area information") to the mixture-ratio calculator 104, the foreground/background separator 105, and the motion-blur adjusting unit 106.

The mixture-ratio calculator 104 calculates the mixture ratio corresponding to the pixels contained in a mixed area 63 (hereinafter referred to as the "mixture ratio $\alpha$") based on the input image, the motion vector and the positional information thereof supplied from the motion detector 102, and the area information supplied from the area specifying unit 103, and supplies the mixture ratio $\alpha$ to the foreground/background separator 105.

The mixture ratio α is a value indicating the ratio of the image components corresponding to the background object (hereinafter also be referred to as "background components") to the pixel value as expressed by equation (3), which is shown below.

The foreground/background separator 105 separates the input image into a foreground component image formed of only the image components corresponding to the foreground object (hereinafter also be referred to as "foreground components") and a background component image formed of only the background components based on the area information supplied from the area specifying unit 103 and the mixture ratio α supplied from the mixture-ratio calculator 104, and supplies the foreground component image to the motion-blur adjusting unit 106 and a selector 107. The separated foreground component image may be set as the final output. A more precise foreground and background can be obtained compared to a known method in which only a foreground and a background are specified without considering the mixed area.

The motion-blur adjusting unit 106 determines the unit of processing indicating at least one pixel contained in the foreground component image based on the amount of movement v obtained from the motion vector and based on the area information. The unit of processing is data that specifies a group of pixels to be subjected to the motion-blur adjustments.

Based on the amount by which the motion blur is to be adjusted, which is input into the signal processor 12, the foreground component image supplied from the foreground/background separator 105, the motion vector and the positional information thereof supplied from the motion detector 102, and the unit of processing, the motion-blur adjusting unit 106 adjusts the amount of motion blur contained in the foreground component image by removing, decreasing, or increasing the motion blur contained in the foreground component image. The motion-blur adjusting unit 106 then outputs the foreground component image in which amount of motion blur is adjusted to the selector 107. It is not essential that the motion vector and the positional information thereof be used.

The selector 107 selects one of the foreground component image supplied from the foreground/background separator 105 and the foreground component image in which the amount of motion blur is adjusted supplied from the motion-blur adjusting unit 106 based on, for example, a selection signal reflecting a user's selection, and outputs the selected foreground component image.

An input image supplied to the signal processor 12 is discussed below with reference to FIGS. 5 through 20.

FIG. 5 illustrates image capturing performed by a sensor. The sensor 11 is formed of, for example; a CCD (Charge-Coupled Device) video camera provided with a CCD area sensor, which is a solid-state image-capturing device. An object 111 corresponding to a foreground in the real world moves, for example, horizontally from the left to the right, between an object 112 corresponding to a background and the sensor.

The sensor 11 captures the image of the object 111 corresponding to the foreground together with the image of the object 112 corresponding to the background. The sensor 11 outputs the captured image in units of frames. For example, the sensor 11 outputs an image having 30 frames per second. The exposure time of the sensor 11 can be 1/30 second. The exposure time is a period from when the sensor 11 starts converting input light into electrical charge until when the conversion from the input light to the electrical charge is finished. The exposure time is also referred to as a "shutter time".

Figure 6:
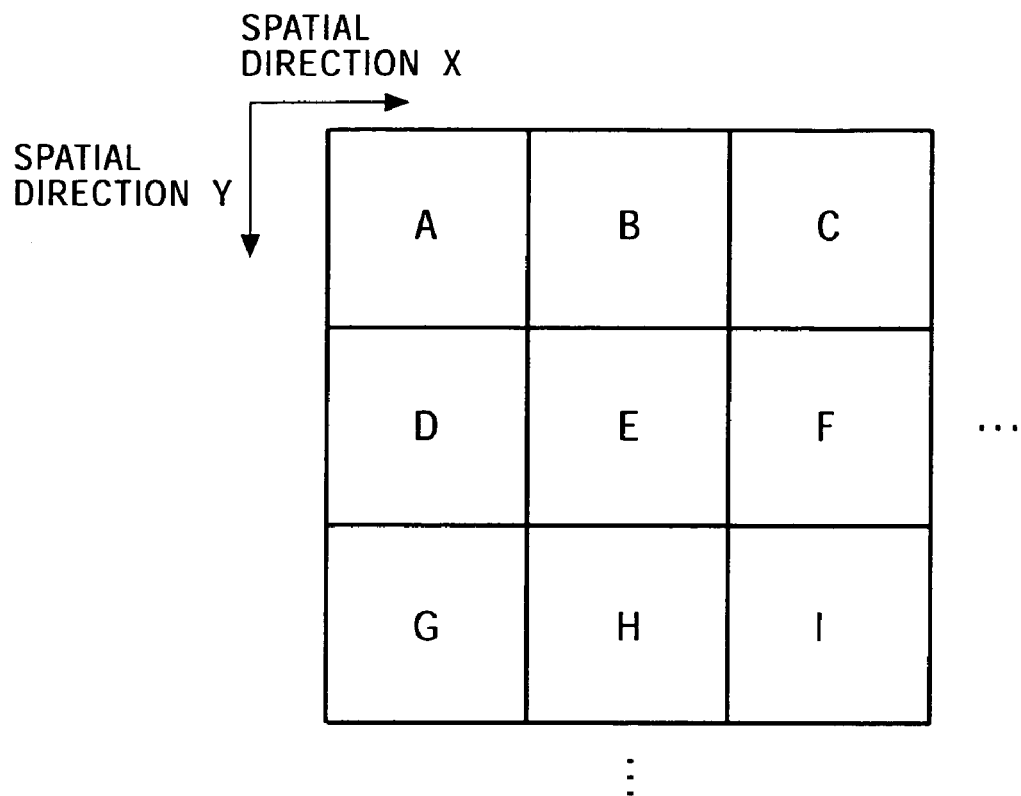
FIG. 6 illustrates the arrangement of pixels.

FIG. 6 illustrates the arrangement of pixels. In FIG. 6, A through I indicate the individual pixels. The pixels are disposed on a plane of a corresponding image. One detection device corresponding to each pixel is disposed on the sensor 11. When the sensor 11 performs image capturing, each detection device outputs a pixel value of the corresponding pixel forming the image. For example, the position of the detection device in the X direction corresponds to the horizontal direction on the image, while the position of the detection device in the Y direction corresponds to the vertical direction on the image.

Figure 7:
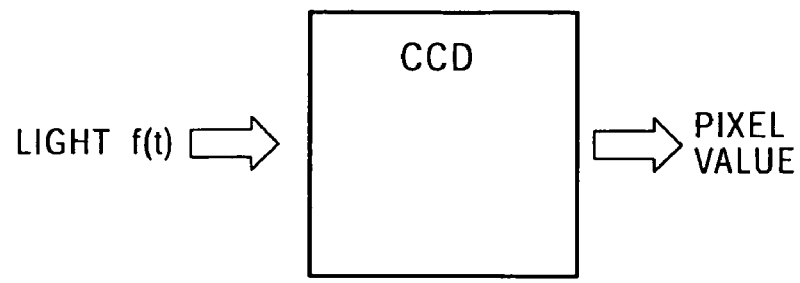
FIG. 7 illustrates the operation of a detection device.

As shown in FIG. 7, the detection device, which is, for example, a CCD, converts input light into electrical charge during a period corresponding to a shutter time, and stores the converted electrical charge. The amount of charge is almost proportional to the intensity of the input light and the period for which the light is input. The detection device sequentially adds the electrical charge converted from the input light to the stored electrical charge during the period corresponding to the shutter time. That is, the detection device integrates the input light during the period corresponding to the shutter time and stores the electrical charge corresponding to the amount of integrated light. It can be considered that the detection device has an integrating function with respect to time.

The electrical charge stored in the detection device is converted into a voltage value by a circuit (not shown), and the voltage value is further converted into a pixel value, such as digital data, and is output. Accordingly, each pixel value output from the sensor 11 is a value projected on a linear space, which is a result of integrating a certain three-dimensional portion of the object corresponding to the foreground or the background with respect to the shutter time.

The signal processor 12 extracts significant information embedded in the output signal, for example, the mixture ratio α, by the storage operation of the sensor 11. The signal processor 12 adjusts the amount of distortion, for example, the amount of motion blur, caused by the mixture of the foreground image object itself. The signal processor 12 also adjusts the amount of distortion caused by the mixture of the foreground image object and the background image object.

Figure 8A:
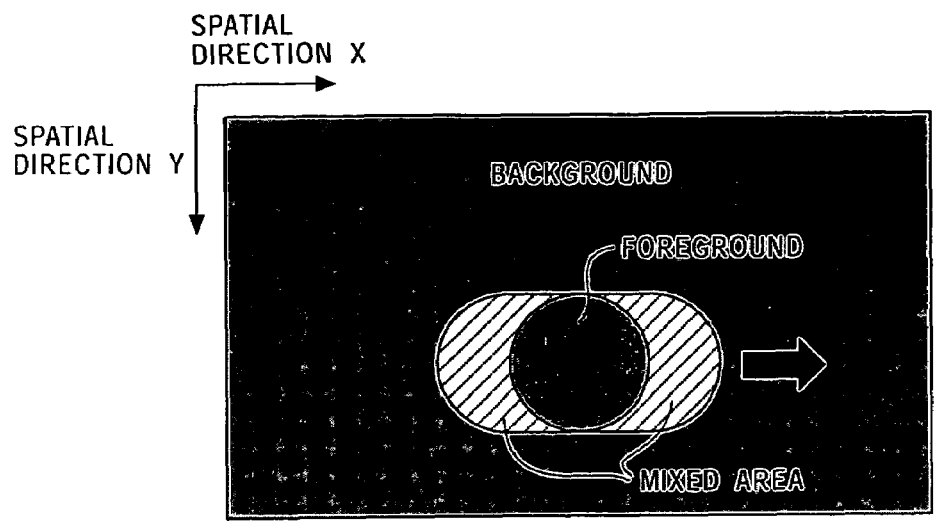
FIG. 8A illustrates an image obtained by image-capturing an object corresponding to a moving foreground and an object corresponding to a stationary background.

FIG. 8A illustrates an image obtained by capturing a moving object corresponding to a foreground and a stationary object corresponding to a background. In the example shown in FIG. 8A, the object corresponding to the foreground is moving horizontally from the left to the right with respect to the screen.

Figure 8B:
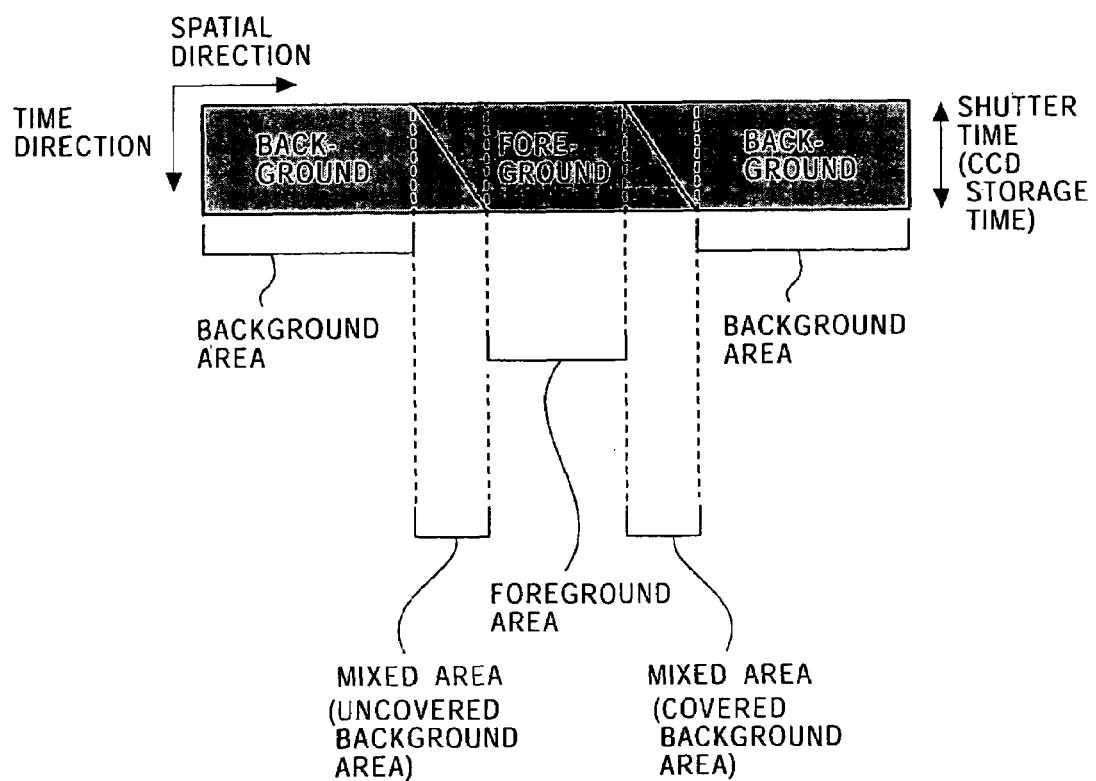
FIG. 8B illustrates a model of an image obtained by image-capturing an object corresponding to a moving foreground and an object corresponding to a stationary background.

FIG. 8B illustrates a model obtained by expanding pixel values corresponding to one line of the image shown in FIG. 8A in the time direction. The horizontal direction shown in FIG. 8B corresponds to the spatial direction X in FIG. 8A.

The values of the pixels in the background area are formed only from the background components, that is, the image components corresponding to the background object. The values of the pixels in the foreground area are formed only from the foreground components, that is, the image components corresponding to the foreground object.

The values of the pixels of the mixed area are formed from the background components and the foreground components. Since the values of the pixels in the mixed area are formed from the background components and the foreground components, it may be referred to as a "distortion area". The mixed area is further classified into a covered background area and an uncovered background area.

The covered background area is a mixed area at a position corresponding to the leading end in the direction in which the foreground object is moving, where the background components are gradually covered with the foreground over time.

In contrast, the uncovered background area is a mixed area corresponding to the trailing end in the direction in which the foreground object is moving, where the background components gradually appear over time.

As discussed above, the image containing the foreground area, the background area, or the covered background area or the uncovered background area is input into the area specifying unit 103, the mixture-ratio calculator 104, and the foreground/background separator 105 as the input image.

Figures 9, 10:
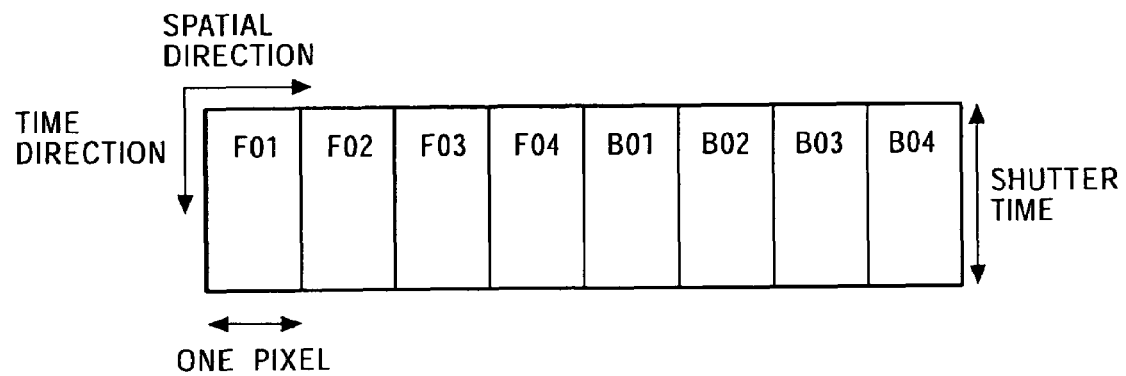
FIG. 9 illustrates a background area, a foreground area, a mixed area, a covered background area, and an uncovered background area.
FIG. 10 illustrates a model obtained by expanding in the time direction the pixel values of pixels aligned side-by-side in an image obtained by image-capturing an object corresponding to a stationary foreground and an the object corresponding to a stationary background.

FIG. 9 illustrates the background area, the foreground area, the mixed area, the covered background area, and the uncovered background area discussed above. In the areas corresponding to the image shown in FIG. 8A, the background area is a stationary portion, the foreground area is a moving portion, the covered background area of the mixed area is a portion that changes from the background to the foreground, and the uncovered background area of the mixed area is a portion that changes from the foreground to the background.

FIG. 10 illustrates a model obtained by expanding in the time direction the pixel values of the pixels aligned side-by-side in the image obtained by capturing the image of the object corresponding to the stationary foreground and the image of the object corresponding to the stationary background. For example, as the pixels aligned side-by-side, pixels arranged in one line on the screen can be selected.

The pixel values indicated by F01 through F04 shown in FIG. 10 are values of the pixels corresponding to the object of the stationary foreground. The pixel values indicated by B01 through B04 shown in FIG. 10 are values of the pixels corresponding to the object of the stationary background.

Time elapses from the top to the bottom in FIG. 10 in the vertical direction in FIG. 10. The position at the top side of the rectangle in FIG. 10 corresponds to the time at which the sensor 11 starts converting input light into electrical charge, and the position at the bottom side of the rectangle in FIG. 10 corresponds to the time at which the conversion from the input light into the electrical charge is finished. That is, the distance from the top side to the bottom side of the rectangle in FIG. 10 corresponds to the shutter time.

The pixels shown in FIG. 10 are described below assuming that, for example, the shutter time is equal to the frame size.

The horizontal direction in FIG. 10 corresponds to the spatial direction X in FIG. 8A. More specifically, in the example shown in FIG. 10, the distance from the left side of the rectangle indicated by "F01" in FIG. 10 to the right side of the rectangle indicated by "B04" is eight times the pixel pitch, i.e., eight consecutive pixels.

When the foreground object and the background object are stationary, the light input into the sensor 11 does not change during the period corresponding to the shutter time.

The period corresponding to the shutter time is divided into two or more portions of equal periods. For example, if the number of virtual divided portions is 4, the model shown in FIG. 10 can be represented by the model shown in FIG. 11. The number of virtual divided portions can be set according to the amount of movement v of the object corresponding to the foreground within the shutter time. For example, the number of virtual divided portions is set to 4 when the amount of movement v is 4, and the period corresponding to the shutter time is divided into four portions.

Figure 11:
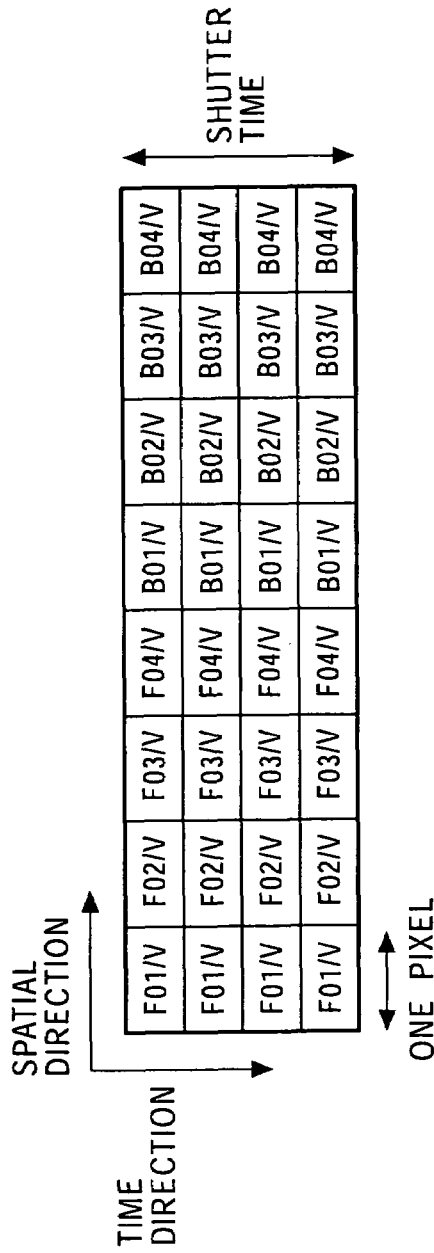
FIG. 11 illustrates a model in which pixel values are expanded in the time direction and the period corresponding to the shutter time is divided.

The uppermost line in FIG. 11 corresponds to the first divided period from when the shutter has opened. The second line in FIG. 11 corresponds to the second divided period from when the shutter has opened. The third line in FIG. 11 corresponds to the third divided period from when the shutter has opened. The fourth line in FIG. 11 corresponds to the fourth divided period from when the shutter has opened.

The shutter time divided in accordance with the amount of movement v is also hereinafter referred to as the "shutter time/v".

When the object corresponding to the foreground is stationary, the light input into the sensor 11 does not change, and thus, the foreground component F01/v is equal to the value obtained by dividing the pixel value F01 by the number of virtual divided portions. Similarly, when the object corresponding to the foreground is stationary, the foreground component F02/v is equal to the value obtained by dividing the pixel value F02 by the number of virtual divided portions, the foreground component F03/v is equal to the value obtained by dividing the pixel value F03 by the number of virtual divided portions, and the foreground component F04/v is equal to the value obtained by dividing the pixel value F04 by the number of virtual divided portions.

When the object corresponding to the background is stationary, the light input into the sensor 11 does not change, and thus, the background component B01/v is equal to the value obtained by dividing the pixel value B01 by the number of virtual divided portions. Similarly, when the object corresponding to the background is stationary, the background component B02/v is equal to the value obtained by dividing the pixel value B02 by the number of virtual divided portions, the background component B03/v is equal to the value obtained by dividing the pixel value B03 by the number of virtual divided portions, and the background component B04/v is equal to the value obtained by dividing the pixel value B04 by the number of virtual divided portions.

More specifically, when the object corresponding to the foreground is stationary, the light corresponding to the foreground object input into the sensor 11 does not change during the period corresponding to the shutter time. Accordingly, the foreground component F01/v corresponding to the first portion of the shutter time/v from when the shutter has opened, the foreground component F01/v corresponding to the second portion of the shutter time/v from when the shutter has opened, the foreground component F01/v corresponding to the third portion of the shutter time/v from when the shutter has opened, and the foreground component F01/v corresponding to the fourth portion of the shutter time/v from when the shutter has opened become the same value. The same applies to F02/v through F04/v, as in the case of F01/v.

When the object corresponding to the background is stationary, the light corresponding to the background object input into the sensor 11 does not change during the period corresponding to the shutter time. Accordingly, the background component B01/v corresponding to the first portion of the shutter time/v from when the shutter has opened, the background component B01/v corresponding to the second portion of the shutter time/v from when the shutter has opened, the background component B01/v corresponding to the third portion of the shutter time/v from when the shutter has opened, and the background component B01/v corresponding to the fourth portion of the shutter time/v from when the shutter has opened become the same value. The same applies to B02/v through B04/v.

A description is given of the case in which the object corresponding to the foreground is moving and the object corresponding to the background is stationary.

Figure 12:
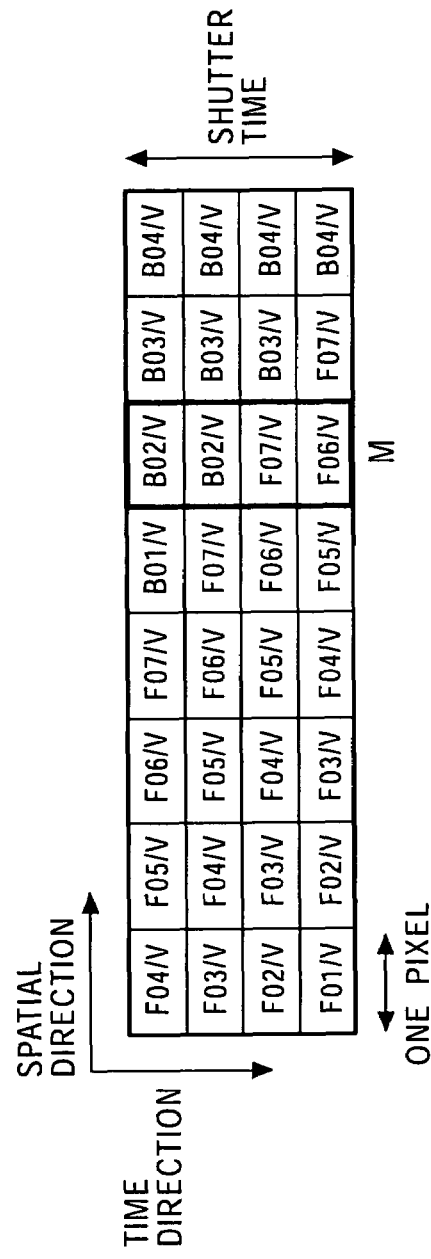
FIG. 12 illustrates a model in which pixel values are expanded in the time direction and the period corresponding to the shutter time is divided.

FIG. 12 illustrates a model obtained by expanding in the time direction the pixel-values of the pixels in one line, including a covered background area, when the object corresponding to the foreground is moving to the right in FIG. 12. In FIG. 12, the amount of movement v is 4. Since one frame is a short period, it can be assumed that the object corresponding to the foreground is a rigid body moving with constant velocity. In FIG. 12, the object image corresponding to the foreground is moving such that it is positioned four pixels to the right with respect to a reference frame when it is displayed in the subsequent frame.

In FIG. 12, the pixels from the leftmost pixel to the fourth pixel belong to the foreground area. In FIG. 12, the pixels from the fifth pixel to the seventh pixel from the left belong to the mixed area, which is the covered background area. In FIG. 12, the rightmost pixel belongs to the background area.

The object corresponding to the foreground is moving such that it gradually covers the object corresponding to the background over time. Accordingly, the components contained in the pixel values of the pixels belonging to the covered background area change from the background components to the foreground components at a certain time during the period corresponding to the shutter time.

For example, the pixel value M surrounded by the thick frame in FIG. 12 is expressed by equation (1) below.

$$M=B02/v+B02/v+F07/v+F06/v \quad (1)$$

For example, the fifth pixel from the left contains a background component corresponding to one portion of the shutter time/v and foreground components corresponding to three portions of the shutter time/v, and thus, the mixture ratio α of the fifth pixel from the left is 1/4. The sixth pixel from the left contains background components corresponding to two portions of the shutter time/v and foreground components corresponding to two portions of the shutter time/v, and thus, the mixture ratio α of the sixth pixel from the left is 1/2. The seventh pixel from the left contains background components corresponding to three portions of the shutter time/v and a foreground component corresponding to one portion of the shutter time/v, and thus, the mixture ratio α of the fifth pixel from the left is 3/4.

It can be assumed that the object corresponding to the foreground is a rigid body, and the foreground object is moving with constant velocity such that it is displayed four pixels to the right in the subsequent frame. Accordingly, for example, the foreground component F07/v of the fourth pixel from the left in FIG. 12 corresponding to the first portion of the shutter time/v from when the shutter has opened is equal to the foreground component of the fifth pixel from the left in FIG. 12 corresponding to the second portion of the shutter time/v from when the shutter has opened. Similarly, the foreground component F07/v is equal to the foreground component of the sixth pixel from the left in FIG. 12 corresponding to the third portion of the shutter time/v from when the shutter has opened, and the foreground component of the seventh pixel from the left in FIG. 12 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F06/v of the third pixel from the left in FIG. 12 corresponding to the first portion of the shutter time/v from when the shutter has opened is equal to the foreground component of the fourth pixel from the left in FIG. 12 corresponding to the second portion of the shutter time/v from when the shutter has opened. Similarly, the foreground component F06/v is equal to the foreground component of the fifth pixel from the left in FIG. 12 corresponding to the third portion of the shutter time/v from when the shutter has opened, and the foreground component of the sixth pixel from the left in FIG. 12 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F05/v of the second pixel from the left in FIG. 12 corresponding to the first portion of the shutter time/v from when the shutter has opened is equal to the foreground component of the third pixel from the left in FIG. 12 corresponding to the second portion of the shutter time/v from when the shutter has opened. Similarly, the foreground-component F05/v is equal to the foreground component of the fourth pixel from the left in FIG. 12 corresponding to the third portion of the shutter time/v from when the shutter has opened, and the foreground component of the fifth pixel from the left in FIG. 12 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F04/v of the left most pixel in FIG. 12 corresponding to the first portion of the shutter time/v from when the shutter has opened is equal to the foreground component of the second pixel from the left in FIG. 12 corresponding to the second portion of the shutter time/v from when the shutter has opened. Similarly, the foreground component F04/v is equal to the foreground component of the third pixel from the left in FIG. 12 corresponding to the third portion of the shutter time/v from when the shutter has opened, and the foreground component of the fourth pixel from the left in FIG. 12 corresponding to the fourth portion of the shutter time/v from when the shutter has opened.

Since the foreground area corresponding to the moving object contains motion blur as discussed above, it can also be referred to as a "distortion area".

Figure 13:
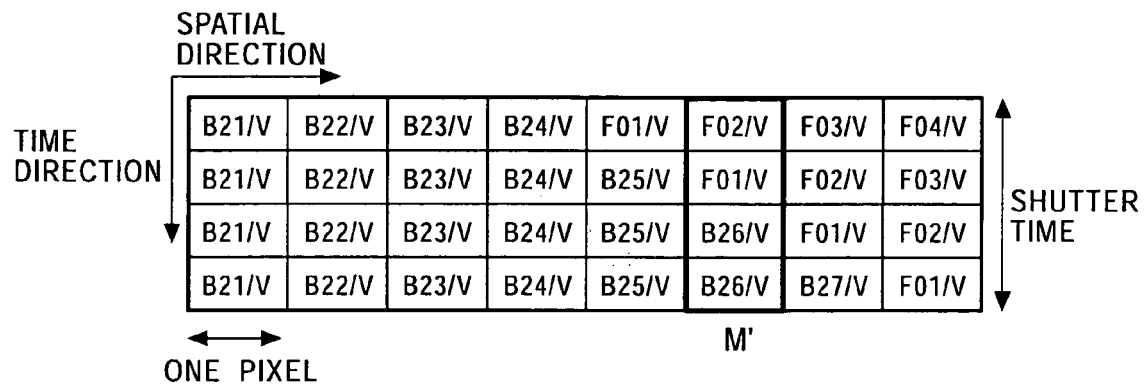
FIG. 13 illustrates a model in which pixel values are expanded in the time direction and the period corresponding to the shutter time is divided.

FIG. 13 illustrates a model obtained by expanding in the time direction the pixel values of the pixels in one line including an uncovered background area when the object corresponding to the foreground is moving to the right in FIG. 13. In FIG. 13, the amount of movement v is 4. Since one frame is a short period, it can be assumed that the object corresponding to the foreground is a rigid body moving with constant velocity. In FIG. 13, the object image corresponding to the foreground is moving to the right such that it is positioned four pixels to the right with respect to a reference frame when it is displayed in the subsequent frame.

In FIG. 13, the pixels from the leftmost pixel to the fourth pixel belong to the background area. In FIG. 13, the pixels from the fifth pixel to the seventh pixels from the left belong to the mixed area, which is an uncovered background area. In FIG. 13, the rightmost pixel belongs to the foreground area.

The object corresponding to the foreground which covers the object corresponding to the background is moving such that it is gradually removed from the object corresponding to the background over time. Accordingly, the components contained in the pixel values of the pixels belonging to the uncovered background area change from the foreground components to the background components at a certain time of the period corresponding to the shutter time.

For example, the pixel value M' surrounded by the thick frame in FIG. 13 is expressed by equation (2).

$$M'=F02/v+F01/v+B26/v+B26/v \qquad (2)$$

For example, the fifth pixel from the left contains background components corresponding to three portions of the shutter time/v and a foreground component corresponding to one shutter portion of the shutter time/v, and thus, the mixture ratio α of the fifth pixel from the left is 3/4. The sixth pixel from the left contains background components corresponding to two portions of the shutter time/v and foreground components corresponding to two portions of the shutter time/v, and thus, the mixture ratio α of the sixth pixel from the left is 1/2. The seventh pixel from the left contains a background component corresponding to one portion of the shutter time/v and foreground components corresponding to three portions of the shutter time/v, and thus, the mixture ratio α of the seventh pixel from the left is 1/4.

When equations (1) and (2) are generalized, the pixel value M can be expressed by equation (3):

$$M = \alpha \cdot B + \sum_i Fi/v \qquad (3)$$

where α is the mixture ratio, B indicates a pixel value of the background, and Fi/v designates a foreground component.

It can be assumed that the object corresponding to the foreground is a rigid body, which is moving with constant velocity, and the amount of movement is 4. Accordingly, for example, the foreground component F01/v of the fifth pixel from the left in FIG. 13 corresponding to the first portion of the shutter time/v from when the shutter has opened is equal to the foreground component of the sixth pixel from the left in FIG. 13 corresponding to the second portion of the shutter time/v from when the shutter has opened. Similarly, the foreground component F01/v is equal to the foreground component of the seventh pixel from the left in FIG. 13 corresponding to the third portion of the shutter time/v from when the shutter has opened, and the foreground component of the eighth pixel from the left in FIG. 13 corresponding to the fourth portion of the shutter time/v from when the shutter has opened.

It can be assumed that the object corresponding to the foreground is a rigid body, which is moving with constant velocity, and the amount of movement v is 4. Accordingly, for example, the foreground component F02/v of the sixth pixel from the left in FIG. 13 corresponding to the first portion of the shutter time/v from when the shutter has opened is equal to the foreground component of the seventh pixel from the left in FIG. 13 corresponding to the second portion of the shutter time/v from when the shutter has opened. Similarly, the foreground component F02/v is equal to the foreground component of the eighth pixel from the left in FIG. 13 corresponding to the third portion of the shutter time/v from when the shutter has opened.

It can be assumed that the object corresponding to the foreground is a rigid body, which is moving with constant velocity, and the amount of movement v is 4. Accordingly, for example, the foreground component F03/v of the seventh pixel from the left in FIG. 13 corresponding to the first portion of the shutter time/v from when the shutter has opened is equal to the foreground component of the eighth pixel from the left in FIG. 13 corresponding to the second portion of the shutter time/v from when the shutter has opened.

It has been described with reference to FIGS. 11 through 13 that the number of virtual divided portions is 4. The number of virtual divided portions corresponds to the amount of movement v. Generally, the amount of movement v corresponds to the moving speed of the object corresponding to the foreground. For example, if the object corresponding to the foreground is moving such that it is displayed four pixels to the right with respect to a certain frame when it is positioned in the subsequent frame, the amount of movement v is set to 4. The number of virtual divided portions is set to 4 in accordance with the amount of movement v. Similarly, when the object corresponding to the foreground is moving such that it is displayed six pixels to the left with respect to a certain frame when it is positioned in the subsequent frame, the amount of movement v is set to 6, and the number of virtual divided portions is set to 6.

Figure 14:
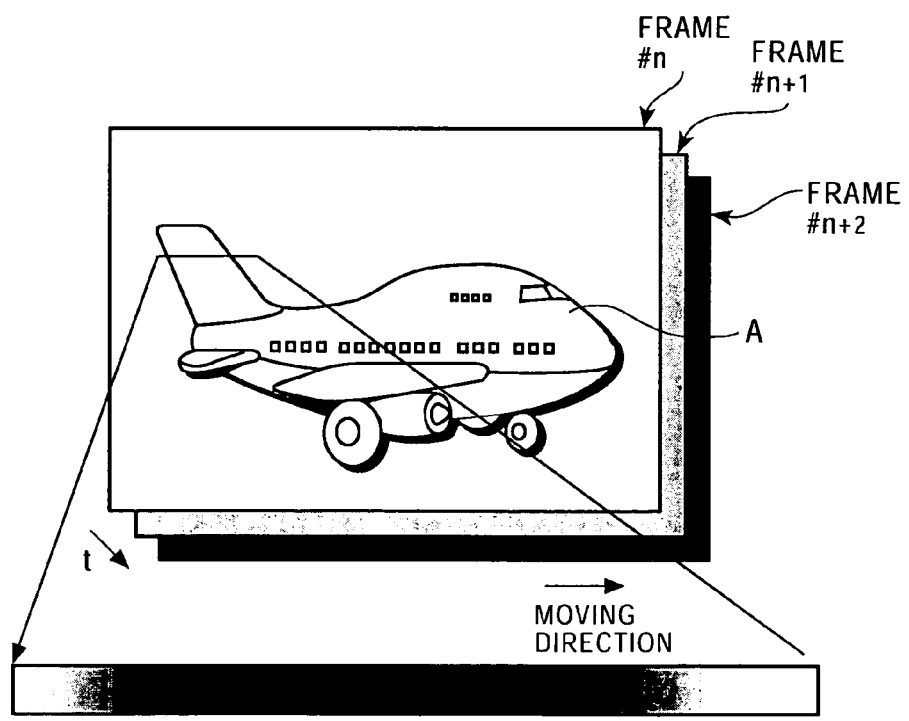
FIG. 14 illustrates an example in which pixels in a foreground area, a background area, and a mixed area are extracted.
Figure 15:
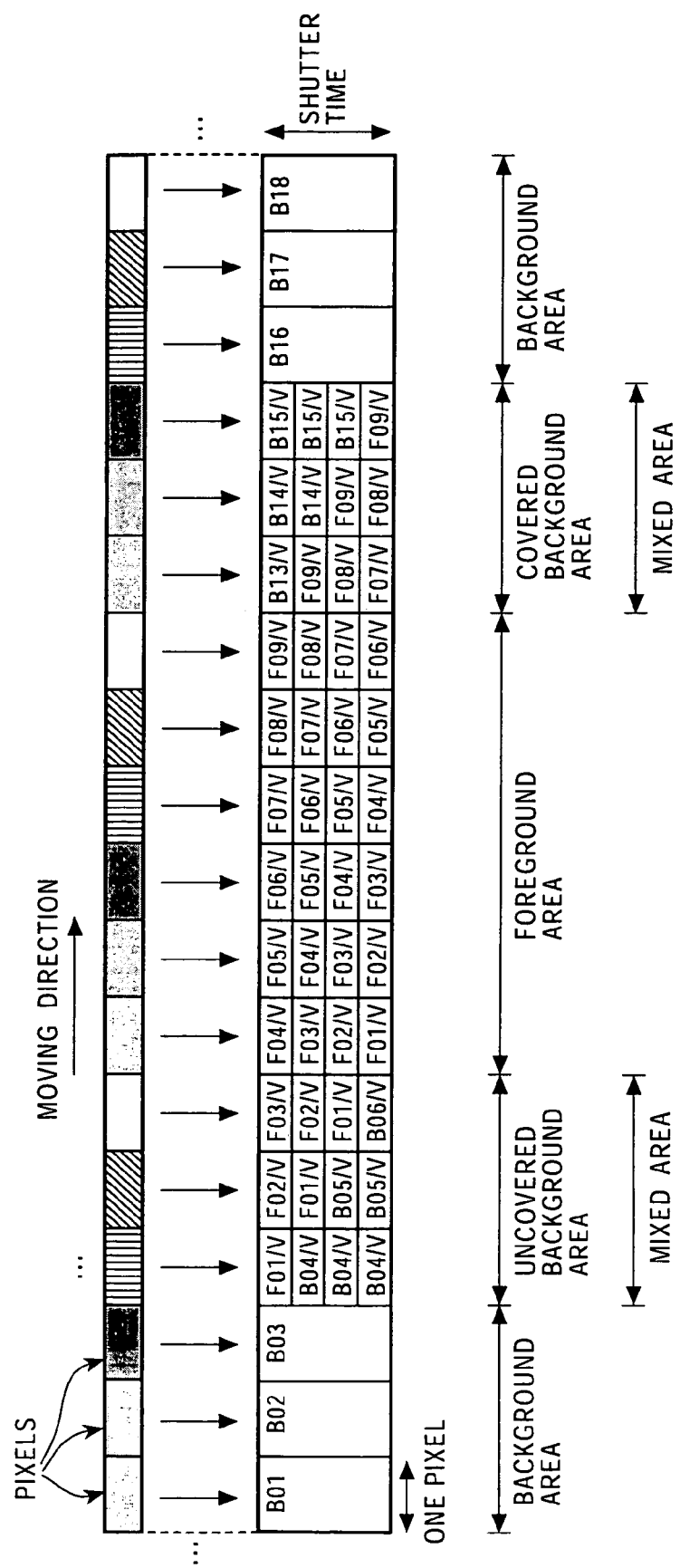
FIG. 15 illustrates the relationships between pixels and a model obtained by expanding the pixel values in the time direction.

FIGS. 14 and 15 illustrate the relationship of the foreground area, the background area, and the mixed area which consists of a covered background or an uncovered background, which are discussed above, to the foreground components and the background components corresponding to the divided periods of the shutter time.

FIG. 14 illustrates an example in which pixels in the foreground area, the background area, and the mixed area are extracted from an image containing a foreground corresponding to an object moving in front of a stationary background. In the example shown in FIG. 14, the object corresponding to the foreground is horizontally moving with respect to the screen.

Frame #n+1 is a frame subsequent to frame #n, and frame #n+2 is a frame subsequent to frame #n+1.

Pixels in the foreground area, the background area, and the mixed area are extracted from one of frames #n through #n+2, and the amount of movement v is set to 4. A model obtained by expanding the pixel values of the extracted pixels in the time direction is shown in FIG. 15.

Since the object corresponding to the foreground is moving, the pixel values in the foreground area are formed of four different foreground components corresponding to the shutter time/v. For example, the leftmost pixel of the pixels in the foreground area shown in FIG. 15 consists of F01/v, F02/v, F03/v, and F04/v. That is, the pixels in the foreground contain motion blur.

Since the object corresponding to the background is stationary, light input into the sensor 11 corresponding to the background during the shutter time does not change. In this case, the pixel values in the background area do not contain motion blur.

The pixel values in the mixed area consisting of a covered background area or an uncovered background area are formed of foreground components and background components.

A description is given below of a model obtained by expanding in the time direction the pixel values of the pixels which are aligned side-by-side in a plurality of frames and which are located at the same positions when the frames are overlapped when the image corresponding to the object is moving. For example, when the image corresponding to the object is moving horizontally with respect to the screen, pixels aligned on the screen can be selected as the pixels aligned side-by-side.

Figure 16:
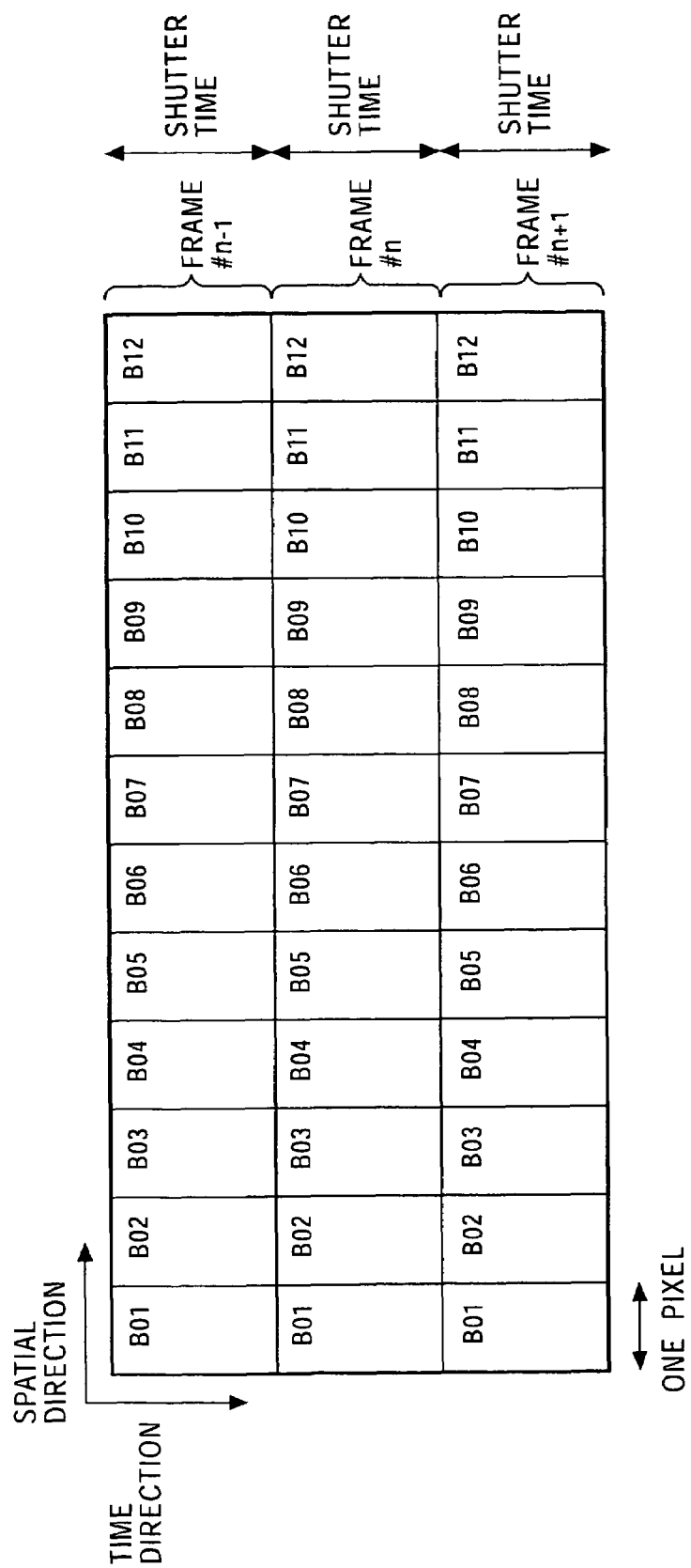
FIG. 16 illustrates a model in which pixel values are expanded in the time direction and the period corresponding to the shutter time is divided.

FIG. 16 illustrates a model obtained by expanding in the time direction the pixels which are aligned side-by-side in three frames of an image obtained by capturing an object corresponding to a stationary background and which are located at the same positions when the frames are overlapped. Frame #n is the frame subsequent to frame #n−1, and frame #n+1 is the frame subsequent to frame #n. The same applies to the other frames.

The pixel values B01 through B12 shown in FIG. 16 are pixel values corresponding to the stationary background object. Since the object corresponding to the background is stationary, the pixel values of the corresponding pixels in frame #n−1 through frame #n+1 do not change. For example, the pixel in frame #n and the pixel in frame #n+1 located at the corresponding position of the pixel having the pixel value B05 in frame #n−1 have the pixel value B05.

Figure 17:
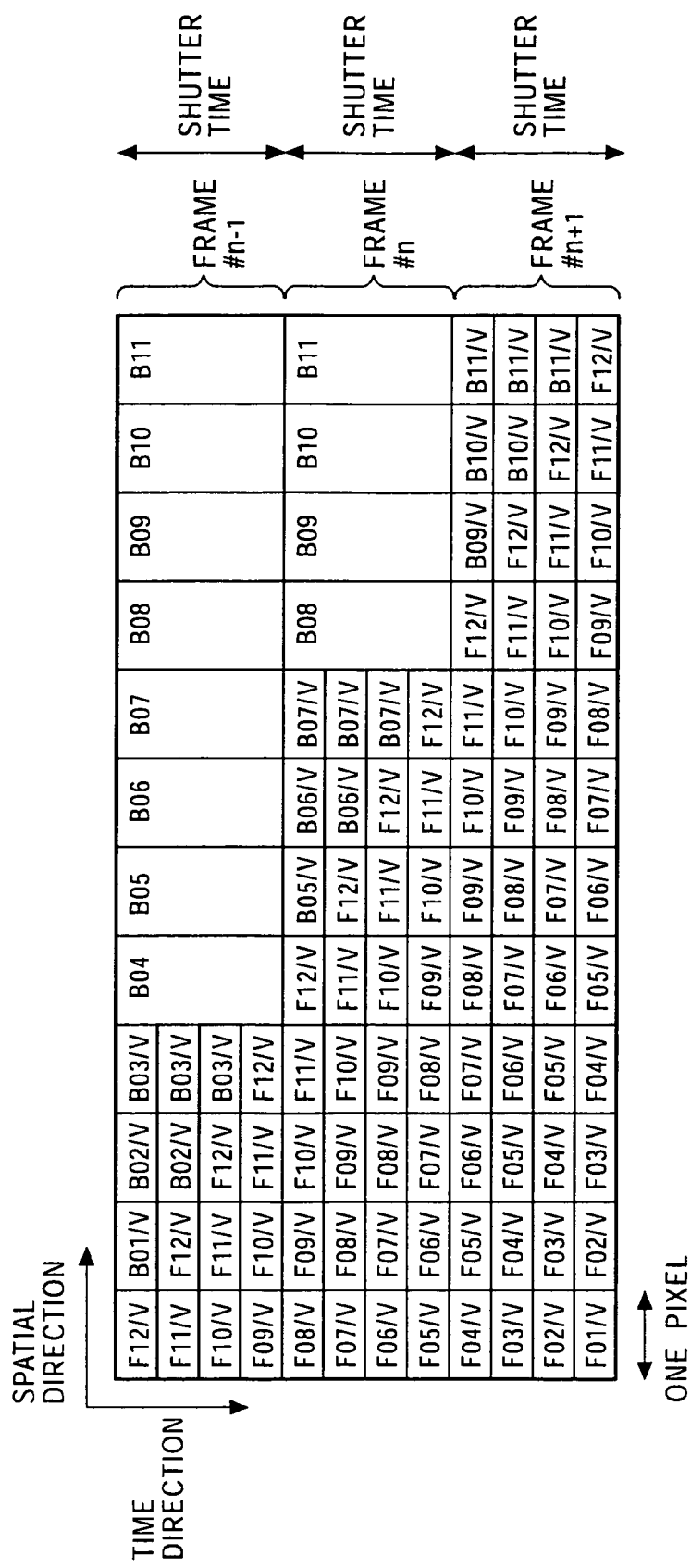
FIG. 17 illustrates a model in which pixel values are expanded in the time direction and the period corresponding to the shutter time is divided.

FIG. 17 illustrates a model obtained by expanding in the time direction the pixels which are aligned side-by-side in three frames of an image obtained by capturing an object corresponding to a foreground that is moving to the right in FIG. 17 together with an object corresponding to a stationary background and which are located at the same positions when the frames are overlapped. The model shown in FIG. 17 contains a covered background area.

In FIG. 17, it can be assumed that the object corresponding to the foreground is a rigid body moving with constant velocity, and that it is moving such that it is displayed four pixels to the right in the subsequent frame. Accordingly, the amount of movement v is 4, and the number of virtual divided portions is 4.

For example, the foreground component of the leftmost pixel of frame #n−1 in FIG. 17 corresponding to the first portion of the shutter time/v from when the shutter has opened is F12/v, and the foreground component of the second pixel from the left in FIG. 17 corresponding to the second portion of the shutter time/v from when the shutter has opened is also F12/v. The foreground component of the third pixel from the left in FIG. 17 corresponding to the third portion of the shutter time/v from when the shutter has opened and the foreground component of the fourth pixel from the left in FIG. 17 corresponding to the fourth portion of the shutter time/v from when the shutter has opened are F12/v.

The foreground component of the leftmost pixel of frame #n−1 in FIG. 17 corresponding to the second portion of the shutter time/v from when the shutter has opened is F11/v. The foreground component of the second pixel from the left in FIG. 17 corresponding to the third portion of the shutter time/v from when the shutter has opened is also F11/v. The foreground component of the third pixel from the left in FIG. 17 corresponding to the fourth portion of the shutter time/v from when the shutter has opened is F11/v.

The foreground component of the leftmost pixel of frame #n−1 in FIG. 17 corresponding to the third portion of the shutter time/v from when the shutter has opened is F10/v. The foreground component of the second pixel from the left in FIG. 17 corresponding to the fourth portion of the shutter time/v from when the shutter has opened is also F10/v. The foreground component of the leftmost pixel of frame #n−1 in FIG. 17 corresponding to the fourth portion of the shutter time/v from when the shutter has opened is F09/v.

Since the object corresponding to the background is stationary, the background component of the second pixel from the left of frame #n−1 in FIG. 17 corresponding to the first portion of the shutter time/v from when the shutter has opened is B01/v. The background components of the third pixel from the left of frame #n−1 in FIG. 17 corresponding to the first and second portions of the shutter time/v from when the shutter has opened are B02/v. The background components of the fourth pixel from the left of frame #n−1 in FIG. 17 corresponding to the first through third portions of the shutter time/v from when the shutter has opened are B03/v.

In frame #n−1 in FIG. 17, the leftmost pixel from the left belongs to the foreground area, and the second through fourth pixels from the left belong to the mixed area, which is a covered background area.

The fifth through twelfth pixels from the left of frame #n−1 in FIG. 17 belong to the background area, and the pixel values thereof are B04 through B11, respectively.

The first through fifth pixels from the left in frame #n in FIG. 17 belong to the foreground area. The foreground component in the shutter time/v in the foreground area of frame #n is any one of F05/v through F12/v.

It can be assumed that the object corresponding to the foreground is a rigid body moving with constant velocity, and that it is moving such that the foreground image is displayed four pixels to the right in the subsequent frame. Accordingly, the foreground component of the fifth pixel from the left of frame #n in FIG. 17 corresponding to the first portion of the shutter time/v from when the shutter has opened is F12/v, and the foreground component of the sixth pixel from the left in FIG. 17 corresponding to the second portion of the shutter time/v from when the shutter has opened is also F12/v. The foreground component of the seventh pixel from the left in FIG. 17 corresponding to the third portion of the shutter time/v from when the shutter has opened and the foreground component of the eighth pixel from the left in FIG. 17 corresponding to the fourth portion of the shutter time/v from when the shutter has opened are F12/v.

The foreground component of the fifth pixel from the left of frame #n in FIG. 17 corresponding to the second portion of the shutter time/v from when the shutter has opened is F11/v. The foreground component of the sixth pixel from the left in FIG. 17 corresponding to the third portion of the shutter time/v from when the shutter has opened is also F11/v. The foreground component of the seventh pixel from the left in FIG. 17 corresponding to the fourth portion of the shutter time/v from when the shutter has opened is F11/v.

The foreground component of the fifth pixel from the left of frame #n in FIG. 17 corresponding to the third portion of the shutter time/v from when the shutter has opened is F10/v. The foreground component of the sixth pixel from the left in FIG. 17 corresponding to the fourth portion of the shutter time/v from when the shutter has opened is also F10/v. The foreground component of the fifth pixel from the left of frame #n in FIG. 17 corresponding to the fourth portion of the shutter time/v from when the shutter has opened is F09/v.

Since the object corresponding to the background is stationary, the background component of the sixth pixel from the left of frame #n in FIG. 17 corresponding to the first portion of the shutter time/v from when the shutter has opened is B05/v. The background components of the seventh pixel from the left of frame #n in FIG. 17 corresponding to the first and second portions of the shutter time/v from when the shutter has opened are B06/v. The background components of the eighth pixel from the left of frame #n in FIG. 17 corresponding to the first through third portion of the shutter time/v from when the shutter has opened are B07/v.

In frame #n in FIG. 17, the sixth through eighth pixels from the left belong to the mixed area, which is a covered background area.

The ninth through twelfth pixels from the left of frame #n in FIG. 17 belong to the background area, and the pixel values thereof are B08 through B11, respectively.

The first through ninth pixels from the left in frame #n+1 in FIG. 17 belong to the foreground area. The foreground component in the shutter time/v in the foreground area of frame #n+1 is any one of F01/v through F12/v.

It can be assumed that the object corresponding to the foreground is a rigid body moving with constant velocity, and that it is moving such that the foreground image is displayed four pixels to the right in the subsequent frame. Accordingly, the foreground component of the ninth pixel from the left of frame #n+1 in FIG. 17 corresponding to the first portion of the shutter time/v from when the shutter has opened is F12/v, and the foreground component of the tenth pixel from the left in FIG. 17 corresponding to the second portion of the shutter time/v from when the shutter has opened is also F12/v. The foreground component of the eleventh pixel from the left in FIG. 17 corresponding to the third portion of the shutter time/v from when the shutter has opened and the foreground component of the twelfth pixel from the left in FIG. 17 corresponding to the fourth portion of the shutter time/v from when the shutter has opened are F12/v.

The foreground component of the ninth pixel from the left of frame #n+1 in FIG. 17 corresponding to the second portion of the shutter time/v from when the shutter has opened is F11/v. The foreground component of the tenth pixel from the left in FIG. 17 corresponding to the third portion of the shutter time/v from when the shutter has opened is also F11/v. The foreground component of the eleventh pixel from the left in FIG. 17 corresponding to the fourth portion of the shutter time/v from when the shutter has opened is F11/v.

The foreground component of the ninth pixel from the left of frame #n+1 in FIG. 17 corresponding to the third portion of the shutter time/v from when the shutter has opened is F10/v. The foreground component of the tenth pixel from the left in FIG. 17 corresponding to the fourth portion of the shutter time/v from when the shutter has opened is also F10/v. The foreground component of the ninth pixel from the left of frame #n+1 in FIG. 17 corresponding to the fourth portion of the shutter time/v from when the shutter has opened is F09/v.

Since the object corresponding to the background is stationary, the background component of the tenth pixel from the left of frame #n+1 in FIG. 17 corresponding to the first portion of the shutter time/v from when the shutter has opened is B09/v. The background components of the eleventh pixel from the left of frame #n+1 in FIG. 17 corresponding to the first and second portions of the shutter time/v from when the shutter has opened are B10/v. The background components of the twelfth pixel from the left of frame #n+1 in FIG. 17 corresponding to the first through third portion of the shutter time/v from when the shutter has opened are B11/v.

In frame #n+1 in FIG. 17, the tenth through twelfth pixels from the left belong to the mixed area, which is a covered background area.

Figure 18:
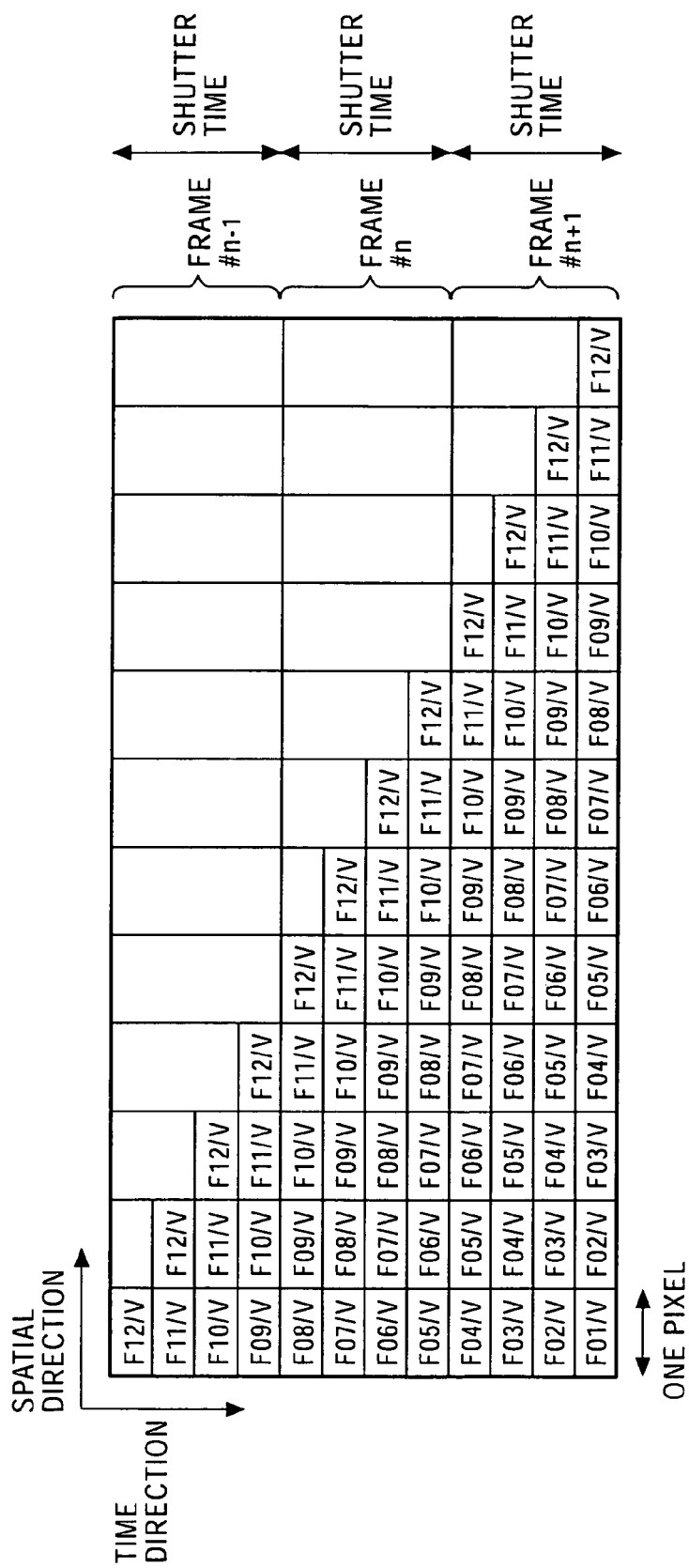
FIG. 18 illustrates a model in which pixel values are expanded in the time direction and the period corresponding to the shutter time is divided.

FIG. 18 is a model of an image obtained by extracting the foreground components from the pixel values shown in FIG. 17.

Figure 19:
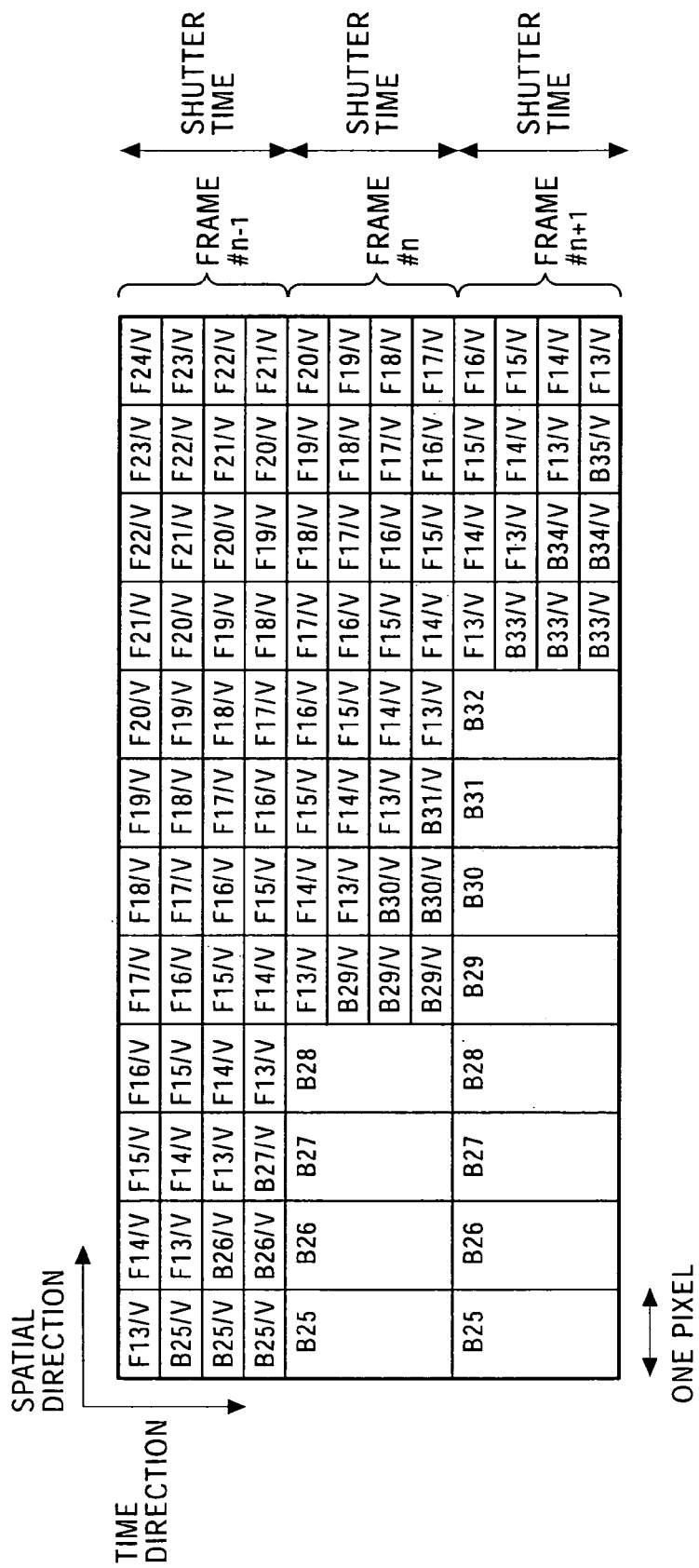
FIG. 19 illustrates a model in which pixel values are expanded in the time direction and the period corresponding to the shutter time is divided.

FIG. 19 illustrates a model obtained by expanding in the time direction the pixels which are aligned side-by-side in three frames of an image obtained by capturing an object corresponding to a foreground that is moving to the right in FIG. 19 together with an object corresponding to a stationary background and which are located at the same positions when the frames are overlapped. The model shown in FIG. 19 contains an uncovered background area.

In FIG. 19, it can be assumed that the object corresponding to the foreground is a rigid body moving with constant velocity, and that it is moving such that it is displayed four pixels to the right in the subsequent frame. Accordingly, the amount of movement v is 4.

For example, the foreground component of the leftmost pixel of frame #n−1 in FIG. 19 corresponding to the first portion of the shutter time/v from when the shutter has opened is F13/v, and the foreground component of the second pixel from the left in FIG. 19 corresponding to the second portion of the shutter time/v from when the shutter has opened is also F13/v. The foreground component of the third pixel from the left in FIG. 19 corresponding to the third portion of the shutter time/v from when the shutter has opened and the foreground component of the fourth pixel from the left in FIG. 19 corresponding to the fourth portion of the shutter time/v from when the shutter has opened are F13/v.

The foreground component of the second pixel from the left of frame #n−1 in FIG. 19 corresponding to the first portion of the shutter time/v from when the shutter has opened is F14/v. The foreground component of the third pixel from the left in FIG. 19 corresponding to the second portion of the shutter time/v from when the shutter has opened is also F14/v. The foreground component of the third pixel from the left in FIG. 19 corresponding to the first portion of the shutter time/v from when the shutter has opened is F15/v.

Since the object corresponding to the background is stationary, the background components of the leftmost pixel of frame #n−1 in FIG. 19 corresponding to the second through fourth portions of the shutter time/v from when the shutter has opened are B25/v. The background components of the second pixel from the left of frame #n−1 in FIG. 19 corresponding to the third and fourth portions of the shutter time/v from when the shutter has opened are B26/v. The background component of the third pixel from the left of frame #n−1 in FIG. 19 corresponding to the fourth portion of the shutter time/v from when the shutter has opened is B27/v.

In frame #n−1 in FIG. 19, the leftmost pixel through the third pixel belong to the mixed area, which is an uncovered background area.

The fourth through twelfth pixels from the left of frame #n−1 in FIG. 19 belong to the foreground area. The foreground component of the frame is any one of F13/v through F24/v.

The leftmost pixel through the fourth pixel from the left of frame #n in FIG. 19 belong to the background area, and the pixel values thereof are B25 through B28, respectively.

It can be assumed that the object corresponding to the foreground is a rigid body moving with constant velocity, and that it is moving such that it is displayed four pixels to the right in the subsequent frame. Accordingly, the foreground component of the fifth pixel from the left of frame #n in FIG. 19 corresponding to the first portion of the shutter time/v from when the shutter has opened is F13/v, and the foreground component of the sixth pixel from the left in FIG. 19 corresponding to the second portion of the shutter time/v from when the shutter has opened is also F13/v. The foreground component of the seventh pixel from the left in FIG. 19 corresponding to the third portion of the shutter time/v from when the shutter has opened and the foreground component of the eighth pixel from the left in FIG. 19 corresponding to the fourth portion of the shutter time/v from when the shutter has opened are F13/v.

The foreground component of the sixth pixel from the left of frame #n in FIG. 19 corresponding to the first portion of the shutter time/v from when the shutter has opened is F14/v. The foreground component of the seventh pixel from the left in FIG. 19 corresponding to the second portion of the shutter time/v from when the shutter has opened is also F14/v. The foreground component of the eighth pixel from the left in FIG. 19 corresponding to the first portion of the shutter time/v from when the shutter has opened is F15/v.

Since the object corresponding to the background is stationary, the background components of the fifth pixel from the left of frame #n in FIG. 19 corresponding to the second through fourth portions of the shutter time/v from when the shutter has opened are B29/v. The background components of the sixth pixel from the left of frame #n in FIG. 19 corresponding to the third and fourth portions of the shutter time/v from when the shutter has opened are B30/v. The background component of the seventh pixel from the left of frame #n in FIG. 19 corresponding to the fourth portion of the shutter time/v from when the shutter has opened is B31/v.

In frame #n in FIG. 19, the fifth pixel through the seventh pixel from the left belong to the mixed area, which is an uncovered background area.

The eighth through twelfth pixels from the left of frame #n in FIG. 19 belong to the foreground area. The value in the foreground area of frame #n corresponding to the period of the shutter time/v is any one of F13/v through F20/v.

The leftmost pixel through the eighth pixel from the left of frame #n+1 in FIG. 19 belong to the background area, and the pixel values thereof are B25 through B32, respectively.

It can be assumed that the object corresponding to the foreground is a rigid body moving with constant velocity, and that it is moving such that it is displayed four pixels to the right in the subsequent frame. Accordingly, the foreground component of the ninth pixel from the left of frame #n+1 in FIG. 19 corresponding to the first portion of the shutter time/v from when the shutter has opened is F13/v, and the foreground component of the tenth pixel from the left in FIG. 19 corresponding to the second portion of the shutter time/v from when the shutter has opened is also F13/v. The foreground component of the eleventh pixel from the left in FIG. 19 corresponding to the third portion of the shutter time/v from when the shutter has opened and the foreground component of the twelfth pixel from the left in FIG. 19 corresponding to the fourth portion of the shutter time/v from when the shutter has opened are F13/v.

The foreground component of the tenth pixel from the left of frame #n+1 in FIG. 19 corresponding to the first portion of the shutter time/v from when the shutter has opened is F14/v. The foreground component of the eleventh pixel from the left in FIG. 19 corresponding to the second portion of the shutter time/v from when the shutter has opened is also F14/v. The foreground component of the twelfth pixel from the left in FIG. 19 corresponding to the first portion of the shutter time/v from when the shutter has opened is F15/v.

Since the object corresponding to the background is stationary, the background components of the ninth pixel from the left of frame #n+1 in FIG. 19 corresponding to the second through fourth portions of the shutter time/v from when the shutter has opened are B33/v. The background components of the tenth pixel from the left of frame #n+1 in FIG. 19 corresponding to the third and fourth portions of the shutter time/v from when the shutter has opened are B34/v. The background component of the eleventh pixel from the left of frame #n+1 in FIG. 19 corresponding to the fourth portion of the shutter time/v from when the shutter has opened is B35/v.

In frame #n+1 in FIG. 19, the ninth through eleventh pixels from the left in FIG. 19 belong to the mixed area, which is an uncovered background area.

The twelfth pixel from the left of frame #n+1 in FIG. 19 belongs to the foreground area. The foreground component in the shutter time/v in the foreground area of frame #n+1 is any one of F13 through F16, respectively.

Figure 20:
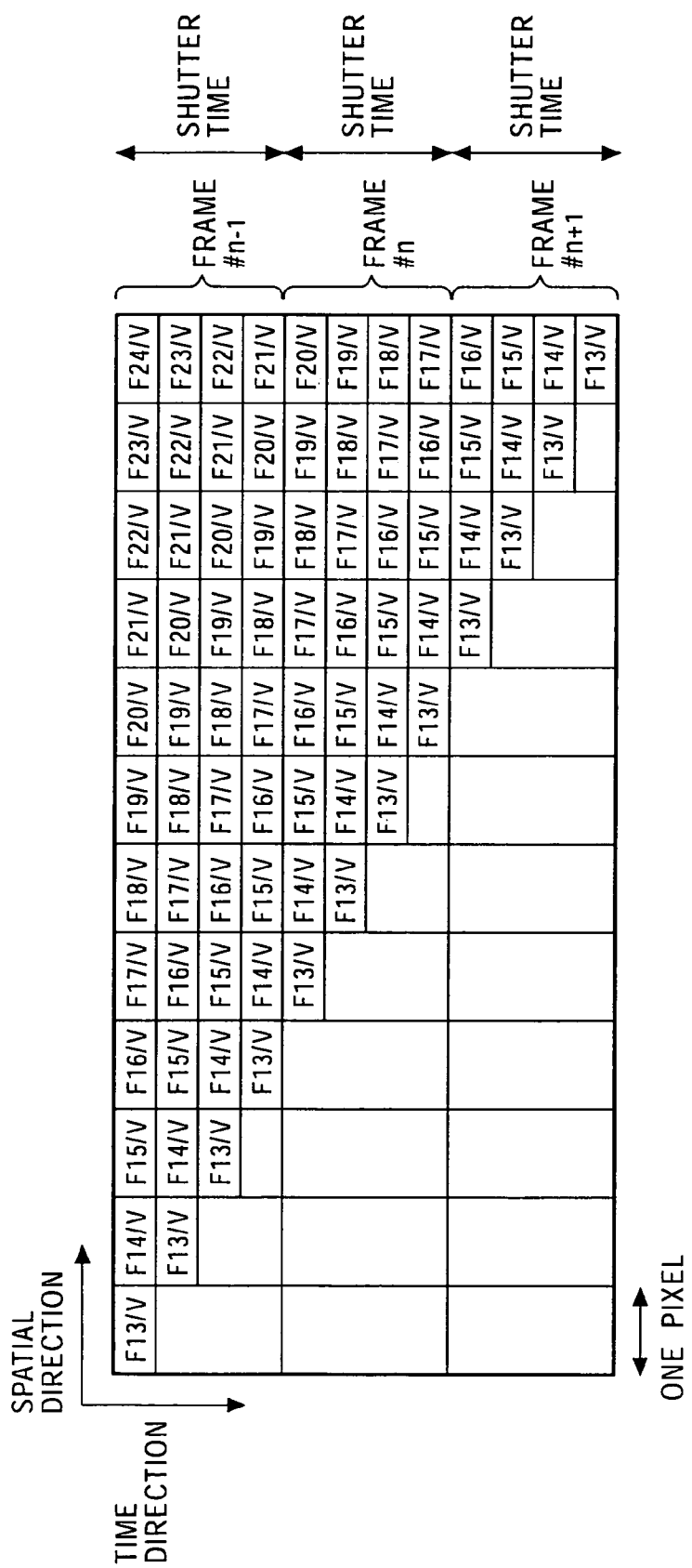
FIG. 20 illustrates a model in which pixel values are expanded in the time direction and the period corresponding to the shutter time is divided.

FIG. 20 illustrates a model of an image obtained by extracting the foreground components from the pixel values shown in FIG. 19.

Referring back to FIG. 4, the area specifying unit 103 specifies flags indicating to which of a foreground area, a background area, a covered background area, or an uncovered background area the individual pixels of the input image belong by using the pixel values of a plurality of frames, and supplies the flags to the mixture-ratio calculator 104 and the motion-blur adjusting unit 106 as the area information.

The mixture-ratio calculator 104 calculates the mixture ratio α for each pixel contained in the mixed area based on the pixel values of a plurality of frames and the area information, and supplies the calculated mixture ratio α to the foreground/background separator 105.

The foreground/background separator 105 extracts the foreground component image consisting of only the foreground components based on the pixel values of a plurality of frames, the area information, and the mixture ratio α, and supplies the foreground component image to the motion-blur adjusting unit 106.

The motion-blur adjusting unit 106 adjusts the amount of motion blur contained in the foreground component image based on the foreground component image supplied from the foreground/background separator 105, the motion vector supplied from the motion detector 102, and the area information supplied from the area specifying unit 103, and then outputs the foreground component image in which motion blur is adjusted.

Figure 21:
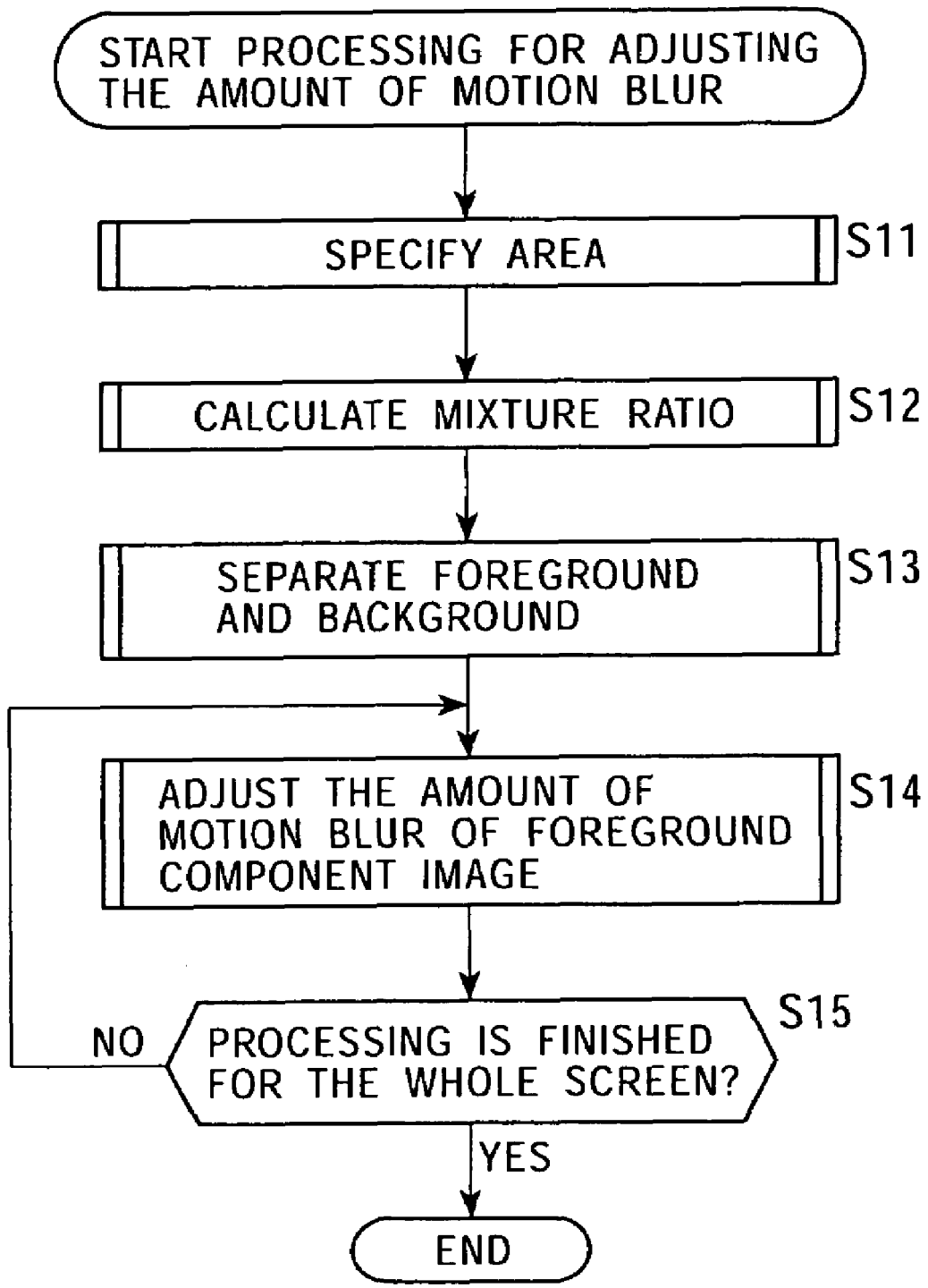
FIG. 21 is a flowchart illustrating the processing for adjusting the amount of motion blur.

The processing for adjusting the amount of motion blur performed by the signal processor 12 is described below with reference to the flowchart of FIG. 21. In step S11, the area specifying unit 103 executes area specifying processing, based on an input image, for generating area information indicating to which of a foreground area, a background area, a covered background area, or an uncovered background area each pixel of the input image belongs. Details of the area specifying processing are given below. The area specifying unit 103 supplies the generated area information to the mixture-ratio calculator 104.

In step S11, the area specifying unit 103 may generate, based on the input image, area information indicating to which of the foreground area, the background area, or the mixed area (regardless of whether each pixel belongs to a covered background area or an uncovered background area) each pixel of the input image belongs. In this case, the foreground/background separator 105 and the motion-blur adjusting unit 106 determine based on the direction of the motion vector whether the mixed area is a covered background area or an uncovered background area. For example, if the input image is disposed in the order of the foreground area, the mixed area, and the background area in the direction of the motion vector, it is determined that the mixed area is a covered background area. If the input image is disposed in the order of the background area, the mixed area, and the foreground area in the direction of the motion vector, it is determined that the mixed area is an uncovered background area.

In step S12, the mixture-ratio calculator 104 calculates the mixture ratio α for each pixel contained in the mixed area based on the input image, the motion vector and the positional information thereof, and the area information. Details of the mixture ratio calculating processing are given below. The mixture-ratio calculator 104 supplies the calculated mixture ratio α to the foreground/background separator 105.

In step S13, the foreground/background separator 105 extracts the foreground components from the input image based on the area information and the mixture ratio α, and supplies the foreground components to the motion-blur adjusting unit 106 as the foreground component image.

In step S14, the motion-blur adjusting unit 106 generates, based on the motion vector and the area information, the unit of processing that indicates the positions of consecutive pixels disposed in the moving direction and belonging to any of the uncovered background area, the foreground area, and the covered background area, and adjusts the amount of motion blur contained in the foreground components corresponding to the unit of processing. Details of the processing for adjusting the amount of motion blur are given below.

In step S15, the signal processor 12 determines whether the processing is finished for the whole screen. If it is determined that the processing is not finished for the whole screen, the process proceeds to step S14, and the processing for adjusting the amount of motion blur for the foreground components corresponding to the unit of processing is repeated.

If it is determined in step S15 that the processing is finished for the whole screen, the processing is completed.

In this manner, the signal processor 12 is capable of adjusting the amount of motion blur contained in the foreground by separating the foreground and the background. That is, the signal processor 12 is capable of adjusting the amount of motion blur contained in sampled data indicating the pixel values of the foreground pixels.

The configuration of each of the area specifying unit 103, the mixture-ratio calculator 104, the foreground/background separator 105, and the motion-blur adjusting unit 106 is described below.

Figure 22:
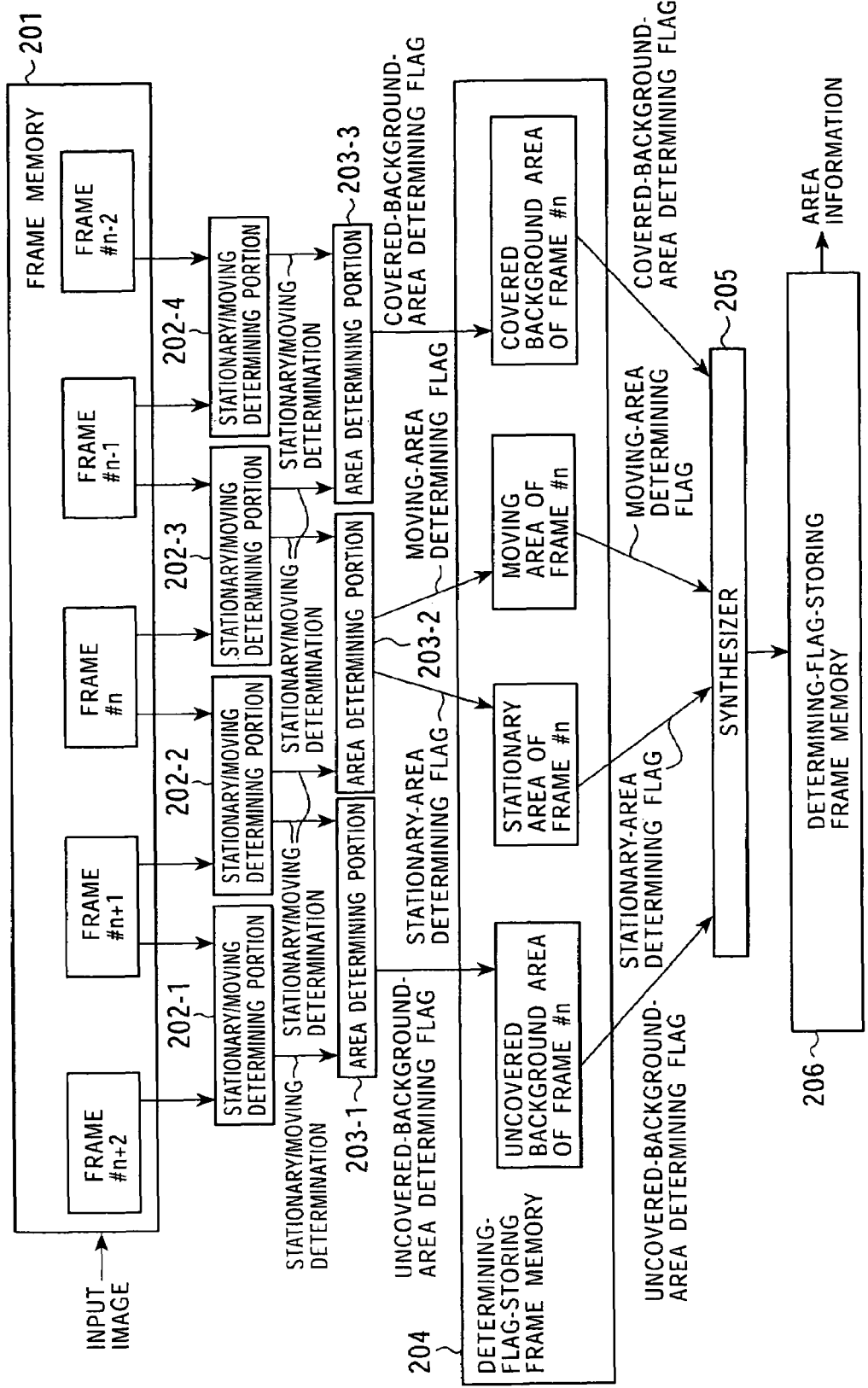
FIG. 22 is a block diagram illustrating an example of the configuration of an area specifying unit 103.

FIG. 22 is a block diagram illustrating an example of the configuration of the area specifying unit 103. The area specifying unit 103 shown in FIG. 22 does not use a motion vector. A frame memory 201 stores an input image in units of frames. When the image to be processed is frame #n, the frame memory 201 stores frame #n−2, which is the frame two frames before frame #n, frame #n−1, which is the frame one frame before frame #n, frame #n, frame #n+1, which is the frame one frame after frame #n, frame #n+2, which is the frame two frames after frame #n.

A stationary/moving determining portion 202-1 reads the pixel value of the pixel of frame #n+2 located at the same position as a designated pixel of frame #n in which the area to which the pixel belongs is determined, and reads the pixel value of the pixel of frame #n+1 located at the same position of the designated pixel of frame #n from the frame memory 201, and calculates the absolute value of the difference between the read pixel values. The stationary/moving determining portion 202-1 determines whether the absolute value of the difference between the pixel value of frame #n+2 and the pixel value of frame #n+1 is greater than a preset threshold Th. If it is determined that the difference is greater than the threshold Th, a stationary/moving determination indicating "moving" is supplied to an area determining portion 203-1. If it is determined that the absolute value of the difference between the pixel value of the pixel of frame #n+2 and the pixel value of the pixel of frame #n+1 is smaller than or equal to the threshold Th, the stationary/moving determining portion 202-1 supplies a stationary/moving determination indicating "stationary" to the area determining portion 203-1.

A stationary/moving determining portion 202-2 reads the pixel value of a designated pixel of frame #n in which the area to which the pixel belongs is determined, and reads the pixel value of the pixel of frame #n+1 located at the same position as the designated pixel of frame #n from the frame memory 201, and calculates the absolute value of the difference between the pixel values. The stationary/moving determining portion 202-2 determines whether the absolute value of the difference between the pixel value of frame #n+1 and the pixel value of frame #n is greater than a preset threshold Th. If it is determined that the absolute value of the difference between the pixel values is greater than the threshold Th, a stationary/moving determination indicating "moving" is supplied to the area determining portion 203-1 and an area determining portion 203-2. If it is determined that the absolute value of the difference between the pixel value of the pixel of frame #n+1 and the pixel value of the pixel of frame #n is smaller than or equal to the threshold Th, the stationary/moving determining portion 202-2 supplies a stationary/moving determination indicating "stationary" to the area determining portion 203-1 and the area determining portion 203-2.

A stationary/moving determining portion 202-3 reads the pixel value of a designated pixel of frame #n in which the area to which the pixel belongs is determined, and reads the pixel value of the pixel of frame #n−1 located at the same position as the designated pixel of frame #n from the frame memory 201, and calculates the absolute value of the difference between the pixel values. The stationary/moving determining portion 202-3 determines whether the absolute value of the difference between the pixel value of frame #n and the pixel value of frame #n−1 is greater than a preset threshold Th. If it is determined that the absolute value of the difference between the pixel values is greater than the threshold Th, a stationary/moving determination indicating "moving" is supplied to the area determining portion 203-2 and an area determining portion 203-3. If it is determined that the absolute value of the difference between the pixel value of the pixel of frame #n and the pixel value of the pixel of frame #n−1 is smaller than or equal to the threshold Th, the stationary/moving determining portion 202-3 supplies a stationary/moving determination indicating "stationary" to the area determining portion 203-2 and the area determining portion 203-3.

A stationary/moving determining portion 202-4 reads the pixel value of the pixel of frame #n−1 located at the same position as a designated pixel of frame #n in which the area to which the pixel belongs is determined, and reads the pixel value of the pixel of frame #n−2 located at the same position as the designated pixel of frame #n from the frame memory 201, and calculates the absolute value of the difference between the pixel values. The stationary/moving determining portion 202-4 determines whether the absolute value of the difference between the pixel value of frame #n−1 and the pixel value of frame #n−2 is greater than a preset threshold Th. If it is determined that the absolute value of the difference between the pixel values is greater than the threshold Th, a stationary/moving determination indicating "moving" is supplied to the area determining portion 203-3. If it is determined that the absolute value of the difference between the pixel value of the pixel of frame #n−1 and the pixel value of the pixel of frame #n−2 is smaller than or equal to the threshold Th, the stationary/moving determining portion 202-4 supplies a stationary/moving determination indicating "stationary" to the area determining portion 203-3.

When the stationary/moving determination supplied from the stationary/moving determining portion 202-1 indicates "stationary" and when the stationary/moving determination supplied from the stationary/moving determining portion 202-2 indicates "moving", the area determining portion 203-1 determines that the designated pixel of frame #n belongs to an uncovered background area, and sets "1", which indicates that the designated pixel belongs to an uncovered background area, in an uncovered-background-area determining flag associated with the designated pixel.

When the stationary/moving determination supplied from the stationary/moving determining portion 202-1 indicates "moving" or when the stationary/moving determination supplied from the stationary/moving determining portion 202-2 indicates "stationary", the area specifying unit 203-1 determines that the designated pixel of frame #n does not belong to an uncovered background area, and sets "0", which indicates that the designated pixel does not belong to an uncovered background area, in the uncovered-background-area determining flag associated with the designated pixel.

The area determining portion 203-1 supplies the uncovered-background-area determining flag in which "1" or "0" is set as discussed above to a determining-flag-storing frame memory 204.

When the stationary/moving determination supplied from the stationary/moving determining portion 202-2 indicates "stationary" and when the stationary/moving determination supplied from the stationary/moving determining portion 202-3 indicate "stationary", the area determining portion 203-2 determines that the designated pixel of frame #n belongs to the stationary area, and sets "1", which indicates that the pixel belongs to the stationary area, in a stationary-area determining flag associated with the designated pixel.

When the stationary/moving determination supplied from the stationary/moving determining portion 202-2 indicates "moving" or when the stationary/moving determination supplied from the stationary/moving determining portion 202-3 indicate "moving", the area determining portion 203-2 determines that the designated pixel of frame #n does not belong to the stationary area, and sets "0", which indicates that the pixel does not belong to the stationary area, in the stationary-area determining flag associated with the designated pixel.

The area determining portion 203-2 supplies the stationary-area determining flag in which "1" or "0" is set as discussed above to the determining-flag-storing frame memory 204.

When the stationary/moving determination supplied from the stationary/moving determining portion 202-2 indicates "moving" and when the stationary/moving determination supplied from the stationary/moving determining portion 202-3 indicate "moving", the area determining portion 203-2 determines that the designated pixel of frame #n belongs to the moving area, and sets "1", which indicates that the designated pixel belongs to the moving area, in a moving-area determining flag associated with the designated pixel.

When the stationary/moving determination supplied from the stationary/moving determining portion 202-2 indicates "stationary" or when the stationary/moving determination supplied from the stationary/moving determining portion 202-3 indicate "stationary", the area determining portion 203-2 determines that the designated pixel of frame #n does not belong to the moving area, and sets "0", which indicates that the pixel does not belong to the moving area, in the moving-area determining flag associated with the designated pixel.

The area determining portion 203-2 supplies the moving-area determining flag in which "1" or "0" is set as discussed above to the determining-flag-storing frame memory 204.

When the stationary/moving determination supplied from the stationary/moving determining portion 202-3 indicates "moving" and when the stationary/moving determination supplied from the stationary/moving determining portion 202-4 indicate "stationary", the area determining portion 203-3 determines that the designated pixel of frame #n belongs to a covered background area, and sets "1", which indicates that the designated pixel belongs to the covered background area, in a covered-background-area determining flag associated with the designated pixel.

When the stationary/moving determination supplied from the stationary/moving determining portion 203-3 indicates "stationary" or when the stationary/moving determination supplied from the stationary/moving determining portion 202-4 indicate "moving", the area determining portion 203-3 determines that the designated pixel of frame #n does not belong to a covered background area, and sets "0", which indicates that the designated pixel does not belong to a covered background area, in the covered-background-area determining flag associated with the designated pixel.

The area determining portion 203-3 supplies the covered-background-area determining flag in which "1" or "0" is set as discussed above to the determining-flag-storing frame memory 204.

The determining-flag-storing frame memory 204 thus stores the uncovered-background-area determining flag supplied from the area determining portion 203-1, the stationary-area determining flag supplied from the area determining portion 203-2, the moving-area determining flag supplied from the area determining portion 203-2, and the covered-background-area determining flag supplied from the area determining portion 203-3.

The determining-flag-storing frame memory 204 supplies the uncovered-background-area determining flag, the stationary-area determining flag, the moving-area determining flag, and the covered-background-area determining flag stored therein to a synthesizer 205. The synthesizer 205 generates area information indicating to which of the uncovered background area, the stationary area, the moving area, or the covered background area each pixel belongs based on the uncovered-background-area determining flag, the stationary-area determining flag, the moving-area determining flag, and the covered-background-area determining flag supplied from the determining-flag-storing frame memory 204, and supplies the area information to a determining-flag-storing frame memory 206.

The determining-flag-storing frame memory 206 stores the area information supplied from the synthesizer 205, and also outputs the area information stored therein.

An example of the processing performed by the area specifying unit 103 is described below with reference to FIGS. 23 through 27.

Figure 23:
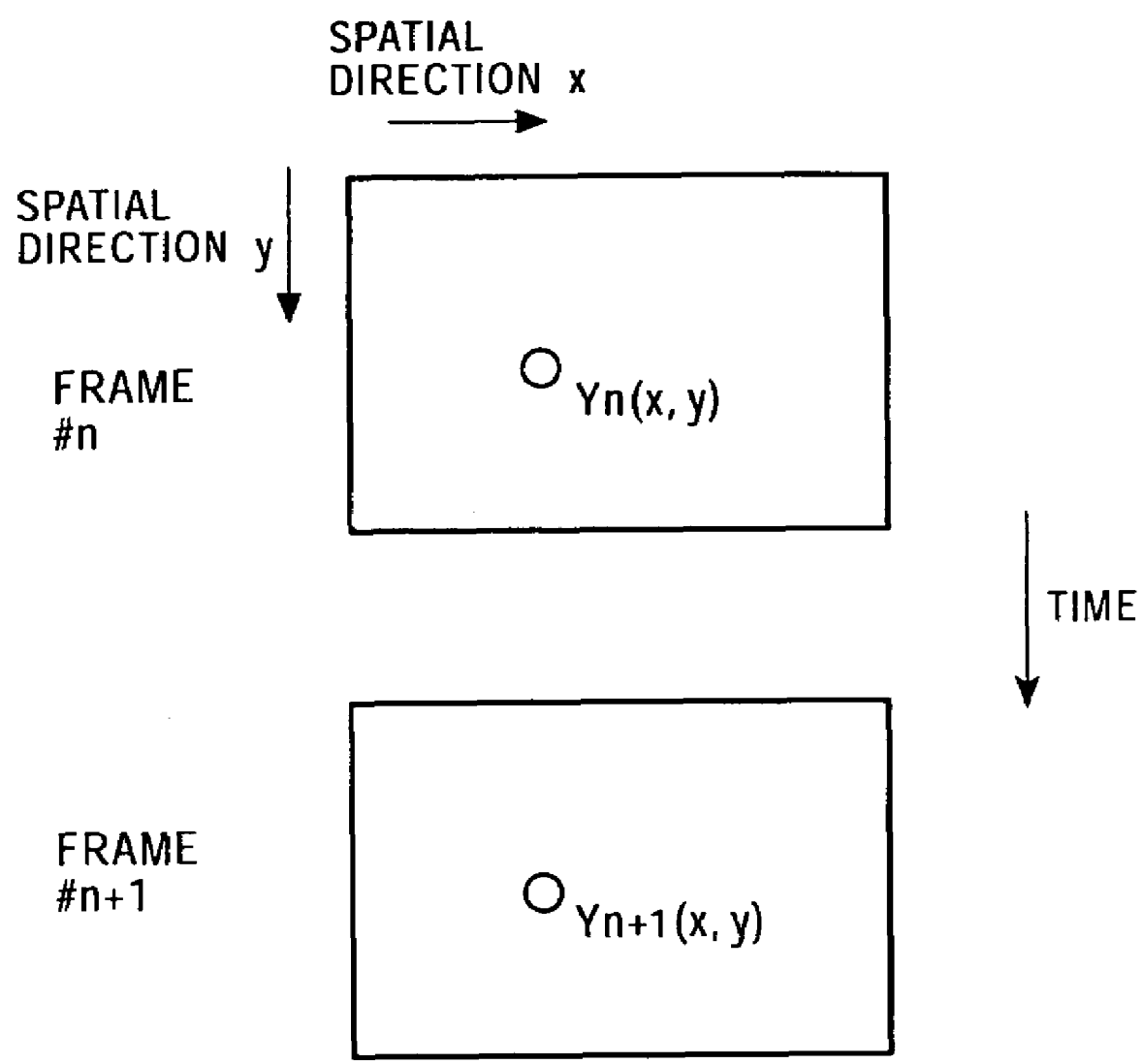
FIG. 23 illustrates an image when an object corresponding to a foreground is moving.

When the object corresponding to the foreground is moving, the position of the image corresponding to the object on the screen changes in every frame. As shown in FIG. 23, the image corresponding to the object located at the position indicated by Yn(x,y) in frame #n is positioned at Yn+1(x,y) in frame #n+1, which is subsequent to frame #n.

Figure 24:
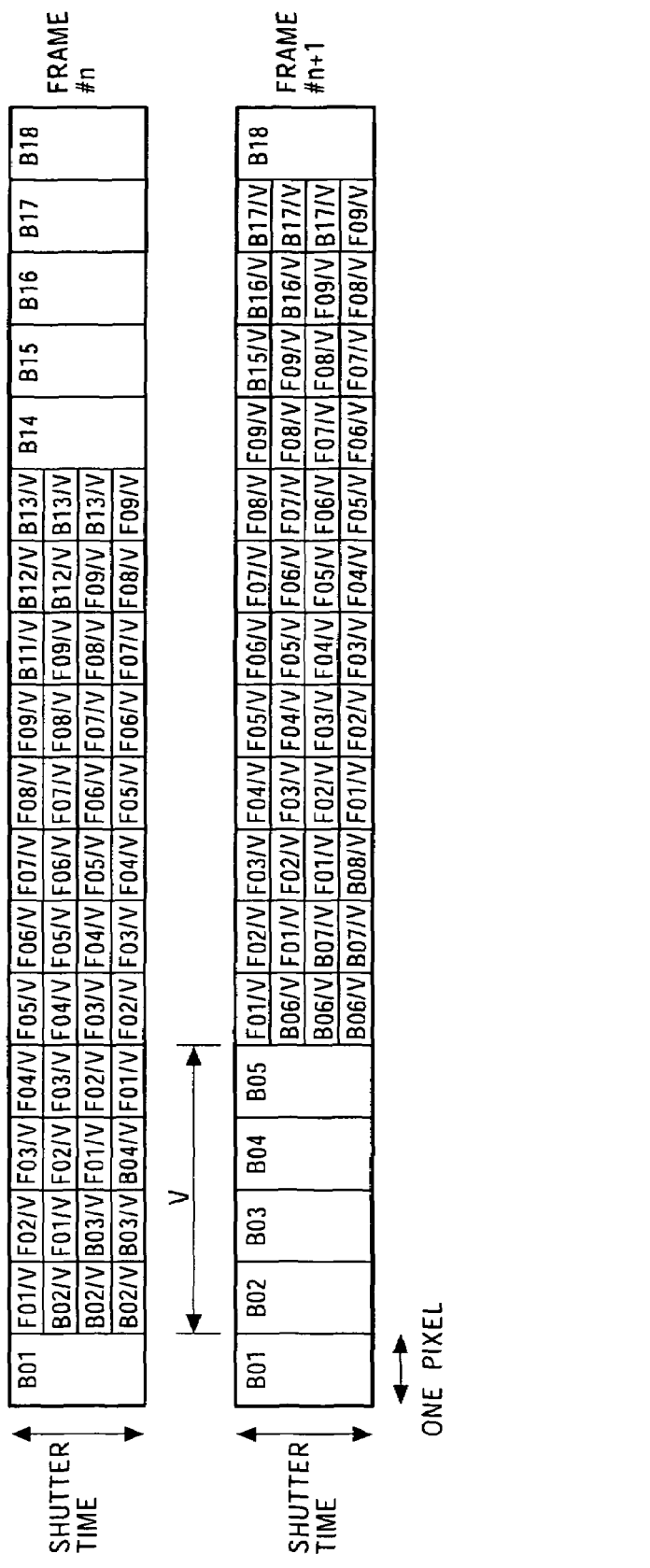
FIG. 24 illustrates a model in which pixel values are expanded in the time direction and the period corresponding to the shutter time is divided.

A model obtained by expanding in the time direction the pixel values of the pixels aligned side-by-side in the moving direction of the image corresponding to the foreground object is shown in FIG. 24. For example, if the moving direction of the image corresponding to the foreground object is horizontal with respect to the screen, the model shown in FIG. 24 is a model obtained by expanding in the time direction the pixel values of the pixels disposed on a line side-by-side.

In FIG. 24, the line in frame #n is equal to the line in frame #n+1.

The foreground components corresponding to the object contained in the second pixel to the thirteenth pixel from the left in frame #n are contained in the sixth pixel through the seventeenth pixel from the left in frame #n+1.

In frame #n, the pixels belonging to the covered background area are the eleventh through thirteenth pixels from the left, and the pixels belonging to the uncovered background area are the second through fourth pixels from the left. In frame #n+1, the pixels belonging to the covered background area are the fifteenth through seventeenth pixels from the left, and the pixels belonging to the uncovered background area are the sixth through eighth pixels from the left.

In the example shown in FIG. 24, since the foreground components contained in frame #n are moved by four pixels in frame #n+1, the amount of movement v is 4. The number of virtual divided portions is 4 in accordance with the amount of movement v.

A description is now given of a change in pixel values of the pixels belonging to the mixed area in the frames before and after a designated frame.

In FIG. 25, the pixels belonging to a covered background area in frame #n in which the background is stationary and the amount of movement v in the foreground is 4 are the fifteenth through seventeenth pixels from the left. Since the amount of movement v is 4, the fifteenth through seventeenth frames from the left in the previous frame #n−1 contain only background components and belong to the background area. The fifteenth through seventeenth pixels from the left in frame #n−2, which is one before frame #n−1, contain only background components and belong to the background area.

Since the object corresponding to the background is stationary, the pixel value of the fifteenth pixel from the left in frame #n−1 does not change from the pixel value of the fifteenth pixel from the left in frame #n−2. Similarly, the pixel value of the sixteenth pixel from the left in frame #n−1 does not change from the pixel value of the sixteenth pixel from the left in frame #n−2, and the pixel value of the seventeenth pixel from the left in frame #n−1 does not change from the pixel value of the seventeenth pixel from the left in frame #n−2.

That is, the pixels in frame #n−1 and frame #n−2 corresponding to the pixels belonging to the covered background area in frame #n consist of only background components, and the pixel values thereof do not change. Accordingly, the absolute value of the difference between the pixel values is almost 0. Thus, the stationary/moving determination made for the pixels in frame #n−1 and frame #n−2 corresponding to the pixels belonging to the mixed area in frame #n by the stationary/moving determining portion 202-4 is "stationary".

Since the pixels belonging to the covered background area in frame #n contain foreground components, the pixel values thereof are different from those of frame #n−1 consisting of only background components. Accordingly, the stationary/moving determination made for the pixels belonging to the mixed area in frame #n and the corresponding pixels in frame #n−1 by the stationary/moving determining portion 202-3 is "moving".

When the stationary/moving determination result indicating "moving" is supplied from the stationary/moving determining portion 202-3, and when the stationary/moving determination result indicating "stationary" is supplied from the stationary/moving determining portion 202-4, as discussed above, the area determining portion 203-3 determines that the corresponding pixels belong to a covered background area.

In FIG. 26, in frame #n in which the background is stationary and the amount of movement v in the foreground is 4, the pixels contained in an uncovered background area are the second through fourth pixels from the left. Since the amount of movement v is 4, the second through fourth pixels from the left in the subsequent frame #n+1 contain only background components and belong to the background area. In frame #n+2, which is subsequent to frame #n+1, the second through fourth pixels from the left contain only background components and belong to the background area.

Since the object corresponding to the background is stationary, the pixel value of the second pixel from the left in frame #n+2 does not change from the pixel value of the second pixel from the left in frame #n+1. Similarly, the pixel value of the third pixel from the left in frame #n+2 does not change from the pixel value of the third pixel from the left in frame #n+1, and the pixel value of the fourth pixel from the left in frame #n+2 does not change from the pixel value of the fourth pixel from the left in frame #n+1.

That is, the pixels in frame #n+1 and frame #n+2 corresponding to the pixels belonging to the uncovered background area in frame #n consist of only background components, and the pixel values thereof do not change. Accordingly, the absolute value of the difference between the pixel values is almost 0. Thus, the stationary/moving determination made for the pixels in frame #n+1 and frame #n+2 corresponding to the pixels belonging to the mixed area in frame #n by the stationary/moving determining portion 202-1 is "stationary".

Since the pixels belonging to the uncovered background area in frame #n contain foreground components, the pixel values thereof are different from those of frame #n+1 consisting of only background components. Accordingly, the stationary/moving determination made for the pixels belonging to the mixed area in frame #n and the corresponding pixels in frame #n+1 by the stationary/moving determining portion 202-2 is "moving".

When the stationary/moving determination result indicating "moving" is supplied from the stationary/moving determining portion 202-2, and when the stationary/moving determination result indicating "stationary" is supplied from the stationary/moving determining portion 202-1, as discussed above, the area determining portion 203-1 determines that the corresponding pixels belong to an uncovered background area.

FIG. 27 illustrates determination conditions for frame #n made by the area specifying unit 103. When the determination result for the pixel in frame #n−2 located at the same image position as a pixel in frame #n to be processed and for the pixel in frame #n−1 located at the same position as the pixel in frame #n is stationary, and when the determination result for the pixel in frame #n and the pixel in frame #n−1 located at the same image position as the pixel in frame #n is moving, the area specifying unit 103 determines that the pixel in frame #n belongs to a covered background area.

When the determination result for the pixel in frame #n and the pixel in frame #n−1 located at the same image position as the pixel in frame #n is stationary, and when the determination result for the pixel in frame #n and the pixel in frame #n+1 located at the same image position as the pixel in frame #n is stationary, the area specifying unit 103 determines that the pixel in frame #n belongs to the stationary area.

When the determination result for the pixel in frame #n and the pixel in frame #n−1 located at the same image position as the pixel in frame #n is moving, and when the determination result for the pixel in frame #n and the pixel in frame #n+1 located at the same image position as the pixel in frame #n is moving, the area specifying unit 103 determines that the pixel in frame #n belongs to the moving area.

When the determination result for the pixel in frame #n and the pixel in frame #n+1 located at the same image position as the pixel in frame #n is moving, and when the determination result for the pixel in frame #n+1 located at the same image position as the pixel in frame #n and the pixel in frame #n+2 located at the same image position as the pixel in frame #n is stationary, the area specifying unit 103 determines that the pixel in frame #n belongs to an uncovered background area.

Figure 28A:
FIG. 28A illustrates an example of the result obtained by specifying the area by the area specifying unit 103.
Figure 28B:
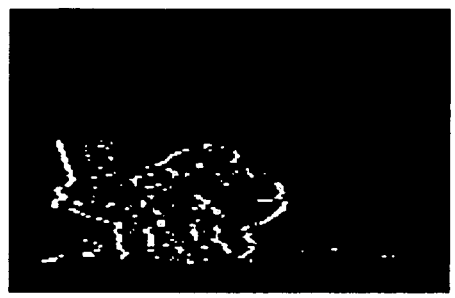
FIG. 28B illustrates an example of the result obtained by specifying the area by the area specifying unit 103.

FIGS. 28A through 28D illustrate examples of the area determination results obtained by the area specifying unit 103. In FIG. 28A, the pixels which are determined to belong to a covered background area are indicated in white. In FIG. 28B, the pixels which are determined to belong to an uncovered background area are indicated in white.

Figure 28C:
FIG. 28C illustrates an example of the result obtained by specifying the area by the area specifying unit 103.
Figure 28D:
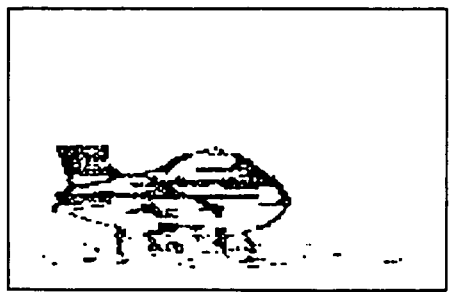
FIG. 28D illustrates an example of the result obtained by specifying the area by the area specifying unit 103.

In FIG. 28C, the pixels which are determined to belong to a moving area are indicated in white. In FIG. 28D, the pixels which are determined to belong to a stationary area are indicated in white.

Figure 29:
FIG. 29 illustrates an example of the result obtained by specifying the area by the area specifying unit 103.

FIG. 29 illustrates the area information indicating the mixed area, in the form of an image, selected from the area information output from the determining-flag-storing frame memory 206. In FIG. 29, the pixels which are determined to belong to the covered background area or the uncovered background area, i.e., the pixels which are determined to belong to the mixed area, are indicated in white. The area information indicating the mixed area output from the determining-flag-storing frame memory 206 designates the mixed area and the portions having a texture surrounded by the portions without a texture in the foreground area.

Figure 30:
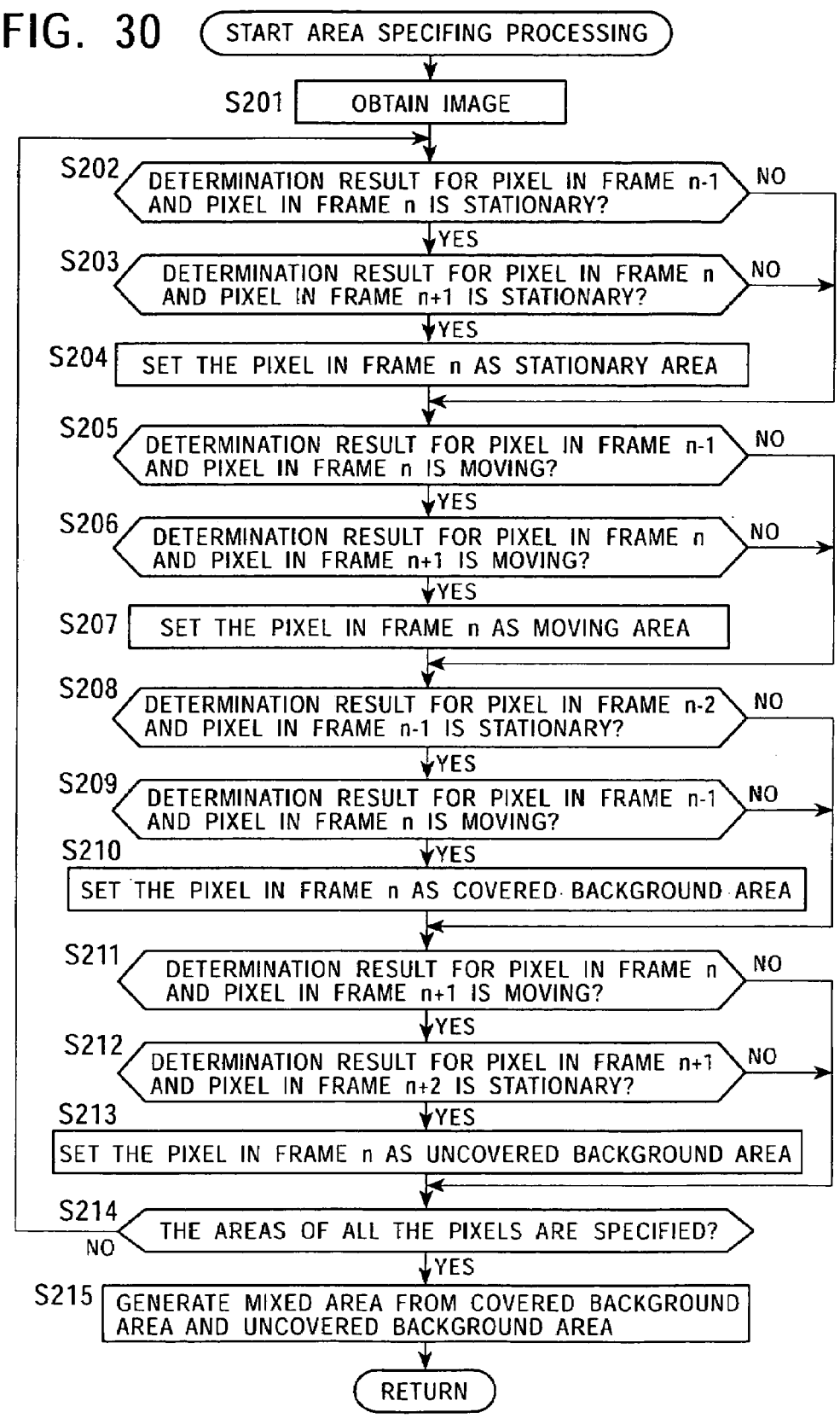
FIG. 30 is a flowchart illustrating the area specifying processing.

The area specifying processing performed by the area specifying unit 103 is described below with reference to the flowchart of FIG. 30. In step S201, the frame memory 201 obtains an image of frame #n−2 through frame #n+2 including frame #n.

In step S202, the stationary/moving determining portion 202-3 determines whether the determination result for the pixel in frame #n−1 and the pixel in frame #n located at the same position is stationary. If it is determined that the determination result is stationary, the process proceeds to step S203 in which the stationary/moving determining portion 202-2 determines whether the determination result for the pixel in frame #n and the pixel in frame #n+1 located at the same position is stationary.

If it is determined in step S203 that the determination result for the pixel in frame #n and the pixel in frame #n+1 located at the same position is stationary, the process proceeds to step S204. In step S204, the area determining portion 203-2 sets "1", which indicates that the pixel to be processed belongs to the stationary area, in the stationary-area determining flag associated with the pixel to be processed. The area determining portion 203-2 supplies the stationary-area determining flag to the determining-flag-storing frame memory 204, and the process proceeds to step S205.

If it is determined in step S202 that the determination result for the pixel in frame #n−1 and the pixel in frame #n located at the same position is moving, or if it is determined in step S203 that the determination result for the pixel in frame #n and the pixel in frame #n+1 located at the same position is moving, the pixel to be processed does not belong to a stationary area. Accordingly, the processing of step S204 is skipped, and the process proceeds to step S205.

In step S205, the stationary/moving determining portion 202-3 determines whether the determination result for the pixel in frame #n−1 and the pixel in frame #n located at the same position is moving. If it is determined that the determination result is moving, the process proceeds to step S206 in which the stationary/moving determining portion 202-2 determines whether the determination result for the pixel in frame #n and the pixel in frame #n+1 located at the same position is moving.

If it is determined in step S206 that the determination result for the pixel in frame #n and the pixel in frame #n+1 located at the same position is moving, the process proceeds to step S207. In step S207, the area determining portion 203-2 sets "1", which indicates that the pixel to be processed belongs to a moving area, in the moving-area determining flag associated with the pixel to be processed. The area determining area 203-2 supplies the moving-area determining flag to the determining-flag-storing frame memory 204, and the process proceeds to step S208.

If it is determined in step S205 that the determination result for the pixel in frame #n−1 and the pixel in frame #n located at the same position is stationary, or if it is determined in step S206 that the determination result for the pixel in frame #n and the pixel in frame #n+1 located at the same position is stationary, the pixel in frame #n does not belong to a moving area. Accordingly, the processing of step S207 is skipped, and the process proceeds to step S208.

In step S208, the stationary/moving determining portion 202-4 determines whether the determination result for the pixel in frame #n−2 and the pixel in frame #n−1 located at the same position is stationary. If it is determined that the determination result is stationary, the process proceeds to step S209 in which the stationary/moving determining portion 202-3 determines whether the determination result for the pixel in frame #n−1 and the pixel in frame #n located at the same position is moving.

If it is determined in step S209 that the determination result for the pixel in frame #n−1 and the pixel in frame #n located at the same position is moving, the process proceeds to step S210. In step S210, the area determining portion 203-3 sets "1", which indicates that the pixel to be processed belongs to a covered background area, in the covered-background-area determining flag associated with the pixel to be processed. The area determining portion 203-3 supplies the covered-background-area determining flag to the determining-flag-storing frame memory 204, and the process proceeds to step S211. The area determining portion 203-3 supplies the covered-background-area determining flag to the determining-flag-storing frame memory 204, and the process proceeds to step S211.

If it is determined in step S208 that the determination result for the pixel in frame #n−2 and the pixel in frame #n−1 located at the same position is moving, or if it is determined in step S209 that the pixel in frame #n−1 and the pixel in frame #n located at the same position is stationary, the pixel in frame #n does not belong to a covered background area. Accordingly, the processing of step S210 is skipped, and the process proceeds to step S211.

In step S211, the stationary/moving determining portion 202-2 determines whether the determination result for the pixel in frame #n and the pixel in frame #n+1 located at the same position is moving. If it is determined in step S211 that the determination result is moving, the process proceeds to step S212 in which the stationary/moving determining portion 202-1 determines whether the determination result for the pixel in frame #n+1 and the pixel in frame #n+2 located at the same position is stationary.

If it is determined in step S212 that the determination result for the pixel in frame #n+1 and the pixel in frame #n+2 located at the same position is stationary, the process proceeds to step S213. In step S213, the area determining portion 203-1 sets "1", which indicates that the pixel to be processed belongs to an uncovered background area, in the uncovered-background-area determining flag associated with the pixel to be processed. The area determining portion 203-1 supplies the uncovered-background-flag determining flag to the determining-flag-storing frame memory 204, and the process proceeds to step S214.

If it is determined in step S211 that the determination result for the pixel in frame #n and the pixel in frame #n+1 located at the same position is stationary, or if it is determined in step S212 that the determination result for the pixel in frame #n+1 and the pixel in frame #n+2 is moving, the pixel in frame #n does not belong to an uncovered background area. Accordingly, the processing of step S213 is skipped, and the process proceeds to step S214.

In step S214, the area specifying unit 103 determines whether the areas of all the pixels in frame #n are specified. If it is determined that the areas of all the pixels in frame #n are not yet specified, the process returns to step S202, and the area specifying processing is repeated for the remaining pixels.

If it is determined in step S214 that the areas of all the pixels in frame #n are specified, the process proceeds to step S215. In step S215, the synthesizer 215 generates area information indicating the mixed area based on the uncovered-background-area determining flag and the covered-background-area determining flag stored in the determining-flag-storing frame memory 204, and also generates area information indicating to which of the uncovered background area, the stationary area, the moving area, or the covered background area each pixel belongs, and sets the generated area information in the determining-flag-storing frame memory 206. The processing is then completed.

As discussed above, the area specifying unit 103 is capable of generating area information indicating to which of the moving area, the stationary area, the uncovered background area, or the covered background area each of the pixels contained in a frame belongs.

The area specifying unit 103 may apply logical OR to the area information corresponding to the uncovered background area and the area information corresponding to the covered background area so as to generate area information corresponding to the mixed area, and then may generate area information consisting of flags indicating to which of the moving area, the stationary area, or the mixed area the individual pixels contained in the frame belong.

When the object corresponding to the foreground has a texture, the area specifying unit 103 is able to specify the moving area more precisely.

The area specifying unit 103 is able to output the area information indicating the moving area as the area information indicating the foreground area, and outputs the area information indicating the stationary area as the area information indicating the background area.

The embodiment has been described, assuming that the object corresponding to the background is stationary. However, the above-described area specifying processing can be applied even if the image corresponding to the background area contains motion. For example, if the image corresponding to the background area is uniformly moving, the area specifying unit 103 shifts the overall image in accordance with this motion, and performs processing in a manner similar to the case in which the object corresponding to the background is stationary. If the image corresponding to the background area contains locally different motions, the area specifying unit 103 selects the pixels corresponding to the motions, and executes the above-described processing.

Figure 31:
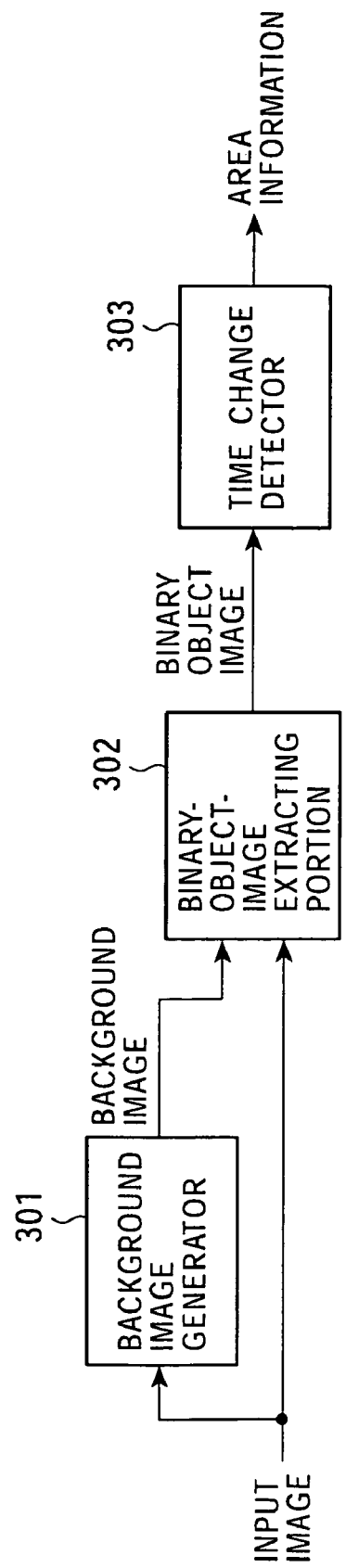
FIG. 31 is a block diagram illustrating another configuration of the area specifying unit 103.

FIG. 31 is a block diagram illustrating the configuration of the area specifying unit 103. The area specifying unit 103 shown in FIG. 31 does not use a motion vector. A background image generator 301 generates a background image corresponding to an input image, and supplies the generated background image to a binary-object-image extracting portion 302. The background image generator 301 extracts, for example, an image object corresponding to a background object contained in the input image, and generates the background image.

Figure 32:
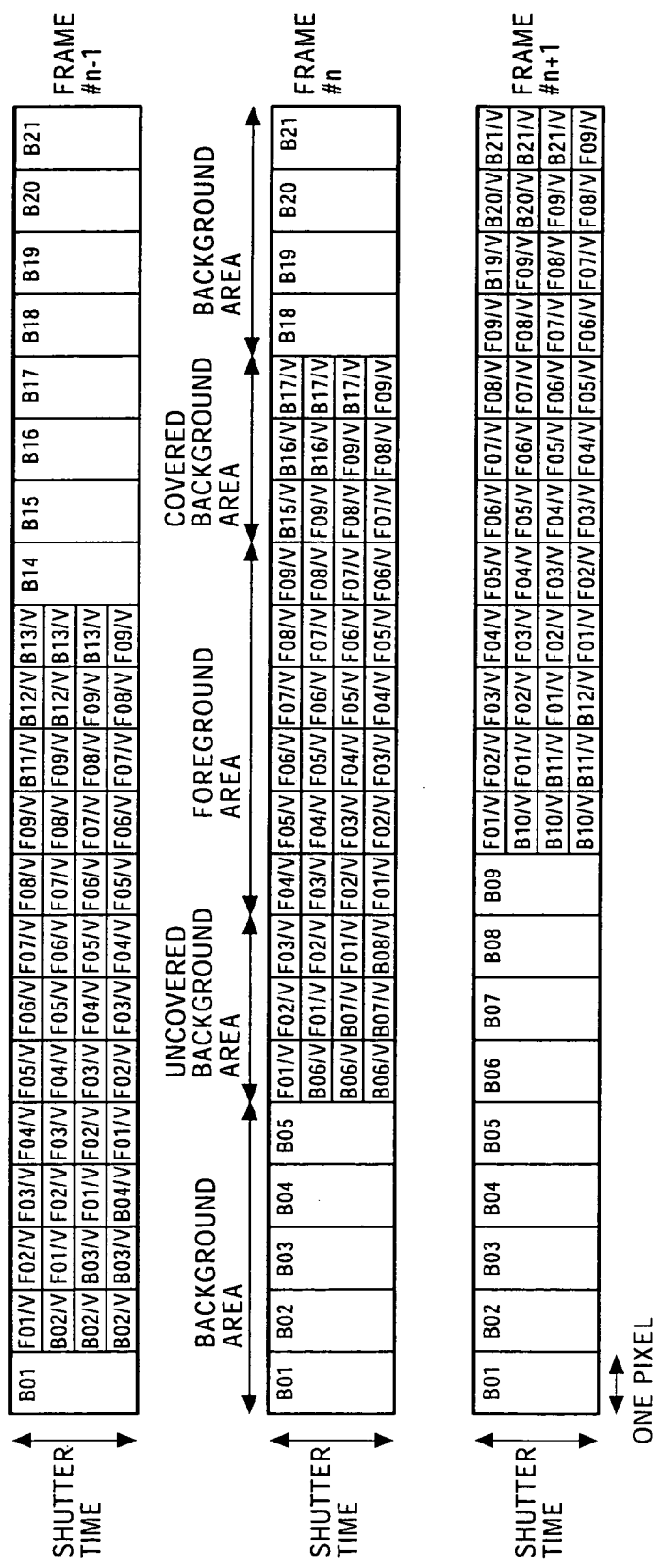
FIG. 32 illustrates a model in which pixel values are expanded in the time direction and the period corresponding to the shutter time is divided.

An example of a model obtained by expanding in the time direction the pixel values of pixels aligned side-by-side in the moving direction of an image corresponding to a foreground object is shown in FIG. 32. For example, if the moving direction of the image corresponding to the foreground object is horizontal with respect to the screen, the model shown in FIG. 32 is a model obtained by expanding the pixel values of pixels disposed side-by-side on a single line in the time domain.

In FIG. 32, the line in frame #n is the same as the line in frame #n−1 and the line in frame #n+1.

In frame #n, the foreground components corresponding to the object contained in the sixth through seventeenth pixels from the left are contained in the second through thirteenth pixels from the left in frame #n−1 and are also contained in the tenth through twenty-first pixel from the left in frame #n+1.

In frame #n−1, the pixels belonging to the covered background area are the eleventh through thirteenth pixels from the left, and the pixels belonging to the uncovered background area are the second through fourth pixels from the left. In frame #n, the pixels belonging to the covered background area are the fifteenth through seventeenth pixels from the left, and the pixels belonging to the uncovered background area are the sixth through eighth pixels from the left. In frame #n+1, the pixels belonging to the covered background area are the nineteenth through twenty-first pixels from the left, and the pixels belonging to the uncovered background area are the tenth through twelfth pixels from the left.

In frame #n−1, the pixels belonging to the background area are the first pixel from the left, and the fourteenth through twenty-first pixels from the left. In frame #n, the pixels belonging to the background area are the first through fifth pixels from the left, and the eighteenth through twenty-first pixels from the left. In frame #n+1, the pixels-belonging to the background area are the first through ninth pixels from the left.

Figure 33:
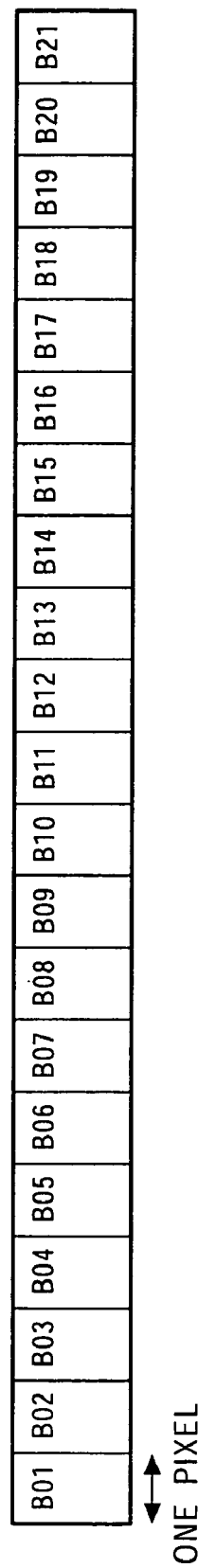
FIG. 33 illustrates an example of a background image.

An example of the background image corresponding to the example shown in FIG. 32 generated by the background image generator 301 is shown in FIG. 33. The background image consists of the pixels corresponding to the background object, and does not contain image components corresponding to the foreground object.

The binary-object-image extracting portion 302 generates a binary object image based on the correlation between the background image and the input image, and supplies the generated binary object image to a time change detector 303.

Figure 34:
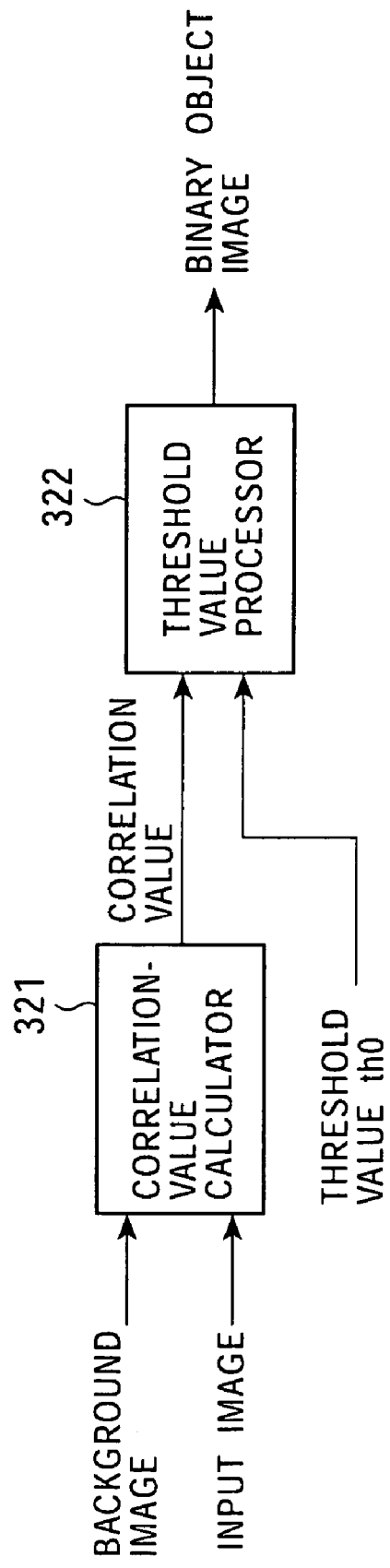
FIG. 34 is a block diagram illustrating the configuration of a binary-object-image extracting portion 302.

FIG. 34 is a block diagram illustrating the configuration of the binary-object-image extracting portion 302. A correlation-value calculator 321 calculates the correlation between the background image supplied from the background image generator 301 and the input image so as to generate a correlation value, and supplies the generated correlation value to a threshold-value processor 322.

The correlation-value calculator 321 applies equation (4) to, for example, 3×3-background image blocks having $X_4$ at the center, as shown in FIG. 35A, and to, for example, 3×3-background image blocks having $Y_4$ at the center which corresponds to the background image blocks, as shown in FIG. 35B, thereby calculating a correlation value corresponding to $Y_4$.

$$\text{Correlation value} = \frac{\sum_{i=0}^{8}(Xi-\overline{X})\sum_{i=0}^{8}(Yi-\overline{Y})}{\sqrt{\sum_{i=0}^{8}(Xi-\overline{X})^2 \cdot \sum_{i=0}^{8}(Yi-\overline{Y})^2}} \quad (4)$$

$$\overline{X} = \frac{\sum_{i=0}^{8} Xi}{9} \quad (5)$$

-continued $$Y = \frac{\sum_{i=0}^{8} Yi}{9} \quad (6)$$

The correlation-value calculator 321 supplies the correlation value calculated for each pixel as discussed above to the threshold-value processor 322.

Alternatively, the correlation-value calculator 321 may apply equation (7) to, for example, 3×3-background image blocks having $X_4$ at the center, as shown in FIG. 36A, and to, for example, 3×3-background image blocks having $Y_4$ at the center which corresponds to the background image blocks, as shown in FIG. 36B, thereby calculating the sum of absolute values of differences corresponding to $Y_4$.

$$\text{Sum of absolute values of differences} = \sum_{i=0}^{8} |(Xi - Yi)| \quad (7)$$

The correlation-value calculator 321 supplies the sum of the absolute values of the differences calculated as described above to the threshold-value processor 322 as the correlation value.

The threshold-value processor 322 compares the pixel value of the correlation image with a threshold value th0. If the correlation value is smaller than or equal to the threshold value th0, 1 is set in the pixel value of the binary object image. If the correlation value is greater than the threshold value th0, 0 is set in the pixel value of the binary object image. The threshold-value processor 322 then outputs the binary object image whose pixel value is set to 0 or 1. The threshold-value processor 322 may store the threshold value th0 therein in advance, or may use the threshold value th0 input from an external source.

FIG. 37 illustrates the binary object image corresponding to the model of the input image shown in FIG. 32. In the binary object image, 0 is set in the pixel values of the pixels having a higher correlation with the background image.

Figure 38:
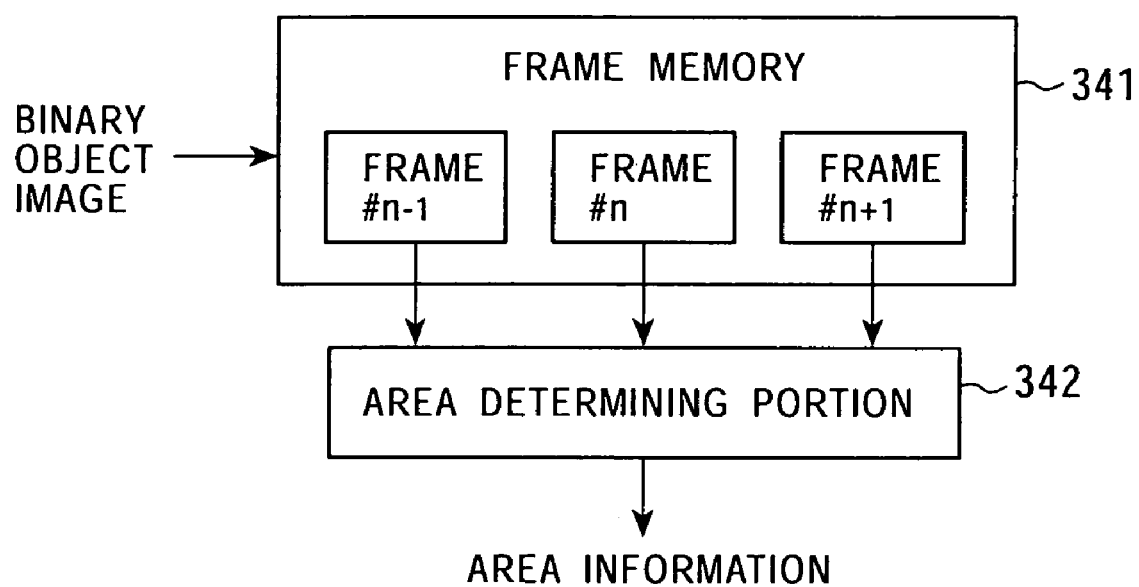
FIG. 38 is a block diagram illustrating the configuration of a time change detector 303.

FIG. 38 is a block diagram illustrating the configuration of the time change detector 303. When determining the area of a pixel in frame #n, a frame memory 341 stores a binary object image of frame #n−1, frame #n, and frame #n+1 supplied from the binary-object-image extracting portion 302.

An area determining portion 342 determines the area of each pixel of frame #n based on the binary object image of frame #n−1, frame #n, and frame #n+1 so as to generate area information, and outputs the generated area information.

FIG. 39 illustrates the determinations made by the area determining portion 342. When the designated pixel of the binary object image in frame #n is 0, the area determining portion 342 determines that the designated pixel in frame #n belongs to the background area.

When the designated pixel of the binary object image in frame #n is 1, and when the corresponding pixel of the binary object image in frame #n−1 is 1, and when the corresponding pixel of the binary object image in frame #n+1 is 1, the area determining portion 342 determines that the designated pixel in frame #n belongs to the foreground area.

When the designated pixel of the binary object image in frame #n is 1, and when the corresponding pixel of the binary object image in frame #n−1 is 0, the area determining portion 342 determines that the designated pixel in frame #n belongs to a covered background area.

When the designated pixel of the binary object image in frame #n is 1, and when the corresponding pixel of the binary object image in frame #n+1 is 0, the area determining portion 342 determines that the designated pixel in frame #n belongs to an uncovered background area.

Figure 40:
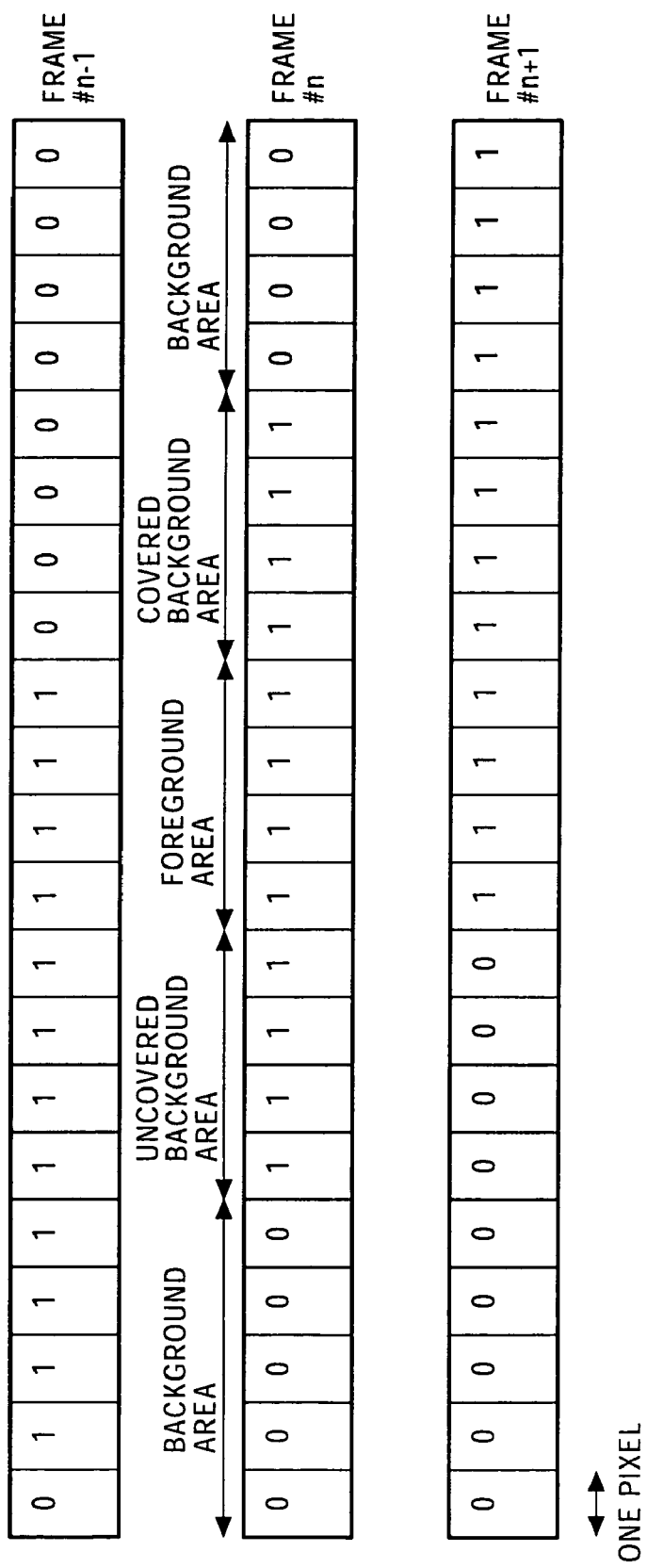
FIG. 40 illustrates an example of determinations made by the time change detector 303.

FIG. 40 illustrates an example of the determinations made by the time change detector 303 on the binary object image corresponding to the model of the input image shown in FIG. 32. The time change detector 303 determines that the first through fifth pixels from the left in frame #n belong to the background area since the corresponding pixels of the binary object image in frame #n are 0.

The time change detector 303 determines that the sixth through ninth pixels from the left belong to the uncovered background area since the pixels of the binary object image in frame #n are 1, and the corresponding pixels in frame #n+1 are 0.

The time change detector 303 determines that the tenth through thirteenth pixels from the left belong to the foreground area since the pixels of the binary object image in frame #n are 1, the corresponding pixels in frame #n−1 are 1, and the corresponding pixels in frame #n+1 are 1.

The time change detector 303 determines that the fourteenth through seventeenth pixels from the left belong to the covered background area since the pixels of the binary object image in frame #n are 1, and the corresponding pixels in frame #n−1 are 0.

The time change detector 303 determines that the eighteenth through twenty-first pixels from the left belong to the background area since the corresponding pixels of the binary object image in frame #n are 0.

Figure 41:
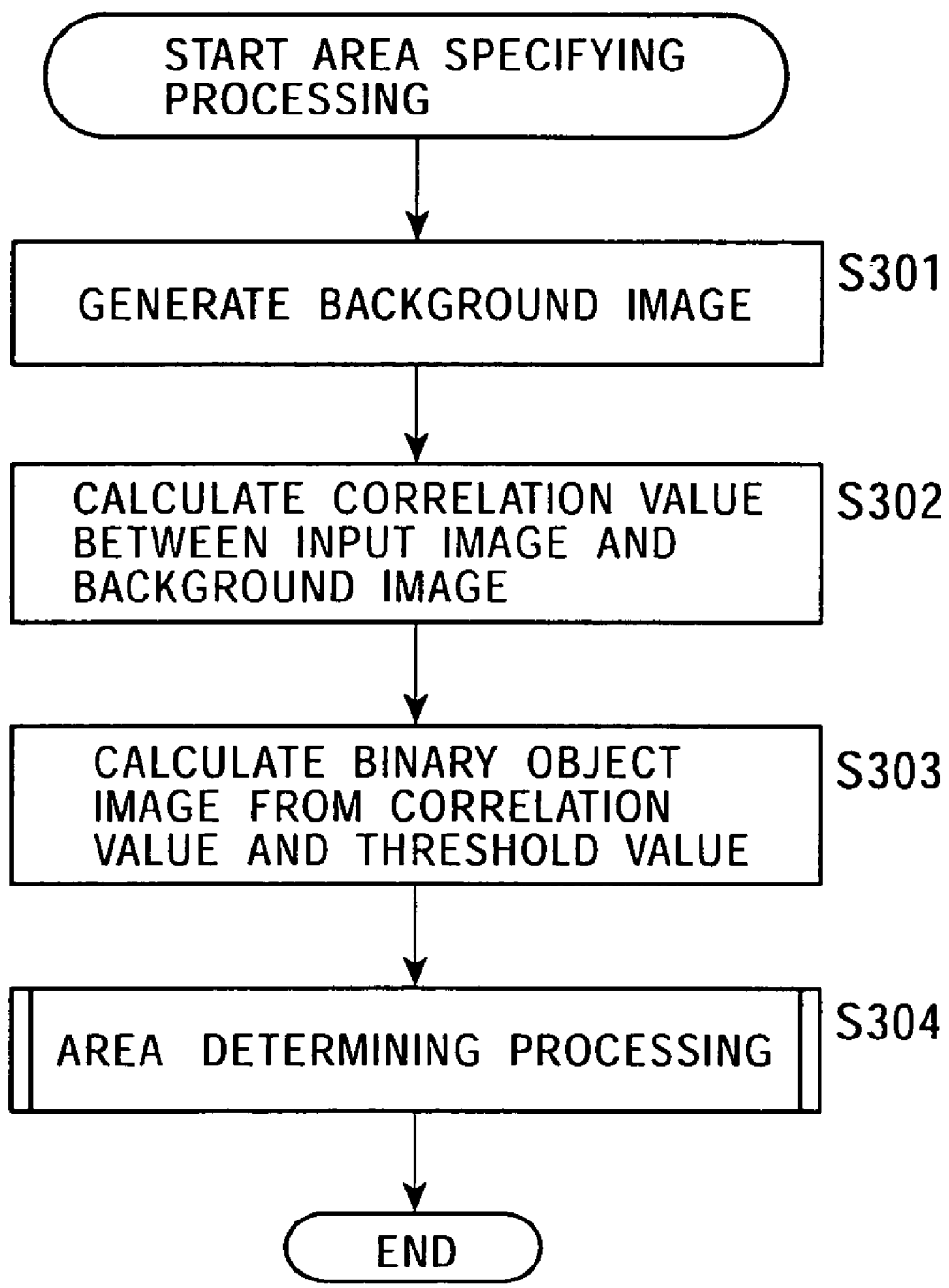
FIG. 41 is a flowchart illustrating the area specifying processing performed by the area specifying unit 103.

The area specifying processing performed by the area specifying unit 103 is described below with reference to the flowchart of FIG. 41. In step S301, the background image generator 301 of the area specifying unit 103 extracts, for example, an image object corresponding to a background object contained in an input image based on the input image so as to generate a background image, and supplies the generated background image to the binary-object-image extracting portion 302.

In step S302, the binary-object-image extracting portion 302 calculates a correlation value between the input image and the background image supplied from the background image generator 301 according to, for example, calculation discussed with reference to FIGS. 35A and 35B. In step S303, the binary-object-image extracting portion 302 computes a binary object image from the correlation value and the threshold value th0 by, for example, comparing the correlation value with the threshold value th0.

In step S304, the time change detector 303 executes the area determining processing, and the processing is completed.

Figure 42:
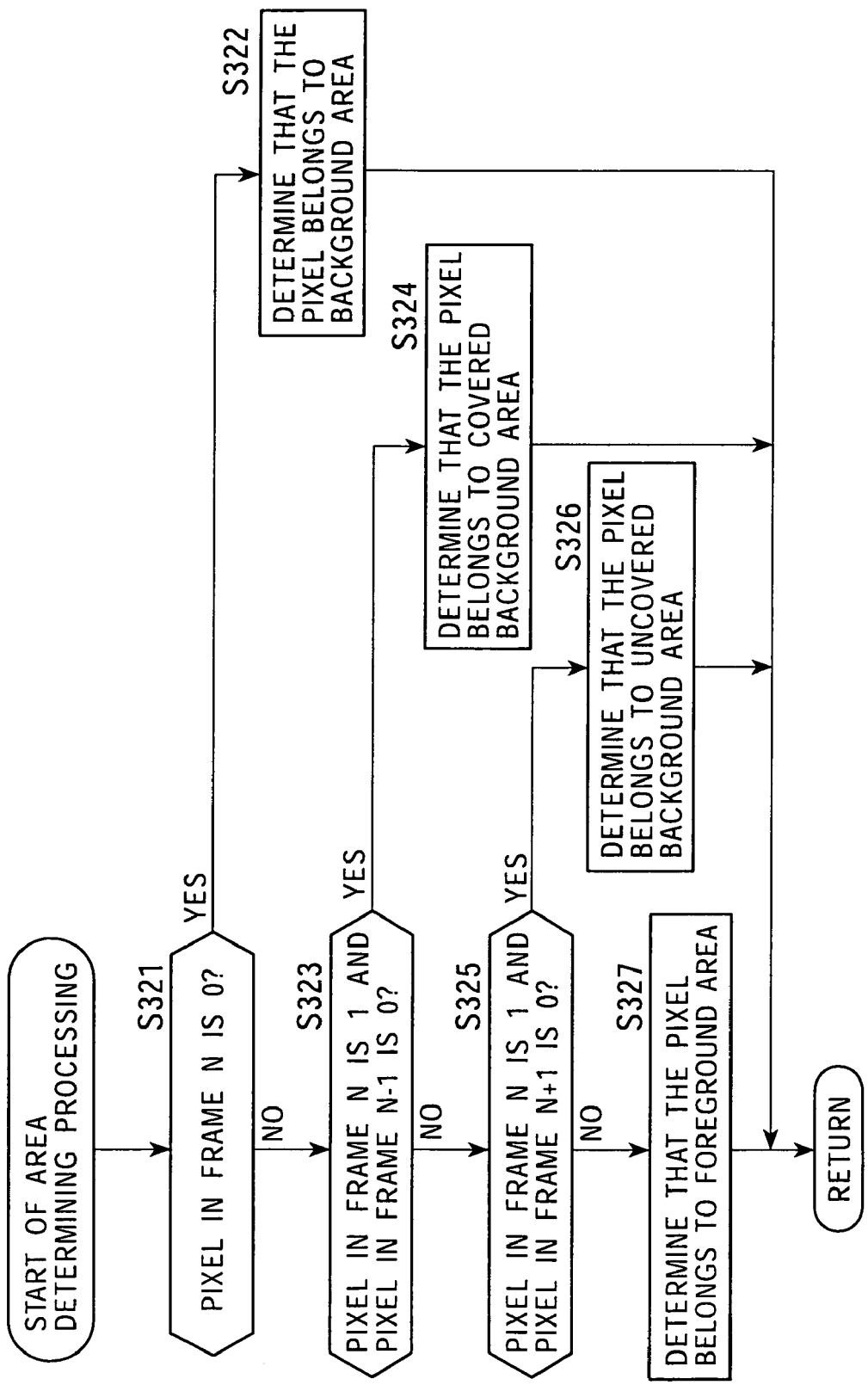
FIG. 42 is a flowchart illustrating details of the area specifying processing.

Details of the area determining processing in step S304 are described below with reference to the flowchart of FIG. 42. In step S321, the area determining portion 342 of the time change detector 303 determines whether the designated pixel in frame #n stored in the frame memory 341 is 0. If it is determined that the designated pixel in frame #n is 0, the process proceeds to step S322. In step S322, it is determined that the designated pixel in frame #n belongs to the background area, and the processing is completed.

If it is determined in step S321 that the designated pixel in frame #n is 1, the process proceeds to step S323. In step S323, the area determining portion 342 of the time change detector 303 determines whether the designated pixel in frame #n stored in the frame memory 341 is 1, and whether the corresponding pixel in frame #n−1 is 0. If it is determined that the designated pixel in frame #n is 1 and the corresponding pixel in frame #n−1 is 0, the process proceeds to step S324. In step S324, it is determined that the designated pixel in frame #n belongs to the covered background area, and the processing is completed.

If it is determined in step S323 that the designated pixel in frame #n is 0, or that the corresponding pixel in frame #n−1 is 1, the process proceeds to step S325. In step S325, the area determining portion 342 of the time change detector 303 determines whether the designated pixel in frame #n stored in the frame memory 341 is 1, and whether the corresponding pixel in frame #n+1 is 0. If it is determined that the designated pixel in frame #n is 1 and the corresponding pixel in frame #n+1 is 0, the process proceeds to step S326. In step S326, it is determined that the designated pixel in frame #n belongs to the uncovered background area, and the processing is completed.

If it is determined in step S325 that the designated pixel in frame #n is 0, or that the corresponding pixel in frame #n+1 is 1, the process proceeds to step S327. In step S327, the area determining portion 342 of the time change detector 303 determines that the designated pixel in frame #n belongs to the foreground area, and the processing is completed.

As discussed above, the area specifying unit 103 is able to specify, based on the correlation value between the input image and the corresponding background image, to which of the foreground area, the background area, the covered background area, or the uncovered background area each pixel of the input image belongs, and generates area information corresponding to the specified result.

Figure 43:
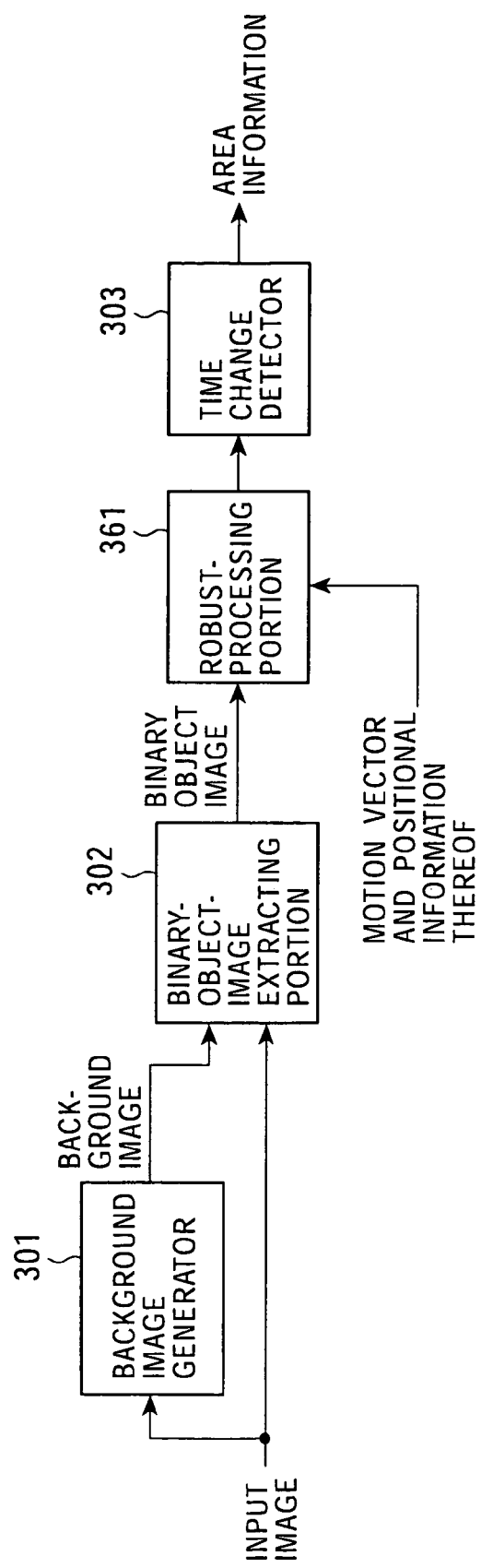
FIG. 43 is a block diagram illustrating still another configuration of the area specifying unit 103.

FIG. 43 is a block diagram illustrating another configuration of the area specifying unit 103. The area specifying unit 103 uses a motion vector and positional information thereof supplied from the motion detector 102. The same elements as those shown in FIG. 31 are designated with like reference numerals, and an explanation thereof is thus omitted.

A robust-processing portion 361 generates a robust binary object image based on binary object images of N frames supplied from the binary-object-image extracting portion 302, and outputs the robust binary object image to the time change detector 303.

Figure 44:
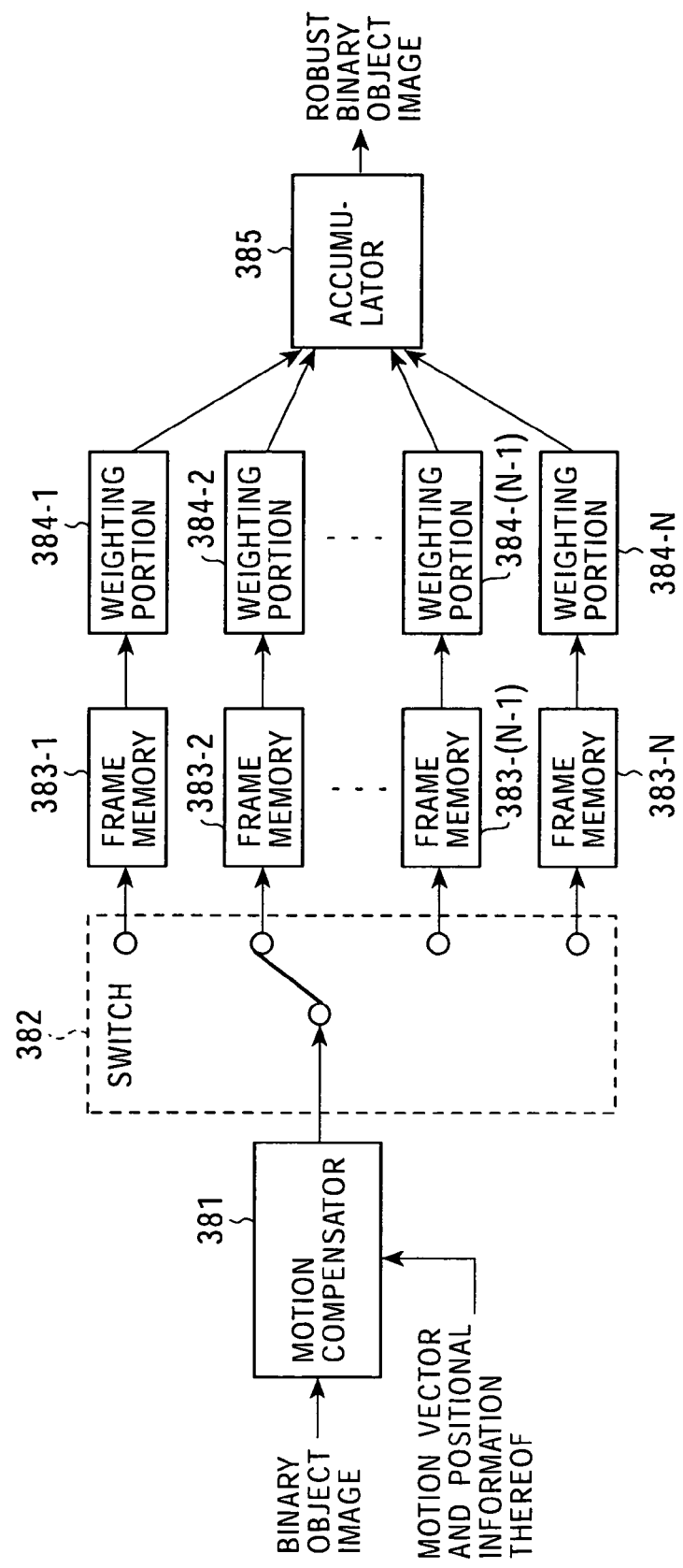
FIG. 44 is a block diagram illustrating the configuration of a robust-processing portion 361.

FIG. 44 is a block diagram illustrating the configuration of the robust-processing portion 361. A motion compensator 381 compensates for the motion of the binary object images of N frames based on the motion vector and the positional information thereof supplied from the motion detector 102, and outputs a motion-compensated binary object image to a switch 382.

Figure 45:
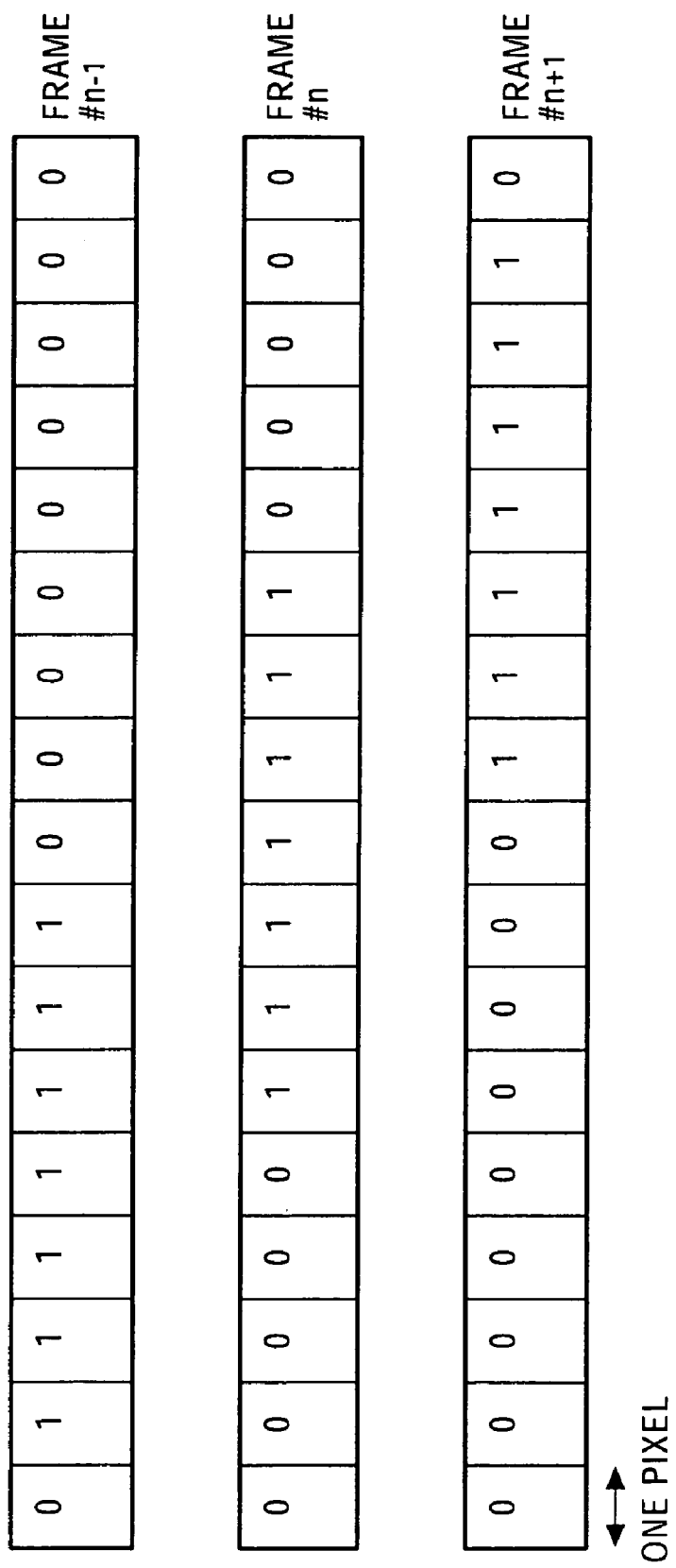
FIG. 45 illustrates motion compensation performed by a motion compensator 381.
Figure 46:
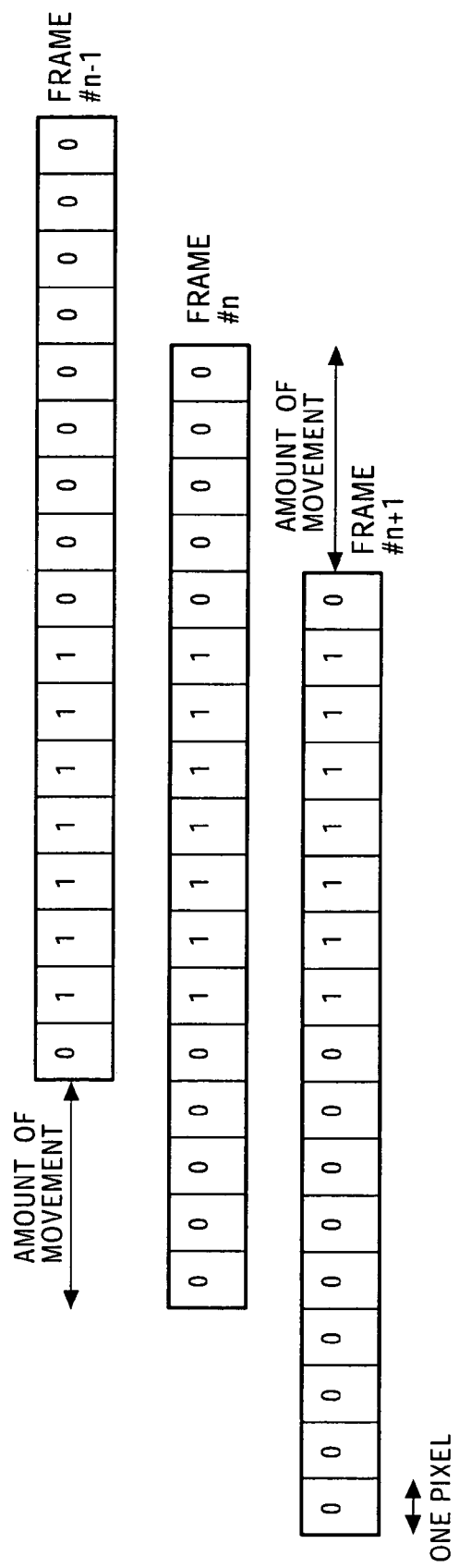
FIG. 46 illustrates motion compensation performed by the motion compensator 381.

The motion compensation performed by the motion compensator 381 is discussed below with reference to examples shown in FIGS. 45 and 46. It is now assumed, for example, that the area in frame #n is to be processed. When binary object images of frame #n−1, frame #n, and frame #n+1 shown in FIG. 45 are input, the motion compensator 381 compensates for the motion of the binary object image of frame #n−1 and the binary object image of frame #n+1, as indicated by the example shown in FIG. 46, based on the motion vector supplied from the motion detector 102, and supplies the motion-compensated binary object images to the switch 382.

The switch 382 outputs the motion-compensated binary object image of the first frame to a frame memory 383-1, and outputs the motion-compensated binary object image of the second frame to a frame memory 383-2. Similarly, the switch 382 outputs the motion-compensated binary object images of the third through (N−1)-th frame to frame memories 383-3 through 383-(N−1), and outputs the motion-compensated binary object image of the N-th frame to a frame memory 383-N.

The frame memory 383-1 stores the motion-compensated binary object image of the first frame, and outputs the stored binary object image to a weighting portion 384-1. The frame memory 383-2 stores the motion-compensated binary object image of the second frame, and outputs the stored binary object image to a weighting portion 384-2.

Similarly, the frame memories 383-3 through 383-(N−1) stores the motion-compensated binary object images of the third through (N−1)-th frames, and outputs the stored binary object images to weighting portions 384-3 through 384-(N−1). The frame memory 383-N stores the motion-compensated binary object image of the N-th frame, and outputs the stored binary object image to a weighting portion 384-N.

The weighting portion 384-1 multiplies the pixel value of the motion-compensated binary object image of the first frame supplied from the frame memory 383-1 by a predetermined weight w1, and supplies a weighted binary object image to an accumulator 385. The weighting portion 384-2 multiplies the pixel value of the motion-compensated binary object image of the second frame supplied from the frame memory 383-2 by a predetermined weight w2, and supplies the weighted binary object image to the accumulator 385.

Likewise, the weighting portions 384-3 through 384-(N−1) multiply the pixel values of the motion-compensated binary object images of the third through (N−1)-th frames supplied from the frame memories 383-3 through 383-(N−1) by predetermined weights w3 through w(N−1), and supplies the weighted binary object images to the accumulator 385. The weighting portion 384-N multiplies the pixel value of the motion-compensated binary object image of the N-th frame supplied from the frame memory 383-N by a predetermined weight wN, and supplies the weighted binary object image to the accumulator 385.

The accumulator 385 accumulates the pixel values of the motion-compensated binary object images multiplied by the weights w1 through wN of the first through N-th frames, and compares the accumulated pixel value with the predetermined threshold value th0, thereby generating the binary object image.

As discussed above, the robust-processing portion 361 generates a robust binary object image from N binary object images, and supplies it to the time change detector 303. Accordingly, the area specifying unit 103 configured as shown in FIG. 43 is able to specify the area more precisely than that shown in FIG. 31 even if noise is contained in the input image.

The area specifying processing performed by the area specifying unit 103 configured as shown in FIG. 43 is described below with reference to the flowchart of FIG. 47. The processings of step S341 through step S343 are similar to those of step S301 through step S303 discussed with reference to the flowchart of FIG. 41, and an explanation thereof is thus omitted.

In step S344, the robust-processing portion 361 performs the robust processing.

In step S345, the time change detector 303 performs the area determining processing, and the processing is completed. Details of the processing of step S345 are similar to the processing discussed with reference to the flowchart of FIG. 42, and an explanation thereof is thus omitted.

Figure 47:
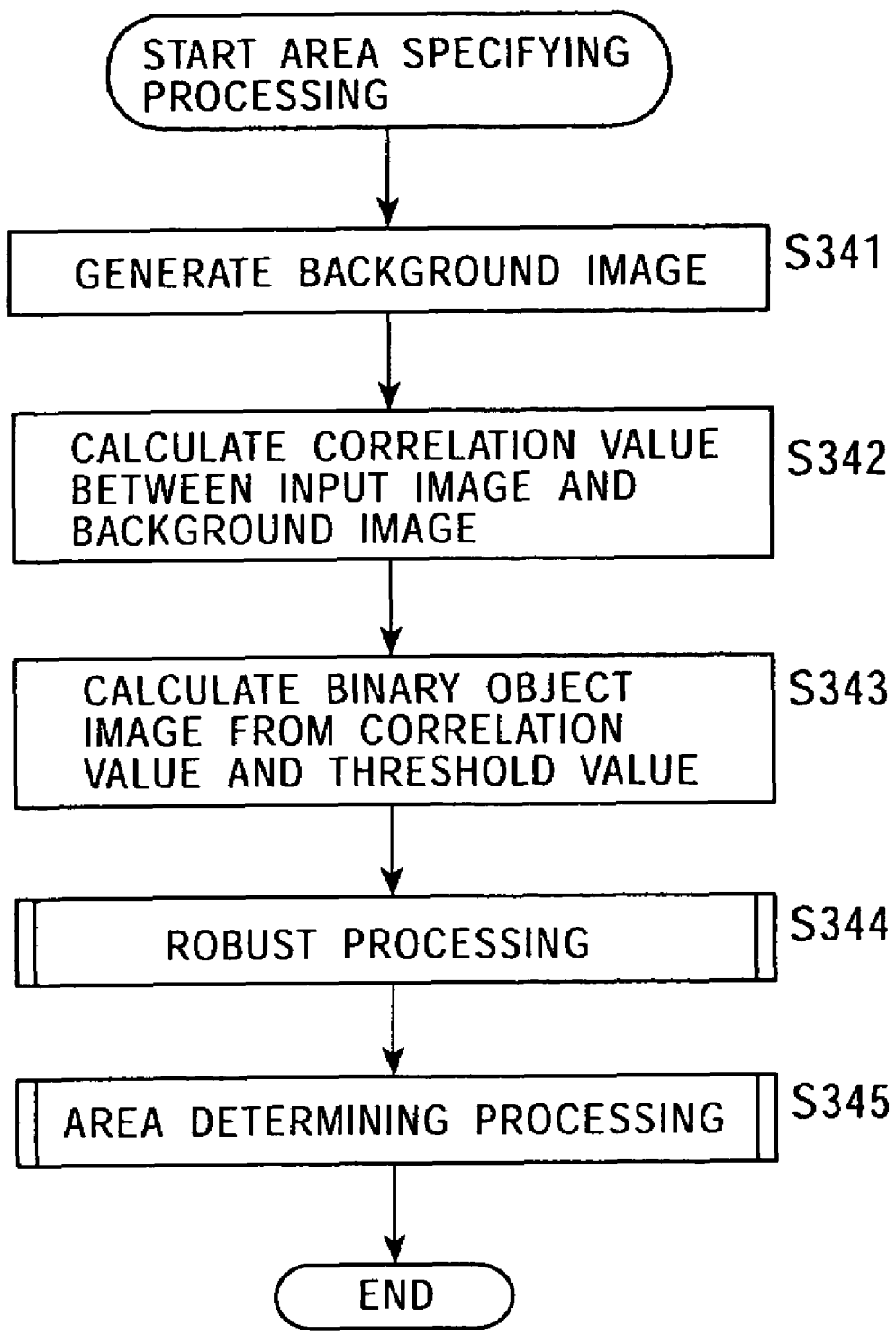
FIG. 47 is a flowchart illustrating the area specifying processing.
Figure 48:
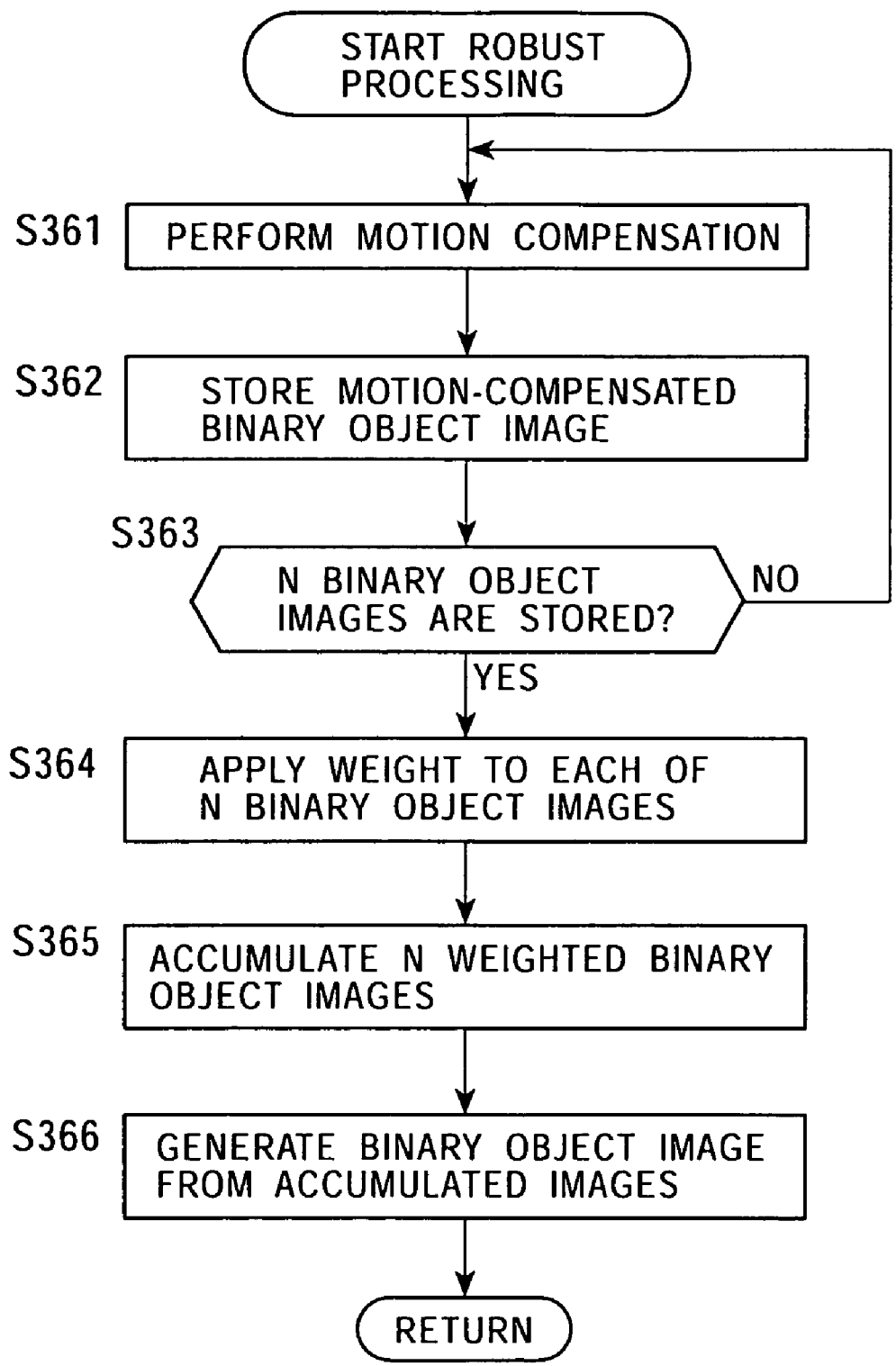
FIG. 48 is a flowchart illustrating details of the robust processing.

Details of the robust processing corresponding to the processing of step S344 in FIG. 47 are given below with reference to the flowchart of FIG. 48. In step S361, the motion compensator 381 performs the motion compensation of an input binary object image based on the motion vector and the positional information thereof supplied from the motion detector 102. In step S362, one of the frame memories 383-1 through 383-N stores the corresponding motion-compensated binary object image supplied via the switch 382.

In step S363, the robust-processing portion 361 determines whether N binary object images are stored. If it is determined that N binary object images are not stored, the process returns to step S361, and the processing for compensating for the motion of the binary object image and the processing for storing the binary object image are repeated.

If it is determined in step S363 that N binary object images are stored, the process proceeds to step S364 in which weighting is performed. In step S364, the weighting portions 384-1 through 384-N multiply the corresponding N binary object images by the weights w1 through wN.

In step S365, the accumulator 385 accumulates the N weighted binary object images.

In step S366, the accumulator 385 generates a binary object image from the accumulated images by, for example, comparing the accumulated value with a predetermined threshold value th1, and the processing is completed.

As discussed above, the area specifying unit 103 configured as shown in FIG. 43 is able to generate area information based on the robust binary object image.

As is seen from the foregoing description, the area specifying unit 103 is able to generate area information indicating to which of the moving area, the stationary area, the uncovered background area, or the covered background area each pixel contained in a frame belongs.

Figure 49:
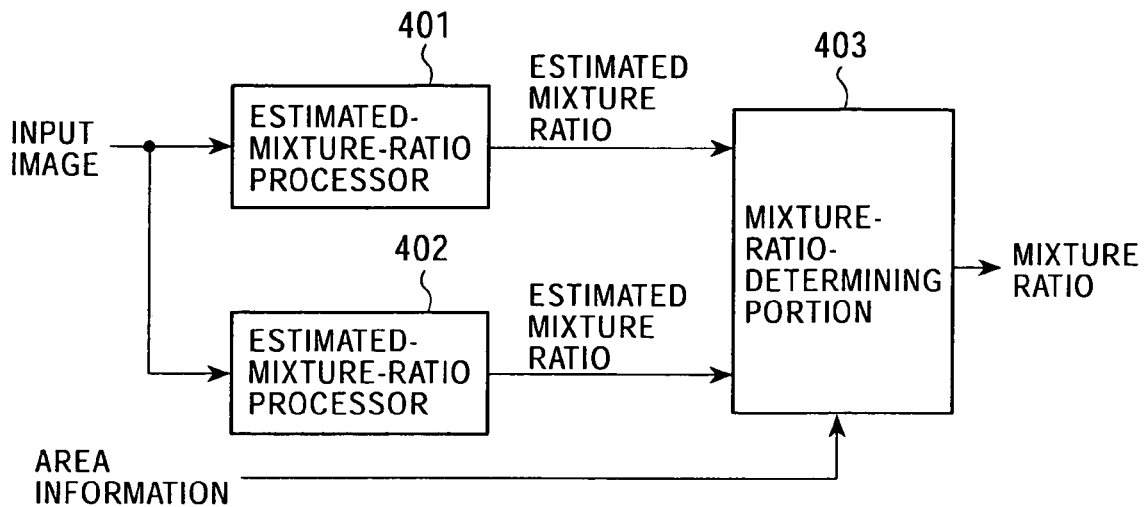
FIG. 49 is a block diagram illustrating the configuration of a mixture-ratio calculator 104.

FIG. 49 is a block diagram illustrating the configuration of the mixture-ratio calculator 104. An estimated-mixture-ratio processor 401 calculates an estimated mixture ratio for each pixel by calculating a model of a covered background area based on the input image, and supplies the calculated estimated mixture ratio to a mixture-ratio determining portion 403.

An estimated-mixture-ratio processor 402 calculates an estimated mixture ratio for each pixel by calculating a model of an uncovered background area based on the input image, and supplies the calculated estimated mixture ratio to the mixture-ratio determining portion 403.

Since it can be assumed that the object corresponding to the foreground is moving with constant velocity within the shutter time, the mixture ratio α of the pixels belonging to a mixed area exhibits the following characteristics. That is, the mixture ratio α linearly changes according to the positional change in the pixels. If the positional change in the pixels is one-dimensional, a change in the mixture ratio α can be represented linearly. If the positional change in the pixels is two-dimensional, a change in the mixture ratio α can be represented on a plane.

Since the period of one frame is short, it can be assumed that the object corresponding to the foreground is a rigid body moving with constant velocity.

The gradient of the mixture ratio α is inversely proportional to the amount of movement v within the shutter time of the foreground.

Figure 50:
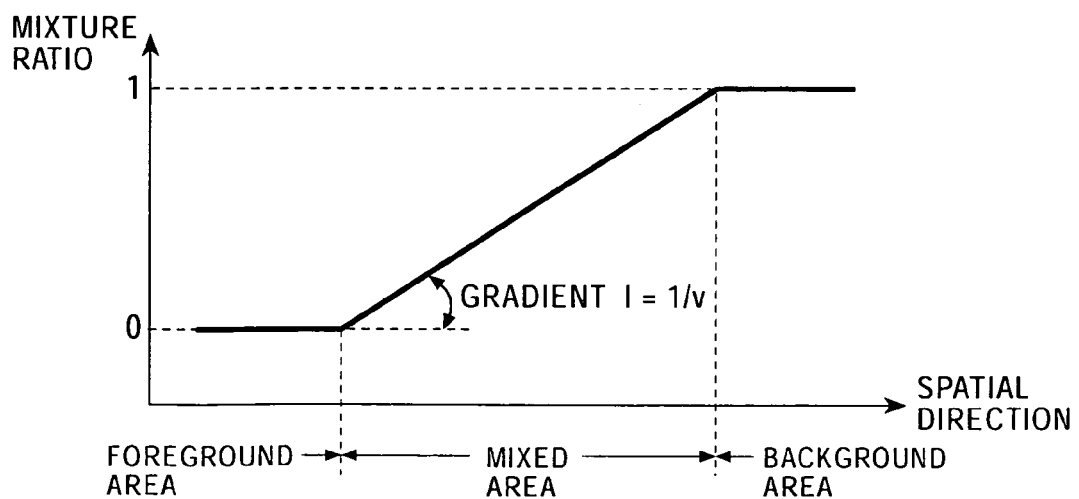
FIG. 50 illustrates an example of the ideal mixture ratio $\alpha$.

An example of the ideal mixture ratio α is shown in FIG. 50. The gradient l of the ideal mixture ratio α in the mixed area can be represented by the reciprocal of the amount of movement v.

As shown in FIG. 50, the ideal mixture ratio α has the value of 1 in the background area, the value of 0 in the foreground area, and the value of greater than 0 and smaller than 1 in the mixed area.

Figure 51:
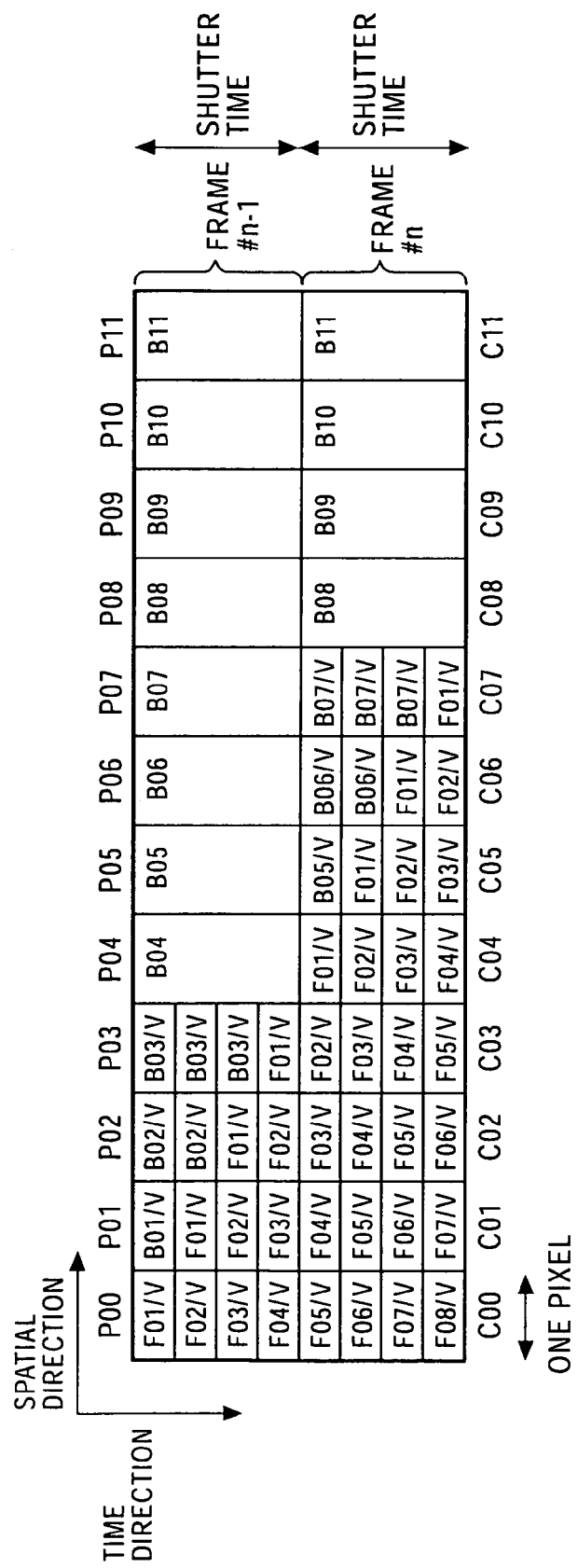
FIG. 51 illustrates a model in which pixel values are expanded in the time direction and the period corresponding to the shutter time is divided.

In the example shown in FIG. 51, the pixel value C06 of the seventh pixel from the left in frame #n can be indicated by equation (8) by using the pixel value P06 of the seventh pixel from the left in frame #n−1.

$$C06 = B06/v + B06/v + F01/v + F02/v \qquad (8)$$
$$= P06/v + P06/v + F01/v + F02/v$$
$$= 2/v \cdot P06 + \sum_{i=1}^{2} Fi/v$$

In equation (8), the pixel value C06 is indicated by a pixel value M of the pixel in the mixed area, while the pixel value P06 is indicated by a pixel value B of the pixel in the background area. That is, the pixel value M of the pixel in the mixed area and the pixel value B of the pixel in the background area can be represented by equations (9) and (10), respectively.

$$M = C06 \qquad (9)$$

$$B = P06 \qquad (10)$$

In equation (8), 2/v corresponds to the mixture ratio α. Since the amount of movement v is 4, the mixture ratio α of the seventh pixel from the left in frame #n is 0.5.

As discussed above, the pixel value C in the designated frame #n is considered as the pixel value in the mixed area, while the pixel value P of frame #n−1 prior to frame #n is considered as the pixel value in the background area. Accordingly, equation (3) indicating the mixture ratio α can be represented by equation (11):

$$C = \alpha \cdot P + f \qquad (11)$$

where f in equation (11) indicates the sum of the foreground components $\Sigma_i Fi/v$ contained in the designated pixel. The variables contained in equation (11) are two factors, i.e., the mixture ratio α and the sum f of the foreground components.

Figure 52:
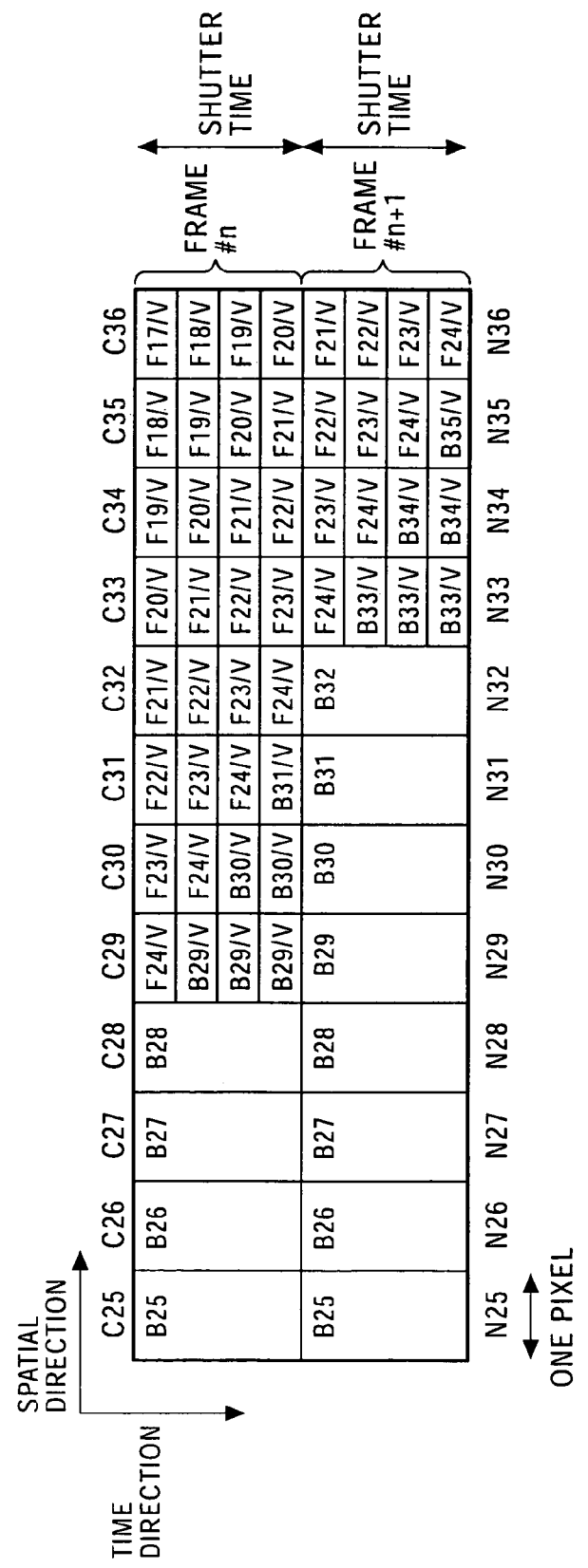
FIG. 52 illustrates a model in which pixel values are expanded in the time direction and the period corresponding to the shutter time is divided.

Similarly, a model obtained by expanding in the time direction the pixel values in which the amount of movement is 4 and the number of virtual divided portions is 4 in an uncovered background area is shown in FIG. 52.

As in the representation of the covered background area, in the uncovered background area, the pixel value C of the designated frame #n is considered as the pixel value in the mixed area, while the pixel value N of frame #n+1 subsequent to frame #n is considered as the background area. Accordingly, equation (3) indicating the mixture ratio α can be represented by equation (12).

$$C = \alpha \cdot N + f \qquad (12)$$

The embodiment has been described, assuming that the background object is stationary. However, equations (8) through (12) can be applied to the case in which the background object is moving by using the pixel value of a pixel located corresponding to the amount of movement v of the background. It is now assumed, for example, in FIG. 51 that the amount of movement v of the object corresponding to the background is 2, and the number of virtual divided portions is 2. In this case, when the object corresponding to the background is moving to the right in FIG. 49, the pixel value B of the pixel in the background area in equation (10) is represented by a pixel value P04.

Since equations (11) and (12) each contain two variables, the mixture ratio α cannot be determined without modifying the equations.

The mixture ratio α linearly changes in accordance with a change in the position of the pixels because the object corresponding to the foreground is moving with constant velocity. By utilizing this characteristic, an equation in which the mixture ratio α and the sum f of the foreground components are approximated in the spatial direction can hold true. By utilizing a plurality of sets of the pixel values of the pixels belonging to the mixed area and the pixel values of the pixels belonging to the background area, the equations in which the mixture ratio α and the sum f of the foreground components are approximated are solved by assuming that the mixture ratio α linearly changes and that the sum of the foreground components linearly changes, as shown in FIG. 53.

Figure 53:
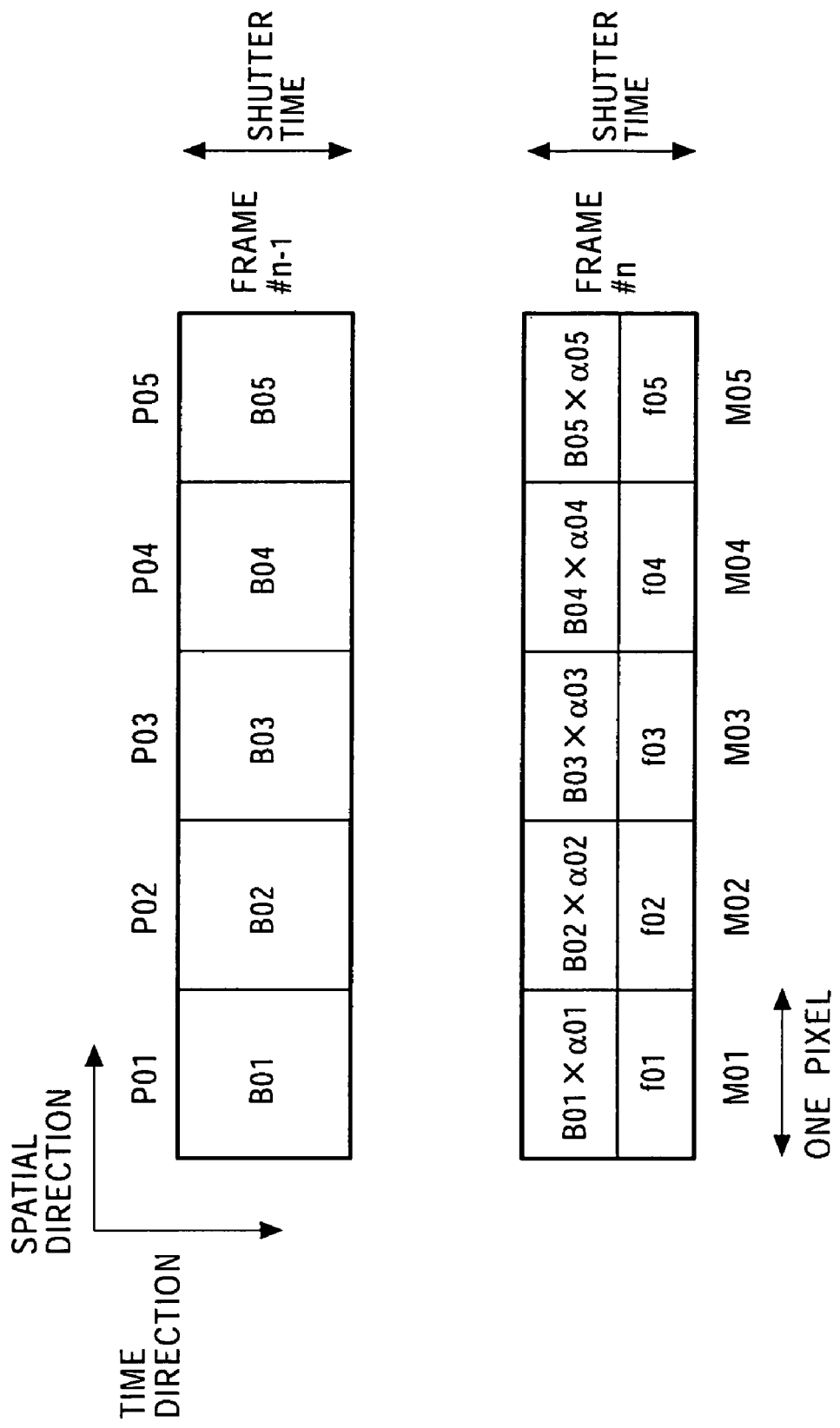
FIG. 53 illustrates a model in which pixel values are expanded in the time direction and the period corresponding to the shutter time is divided.

As shown in FIG. 53, the data that can be utilized for calculating the mixture ratio α of the pixels belonging to the covered background area includes the pixel values M01 through M05, which contain the pixel value of a designated pixel of the designated frame #n, and the pixel values P01 through P05 of frame #n−1.

The mixture ratio α differs according to the spatial position, and is represented by α01 through α05.

The sum of the foreground components differs according to the spatial position, and is represented by F01 through f05.

When the mixture ratio α is approximated in the plane, the mixture ratio α can be represented by equation (13) by considering the movement v corresponding to the two directions, i.e., the horizontal direction and the vertical direction of the image.

$$\alpha x = jm + kq + p \tag{13}$$

In equation (13), x indicates one of 01 through 05. In equation (13), j is the index in the horizontal direction, and k is the index in the vertical direction when the position of the designated pixel is 0. In equation (13), m designates the horizontal gradient of the mixture ratio α in the plane, and q indicates the vertical gradient of the mixture ratio α in the plane. In equation (13), p indicates the intercept of the mixture ratio α in the plane.

The sum of the foreground components can be expressed by equation (14).

$$fx = js + kt + u \tag{14}$$

In equation (14), x indicates one of 01 through 05. In equation (14), j is the index in the horizontal direction, and k is the index in the vertical direction when the position of the designated pixel is 0. In equation (14), s designates the horizontal gradient of the sum of the foreground components in the plane, and t indicates the vertical gradient of the sum of the foreground components in the plane. In equation (14), u indicates the intercept of the sum of the foreground components in the plane.

For example, by applying 5×5-pixel values that are spatially located in close proximity with each other to the equations containing the six variables, m, q, p, s, t, and u, 25 equations can be obtained for the six variables. By solving the obtained equations with the method of least squares, the six variables can be determined.

When the object corresponding to the foreground is moving fast in the shutter time, the mixture ratio α of the pixels that are spatially located in close proximity with each other is uniform, and the sum of the foreground components of the pixels that are spatially located in close proximity with each other is uniform due to the spatial correlation of the foreground object. By utilizing this assumption, equations in which the mixture ratio α and the sum f of the foreground components are approximated in the spatial direction can hold true.

More specifically, concerning the first term of the right side of equation (3), the mixture ratio approximates to be uniform, as indicated by equation (15), which is described below, and also, concerning the second term of the right side of equation (3), the sum of the foreground components approximates to be uniform, as indicated by equation (21), which is described below.

By utilizing a plurality of sets of the pixel values of the pixels belonging to the mixed area and the pixel values of the pixels belonging to the background area, the equation in which the mixture ratio α and the sum f of the foreground components are approximated is solved.

By approximating the mixture ratio α assuming that the mixture ratio α in the pixels which are spatially in close proximity with each other is uniform, the mixture ratio α can be expressed by equation (15).

$$\alpha = n \tag{15}$$

Figure 54:
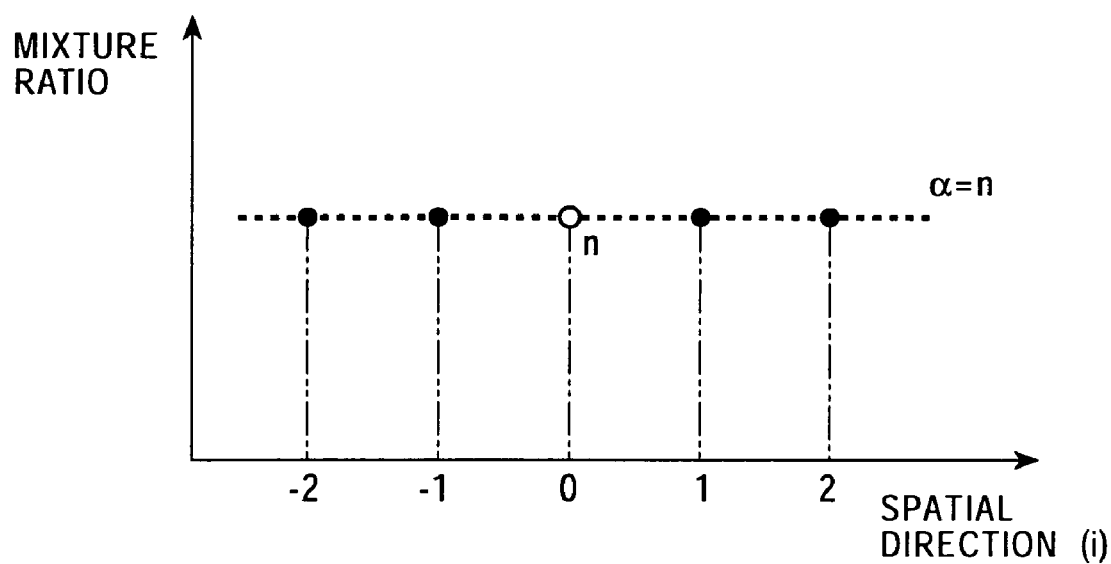
FIG. 54 illustrates a straight line for approximating the mixture ratio $\alpha$.

As shown in FIG. 54, i indicates the spatial index when the position of the designated pixel is set to 0. In FIG. 54, the white dot indicates the designated pixel, and the black dots indicate the pixels located in close proximity with the designated pixel. In equation (15), n is the approximated value of the mixture ratio α and is also the mixture ratio α of the designated pixel corresponding to the index, which is 0.

Although the index i is known, n is unknown.

By approximating the mixture ratio α, as indicated by equation (15), a plurality of different mixture ratios α for a plurality of pixels can be expressed by one variable. In the example shown in FIG. 54, the five mixture ratios α for the five pixels can be expressed by one variable, i.e., n.

Figure 55:
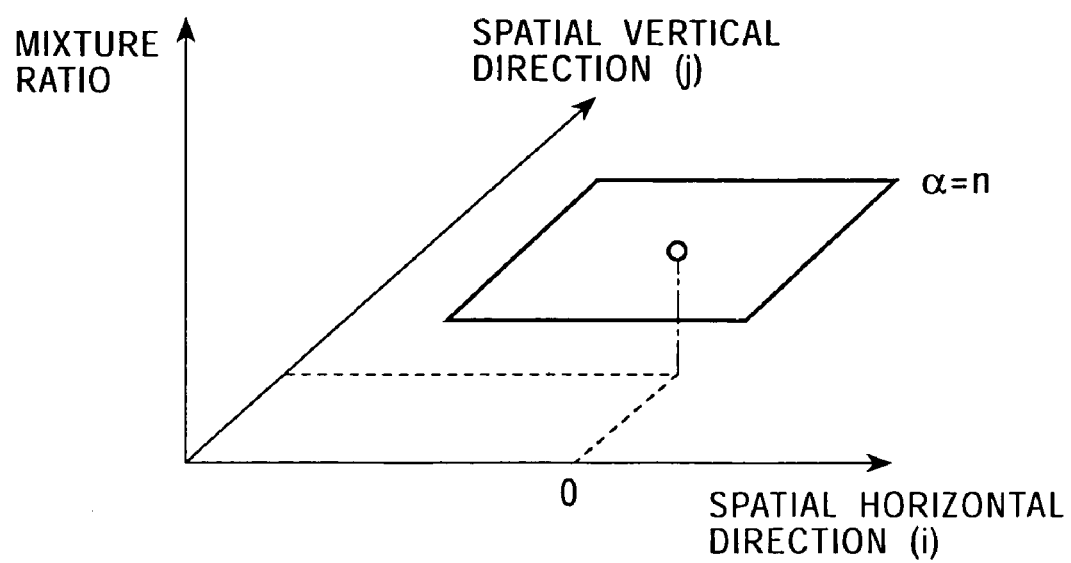
FIG. 55 illustrates a plane for approximating the mixture ratio $\alpha$.

By approximating the mixture ratio α in the plane shown in FIG. 55, equation (15) is expanded into the plane, and the mixture ratio α can be expressed by equation (16).

$$\alpha = n \tag{16}$$

In FIG. 55, i indicates the horizontal index when the position of the designated pixel is set to 0, and j indicates the vertical index when the position of the designated pixel is set to 0. In FIG. 55, the white dot indicates the designated pixel.

Figure 56:
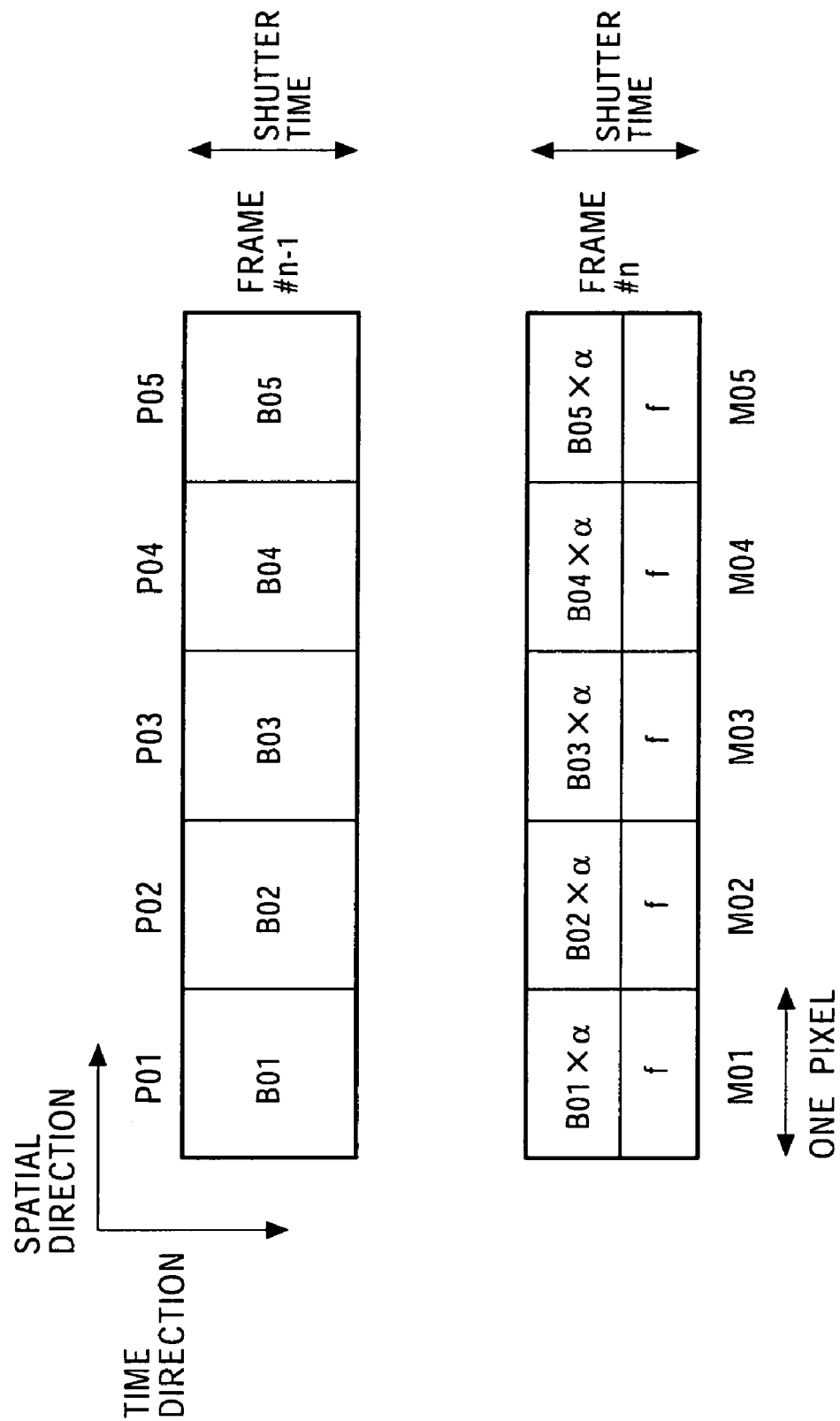
FIG. 56 illustrates a model in which pixel values are expanded in the time direction and the period corresponding to the shutter time is divided

As shown in FIG. 56, the data that can be utilized for calculating the mixture ratio α of the pixels belonging to the covered background area includes the pixel values M01 through M05, which contain the pixel value of the designated pixel of the designated frame #n, and the pixel values P01 through P05 of frame #n−1.

Since the mixture ratio α approximates to be uniform regardless of the spatial position, it is represented by the mixture ratio α.

Since the sum of the foreground components approximates to be uniform regardless of the spatial position, it is represented by f.

For example, in frame #n shown in FIG. 51, equations (17) through (19) can hold true for C05 through C07.

$$C05 = \alpha 05 \cdot B05/v + f05 \tag{17}$$

$$C06 = \alpha 06 \cdot B06/v + f06 \tag{18}$$

$$C07 = \alpha 07 \cdot B07/v + f07 \tag{19}$$

Assuming that the foreground components of the pixels positioned in close proximity with each other are equal, i.e., that F01 through F03 are equal, equation (20) holds true by replacing F01 through F03 by fc.

$$fx=Fc \quad (20)$$

In equation (20), x indicates the position in the spatial direction.

When i indicates the horizontal index, and j indicates the vertical index, equation (20) can be expressed by equation (21).

$$fi,j=u \quad (21)$$

In equation (21), u is indicated by Fc, as expressed by equation (22).

$$u=Fc$$

That is, the approximation in which the sum of the foreground components of the pixels located in close proximity with each other is uniform can be expressed by equation (21).

Assuming that the mixture ratio α of the pixels located in close proximity with each other approximates to be uniform, and that the sum of the foreground components of the pixels located in close proximity with each other approximates to be uniform, equations (15) and (21) are substituted into equation (3), thereby obtaining equation (23).

$$M=n\cdot B+u \quad (23)$$

Equation (23) contains two variables, i.e., n and u.

For determining the mixture ratio α, the number of equations is increased by setting the pixel values of the pixels spatially located in the close proximity with each other in equation (23) while maintaining the two variables. More specifically, according to the pixels in close proximity with the designated pixel, the pixel value M or the pixel value B is set in the normal equation corresponding to equation (23). Then, a plurality of normal equations in which the pixel value M or the pixel value B is set are solved by the method of least squares, thereby calculating the mixture ratio α.

For example, the horizontal index i of the designated pixel is set to 0, and the vertical index j is set to 0. Then, the pixel value M or the pixel value B is set in equation (23) for 3×3 pixels located close to the designated pixel, thereby obtaining equations (24) through (32).

$$M_{-1,-1}=B_{-1,-1}\cdot n+u \quad (24)$$

$$M_{0,-1}=B_{0,-1}\cdot n+u \quad (25)$$

$$M_{+1,-1}=B_{+1,-1}\cdot n+u \quad (26)$$

$$M_{-1,0}=B_{-1,0}\cdot n+u \quad (27)$$

$$M_{0,0}=B_{0,0}\cdot n+u \quad (28)$$

$$M_{+1,0}=B_{+1,0}\cdot n+u \quad (29)$$

$$M_{-1,+1}=B_{-1,+1}\cdot n+u \quad (30)$$

$$M_{0,+1}=B_{0,+1}\cdot n+u \quad (31)$$

$$M_{+1,+1}=B_{+1,+1}\cdot n+u \quad (32)$$

Nine equations (24) through (32) are obtained for the two variables u and n, and are solved by the method of least squares, thereby determining the two variables u and n. In this case, the mixture ratio α of the designated pixel corresponds to the variable n in equation (23). Accordingly, between the two determined variables u and n, the variable n is output as the mixture ratio α.

A description has been given with reference to equations (24) through (32), by assuming that the pixel value of the pixel contained in the mixed area is M, and the pixel value of the pixel contained in the background area is B. In this case, it is necessary to set normal equations for each of the cases where the designated pixel is contained in the covered background area, or the designated pixel is contained in the uncovered background area.

For example, when the mixture ratio α of the pixel contained in the covered background area in frame #n shown in FIG. 51 is determined, C04 through C08 of the pixels in frame #n and the pixel values P04 through P08 of the pixels in frame #n-1 are set in the normal equations.

For determining the mixture ratio α of the pixel contained in the uncovered background area in frame #n shown in FIG. 52, the pixels C28 through C32 of frame #n and the pixel values N28 through N32 of the pixels in frame #n+1 are set in the normal equations.

When the model corresponding to the covered background area is used, it is set that M=C and B=P in equations (24) through (32). In contrast, when the model corresponding to the uncovered background area is used, it is set that M=C and B=N in equations (24) through (32).

Figure 57:
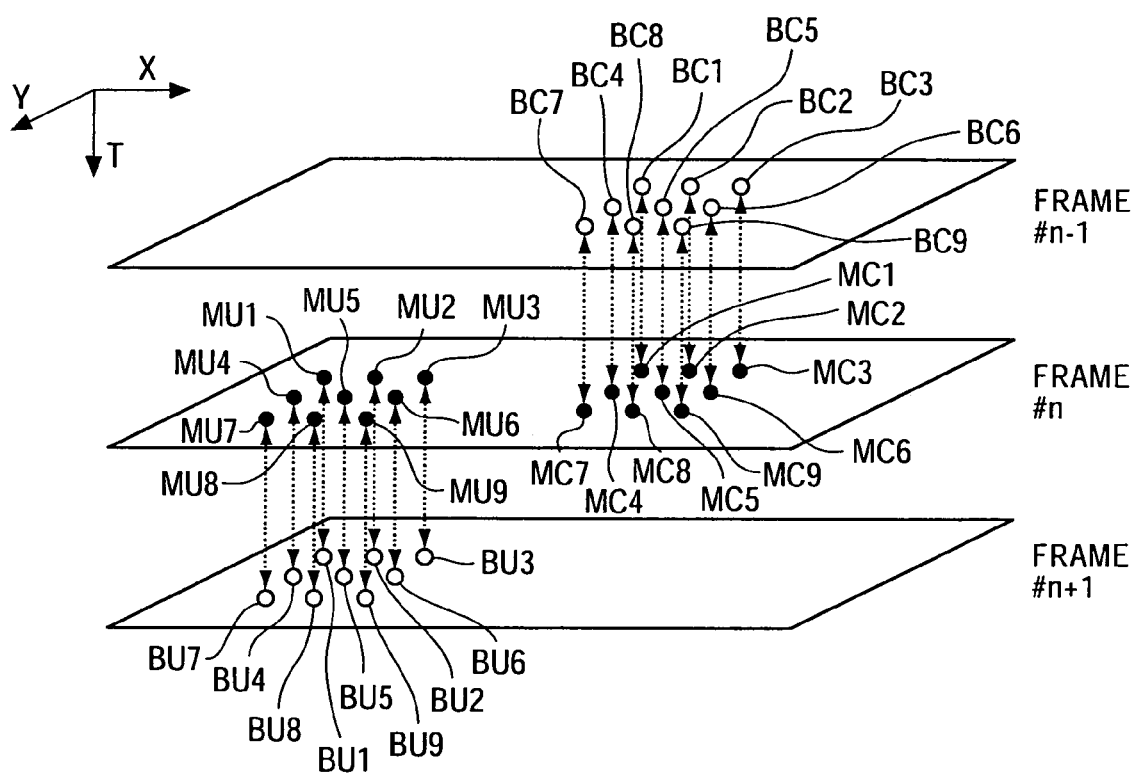
FIG. 57 illustrates the relationships of the pixels in a plurality of frames when the mixture ratio $\alpha$ is calculated.

More specifically, for example, for calculating the mixture ratio α of the pixel contained in the covered background area shown in FIG. 57, the following equations (33) through (41) are established. The pixel value of the pixel whose mixture ratio α is to be calculated is Mc5. In FIG. 57, the white dots indicate pixels to be considered as the background, and the black dots indicate pixels to be considered as the mixed area.

$$Mc1=Bc1\cdot n+u \quad (33)$$

$$Mc2=Bc2\cdot n+u \quad (34)$$

$$Mc3=Bc3\cdot n+u \quad (35)$$

$$Mc4=Bc4\cdot n+u \quad (36)$$

$$Mc5=Bc5\cdot n+u \quad (37)$$

$$Mc6=Bc6\cdot n+u \quad (38)$$

$$Mc7=Bc7\cdot n+u \quad (39)$$

$$Mc8=Bc8\cdot n+u \quad (40)$$

$$Mc9=Bc9\cdot n+u \quad (41)$$

When calculating the mixture ratio α of the pixel contained in the covered background area in frame #n, the pixel values Bc1 through Bc9 of the pixels in the background area in frame #n-1 corresponding to the pixels in frame #n are used in equations (33) through (41). Since nine equations (33) through (41) are established for the two variables u and n, they can be solved by the method of least squares.

When calculating the mixture ratio α of the pixel contained in the uncovered background area shown in FIG. 57, the following equations (42) through (50) can hold true. The pixel value of the pixel whose mixture ratio α is to be calculated is Mu5.

$$Mu1=Bu1\cdot n+u \quad (42)$$

$$Mu2=Bu2\cdot n+u \quad (43)$$

$$Mu3=Bu3\cdot n+u \quad (44)$$

$$Mu4 = Bu4 \cdot n + u \quad (45)$$

$$Mu5 = Bu5 \cdot n + u \quad (46)$$

$$Mu6 = Bu6 \cdot n + u \quad (47)$$

$$Mu7 = Bu7 \cdot n + u \quad (48)$$

$$Mu8 = Bu8 \cdot n + u \quad (49)$$

$$Mu9 = Bu9 \cdot n + u \quad (50)$$

When calculating the mixture ratio α of the pixel contained in the uncovered background area in frame #n, the pixel values Bu1 through Bu9 of the pixels of the background area in frame #n+1 corresponding to the pixels of frame #n are used in equations (42) through (50). Since nine equations (42) through (50) are established for the two variables u and n, they can be solved by the method of least squares.

A specific process for calculating the mixture ratio α by applying the method of least squares is described below.

For the sake of simplicity, in equation (23), n is indicated by w0, and u is indicated by w1. Similarly, in equation (23), the value B relating to n is indicated by a0, and the value 1 relating to u is indicated by a1.

Also, a combination of the horizontal index i and the vertical index j in equations (24) through (32) is indicated by a single index k.

When the index i and the index j are indicated by a single index k, the relationship among the index i, the index j, and the index k is expressed by equation (51).

$$k = (i+1) \cdot 3 + (j+1) \quad (51)$$

In consideration of the error ek, equations (24) through (32) can be modified into equation (52).

$$Mk = \sum_{h=0}^{l} ah \cdot wh + e_k \quad (52)$$

In equation (52), k is any one of the integers from 0 to 8.

Equation (53) can be found from equation (52).

$$e_k = Mk - \sum_{h=0}^{l} ah \cdot wh \quad (53)$$

Since the method of least squares is applied, the square sum E of the error is defined as follows, as expressed by equation (54).

$$E = \sum_{k=0}^{8} e_k^2 \quad (54)$$

In order to minimize the error, the partial differential value of the variable Wv with respect to the square sum E of the error should be 0. v is an integer either 0 or 1. Thus, wv is determined so that equation (55) is satisfied.

$$\frac{\partial E}{\partial w_v} = 2 \cdot \sum_{x=0}^{8} e_k \cdot \frac{\partial e_k}{\partial w_v} \quad (55)$$

-continued $$= 2 \cdot \sum_{x=0}^{8} e_k \cdot a_v = 0$$

By substituting equation (53) into equation (55), equation (56) is obtained.

$$\sum_{k=0}^{8} \left( a_v \cdot \sum_{h=0}^{l} ah \cdot wh \right) = \sum_{k=0}^{8} a_v \cdot Mk \quad (56)$$

From the two equations obtained by substituting one of the integers 0 and 1 into v in equation (56), wh (h=0,1) is determined.

As discussed above, the determined result w0, i.e., n, is set in the mixture ratio α corresponding to the designated pixel.

In this manner, the mixture-ratio calculator 104 is able to determine the mixture ratio α with a relatively simple calculation, by assuming that the mixture ratio α of the pixels in close proximity with each other approximates to be uniform and that the sum of the foreground components of the pixels in close proximity with each other approximates to be uniform.

When the foreground object is moving fast in the shutter time, it can be assumed that the mixture ratio α of the pixels spatially located in close proximity with each other is uniform, and that the sum of the foreground components of the pixels spatially located in close proximity with each other linearly changes due to the spatial correlation of the foreground object. Based on these assumptions, equations in which the mixture ratio α and the sum f of the foreground components are approximated can be established.

Figure 58:
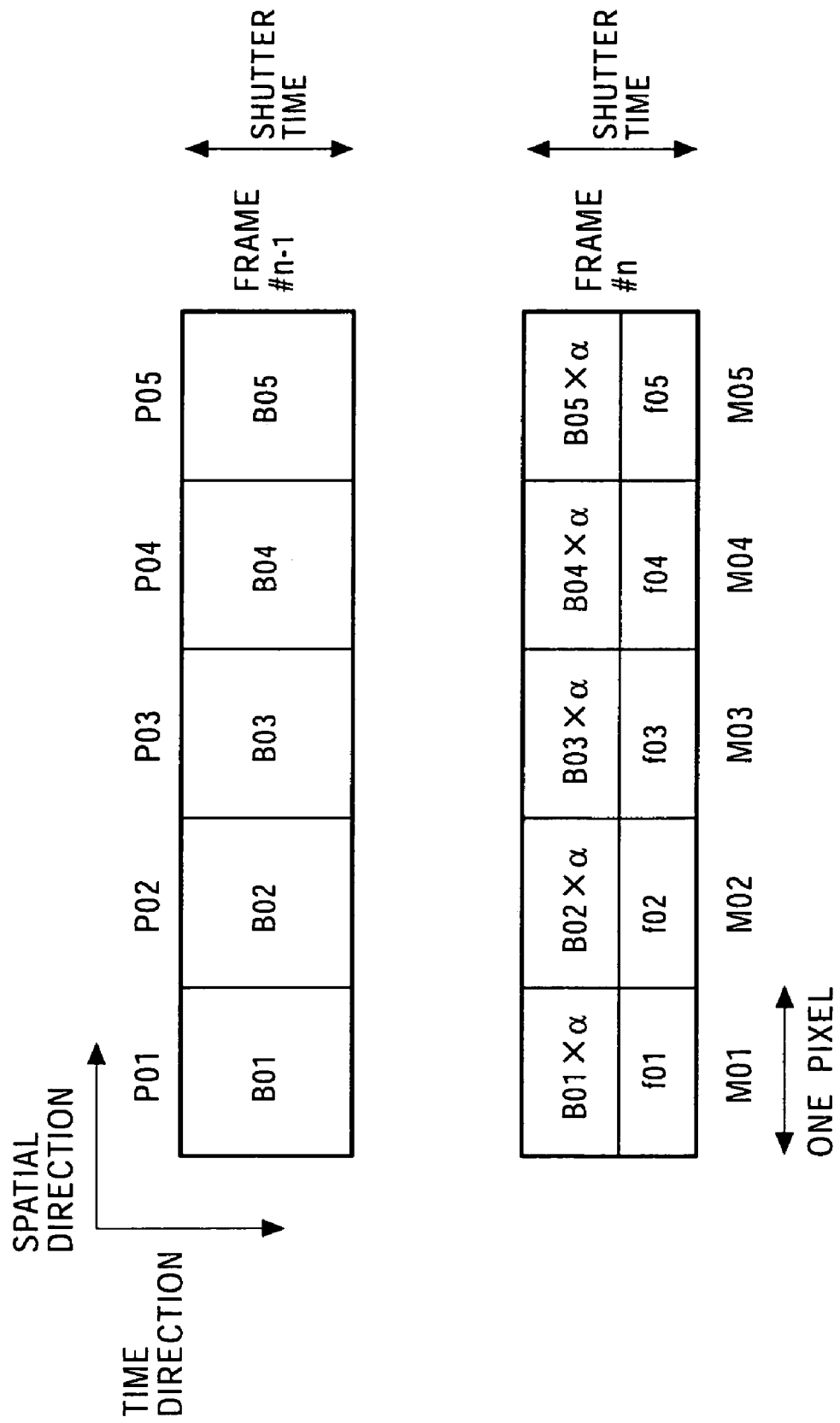
FIG. 58 illustrates a model in which pixel values are expanded in the time direction and the period corresponding to the shutter time is divided.

As shown in FIG. 58, the data that can be utilized for calculating the mixture ratio α of the pixels belonging to the covered background area includes the pixel values M01 through M05, which contain the pixel value of the designated pixel of the designated frame #n, and the pixel values P01 through P05 of frame #n−1.

The mixture ratio α approximates to be uniform regardless of the spatial position, and is thus represented by the mixture ratio α.

The sum of the foreground components is different according to the spatial position, and is thus represented by f01 through f05.

The mixture ratio α in which α approximates to be uniform is expressed by equation (57).

$$\alpha = p \quad (57)$$

f01 through f05 approximating to be linear is expressed by equation (58).

$$fx = js + kt + u \quad (58)$$

In equation (58), x is one of 01 through 05.

With this arrangement, for example, by applying the pixel values of 5×5 pixels spatially located in close proximity with each other to the equations containing the four variables, i.e., p, s, t, and u, 25 equations can be obtained for the four variables. The obtained equations are solved by the method of least squares, thereby determining the four variables.

For example, it is now assumed that the mixture ratio of the 5×5 pixels spatially located in close proximity with each other is uniform, and that the sum of the foreground components of the pixels spatially located in close proximity with each other linearly changes. Then, the pixel values spatially located in close proximity with each other are set in the equations by applying four variables, that is, one variable indicating the mixture ratio and three variables indicating the gradient and the intercepts, and the equations in which the pixel values are set are solved by the method of least squares.

This is described below by taking an example in which 3×3 pixels in close proximity with the designated pixel are processed.

When the horizontal index and the vertical index for the designated pixel are indicated by i and j (the designated pixel is 0), nine equations are established for 3×3 pixels as expressed by equations (59) through (67).

$$M_{-1,-1}=B_{-1,-1}\cdot n+(-1)\cdot s+(-1)\cdot t+u \quad (59)$$

$$M_{0,-1}=B_{0,-1}\cdot n+0\cdot s+(-1)\cdot t+u \quad (60)$$

$$M_{+1,-1}=B_{+1,-1}\cdot n+(-1)\cdot s+(-1)\cdot t+u \quad (61)$$

$$M_{-1,0}=B_{-1,0}\cdot n+(-1)\cdot s+0\cdot t+u \quad (62)$$

$$M_{0,0}=B_{0,0}\cdot n+0\cdot s+0\cdot t+u \quad (63)$$

$$M_{+1,0}=B_{+1,0}\cdot n+(+1)\cdot s+0\cdot t+u \quad (64)$$

$$M_{-1,+1}=B_{-1,+1}\cdot n+(-1)\cdot s+(+1)\cdot t+u \quad (65)$$

$$M_{0,+1}=B_{0,+1}\cdot n+0\cdot s+(+1)\cdot t+u \quad (66)$$

$$M_{+1,+1}=B_{+1,+1}\cdot n+(+1)\cdot s+(+1)\cdot t+u \quad (67)$$

Nine equations (59) through (67) are obtained for the four variables u, s, t, and n, and are solved by the method of least squares, thereby determining the four variables u, s, t, and n. In this case, the mixture ratio α of the designated pixel corresponds to n in equation (23). Accordingly, among the four determined variables, n is output as the mixture ratio α.

A description has been given with reference to equations (59) through (67), by assuming that the pixel value of the pixel contained in the mixed area is M, and the pixel value of the pixel contained in the background area is B. In this case, it is necessary to set normal equations for each of the cases where the designated pixel is contained in the covered background area, or the designated pixel is contained in the uncovered background area.

For example, when the mixture ratio α of the pixel contained in the covered background area in frame #n shown in FIG. 51 is determined, C04 through C08 of the pixels in frame #n and the pixel values P04 through P08 of the pixels in frame #n−1 are set in the normal equations.

For determining the mixture ratio α of the pixel contained in the uncovered background area in frame #n shown in FIG. 52, the pixels C28 through C32 of frame #n and the pixel values N28 through N32 of the pixels in frame #n+1 are set in the normal equations.

When the model corresponding to the covered background area is used, it is set that M=C and B=P in equations (59) through (67). In contrast, when the model corresponding to the uncovered background area is used, it is set that M=C and B=N in equations (59) through (67).

More specifically, for example, for calculating the mixture ratio α of the pixel contained in the covered background area shown in FIG. 57, the following equations (68) through (76) are established. The pixel value of the pixel whose mixture ratio α is to be calculated is Mc5.

$$Mc1=Bc1\cdot n+(-1)\cdot s+(-1)\cdot t+u \quad (68)$$

$$Mc2=Bc2\cdot n+0\cdot s+(-1)\cdot t+u \quad (69)$$

$$Mc3=Bc3\cdot n+(+1)\cdot s+(-1)\cdot t+u \quad (70)$$

$$Mc4=Bc4\cdot n+(-1)\cdot s+0\cdot t+u \quad (71)$$

$$Mc5=Bc5\cdot n+0\cdot s+0\cdot t+u \quad (72)$$

$$Mc6=Bc6\cdot n+(+1)\cdot s+0\cdot t+u \quad (73)$$

$$Mc7=Bc7\cdot n+(-1)\cdot s+(+1)\cdot t+u \quad (74)$$

$$Mc8=Bc8\cdot n+0\cdot s+(+1)\cdot t+u \quad (75)$$

$$Mc9=Bc9\cdot n+(+1)\cdot s+(+1)\cdot t+u \quad (76)$$

When calculating the mixture ratio α of the pixel contained in the covered background area in frame #n, the pixel values Bc1 through Bc9 of the pixels in the background area in frame #n−1 corresponding to the pixels in frame #n are used in equations (68) through (76). Since nine equations (68) through (76) are established for the four variables, they can be solved by the method of least squares.

When calculating the mixture ratio α of the pixel contained in the uncovered background area shown in FIG. 57, the following equations (77) through (85) can hold true. The pixel value of the pixel whose mixture ratio α is to be calculated is Mu5.

$$Mu1=Bu1\cdot n+(-1)\cdot s+(-1)\cdot t+u \quad (77)$$

$$Mu2=Bu2\cdot n+0\cdot s+(-1)\cdot t+u \quad (78)$$

$$Mu3=Bu3\cdot n+(+1)\cdot s+(-1)\cdot t+u \quad (79)$$

$$Mu4=Bu4\cdot n+(-1)\cdot s+0\cdot t+u \quad (80)$$

$$Mu5=Bu5\cdot n+0\cdot s+0\cdot t+u \quad (81)$$

$$Mu6=Bu6\cdot n+(+1)\cdot s+0\cdot t+u \quad (82)$$

$$Mu7=Bu7\cdot n+(-1)\cdot s+(+1)\cdot t+u \quad (83)$$

$$Mu8=Bu8\cdot n+0\cdot s+(+1)\cdot t+u \quad (84)$$

$$Mu9=Bu9\cdot n+(+1)\cdot s+(+1)\cdot t+u \quad (85)$$

When calculating the mixture ratio α of the pixel contained in the uncovered background area in frame #n, the pixel values Bu1 through Bu9 of the pixels of the background area in frame #n+1 corresponding to the pixels of frame #n are used in equations (77) through (85). Since nine equations (77) through (85) are established for the four variables, they can be solved by the method of least squares.

A specific process for calculating the mixture ratio α by applying the method of least squares is described below.

For the sake of simplicity, the four variables, n, s, t, and u are indicated by w0, w1, w2, and w3, respectively. The values B, i, j, and 1 relating to the four variables, n, s, t, and u are indicated by a0, a1, a2, and a3, respectively.

Also, a combination of the horizontal index i and the vertical index j in equations (59) through (67) is indicated by a single index k.

When the index i and the index j are indicated by a single index k, the relationship among the index i, the index j, and the index k is expressed by equation (86).

$$k=(i+1)\cdot 3+(j+1) \quad (86)$$

In consideration of the error ek, equations (59) through (67) can be modified into equation (87).

$$Mk = \sum_{h=0}^{3} ah \cdot wh + e_k \qquad (87)$$

In equation (87), k is any one of the integers from 0 to 8. Equation (88) can be found from equation (87).

$$e_k = Mk - \sum_{h=0}^{3} ah \cdot wh \qquad (88)$$

Since the method of least squares is applied, the square sum E of the error is defined as follows, as expressed by equation (89).

$$E = \sum_{k=0}^{8} e_k^2 \qquad (89)$$

In order to minimize the error, the partial differential value of the variable Wv with respect to the square sum E of the error should be 0. v is any one of the integers from 0 to 4. Thus, wv is determined so that equation (90) is satisfied.

$$\frac{\partial E}{\partial w_v} = 2 \cdot \sum_{k=0}^{8} e_k \cdot \frac{\partial e_k}{\partial w_v} \qquad (90)$$

$$= 2 \cdot \sum_{k=0}^{8} e_k \cdot a_v = 0$$

By substituting equation (88) into equation (90), equation (91) is obtained.

$$\sum_{k=0}^{8} \left( a_v \cdot \sum_{h=0}^{3} ah \cdot wh \right) = \sum_{k=0}^{8} a_v \cdot Mk \qquad (91)$$

From the four equations obtained by substituting one of the integers 0 through 4 into v in equation (91), wh (h=0, 1, 2, 3) is determined.

As discussed above, the determined result w0, i.e., n, is set in the mixture ratio α corresponding to the designated pixel.

In this manner, the mixture-ratio calculator 104 is able to determine the mixture ratio α with a relatively simple calculation and a relatively high precision, by assuming that the mixture ratio α of the pixels in close proximity with each other approximates to be uniform and that the sum of the foreground components of the pixels in close proximity with each other approximates to change linearly. When the mixture ratio α of the pixels in close proximity with each other approximates to be uniform, and when the sum of the foreground components of the pixels in close proximity with each other approximates to change linearly, with a gradation of the foreground object, the mixture-ratio calculator 104 is able to determine the mixture ratio α with higher precision compared to when the mixture ratio α of the pixels in close proximity with each other is uniform and when the sum of the foreground components is uniform.

Figure 59:
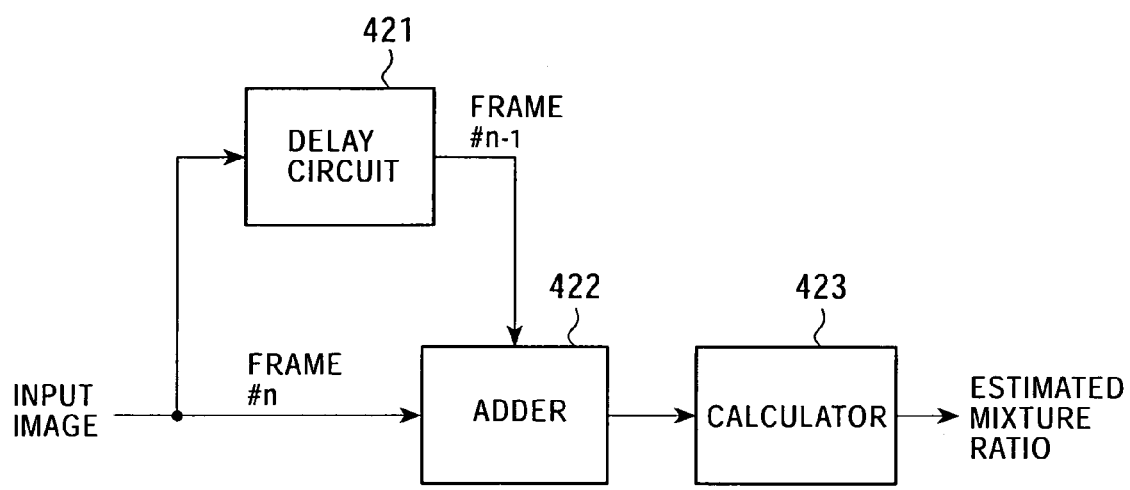
FIG. 59 is a block diagram illustrating the configuration of the mixture-ratio estimation processor 401.

FIG. 59 is a block diagram illustrating the configuration of the estimated-mixture-ratio processor 401. An image input into the estimated-mixture-ratio processor 401 is supplied to a delay circuit 421 and an adder 422.

The delay circuit 421 delays the input image for one frame, and supplies the image to the adder 422. When frame #n is supplied as the input image to the adder 422, the delay circuit 421 supplies frame #n−1 to the adder 422.

The adder 422 sets the pixel value of the pixel adjacent to the pixel for which the mixture ratio α is calculated, and the pixel value of frame #n−1 in the normal equation. For example, the adder 422 sets the pixel values Mc1 through Mc9 and the pixel values Bc1 through Bc9 in the normal equations based on equations (33) through (41), respectively. The adder 422 supplies the normal equations in which the pixel values are set to a calculator 423.

The calculator 423 determines the estimated mixture ratio by solving the normal equations supplied from the adder 422, and outputs the determined estimated mixture ratio.

In this manner, the estimated-mixture-ratio processor 401 is able to calculate the estimated mixture ratio based on the input image, and supplies it to the mixture-ratio determining portion 403.

The estimated-mixture-ratio processor 402 is configured similar to the estimated-mixture-ratio processor 401, and an explanation thereof is thus omitted.

Figure 60:
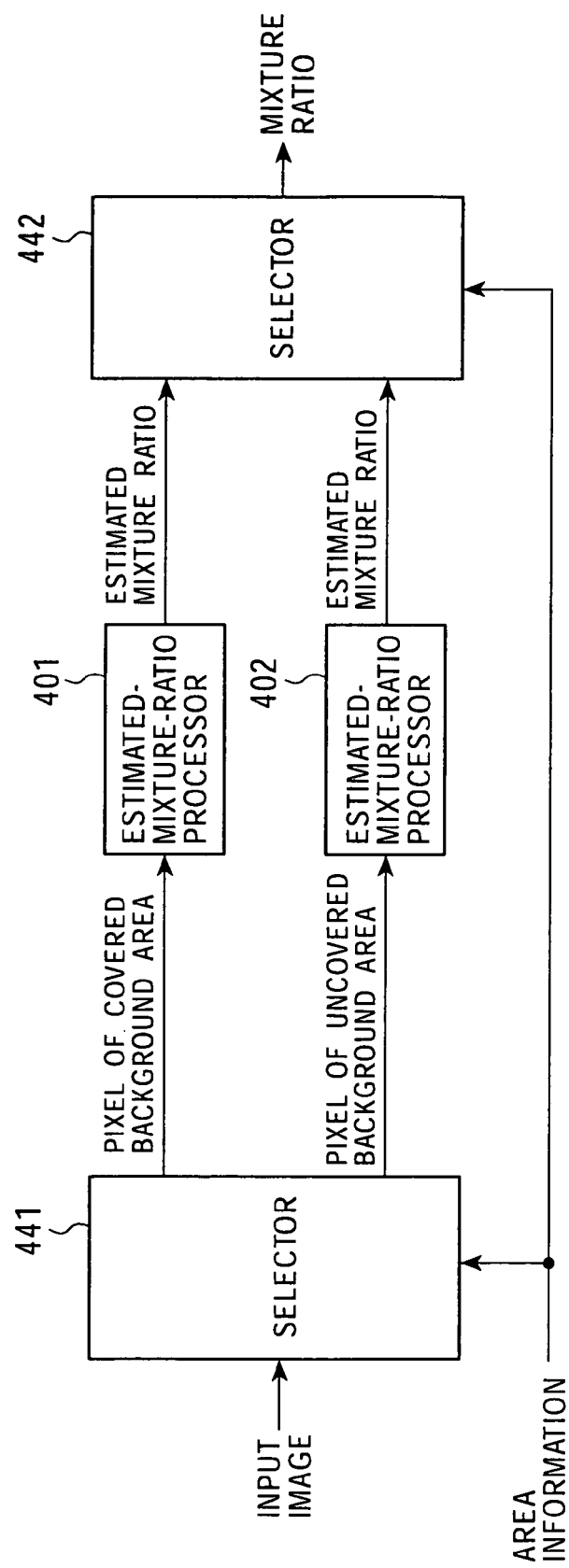
FIG. 60 is a block diagram illustrating another configuration of the mixture-ratio calculator 104.

FIG. 60 is a block diagram illustrating another configuration of the mixture-ratio calculator 104. The same portions as those shown in FIG. 49 are indicated by like reference numerals, and an explanation thereof is thus omitted.

A selector 441 supplies a pixel belonging to the covered background area and the corresponding pixel in the previous frame to an estimated-mixture-ratio processor 401 based on the area information supplied from the area specifying unit 103. The selector 441 supplies a pixel belonging to the uncovered background area and the corresponding pixel in the subsequent frame to an estimated-mixture-ratio processor 402 based on the area information supplied from the area specifying unit 103.

Based on the area information supplied from the area specifying unit 103, the selector 442 sets the mixture ratio α to 0 when the designated pixel belongs to the foreground area, and sets the mixture ratio α to 1 when the designated pixel belongs to the background area. When the designated pixel belongs to the covered background area, the selector 442 selects the estimated mixture ratio supplied from the estimated-mixture-ratio processor 401 and sets it as the mixture ratio α. When the designated pixel belongs to the uncovered background area, the selector 442 selects the estimated mixture ratio supplied from the estimated-mixture-ratio processor 402 and sets it as the mixture ratio α. The selector 442 then outputs the mixture ratio α which has been selected and set based on the area information.

As discussed above, the mixture-ratio calculator 104 configured as shown in FIG. 60 is able to calculate the mixture ratio α for each pixel contained in the image, and outputs the calculated mixture ratio α.

Figure 61:
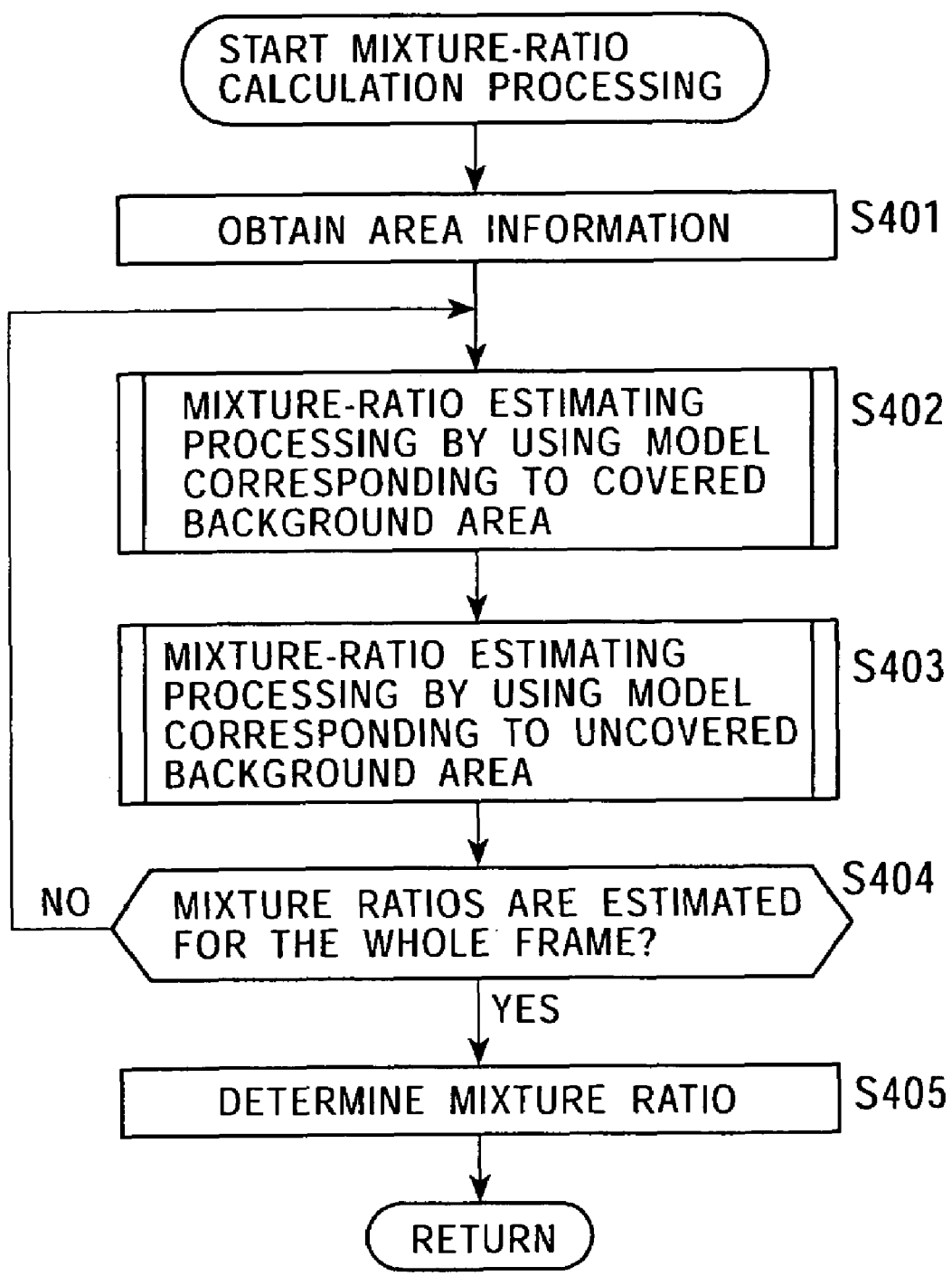
FIG. 61 is a flowchart illustrating the processing for calculating the mixture ratio.

The calculation processing for the mixture ratio α performed by the mixture-ratio calculator 104 configured as shown in FIG. 49 is discussed below with reference to the flowchart of FIG. 61. In step S401, the mixture-ratio calculator 104 obtains area information supplied from the area specifying unit 103. In step S402, the estimated-mixture-ratio processor 401 executes the processing for estimating the mixture ratio by using a model corresponding to a covered background area, and supplies the estimated mixture ratio to the mixture-ratio determining portion 403. Details of the processing for estimating the mixture ratio are discussed below with reference to the flowchart of FIG. 62.

In step S403, the estimated-mixture-ratio processor 402 executes the processing for estimating the mixture ratio by using a model corresponding to an uncovered background area, and supplies the estimated mixture ratio to the mixture-ratio determining portion 403.

In step S404, the mixture-ratio calculator 104 determines whether the mixture ratios have been estimated for the whole frame. If it is determined that the mixture ratios have not yet been estimated for the whole frame, the process returns to step S402, and the processing for estimating the mixture ratio for the subsequent pixel is executed.

If it is determined in step S404 that the mixture ratios have been estimated for the whole frame, the process proceeds to step S405. In step S405, the mixture-ratio determining portion 403 sets the mixture ratio based on the area information supplied from the area specifying unit 103 and indicating to which of the foreground area, the background area, the covered background area, or the uncovered background area the pixel for which the mixture ratio α is to be calculated belongs. The mixture-ratio determining portion 403 sets the mixture ratio α to 0 when the corresponding pixel belongs to the foreground area, and sets the mixture ratio α to 1 when the corresponding pixel belongs to the background area. When the corresponding pixel belongs to the covered background area, the mixture-ratio determining portion 403 sets the estimated mixture ratio supplied from the estimated-mixture-ratio processor 401 as the mixture ratio α. When the corresponding pixel belongs to the uncovered background area, the mixture-ratio determining portion 403 sets the estimated mixture ratio supplied from the estimated-mixture-ratio processor 402 as the mixture ratio α. The processing is then completed.

As discussed above, the mixture-ratio calculator 104 is able to calculate the mixture ratio α, which indicates a feature quantity corresponding to each pixel, based on the area information supplied from the area specifying unit 103, and the input image.

The processing for calculating the mixture ratio α performed by the mixture-ratio calculator 104 configured as shown in FIG. 60 is similar to that discussed with reference to the flowchart of FIG. 61, and an explanation thereof is thus omitted.

Figure 62:
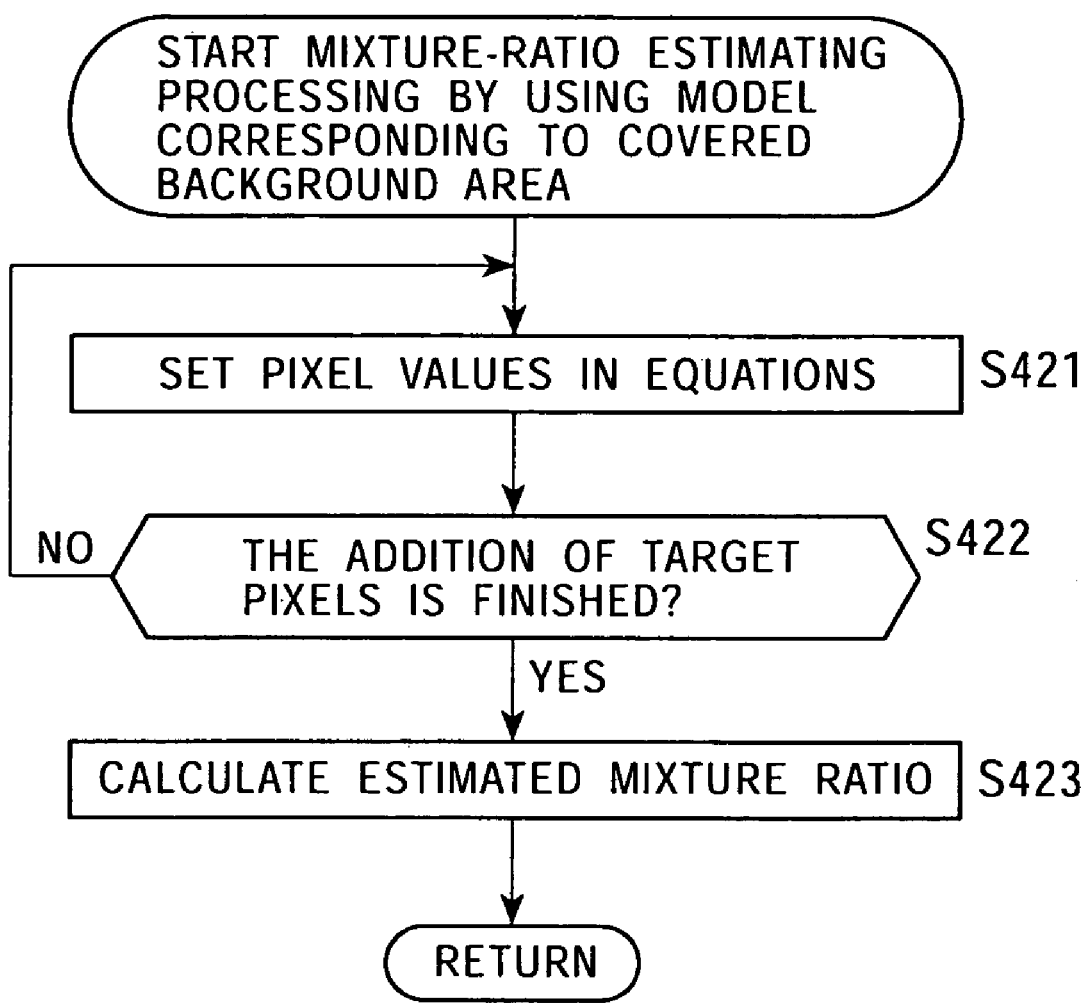
FIG. 62 is a flowchart illustrating the processing for calculating the estimated mixture ratio.

A description is now given, with reference to the flowchart of FIG. 62, of the mixture-ratio estimating processing by the estimated-mixture-ratio processor 401 having the configuration shown in FIG. 59 by using a model of the covered background area.

In step S421, the adder 422 sets the pixel value contained in the input image and the pixel value contained in the image supplied from the delay circuit 421 in a normal equation corresponding to a model of the covered background area.

In step S422, the estimated-mixture-ratio processor 401 determines whether the setting of the target pixels is finished. If it is determined that the setting of the target pixels is not finished, the process returns to step S421, and the processing for setting the pixel values in the normal equation is repeated.

If it is determined in step S422 that the setting for the target pixels is finished, the process proceeds to step S423. In step S423, a calculator 423 calculates the estimated mixture ratio based on the normal equations in which the pixels values are set, and outputs the calculated mixture ratio.

As discussed above, the estimated-mixture-ratio processor 401 having the configuration shown in FIG. 59 is able to calculate the estimated mixture ratio based on the input image.

The mixture-ratio estimating processing by using a model corresponding to the uncovered background area is similar to the processing indicated by the flowchart of FIG. 62 by using the normal equations corresponding to a model of the uncovered background area, and an explanation thereof is thus omitted.

The embodiment has been described, assuming that the object corresponding to the background is stationary. However, the above-described mixture-ratio calculation processing can be applied even if the image corresponding to the background area contains motion. For example, if the image corresponding to the background area is uniformly moving, the estimated-mixture-ratio processor 401 shifts the overall image in accordance with this motion, and performs processing in a manner similar to the case in which the object corresponding to the background is stationary. If the image corresponding to the background area contains locally different motions, the estimated-mixture-ratio processor 401 selects the pixels corresponding to the motions as the pixels belonging to the mixed area, and executes the above-described processing.

As described above, the mixture-ratio calculator 102 is able to calculate the mixture ratio α, which is a feature quantity corresponding to each pixel, based on the input image and the area information supplied to the area specifying unit 101.

By utilizing the mixture ratio α, it is possible to separate the foreground components and the background components contained in the pixel values while maintaining the information of motion blur contained in the image corresponding to the moving object.

By combining the images based on the mixture ratio α, it is also possible to create an image which contains correct motion blur that coincides with the speed of a moving object and which faithfully reflects the real world.

Figure 63:
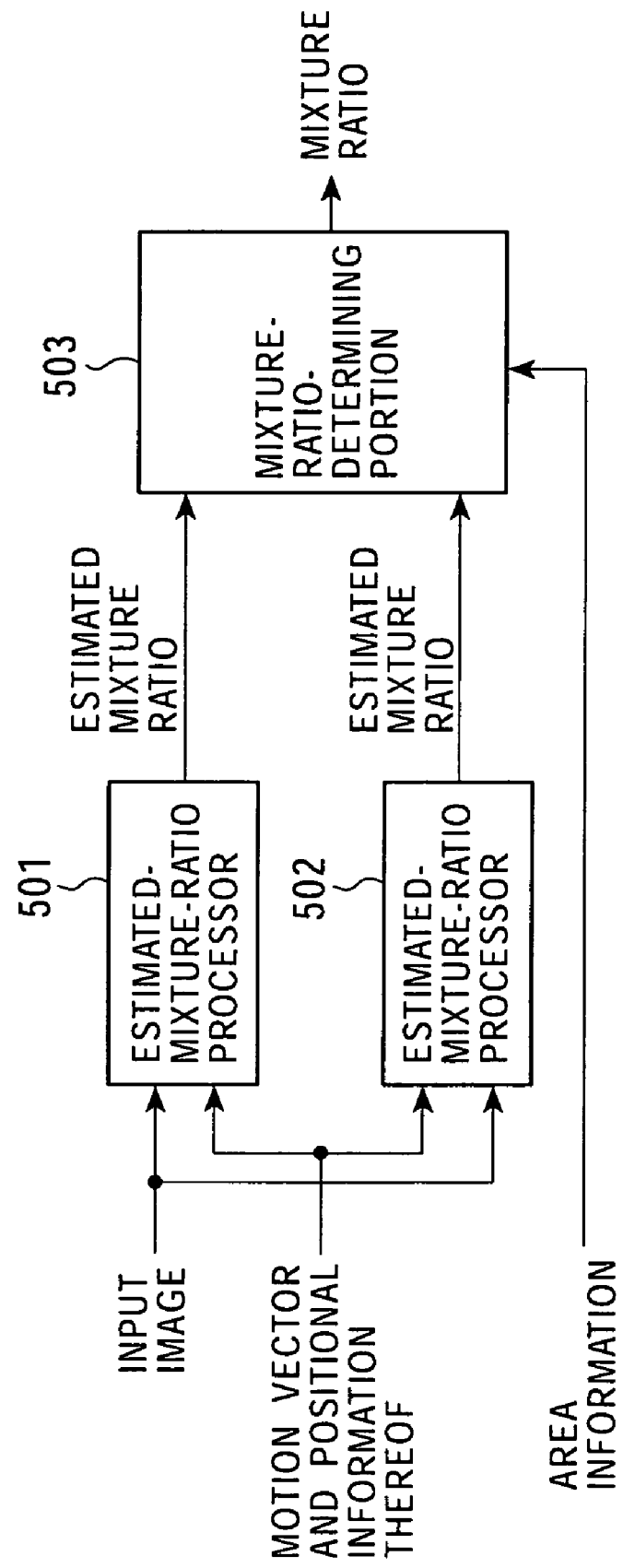
FIG. 63 is a block diagram illustrating the configuration of the mixture-ratio calculator 104.

FIG. 63 is a block diagram illustrating another configuration of the mixture-ratio calculator 104. An estimated-mixture-ratio processor 501 calculates an estimated mixture ratio for each pixel by calculating a model of a covered background area based on the input image and the motion vector and the positional information thereof supplied from the motion detector 102, and supplies the calculated estimated mixture ratio to a mixture-ratio determining portion 503.

An estimated-mixture-ratio processor 502 calculates an estimated mixture ratio for each pixel by calculating a model of an uncovered background area based on the motion vector and the positional information thereof supplied from the motion detector 102 and the input image, and supplies the calculated estimated mixture ratio to the mixture-ratio determining portion 503.

The mixture ratio α linearly changes in accordance with a change in the position of the pixels because the object corresponding to the foreground is moving with constant velocity. By utilizing this characteristic, an equation in which the mixture ratio α and the sum f of the foreground components are approximated in the spatial direction can hold true. Also, an equation in which a set of the pixel value of a pixel belonging to the mixed area and the pixel value of a pixel belonging to the background area is established in accordance with the amount of movement v of the foreground. In the mixture-ratio calculator 104 having the configuration shown in FIG. 63, by utilizing a plurality of sets of the pixel values of the pixels belonging to the mixed area and the pixel values of the pixels belonging to the background area in accordance with the movement of the foreground, the equations in which the mixture ratio α and the sum f of the foreground components are approximated are solved.

When a change in the mixture ratio α is approximated as a straight line, the mixture ratio α can be expressed by equation (92).

$$\alpha = il + p \quad (92)$$

In equation (92), i indicates the spatial index when the position of the designated pixel is set to 0, l designates the gradient of the straight line of the mixture ratio α, and p designates the intercept of the straight line of the mixture ratio α and also indicates the mixture ratio α of the designated pixel. In equation (92), the index i is known, and the gradient l and the intercept p are unknown.

Figure 64:
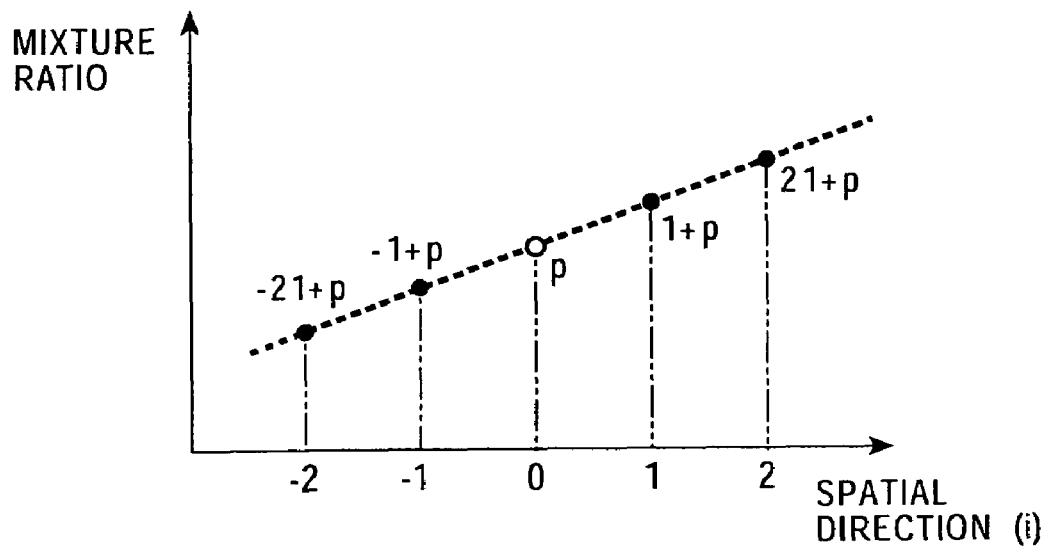
FIG. 64 illustrates a straight line for approximating the mixture ratio α.

The relationship among the index i, the gradient l, and the intercept p is shown in FIG. 64.

By approximating the mixture ratio α as equation (92), a plurality of different mixture ratios a for a plurality of pixels can be expressed by two variables. In the example shown in FIG. 64, the five mixture ratios for five pixels are expressed by the two variables, i.e., the gradient l and the intercept p. In FIG. 64, the while dot indicates the designated pixel, and the black dots indicate the pixels located in close proximity with the designated pixel.

Figure 65:
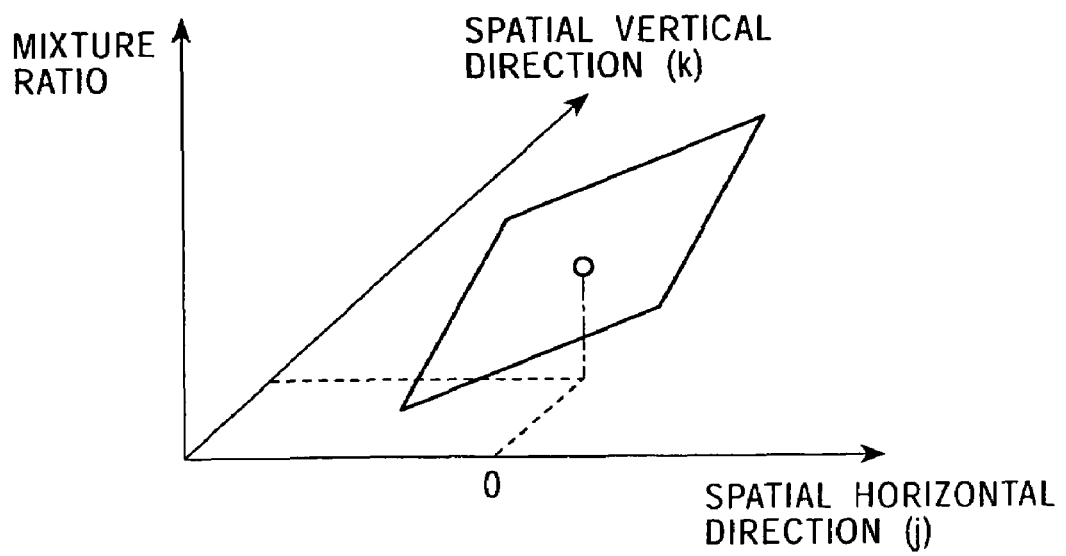
FIG. 65 illustrates a plane for approximating the mixture ratio α.

When the mixture ratio α is approximated in the plane shown in FIG. 65, equation (92) is expanded into the plane by considering the movement v corresponding to the two directions, i.e., the horizontal direction and the vertical direction of the image, and the mixture ratio α can be expressed by equation (93).

$$\alpha = jm + kq + p \quad (93)$$

In equation (93), j is the index in the horizontal direction and k is the index in the vertical direction when the position of the designated pixel is 0. In equation (93), m designates the horizontal gradient of the mixture ratio α in the plane, and q indicates the vertical gradient of the mixture ratio α in the plane. In equation (93), p indicates the intercept of the mixture ratio α in the plane. In FIG. 65, the white dot indicates the designated pixel.

For example, in frame #n shown in FIG. 51, equations (94) through (96) can hold true for C05 through C07, respectively.

$$C05 = \alpha 05 \cdot B05/v + f05 \quad (94)$$

$$C06 = \alpha 06 \cdot B06/v + f06 \quad (95)$$

$$C07 = \alpha 07 \cdot B07/v + f07 \quad (96)$$

Assuming that the foreground components positioned in close proximity with each other are equal to each other, i.e., that F01 through F03 are equal, equation (97) holds true by replacing F01 through F03 by fc.

$$f(x) = (1 - \alpha(x)) \cdot Fc \quad (97)$$

In equation (97), x indicates the position in the spatial direction.

When α(x) is replaced by equation (93), equation (97) can be expressed by equation (98).

$$f(x) = (1 - (jm + kq + p)) \cdot Fc \quad (98)$$
$$= j \cdot (-m \cdot Fc) + k \cdot (-q \cdot Fc) + ((1 - p) \cdot Fc)$$
$$= js + kt + u$$

In equation (98), (−m·Fc), (−q~Fc), and (1−p)·Fc are replaced, as expressed by equations (99) through (101), respectively.

$$s = -m \cdot Fc \quad (99)$$

$$t = -q \cdot Fc \quad (100)$$

$$u = (1-p) \cdot Fc \quad (101)$$

In equation (98), j is the index in the horizontal direction and k is the index in the vertical direction when the position of the designated pixel is 0.

As discussed above, since it can be assumed that the object corresponding to the foreground is moving with constant velocity within the shutter period, and that the foreground components positioned in close proximity with each other are uniform, the sum of the foreground components can be approximated by equation (98).

When the mixture ratio α is approximated by a straight line, the sum of the foreground components can be expressed by equation (102).

$$f(x) = is + u \quad (102)$$

By replacing the mixture ratio α and the sum of the foreground components in equation (92) by using equations (93) and (98), the pixel value M can be expressed by equation (103).

$$M = (jm + kq + p) \cdot B + js + kt + u \quad (103)$$
$$= jB \cdot m + kB \cdot q + B \cdot p + j \cdot s + k \cdot t + u$$

In equation (103), unknown variables are six factors, such as the horizontal gradient m of the mixture ratio α in the plane, the vertical gradient q of the mixture ratio α in the plane, and the intercepts of the mixture ratio α in the plane, p, s, t, and u.

Figure 66:
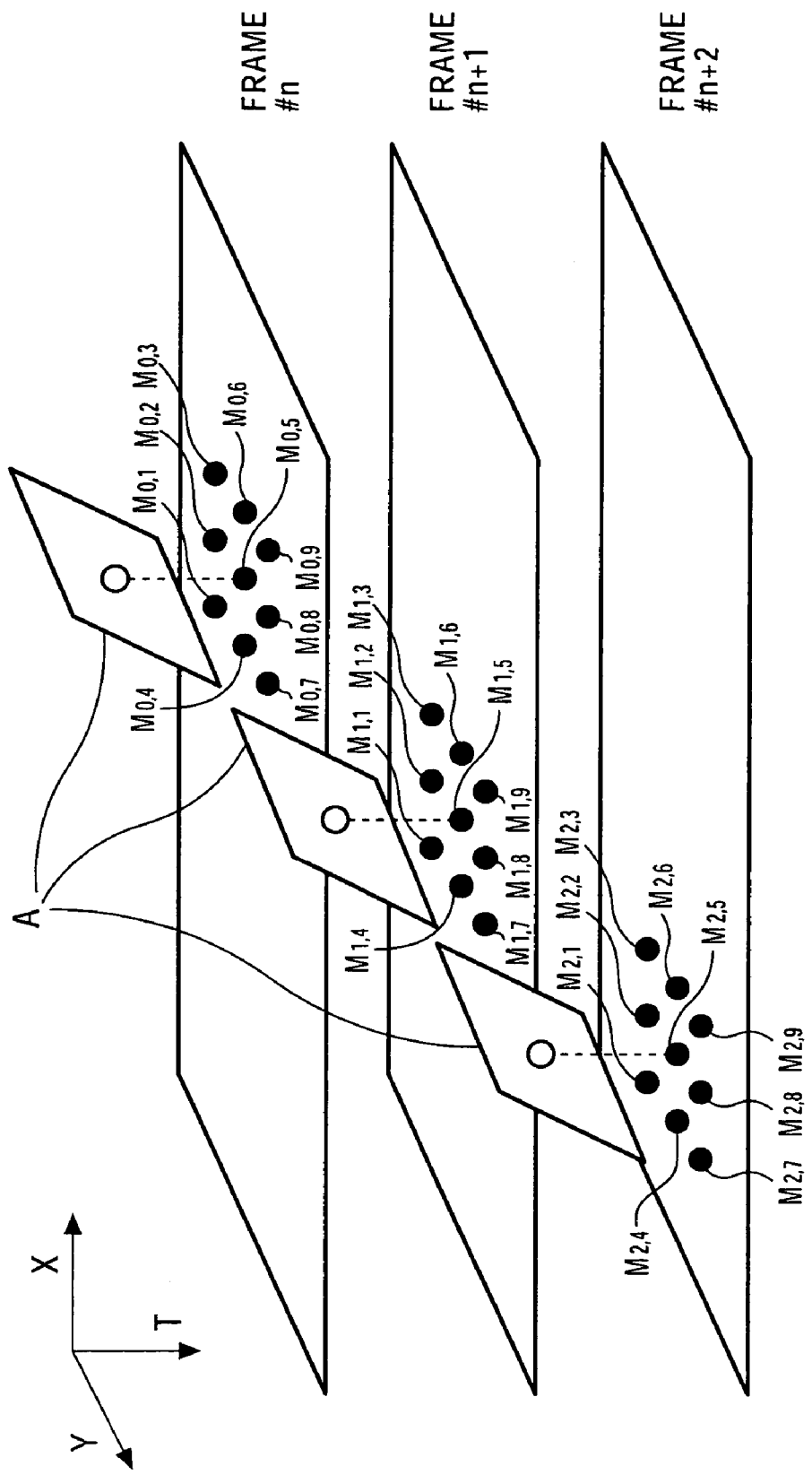
FIG. 66 illustrates the relationships of the pixels in a plurality of frames when the mixture ratio α is calculated.

It is now assumed for a plurality of frames that an object corresponding to the foreground is moving with constant velocity, and that the foreground components are uniform. Then, the approximation in one frame shown in FIG. 65 can be expanded into the approximation over a plurality of frames. In FIG. 66, A indicates planes of the mixture ratio and the foreground components. In FIG. 66, the block dots designate pixels to belong to the mixed area.

It is assumed in FIG. 66 that the gradients of the planes in the individual frames are the same, and the pixel value can be expressed by equation (103) by the approximation of the mixture ratio and the foreground components.

Accordingly, equation (103) can be modified into equation (104) when the index in the time direction is T.

$$M_T = jB_T \cdot m + kB_T \cdot q + B_T \cdot p + j \cdot s + k \cdot t + u \quad (104)$$

The pixel value B and the pixel value M are set in equation (104) in accordance with the amount of movement of the object, which is the designated pixel, and the pixels close to the designated pixel in each frame, and then, a plurality of equations in which the pixel-value M and the pixel value B are set are solved by the method of least squares, thereby calculating the mixture ratio α.

It is now assumed, for example, that the horizontal index j of the designated pixel is set to 0, the vertical index k of the designated pixel is set to 0, and the index T in the time direction is set to 0. In this case, when the pixel value M or the pixel value B is set in the equation indicating the mixed pixel and expressed by equation (104) for 3×3 pixels located in the proximity with the designated pixel, equations (105) through (113) are obtained.

$$M_{0,-1,-1} = (-1) \cdot B_{0,-1,-1} \cdot m + (-1) \cdot B_{0,-1,-1} \cdot q + B_{0,-1,-1} \cdot p + (-1) \cdot s + (-1) \cdot t + u \quad (105)$$

$$M_{0,0,-1} = (0) \cdot B_{0,0,-1} \cdot m + (-1) \cdot B_{0,0,-1} \cdot q + B_{0,0,-1} \cdot p + (0) \cdot s + (-1) \cdot t + u \quad (106)$$

$$M_{0,+1,-1} = (+1) \cdot B_{0,+1,-1} \cdot m + (-1) \cdot B_{0,+1,-1} \cdot q + B_{0,+1,-1} \cdot p + (+1) \cdot s + (-1) \cdot t + u \quad (107)$$

$$M_{0,-1,0} = (-1) \cdot B_{0,-1,0} \cdot m + (0) \cdot B_{0,-1,0} \cdot q + B_{0,-1,0} \cdot p + (-1) \cdot s + (0) \cdot t + u \quad (108)$$

$$M_{0,0,0} = (0) \cdot B_{0,0,0} \cdot m + (0) \cdot B_{0,0,0} \cdot q + B_{0,0,0} \cdot p + (0) \cdot s + (0) \cdot t + u \quad (109)$$

$$M_{0,+1,0} = (+1) \cdot B_{0,+1,0} \cdot m + (0) \cdot B_{0,+1,0} \cdot q + B_{0,+1,0} \cdot p + (+1) \cdot s + (0) \cdot t + u \quad (110)$$

$$M_{0,-1,+1} = (-1) \cdot B_{0,-1,+1} \cdot m + (+1) \cdot B_{0,-1,+1} \cdot q + B_{0,-1,+1} \cdot p + (-1) \cdot s + (+1) \cdot t + u \quad (111)$$

$$M_{0,0,+1} = (0) \cdot B_{0,0,+1} \cdot m + (+1) \cdot B_{0,0,+1} \cdot q + B_{0,0,+1} \cdot p + (0) \cdot s + (+1) \cdot t + u \quad (112)$$

$$M_{0,+1,+1} = (+1) \cdot B_{0,+1,+1} \cdot m + (+1) \cdot B_{0,+1,+1} \cdot q + B_{0,+1,+1} \cdot p + (+1) \cdot s + (+1) \cdot t + u \quad (113)$$

Since the horizontal index j of the designated pixel is 0, and the vertical index k of the designated pixel is 0, the mixture ratio α of the designated pixel is equal to the value when j is 0 and k is 0 in equation (93), i.e., the mixture ratio α is equal to the intercept p in equation (93).

Accordingly, based on 27 equations (9×3), i.e., equations (105) through (113) considering when T is −1, 0, and 1, the horizontal gradient m, the vertical gradient q, and the intercepts p, s, t, and u are calculated by the method of least squares, and the intercept p is output as the mixture ratio α.

A specific process for calculating the mixture ratio α by applying the method of least squares is as follows.

When the index T, the index i, and the index k are expressed by a single index x, the relationship among the index T, the index i, the index k, and the index x can be expressed by equation (114).

$$x = (T+1) \cdot 3 \cdot (j+1) \cdot 3 + (k+1) \quad (114)$$

It is now assumed that the horizontal gradient m, the vertical gradient q, and the intercepts p, s, t, and u are expressed by variables w0, w1, w2, w3, w4, and w5, respectively, and jB, kB, B, j, k and l are expressed by a0, a1, a2, a3, a4, and a5, respectively. In consideration of the error ex, equations (105) through (113) can be modified into equation (115).

$$Mx = \sum_{y=0}^{5} ay \cdot wy + ex \quad (115)$$

In equation (115), x is any one of the integers from 0 to 27.

Equation (116) can be found from equation (115).

$$ex = Mx - \sum_{y=0}^{5} ay \cdot wy \quad (116)$$

Since the method of least squares is applied, the square sum E of the error is defined as follows, as expressed by equation (117).

$$E = \sum_{x=0}^{8} ex^2 \quad (117)$$

In order to minimize the error, the partial differential value of the variable Wv with respect to the square sum E of the error should be 0. v is any one of the integers from 0 to 5. Thus, wy is determined so that equation (118) is satisfied.

$$\frac{\partial E}{\partial Wv} = 2 \cdot \sum_{x=0}^{8} ex \cdot \frac{\partial ex}{\partial Wv} \quad (118)$$

$$= 2 \cdot \sum_{x=0}^{8} ex \cdot av = 0$$

By substituting equation (116) into equation (118), equation (119) is obtained.

$$\sum_{x=0}^{8} \left( av \cdot \sum_{y=0}^{5} ay \cdot Wy \right) = \sum_{x=0}^{8} av \cdot Mx \quad (119)$$

For example, the sweep-out method (Gauss-Jordan elimination) is applied to the normal equations consisting of six equations obtained by substituting one of the integers from 0 to 5 into v in equation (119), thereby obtaining wy. As stated above, w0 is the horizontal gradient m, w1 is the vertical gradient q, w2 is the intercept p, w3 is s, w4 is t, and w5 is u.

As discussed above, by applying the method of least squares to the equations in which the pixel value M and the pixel value B are set, the horizontal gradient m, the vertical gradient q, and the intercepts p, s, t, and u can be determined.

The intercept p is the mixture ratio α when indexes i and k are 0, i.e., the intercept p is located at the center position. Thus, the intercept P is output.

A description has been given with reference to equations (105) through (113), by assuming that the pixel value of the pixel contained in the mixed area is M, and the pixel value of the pixel contained in the background area is B. In this case, it is necessary to set normal equations for each of the cases where the designated pixel is contained in the covered background area, or the designated pixel is contained in the uncovered background area.

For example, if the mixture ratio α of the pixel contained in the covered background area in frame #n shown in FIG. 51 is determined, C04 through C08 of the pixels in frame #n and the pixel values P04 through P08 of the pixels in frame #n−1 are set in the normal equations.

If the mixture ratio α of the pixels contained in the uncovered background area in frame #n shown in FIG. 52 is determined, C28 through C32 of the pixels in frame #n and the pixel values N28 through N32 of the pixels in frame #n+1 are set in the normal equations.

Figure 67:
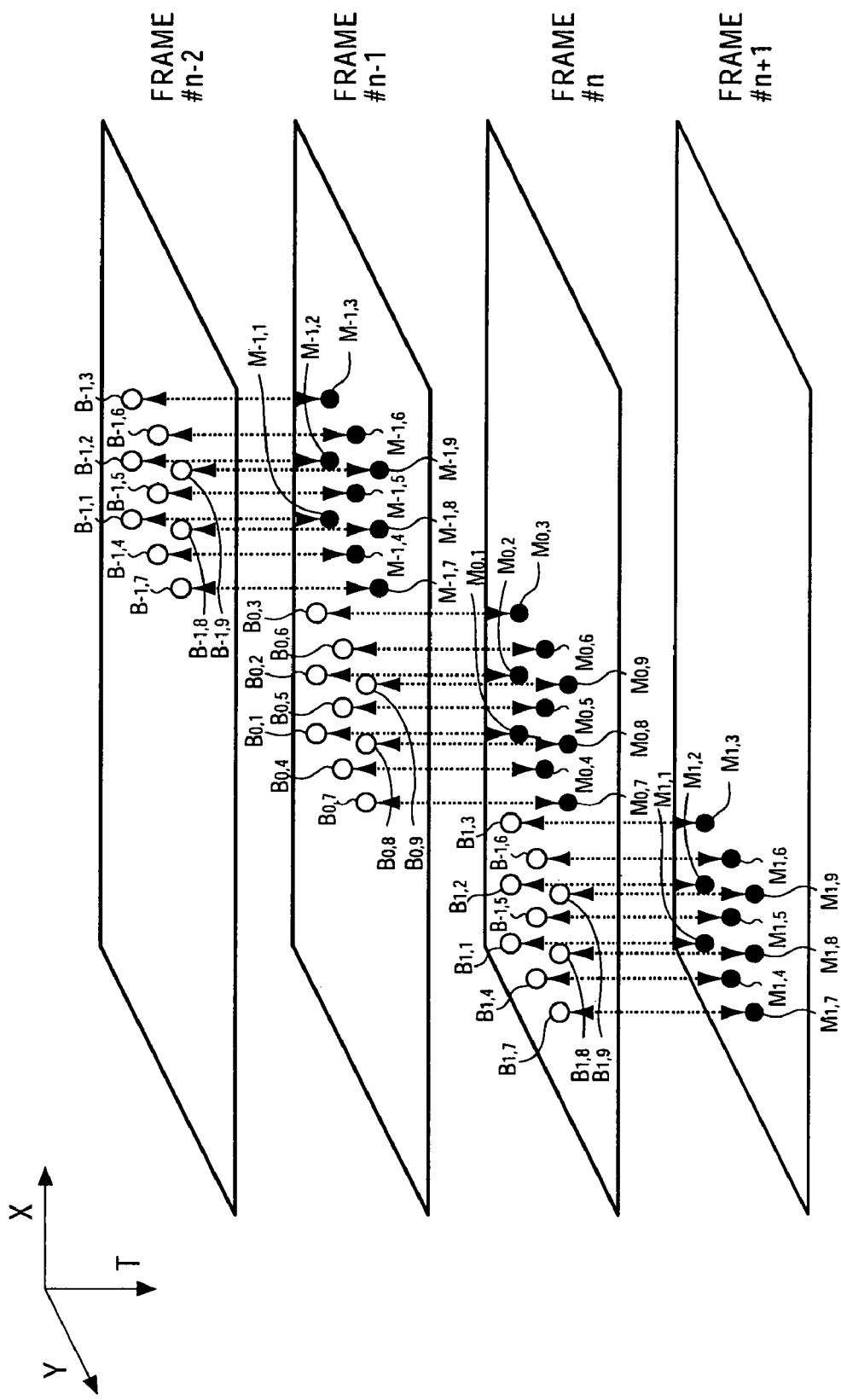
FIG. 67 illustrates the relationships of the pixels in a plurality of frames when the mixture ratio α is calculated.

Moreover, if, for example, the mixture ratio α of the pixel contained in the covered background area shown in FIG. 67 is calculated, the following equations (120) through (128) are set. The pixel value of the pixel for which the mixture ratio α is calculated is Mc5. In FIG. 67, the white dots indicate pixels to belong to the background, and the black dots indicate pixels to belong to the mixed area.

$$Mc_T1=(-1)\cdot Bc1\cdot m+(-1)\cdot Bc1\cdot q+Bc1\cdot p+(-1)\cdot s+(-1)\cdot t+u \quad (120)$$

$$Mc_T2=(0)\cdot Bc2\cdot m+(-1)\cdot Bc2\cdot q+Bc2\cdot p+(0)\cdot s+(-1)\cdot t+u \quad (121)$$

$$Mc_T3=(+1)\cdot Bc3\cdot m+(-1)\cdot Bc3\cdot q+Bc3\cdot p+(+1)\cdot s+(-1)\cdot t+u \quad (122)$$

$$Mc_T4=(-1)\cdot Bc4\cdot m+(0)\cdot Bc4\cdot q+Bc4\cdot p+(-1)\cdot s+(0)\cdot t+u \quad (123)$$

$$Mc_T5=(0)\cdot Bc5\cdot m+(0)\cdot Bc5\cdot q+Bc5\cdot p+(0)\cdot s+(0)\cdot t+u \quad (124)$$

$$Mc_T6=(+1)\cdot Bc6\cdot m+(0)\cdot Bc6\cdot q+Bc6\cdot p+(+1)\cdot s+(0)\cdot t+u \quad (125)$$

$$Mc_T7=(-1)\cdot Bc7\cdot m+(+1)\cdot Bc7\cdot q+Bc7\cdot p+(-1)\cdot s+(+1)\cdot t+u \quad (126)$$

$$Mc_T8=(0)\cdot Bc8\cdot m+(+1)\cdot Bc8\cdot q+Bc8\cdot p+(0)\cdot s+(+1)\cdot t+u \quad (127)$$

$$Mc_T9=(+1)\cdot Bc9\cdot m+(+1)\cdot Bc9\cdot q+Bc9\cdot p+(+1)\cdot s+(+1)\cdot t+u \quad (128)$$

For calculating the mixture ratio α of the pixel contained in the covered background area in frame #n, the pixel values Bc1 through Bc9 of the pixels of the background area in frame #n−1 in equations (120) through (128), respectively, corresponding to the pixels in frame #n are used when T is 0.

When, for example, the mixture ratio α of the pixel contained in the uncovered background area shown in FIG. 67 is calculated, the following equations (129) through (137) are set. The pixel value of the pixel for which the mixture ratio α is calculated is Mu5.

$$Mu_T1=(-1)\cdot Bu1\cdot m+(-1)\cdot Bu1\cdot q+Bu1\cdot p+(-1)\cdot s+(-1)\cdot t+u \quad (129)$$

$$Mu_T2=(0)\cdot Bu2\cdot m+(-1)\cdot Bu2\cdot q+Bu2\cdot p+(0)\cdot s+(-1)\cdot t+u \quad (130)$$

$$Mu_T3=(+1)\cdot Bu3\cdot m+(-1)\cdot Bu3\cdot q+Bu3\cdot p+(+1)\cdot s+(-1)\cdot t+u \quad (131)$$

$$Mu_T4=(-1)\cdot Bu4\cdot m+(0)\cdot Bu4\cdot q+Bu4\cdot p+(-1)\cdot s+(0)\cdot t+u \quad (132)$$

$$Mu_T5=(0)\cdot Bu5\cdot m+(0)\cdot Bu5\cdot q+Bu5\cdot p+(0)\cdot s+(0)\cdot t+u \quad (133)$$

$$Mu_T6=(+1)\cdot Bu6\cdot m+(0)\cdot Bu6\cdot q+Bu6\cdot p+(+1)\cdot s+(0)\cdot t+u \quad (134)$$

$$Mu_T7=(-1)\cdot Bu7\cdot m+(+1)\cdot Bu7\cdot q+Bu7\cdot p+(-1)\cdot s+(+1)\cdot t+u \quad (135)$$

$$Mu_T8=(0)\cdot Bu8\cdot m+(+1)\cdot Bu8\cdot q+Bu8\cdot p+(0)\cdot s+(+1)\cdot t+u \quad (136)$$

$$Mu_T9=(+1)\cdot Bu9\cdot m+(+1)\cdot Bu9\cdot q+Bu9\cdot p+(+1)\cdot s+(+1)\cdot t+u \quad (137)$$

For calculating the mixture ratio α of the pixel contained in the uncovered background area in frame #n, the pixel values Bu1 through Bu9 of the pixels of the background area in frame #n+1 in equations (129) through (137), respectively, corresponding to the pixels in frame #n are used when T is 0.

Figure 68:
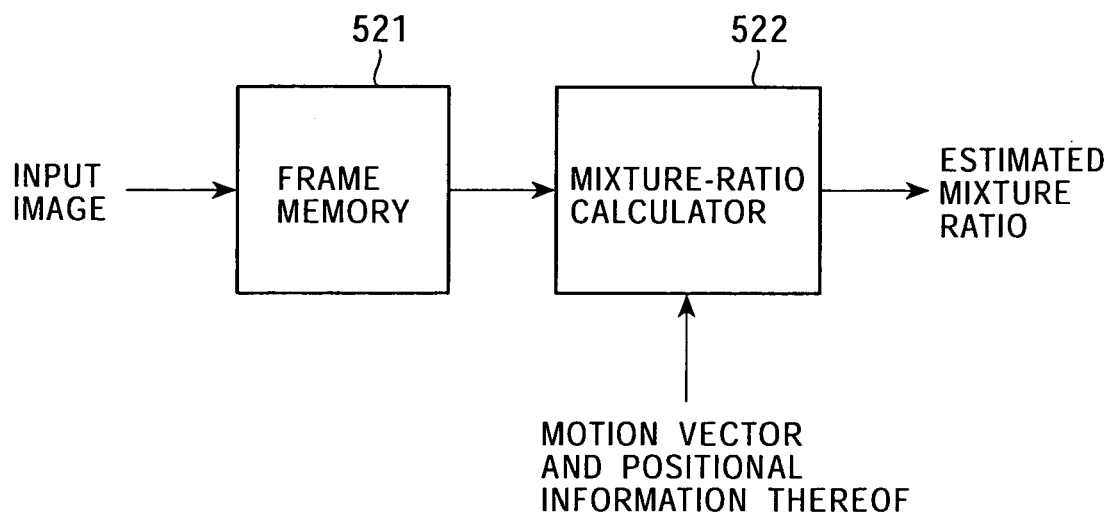
FIG. 68 is a block diagram illustrating the configuration of the estimated mixture-ratio processor 501.

FIG. 68 is a block diagram illustrating the configuration of the estimated-mixture-ratio processor 501 for calculating the estimated mixture ratio by using the amount of movement v based on a model corresponding to the covered background area.

A frame memory 521 stores a plurality of frames of an input image and supplies the stored frames to a mixture-ratio calculator 522. The frame memory 521 stores, for example, six frames, in units of frames, and supplies the stored six frames to the mixture-ratio calculator 522.

The mixture-ratio calculator 522 stores a normal equation for calculating the mixture ratio α and the sum f of the foreground components in advance.

The mixture-ratio calculator 522 sets in the normal equation a pixel value belonging to the mixed area and the corresponding pixel value belonging to the background area contained in the frames supplied from the frame memory 521. The mixture-ratio calculator 522 solves the normal equation in which the pixel value belonging to the mixed area and the corresponding pixel value belonging to the background area are set according to a matrix solution method so as to obtain the estimated mixture ratio, and outputs the calculated estimated mixture ratio.

Figure 69:
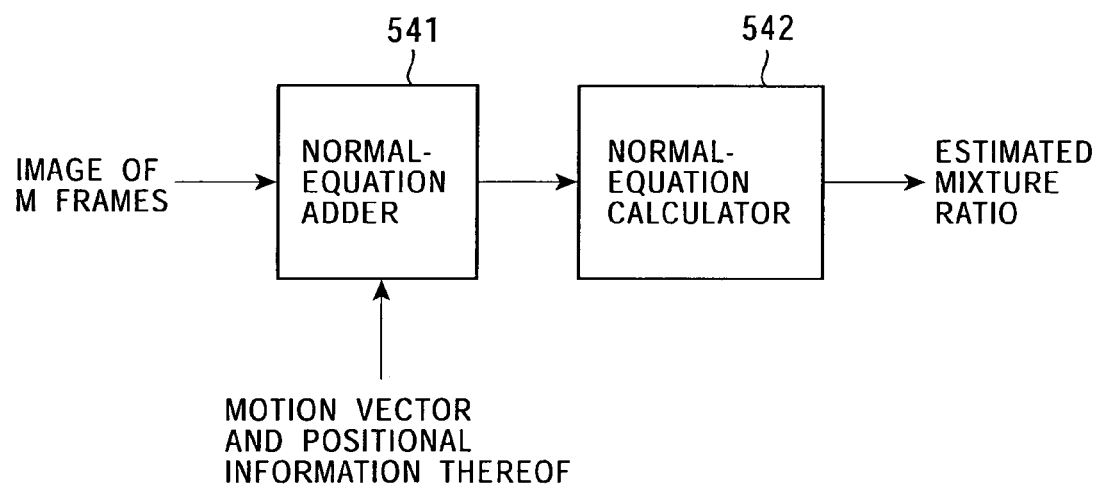
FIG. 69 is a block diagram illustrating the configuration of a mixture-ratio calculator 522.

FIG. 69 is a block diagram illustrating the configuration of the mixture-ratio calculator 522.

A normal-equation adder 541 stores a normal equation for calculating the estimated mixture ratio in advance.

The normal-equation adder 541 sets in the normal equation a corresponding value belonging to the mixed area and the corresponding value belonging to the background area contained in an image of M frames supplied from the frame memory 521. The normal-equation adder 541 supplies the normal equation in which the pixel value belonging to the mixed area and the corresponding pixel value belonging to the background area are set to a normal-equation calculator 542.

The normal-equation calculator 542 solves the normal equation in which the pixel values are set supplied from the normal-equation adder 541 by applying, for example, a sweep-out method (Gauss-Jordan elimination) so as to obtain the estimated mixture ratio, and outputs the calculated mixture ratio.

As discussed above, the estimated-mixture-ratio processor 501 calculates the estimated mixture ratio by using the amount of movement v based on a model corresponding to the covered background area.

The estimated-mixture-ratio processor 502 has a configuration similar to the estimated-mixture-ratio processor 501, and an explanation thereof is thus omitted.

The mixture-ratio determining portion 503 sets the mixture ratio based on the area information supplied from the area specifying unit 101 and indicating to which of the foreground area, the background area, the covered background area, or the uncovered background area the pixel for which the mixture ratio is to be calculated belongs. The mixture-ratio determining portion 503 sets the mixture ratio to 0 when the corresponding pixel belongs to the foreground area, and sets the mixture ratio to 1 when the corresponding pixel belongs to the background area. When the corresponding pixel belongs to the covered background area, the mixture-ratio determining portion 503 sets the mixture ratio to the estimated mixture ratio supplied from the estimated-mixture-ratio processor 501. When the corresponding pixel belongs to the uncovered background area, the mixture-ratio determining portion 503 sets the mixture ratio to the estimated mixture ratio supplied from the estimated-mixture-ratio processor 502. The mixture-ratio determining portion 503 outputs the mixture ratio which has been set based on the area information.

The mixture-ratio calculation processing performed by the mixture-ratio calculator 102 configured shown in FIG. 63 is discussed below with reference to the flowchart of FIG. 70. In step S501, the mixture-ratio calculator 102 obtains area information supplied from the area specifying unit 101. In step S502, the estimated-mixture-ratio processor 501 executes the processing for estimating the mixture ratio by using a model corresponding to a covered background area, and supplies the estimated mixture ratio to the mixture-ratio determining portion 503. Details of the processing for estimating the mixture ratio are discussed below with reference to the flowchart of FIG. 71.

In step S503, the estimated-mixture-ratio processor 502 executes the processing for estimating the mixture ratio by using a model corresponding to an uncovered background area, and supplies the estimated mixture ratio to the mixture-ratio determining portion 503.

In step S504, the mixture-ratio calculator 102 determines whether the mixture ratios have been estimated for the whole frame. If it is determined that the mixture ratios have not yet been estimated for the whole frame, the process returns to step S502, and the processing for estimating the mixture ratio for the subsequent pixel is executed.

If it is determined in step S504 that the mixture ratios have been estimated for the whole frame, the process proceeds to step S505. In step S505, the mixture-ratio determining portion 503 sets the mixture ratio based on the area information supplied from the area specifying unit 101 and indicating to which of the foreground area, the background area, the covered background area, or the uncovered background area the pixel for which the mixture ratio is to be calculated belongs. The mixture-ratio determining portion 503 sets the mixture ratio to 0 when the corresponding pixel belongs to the foreground area, and sets the mixture ratio to 1 when the corresponding pixel belongs to the background area. When the corresponding pixel belongs to the covered background area, the mixture-ratio determining portion 503 sets the estimated mixture ratio supplied from the estimated-mixture-ratio processor 501 as the mixture ratio. When the corresponding pixel belongs to the uncovered background area, the mixture-ratio determining portion 503 sets the estimated mixture ratio supplied from the estimated-mixture-ratio processor 502 as the mixture ratio. The processing is then completed.

As discussed above, the mixture-ratio calculator 102 is able to calculate the mixture ratio $\alpha$, which indicates a feature quantity corresponding to each pixel, based on the area information supplied from the area specifying unit 101, and the input image.

By utilizing the mixture ratio $\alpha$, it is possible to separate the foreground components and the background components contained in the pixel values while maintaining the information of motion blur contained in the image corresponding to the moving object.

Figure 70:
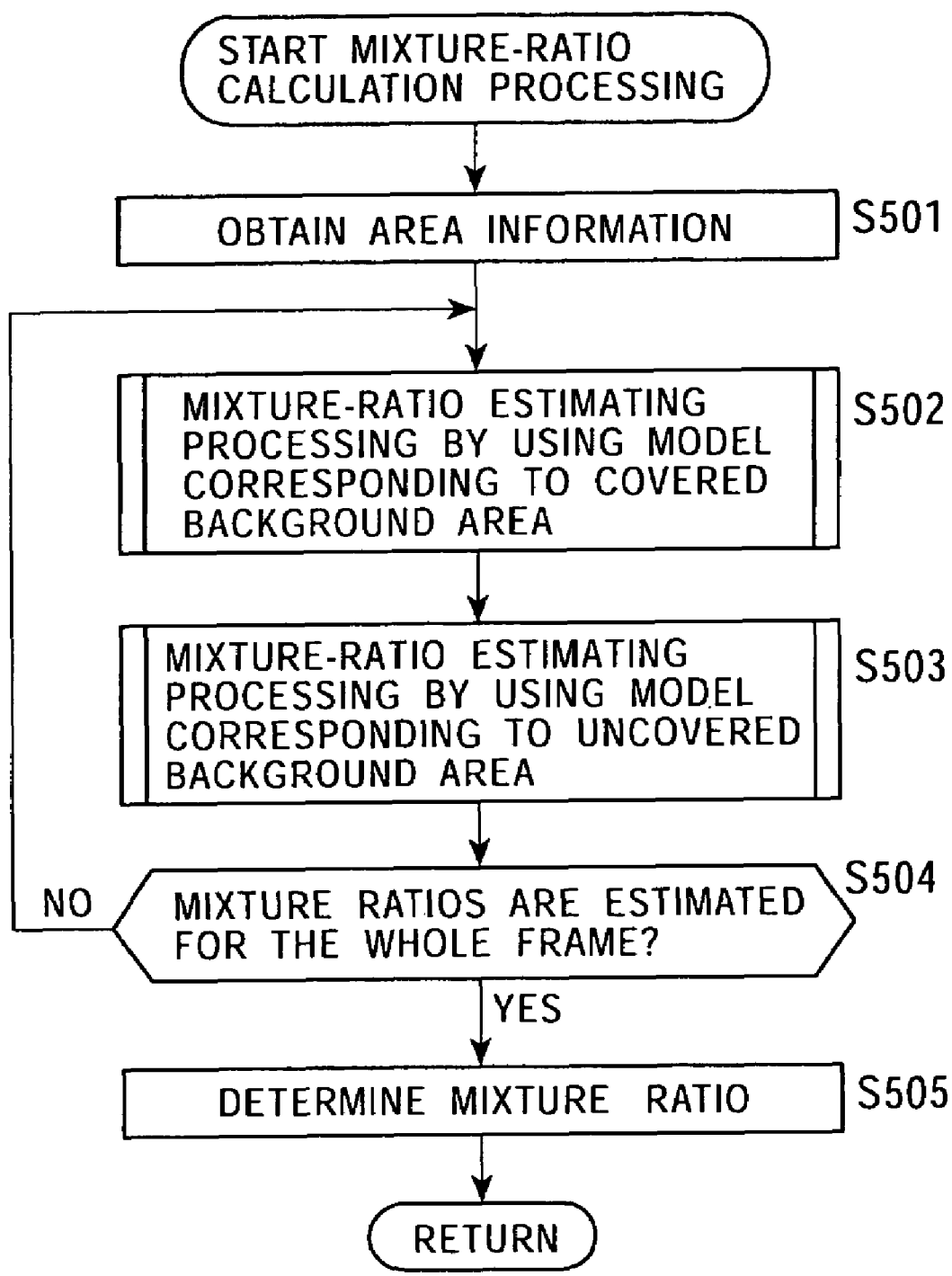
FIG. 70 is a flowchart illustrating the mixture-ratio calculation processing.
Figure 71:
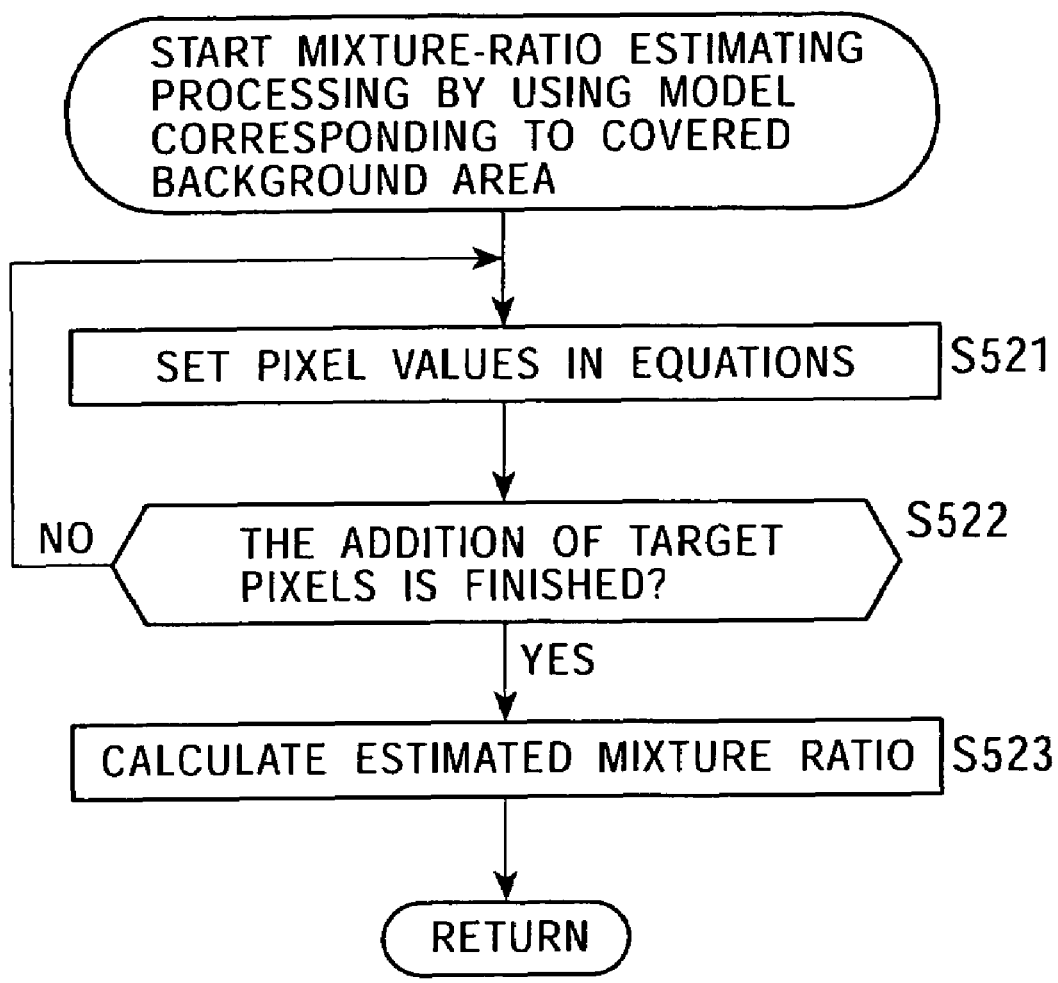
FIG. 71 is a flowchart illustrating the mixture-ratio estimating processing by using a model corresponding to a covered background area.

A description is now given, with reference to the flowchart of FIG. 71, of the mixture-ratio estimating processing by using a model of the covered background area in step S502 of FIG. 70.

In step S521, the normal-equation adder 541 sets the pixel value contained in the input image in a normal equation corresponding to a model of the covered background area.

In step S522, the normal-equation adder 541 determines whether the setting of the target pixels is finished. If it is determined that the setting of the target pixels is not finished, the process returns to step S521, and the processing for setting the pixel values in the normal equation is repeated.

If it is determined in step S522 that the setting for the target pixels is finished, the process proceeds to step S523. In step S523, the normal-equation calculator 542 calculates the estimated mixture ratio based on the normal equations in which the pixels values are set, and outputs the calculated mixture ratio.

As discussed above, the estimated-mixture-ratio processor 501 is able to calculate the estimated mixture ratio based on the input image.

The mixture-ratio estimating processing by using a model corresponding to the uncovered background area in step S503 of FIG. 70 is similar to the processing indicated by the flowchart of FIG. 71 by using the normal equations corresponding to a model of the uncovered background area, and an explanation thereof is thus omitted.

The embodiment has been described, assuming that the object corresponding to the background is stationary. However, the above-described mixture-ratio calculation processing can be applied even if the image corresponding to the background area contains motion. For example, if the image corresponding to the background area is uniformly moving, the estimated-mixture-ratio processor 501 shifts the overall image in accordance with this motion, and performs processing in a manner similar to the case in which the object corresponding to the background is stationary. If the image corresponding to the background area contains locally different motions, the estimated-mixture-ratio processor 501 selects the pixels corresponding to the motions as the pixels belonging to the mixed area, and executes the above-described processing.

The mixture-ratio calculator 104 may execute the mixture-ratio estimating processing on all the pixels only by using a model corresponding to the covered background area, and outputs the calculated estimated mixture ratio as the mixture ratio $\alpha$. In this case, the mixture ratio $\alpha$ indicates the ratio of the background components for the pixels belonging to the covered background area, and indicates the ratio of the foreground components for the pixels belonging to the uncovered background area.

Concerning the pixels belonging to the uncovered background area, the absolute value of the difference between the calculated mixture ratio $\alpha$ and 1 is determined, and the calculated absolute value is set as the mixture ratio $\alpha$. Then, the signal processor 12 is able to determine the mixture ratio $\alpha$ indicating the ratio of the background components for the pixels belonging to the uncovered background area.

Similarly, the mixture-ratio processor 104 may execute the mixture-ratio estimating processing on all the pixels only by using a model corresponding to the uncovered background area, and outputs the calculated estimated mixture ratio as the mixture ratio $\alpha$.

Figure 72:
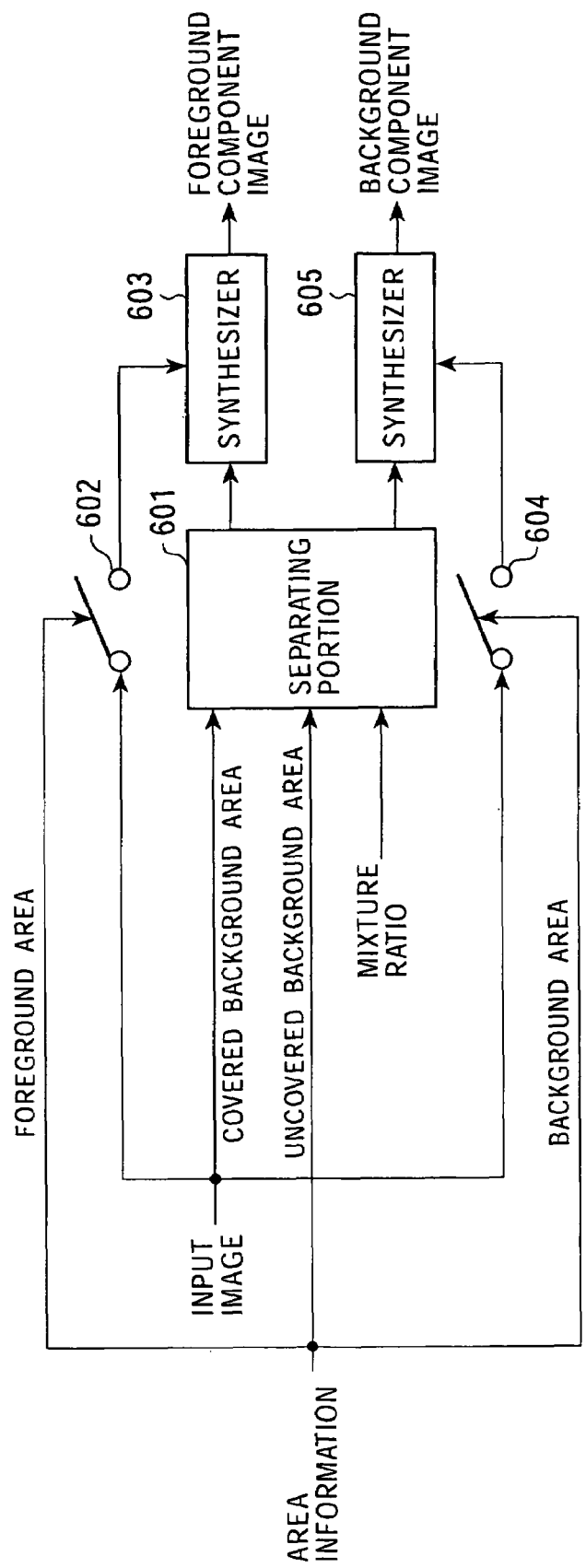
FIG. 72 is a block diagram illustrating an example of the configuration of a foreground/background separator 105.

The foreground/background separator 105 is discussed below. FIG. 72 is a block diagram illustrating an example of the configuration of the foreground/background separator 105. The input image supplied to the foreground/background separator 105 is supplied to a separating portion 601, a switch 602, and a switch 604. The area information supplied from the area specifying unit 103 and indicating the information of the covered background area and the uncovered background area is supplied to the separating portion 601. The area information indicating the foreground area is supplied to the switch 602. The area information indicating the background area supplied to the switch 604.

The mixture ratio $\alpha$ supplied from the mixture-ratio calculator 104 is supplied to the separating portion 601.

The separating portion 601 separates the foreground components from the input image based on the area information indicating the covered background area, the area information indicating the uncovered background area, and the mixture ratio $\alpha$, and supplies the separated foreground components to a synthesizer 603. The separating portion 601 also separates the background components from the input image, and supplies the separated background components to a synthesizer 605.

The switch 602 is closed when a pixel corresponding to the foreground is input based on the area information indicating the foreground area, and supplies only the pixels corresponding to the foreground contained in the input image to the synthesizer 603.

The switch 604 is closed when a pixel corresponding to the background is input based on the area information indicating the background area, and supplies only the pixels corresponding to the background contained in the input image to the synthesizer 605.

The synthesizer 603 synthesizes a foreground component image based on the foreground components supplied from the separating portion 601 and the pixels corresponding to the foreground supplied from the switch 602, and outputs the synthesized foreground component image. Since the foreground area and the mixed area do not overlap, the synthesizer 603 applies, for example, logical OR to the foreground components and the foreground pixels, thereby synthesizing the foreground component image.

In the initializing processing executed at the start of the synthesizing processing for the foreground component image, the synthesizer 603 stores an image whose pixel values are all 0 in a built-in frame memory. Then, in the synthesizing processing for the foreground component image, the synthesizer 603 stores the foreground component image (overwrites the previous image by the foreground component image). Accordingly, 0 is stored in the pixels corresponding to the background area in the foreground component image output from the synthesizer 603.

The synthesizer 605 synthesizes a background component image based on the background components supplied from the separating portion 601 and the pixels corresponding to the background supplied from the switch 604, and outputs the synthesized background component image. Since the background area and the mixed area do not overlap, the synthesizer 605 applies, for example, logical OR to the background components and the background pixels, thereby synthesizing the background component image.

In the initializing processing executed at the start of the synthesizing processing for the background component image, the synthesizer 605 stores an image whose pixel values are all 0 in a built-in frame memory. Then, in the synthesizing processing for the background component image, the synthesizer 605 stores the background component image (overwrites the previous image by the background component image). Accordingly, 0 is stored in the pixels corresponding to the foreground area in the background component image output from the synthesizer 605.

Figure 73B:
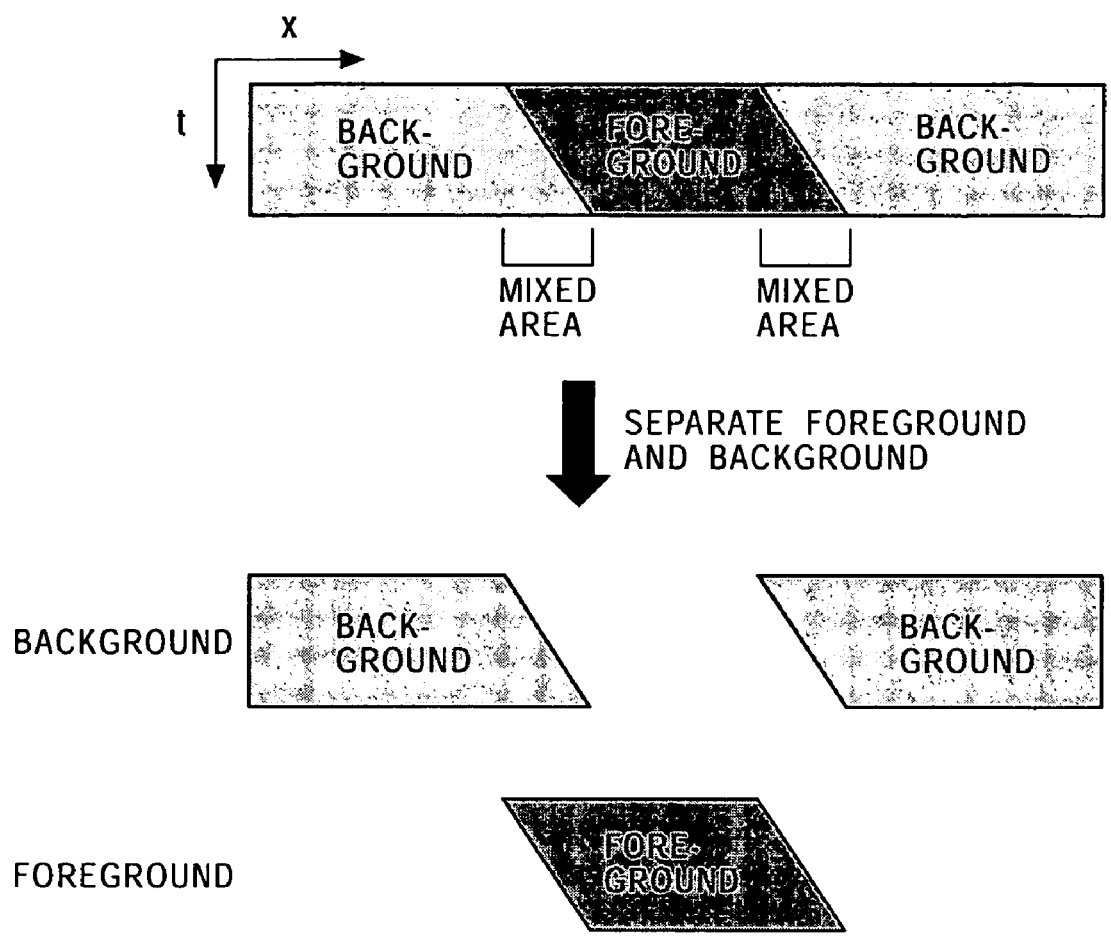
FIG. 73B illustrates a model of an input image, a foreground component image, and a background component image.

FIG. 73A illustrates the input image input into the foreground/background separator 105 and the foreground component image and the background component image output from the foreground/background separator 105. FIG. 73B illustrates a model corresponding to the input image input into the foreground/background separator 105 and the foreground component image and the background component image output from the foreground/background separator 105.

FIG. 73A is a schematic diagram illustrating the image to be displayed, and FIG. 73B is a model obtained by expanding in the time direction the pixels disposed in one line including the pixels belonging to the foreground area, the pixels belonging to the background area, and the pixels belonging to the mixed area corresponding to FIG. 73A.

As shown in FIGS. 73A and 73B, the background component image output from the foreground/background separator 105 consists of the pixels belonging to the background area and the background components contained in the pixels of the mixed area.

As shown in FIGS. 73A and 73B, the foreground component image output from the foreground/background separator 105 consists of the pixel belonging to the foreground area and the foreground components contained in the pixels of the mixed area.

The pixel values of the pixels in the mixed area are separated into the background components and the foreground components by the foreground/background separator 105. The separated background components form the background component image together with the pixels belonging to the background area. The separated foreground components form the foreground component image together with the pixels belonging to the foreground area.

As discussed above, in the foreground component image, the pixel values of the pixels corresponding to the background area are set to 0, and significant pixel values are set in the pixels corresponding to the foreground area and the pixels corresponding to the mixed area. Similarly, in the background component image, the pixel values of the pixels corresponding to the foreground area are set to 0, and significant pixel values are set in the pixels corresponding to the background area and the pixels corresponding to the mixed area.

A description is given below of the processing executed by the separating portion 601 for separating the foreground components and the background components from the pixels belonging to the mixed area.

Figure 74:
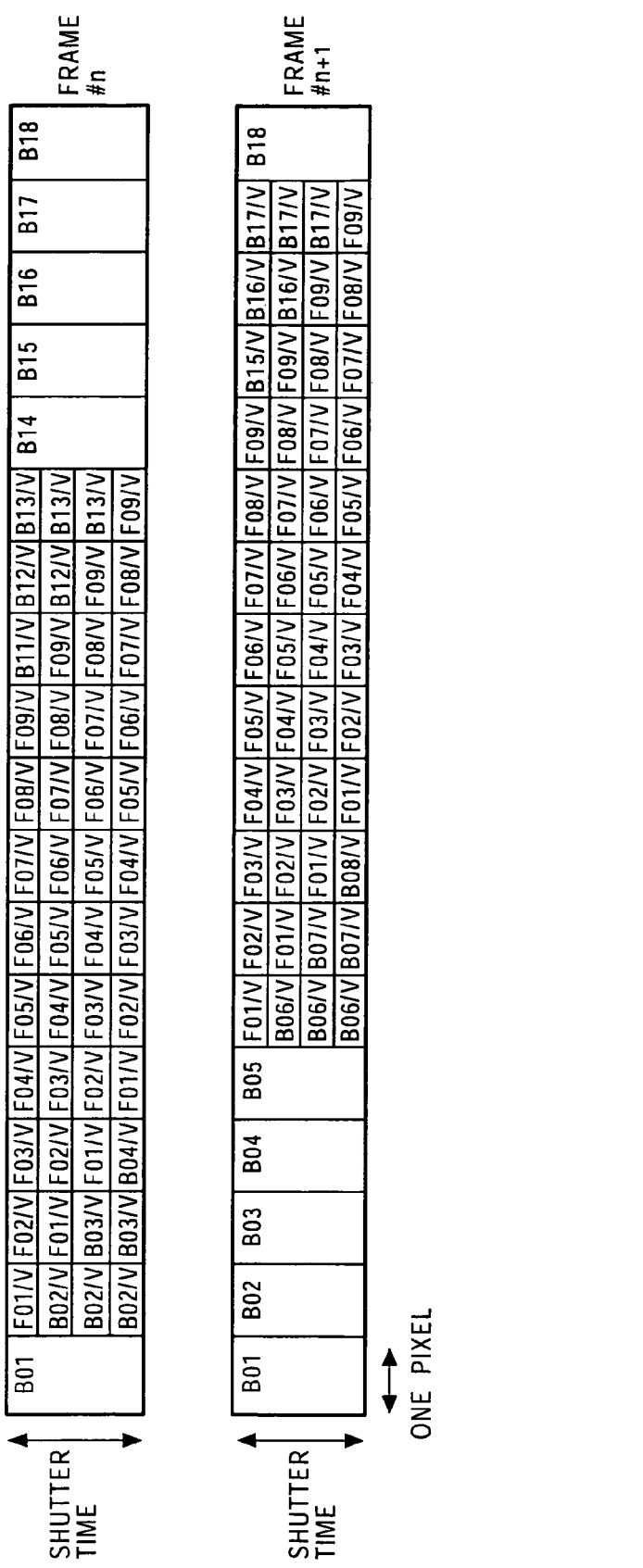
FIG. 74 illustrates a model in which pixel values are expanded in the time direction and the period corresponding to the shutter time is divided.

FIG. 74 illustrates a model of an image indicating foreground components and background components in two frames including a foreground object moving from the left to the right in FIG. 74. In the model of the image shown in FIG. 74, the amount of movement v is 4, and the number of virtual divided portions is 4.

In frame #n, the leftmost pixel and the fourteenth through eighteenth pixels from the left consist of only the background components and belong to the background area. In frame #n, the second through fourth pixels from the left contain the background components and the foreground components, and belong to the uncovered background area. In frame #n, the eleventh through thirteenth pixels from the left contain background components and foreground components, and belong to the covered background area. In frame #n, the fifth through tenth pixels from the left consist of only the foreground components, and belong to the foreground area.

In frame #n+1, the first through fifth pixels from the left and the eighteenth pixel from the left consist of only the background components, and belong to the background area. In frame #n+1, the sixth through eighth pixels from the left contain background components and foreground components, and belong to the uncovered background area. In frame #n+1, the fifteenth through seventeenth pixels from the left contain background components and foreground components, and belong to the covered background area. In frame #n+1, the ninth through fourteenth pixels from the left consist of only the foreground components, and belong to the foreground area.

Figure 75:
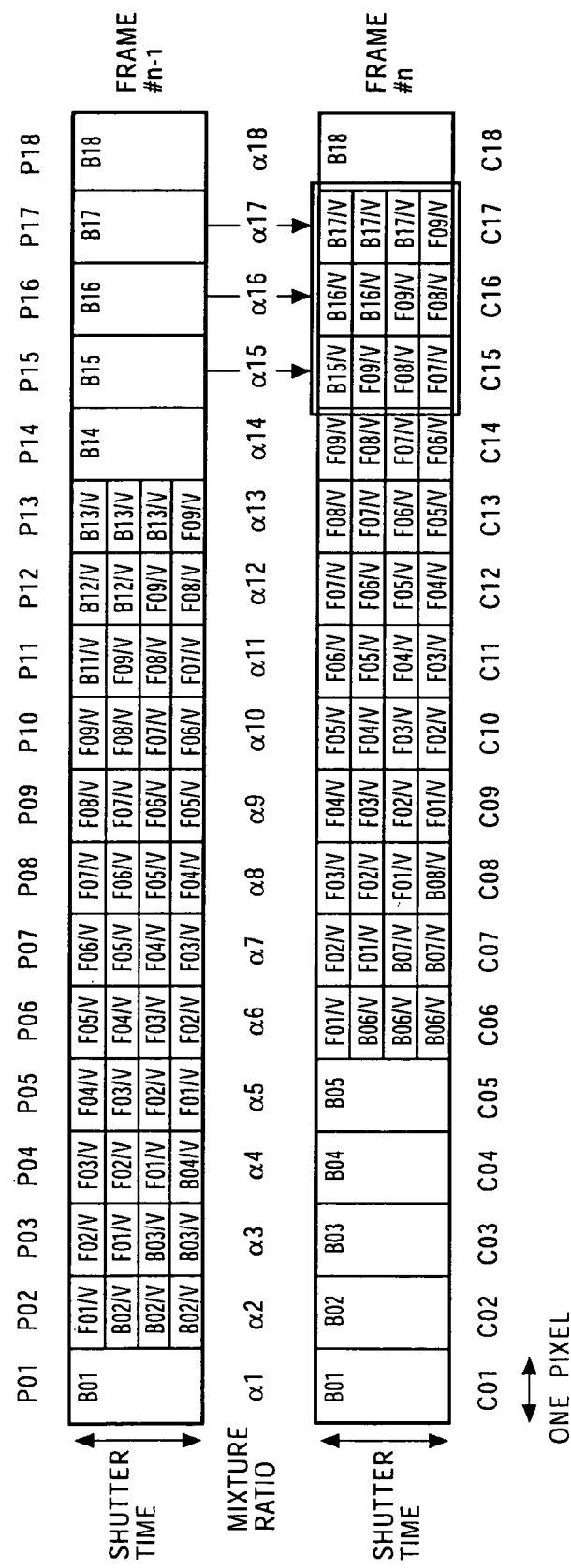
FIG. 75 illustrates a model in which pixel values are expanded in the time direction and the period corresponding to the shutter time is divided.

FIG. 75 illustrates the processing for separating the foreground components from the pixels belonging to the covered background area. In FIG. 75, $\alpha1$ through $\alpha18$ indicate mixture ratios of the individual pixels of frame #n. In FIG. 75, the fifteenth through seventeenth pixels from the left belong to the covered background area.

The pixel value C15 of the fifteenth pixel from the left in frame #n can be expressed by equation (138):

$$C15 = B15/v + F09/v + F08/v + F07/v \quad (138)$$
$$= \alpha 15 \cdot B15 + F09/v + F08/v + F07/v$$
$$= \alpha 15 \cdot P15 + F09/v + F08/v + F07/v$$

where $\alpha 15$ indicates the mixture ratio of the fifteenth pixel from the left in frame #n, and P15 designates the pixel value of the fifteenth pixel from the left in frame #n−1.

The sum f15 of the foreground components of the fifteenth pixel from the left in frame #n can be expressed by equation (139) based on equation (138).

$$f15 = F09/v + F08/v + F07/v \quad (139)$$
$$= C15 - \alpha 15 \cdot P15$$

Similarly, the sum f16 of the foreground components of the sixteenth pixel from the left in frame #n can be expressed by equation (140), and the sum f17 of the foreground components of the seventeenth pixel from the left in frame #n can be expressed by equation (141).

$$f16 = C16 - \alpha 16 \cdot P16 \quad (140)$$

$$f17 = C17 - \alpha 17 \cdot P17 \quad (141)$$

In this manner, the foreground components fc contained in the pixel value C of the pixel belonging to the covered background area can be expressed by equation (142):

$$fc = C - \alpha \cdot P \quad (142)$$

where P designates the pixel value of the corresponding pixel in the previous frame.

Figure 76:
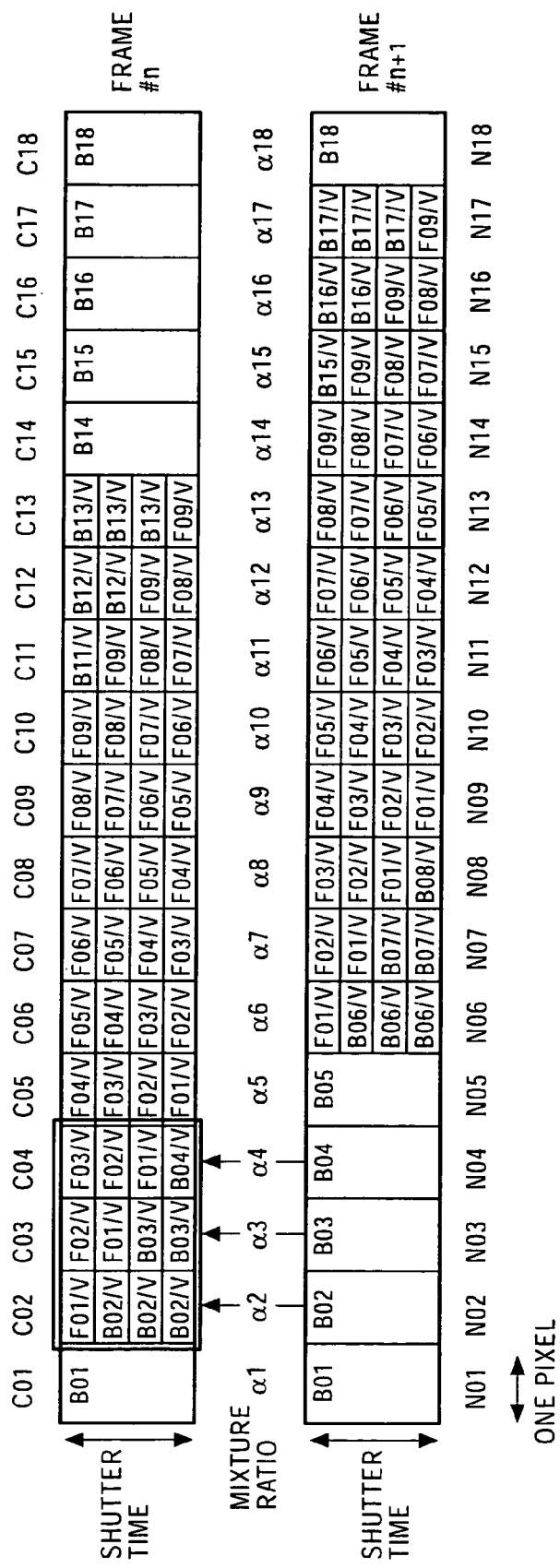
FIG. 76 illustrates a model in which pixel values are expanded in the time direction and the period corresponding to the shutter time is divided.

FIG. 76 illustrates the processing for separating the foreground components from the pixels belonging to the uncovered background area. In FIG. 76, $\alpha 1$ through $\alpha 18$ indicate mixture ratios of the individual pixels of frame #n. In FIG. 76, the second through fourth pixels from the left belong to the uncovered background area.

The pixel value C02 of the second pixel from the left in frame #n can be expressed by equation (143)

$$C02 = B02/v + B02/v + B02/v + F01/v \quad (143)$$
$$= \alpha 2 \cdot B02 + F01/v$$
$$= \alpha 2 \cdot N02 + F01/v$$

where $\alpha 2$ indicates the mixture ratio of the second pixel from the left in frame #n, and N02 designates the pixel value of the second pixel from the left in frame #n+1.

The sum F02 of the foreground components of the second pixel from the left in frame #n can be expressed by equation (144) based on equation (143).

$$f02 = F01/v \quad (144)$$
$$= C02 - \alpha 2 \cdot N02$$

Similarly, the sum f03 of the foreground components of the third pixel from the left in frame #n can be expressed by equation (145), and the sum f04 of the foreground components of the fourth pixel from the left in frame #n can be expressed by equation (146).

$$f03 = C03 - \alpha 3 \cdot N03 \quad (145)$$

$$f04 = C04 - \alpha 4 \cdot N04 \quad (146)$$

In this manner, the foreground components fu contained in the pixel value C of the pixel belonging to the uncovered background area can be expressed by equation (147):

$$fu = C - \alpha \cdot N \quad (147)$$

where N designates the pixel value of the corresponding pixel in the subsequent frame.

As discussed above, the separating portion 601 is able to separate the foreground components from the pixels belonging to the mixed area and the background components from the pixels belonging to the mixed area based on the information indicating the covered background area and the information indicating the uncovered background area contained in the area information, and the mixture ratio $\alpha$ for each pixel.

Figure 77:
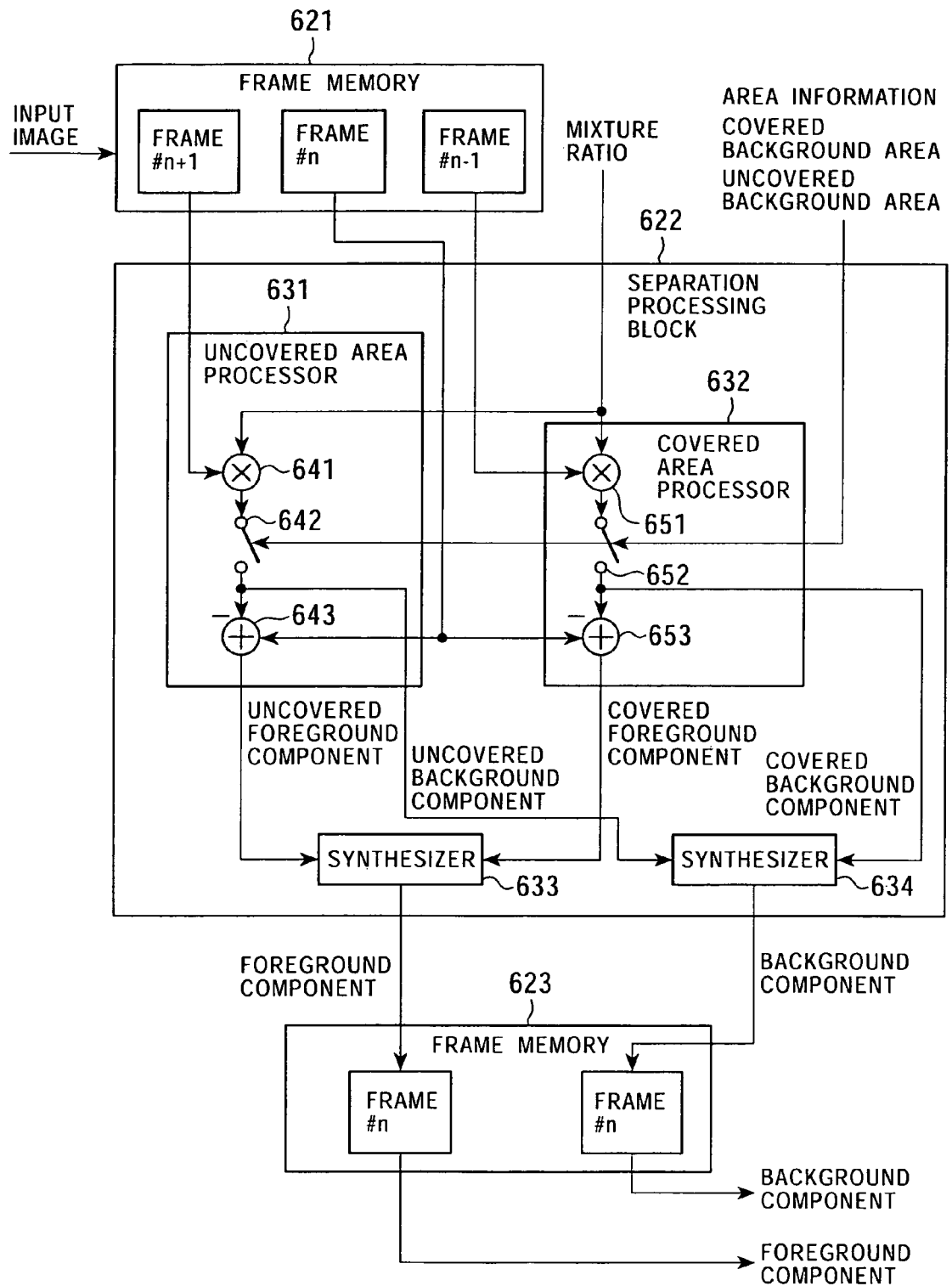
FIG. 77 is a block diagram illustrating an example of the configuration of a separating portion 601.

FIG. 77 is a block diagram illustrating an example of the configuration of the separating portion 601 for executing the above-described processing. An image input into the separating portion 601 is supplied to a frame memory 621, and the area information indicating the covered background area and the uncovered background area supplied from the mixture-ratio calculator 104 and the mixture ratio a are supplied to a separation processing block 622.

The frame memory 621 stores the input images in units of frames. When a frame to be processed is frame #n, the frame memory 621 stores frame #n−1, which is the frame one frame before frame #n, frame #n, and frame #n+1, which is the frame one frame after frame #n.

The frame memory 621 supplies the corresponding pixels in frame #n−1, frame #n, and frame #n+1 to the separation processing block 622.

The separation processing block 622 applies the calculations discussed with reference to FIGS. 75 and 76 to the pixel values of the corresponding pixels in frame #n−1, frame #n, and frame #n+1 supplied from the frame memory 621 based on the area information indicating the covered background area and the uncovered background area and the mixture ratio $\alpha$ so as to separate the foreground components and the background components from the pixels belonging to the mixed area in frame #n, and supplies them to a frame memory 623.

The separation processing block 622 is formed of an uncovered area processor 631, a covered area processor 632, a synthesizer 633, and a synthesizer 634.

A multiplier 641 of the uncovered area processor 631 multiplies the pixel value of the pixel in frame #n+1 supplied from the frame memory 621 by the mixture ratio $\alpha$, and outputs the resulting pixel value to a switch 642. The switch 642 is closed when the pixel of frame #n (corresponding to the pixel in frame #n+1) supplied from the frame memory 621 belongs to the uncovered background area, and supplies the pixel value multiplied by the mixture ratio $\alpha$ supplied from the multiplier 641 to a calculator 643 and the synthesizer 634. The value obtained by multiplying the pixel value of the pixel in frame #n+1 by the mixture ratio $\alpha$ output from the switch 642 is equivalent to the background components of the pixel value of the corresponding pixel in frame #n.

The calculator 643 subtracts the background components supplied from the switch 642 from the pixel value of the pixel in frame #n supplied from the frame memory 621 so as to obtain the foreground components. The calculator 643 supplies the foreground components of the pixel in frame #n belonging to the uncovered background area to the synthesizer 633.

A multiplier 651 of the covered area processor 632 multiplies the pixel value of the pixel in frame #n−1 supplied from the frame memory 621 by the mixture ratio $\alpha$, and outputs the resulting pixel value to a switch 652. The switch 652 is closed when the pixel of frame #n (corresponding to the pixel in frame #n−1) supplied from the frame memory 621 belongs to the covered background area, and supplies the pixel value multiplied by the mixture ratio $\alpha$ supplied from the multiplier 651 to a calculator 653 and the synthesizer 634. The value obtained by multiplying the pixel value of the pixel in frame #n−1 by the mixture ratio $\alpha$ output from the switch 652 is equivalent to the background components of the pixel value of the corresponding pixel in frame #n.

The calculator 653 subtracts the background components supplied from the switch 652 from the pixel value of the pixel in frame #n supplied from the frame memory 621 so as to obtain the foreground components. The calculator 653 supplies the foreground components of the pixel in frame #n belonging to the covered background area to the synthesizer 633.

The synthesizer 633 combines the foreground components of the pixels belonging to the uncovered background area and supplied from the calculator 643 with the foreground components of the pixels belonging to the covered background area and supplied from the calculator 653, and supplies the synthesized foreground components to the frame memory 623.

The synthesizer 634 combines the background components of the pixels belonging to the uncovered background area and supplied from the switch 642 with the background components of the pixels belonging to the covered background area and supplied from the switch 652, and supplies the synthesized background components to the frame memory 623.

The frame memory 623 stores the foreground components and the background components of the pixels in the mixed area of frame #n supplied from the separation processing block 622.

The frame memory 623 outputs the stored foreground components of the pixels in the mixed area in frame #n and the stored background components of the pixels in the mixed area in frame #n.

By utilizing the mixture ratio $\alpha$, which indicates the feature quantity, the foreground components and the background components contained in the pixel values can be completely separated.

The synthesizer 603 combines the foreground components of the pixels in the mixed area in frame #n output from the separating portion 601 with the pixels belonging to the foreground area so as to generate a foreground component image. The synthesizer 605 combines the background components of the pixels in the mixed area in frame #n output from the separating portion 601 with the pixels belonging to the background area so as to generate a background component image.

FIG. 78A illustrates an example of the foreground component image corresponding to frame #n in FIG. 74. The leftmost pixel and the fourteenth pixel from the left consist of only the background components before the foreground and the background are separated, and thus, the pixel values are set to 0.

The second and fourth pixels from the left belong to the uncovered background area before the foreground and the background are separated. Accordingly, the background components are set to 0, and the foreground components are maintained. The eleventh through thirteenth pixels from the left belong to the covered background area before the foreground and the background are separated. Accordingly, the background components are set to 0, and the foreground components are maintained. The fifth through tenth pixels from the left consist of only the foreground components, which are thus maintained.

FIG. 78B illustrates an example of the background component image corresponding to frame #n in FIG. 74. The leftmost pixel and the fourteenth pixel from the left consist of only the background components before the foreground and the background are separated, and thus, the background components are maintained.

The second through fourth pixels from the left belong to the uncovered background area before the foreground and the background are separated. Accordingly, the foreground components are set to 0, and the background components are maintained. The eleventh through thirteenth pixels from the left belong to the covered background area before the foreground and the background are separated. Accordingly, the foreground components are set to 0, and the background components are maintained. The fifth through tenth pixels from the left consist of only the foreground components, and thus, the pixel values are set to 0.

Figure 79:
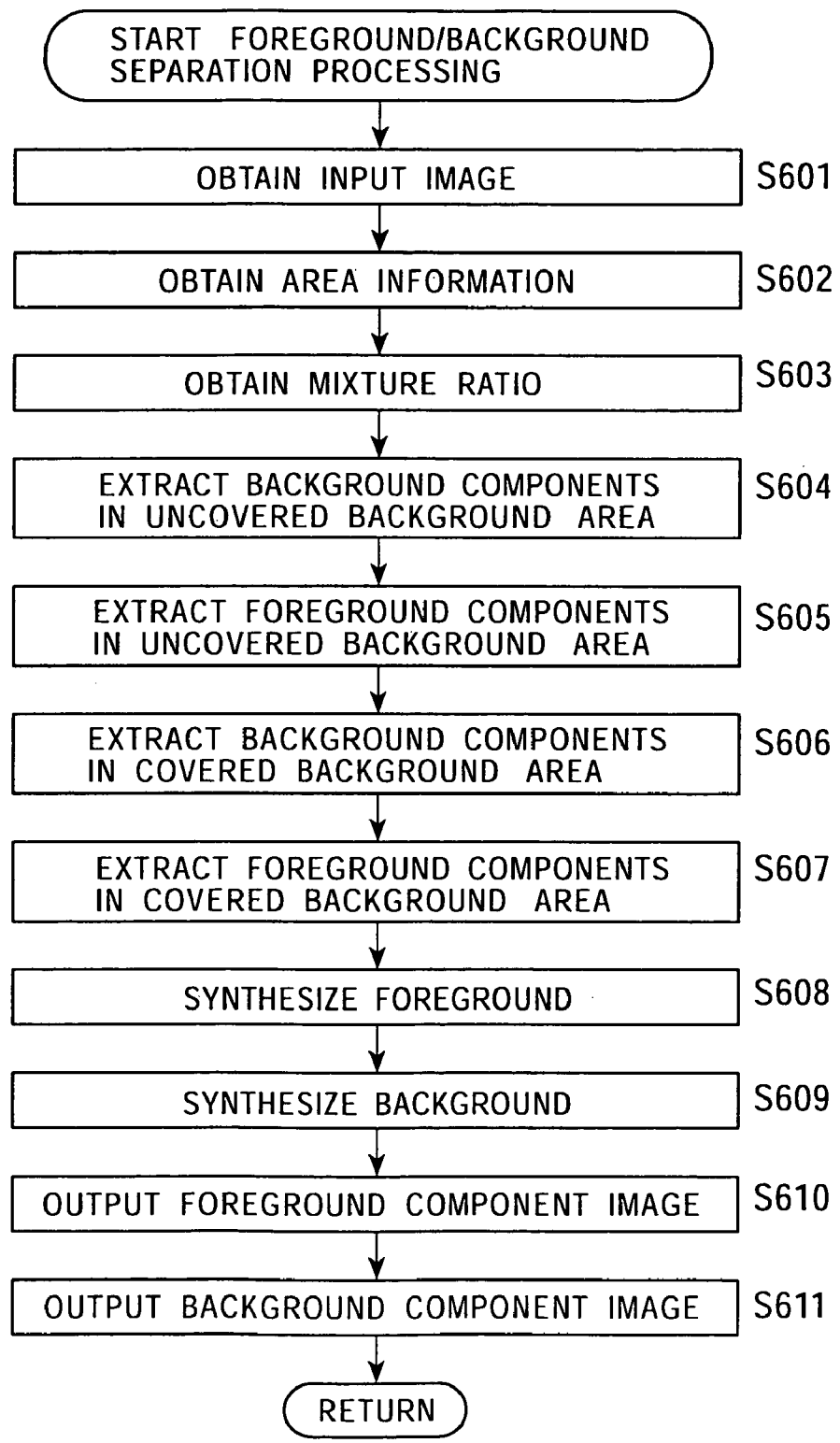
FIG. 79 is a flowchart illustrating the processing for separating a foreground and a background.

The processing for separating the foreground and the background executed by the foreground/background separator 105 is described below with reference to the flowchart of FIG. 79. In step S601, the frame memory 621 of the separating portion 601 obtains an input image, and stores frame #n for which the foreground and the background are separated together with the previous frame #n−1 and the subsequent frame #n+1.

In step S602, the separation processing block 622 of the separating portion 601 obtains area information supplied from the mixture-ratio calculator 104. In step S603, the separation processing block 622 of the separating portion 601 obtains the mixture ratio $\alpha$ supplied from the mixture-ratio calculator 104.

In step S604, the uncovered area processor 631 extracts the background components from the pixel values of the pixels belonging to the uncovered background area supplied from the frame memory 621 based on the area information and the mixture ratio $\alpha$.

In step S605, the uncovered area processor 631 extracts the foreground components from the pixel values of the pixels belonging to the uncovered background area supplied from the frame memory 621 based on the area information and the mixture ratio $\alpha$.

In step S606, the covered area processor 632 extracts the background components from the pixel values of the pixels belonging to the covered background area supplied from the frame memory 621 based on the area information and the mixture ratio $\alpha$.

In step S607, the covered area processor 632 extracts the foreground components from the pixel values of the pixels belonging to the covered background area supplied from the frame memory 621 based on the area information and the mixture ratio $\alpha$.

In step S608, the synthesizer 633 combines the foreground components of the pixels belonging to the uncovered background area extracted in the processing of step S605 with the foreground components of the pixels belonging to the covered background area extracted in the processing of step S607. The synthesized foreground components are supplied to the synthesizer 603. The synthesizer 603 further combines the pixels belonging to the foreground area supplied via the switch 602 with the foreground components supplied from the separating portion 601 so as to generate a foreground component image.

In step S609, the synthesizer 634 combines the background components of the pixels belonging to the uncovered background area extracted in the processing of step S604 with the background components of the pixels belonging to the covered background area extracted in the processing of step S606. The synthesized background components are supplied to the synthesizer 605. The synthesizer 605 further combines the pixels belonging to the background area supplied via the switch 604 with the background components supplied from the separating portion 601 so as to generate a background component image.

In step S610, the synthesizer 603 outputs the foreground component image. In step S611, the synthesizer 605 outputs the background component image. The processing is then completed.

As discussed above, the foreground/background separator 105 is able to separate the foreground components and the background components from the input image based on the area information and the mixture ratio α, and outputs the foreground component image consisting of only the foreground components and the background component image consisting of only the background components.

Adjustments of the amount of motion blur from a foreground component image are described below.

Figure 80:
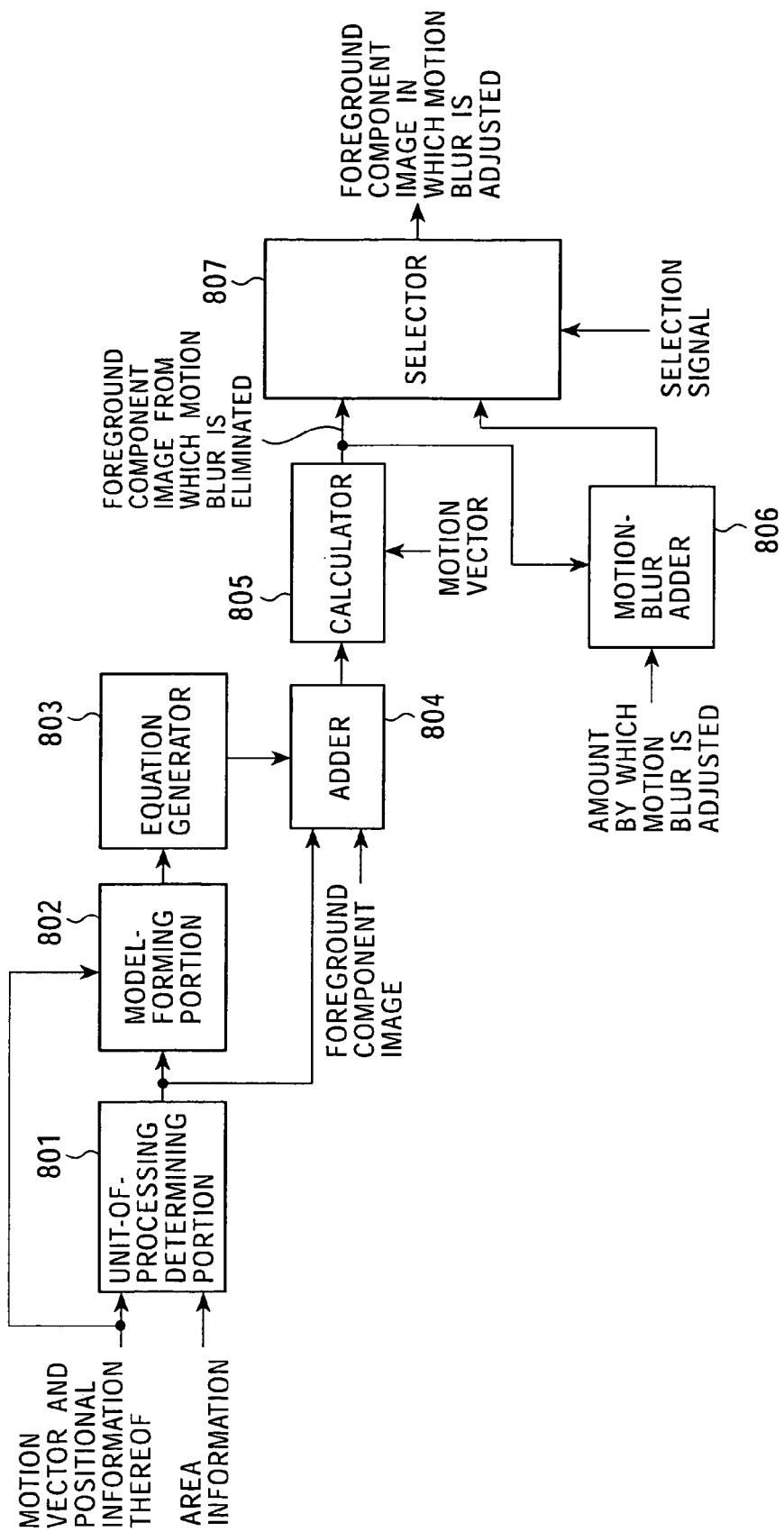
FIG. 80 is a block diagram illustrating an example of the configuration of a motion-blur adjusting unit 106.

FIG. 80 is a block diagram illustrating an example of the configuration of the motion-blur adjusting unit 106. The motion vector and the positional information thereof supplied from the motion detector 102 and the area information supplied from the area specifying unit 103 are supplied to a unit-of-processing determining portion 801 and a model-forming portion 802. The area information supplied from the foreground/background separator 105 is supplied to the adder 804.

The unit-of-processing determining portion 801 supplies, together with the motion vector, the unit of processing that is generated based on the motion vector and the positional information thereof and the area information to the model-forming portion 802. The unit-of-processing determining portion 801 supplies the generated unit of processing to the adder 804.

Figure 81:
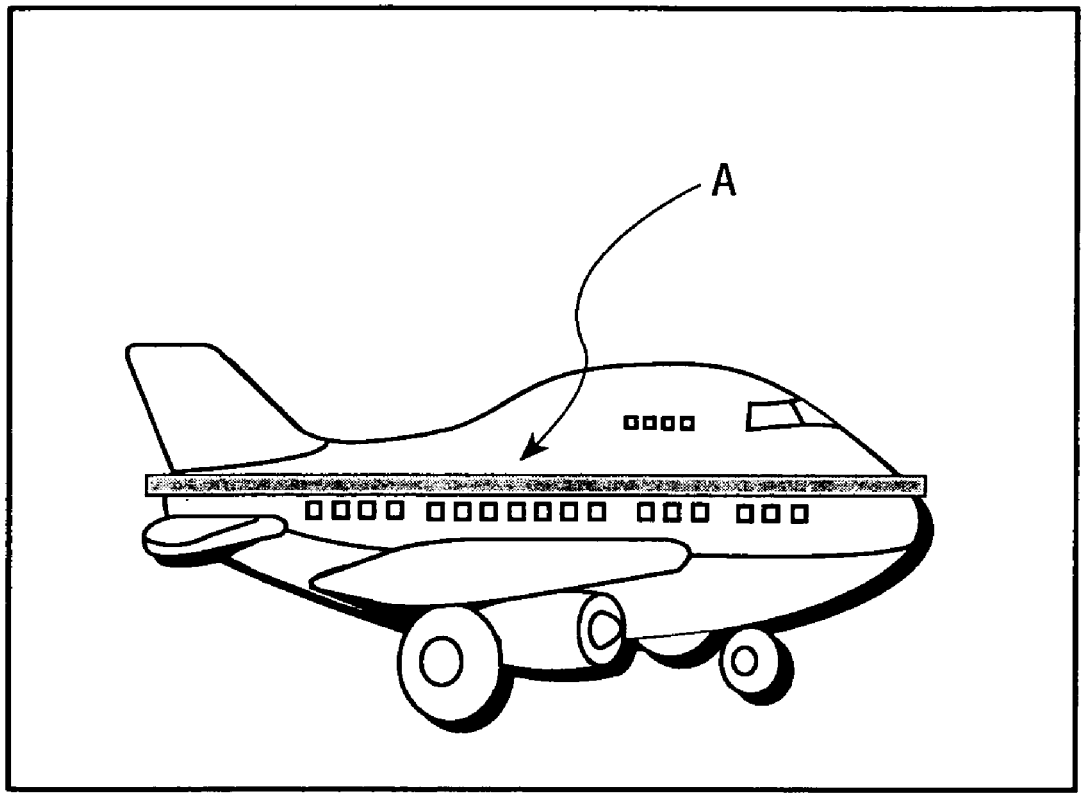
FIG. 81 illustrates the unit of processing.

As indicated by A in FIG. 81, for example, the unit of processing generated by the unit-of-processing determining portion 801 indicates consecutive pixels disposed in the moving direction starting from the pixel corresponding to the covered background area of the foreground component image until the pixel corresponding to the uncovered background area, or indicates consecutive pixels disposed in the moving direction starting from the pixel corresponding to the uncovered background area until the pixel corresponding to the covered background area. The unit of processing is formed of two pieces of data which indicate, for example, the upper left point (which is the position of the leftmost or the topmost pixel in the image designated by the unit of processing) and the lower right point.

The model-forming portion 802 forms a model based on the motion vector and the input unit of processing. More specifically, for example, the model-forming portion 802 may store in advance a plurality of models in accordance with the number of pixels contained in the unit of processing, the number of virtual divided portions of the pixel value in the time direction, and the number of foreground components for each pixel. The model-forming portion 902 then may select the model in which the correlation between the pixel values and the foreground components is designated, such as that in FIG. 82, based on the unit of processing and the number of virtual divided portions of the pixel value in the time direction.

It is now assumed, for example, that the number of pixels corresponding to the unit of processing is 12, and that the amount of movement v within the shutter time is 5. Then, the model-forming portion 802 sets the number of virtual divided portions to 5, and selects a model formed of eight types of foreground components so that the leftmost pixel contains one foreground component, the second pixel from the left contains two foreground components, the third pixel from the left contains three foreground components, the fourth pixel from the left contains four pixel components, the fifth pixel from the left contains five foreground components, the sixth pixel from the left contains five foreground components, the seventh pixel from the left contains five foreground components, the eighth pixel from the left contains five foreground components, the ninth pixel from the left contains four foreground components, the tenth pixel from the left contains three foreground components, the eleventh pixel from the left contains two foreground components, and the twelfth pixel from the left contains one foreground component.

Instead of selecting a model from the prestored models, the model-forming portion 802 may generate a model based on the motion vector and the unit of processing when the motion vector and the unit of processing are supplied.

The model-forming portion 802 supplies the selected model to an equation generator 803.

The equation generator 803 generates an equation based on the model supplied from the model-forming portion 802.

Figure 82:
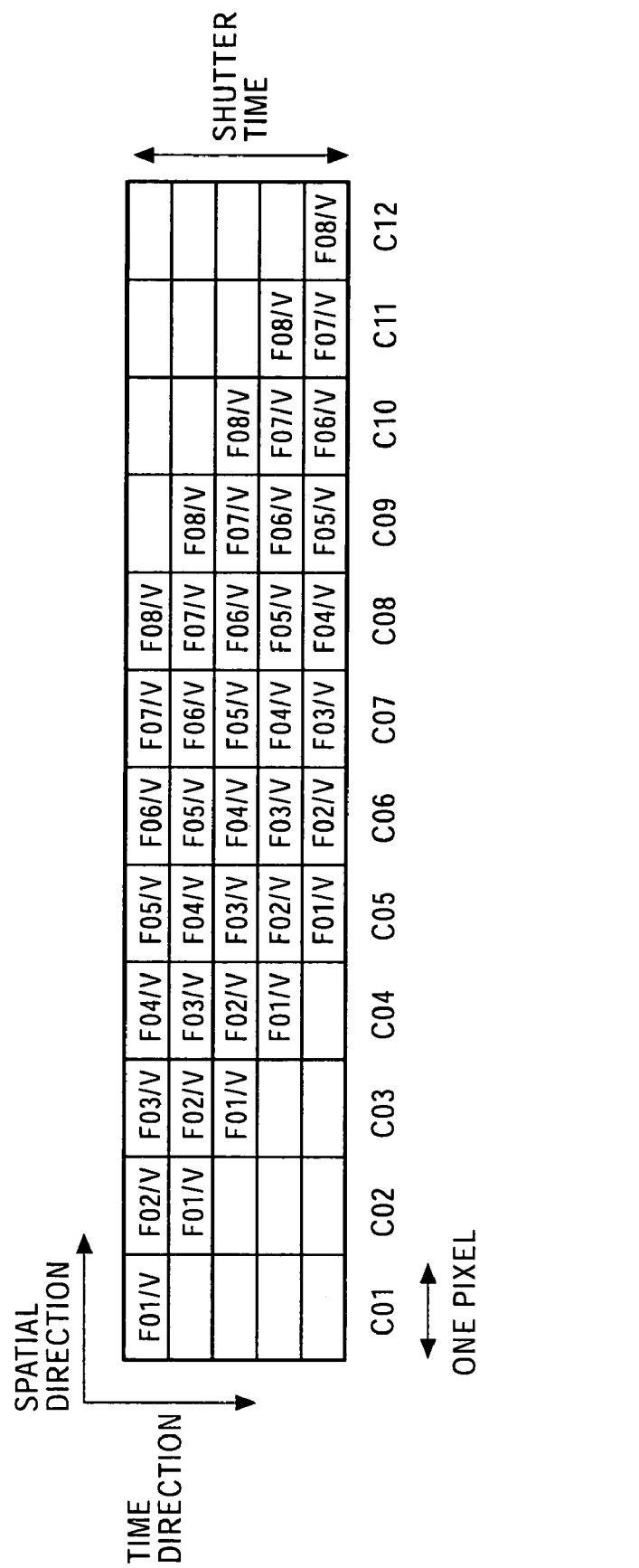
FIG. 82 illustrates a model in which the pixel values of a foreground component image are expanded in the time direction and the period corresponding to the shutter time is divided.

A description is given below, with reference to the model of the foreground component image shown in FIG. 82, of equations generated by the equation generator 803 when the number of foreground components is 8, the number of pixels corresponding to the unit of processing is 12, and the amount of movement v is 5.

When the foreground components contained in the foreground component image corresponding to the shutter time/v are F01/v through F08/v, the relationships between F01/v through F08/v and the pixel values C01 through C12 can be expressed by equations (148) through (159).

$$C01 = F01/v \tag{148}$$

$$C02 = F02/v + F01/v \tag{149}$$

$$C03 = F03/v + F02/v + F01/v \tag{150}$$

$$C04 = F04/v + F03/v + F02/v + F01/v \tag{151}$$

$$C05 = F05/v + F04/v + F03/v + F02/v + F01/v \tag{152}$$

$$C06 = F06/v + F05/v + F04/v + F03/v + F02/v \tag{153}$$

$$C07 = F07/v + F06/v + F05/v + F04/v + F03/v \tag{154}$$

$$C08 = F08/v + F07/v + F06/v + F05/v + F04/v \tag{155}$$

$$C09 = F08/v + F07/v + F06/v + F05/v \tag{156}$$

$$C10 = F08/v + F07/v + F06/v \tag{157}$$

$$C11 = F08/v + F07/v \tag{158}$$

$$C12 = F08/v \tag{159}$$

The equation generator 803 generates an equation by modifying the generated equations. The equations generated by the equation generator 803 are indicated by equations (160) though (171).

$$C01 = 1 \cdot F01/v + 0 \cdot F02/v + 0 \cdot F03/v + 0 \cdot F04/v + 0 \cdot F05/v + 0 \cdot F06/v + 0 \cdot F07/v + 0 \cdot F08/v \quad (160)$$

$$C02 = 1 \cdot F01/v + 1 \cdot F02/v + 0 \cdot F03/v + 0 \cdot F04/v + 0 \cdot F05/v + 0 \cdot F06/v + 0 \cdot F07/v + 0 \cdot F08/v \quad (161)$$

$$C03 = 1 \cdot F01/v + 1 \cdot F02/v + 1 \cdot F03/v + 0 \cdot F04/v + 0 \cdot F05/v + 0 \cdot F06/v + 0 \cdot F07/v + 0 \cdot F08/v \quad (162)$$

$$C04 = 1 \cdot F01/v + 1 \cdot F02/v + 1 \cdot F03/v + 1 \cdot F04/v + 0 \cdot F05/v + 0 \cdot F06/v + 0 \cdot F07/v + 0 \cdot F08/v \quad (163)$$

$$C05 = 1 \cdot F01/v + 1 \cdot F02/v + 1 \cdot F03/v + 1 \cdot F04/v + 1 \cdot F05/v + 0 \cdot F06/v + 0 \cdot F07/v + 0 \cdot F08/v \quad (164)$$

$$C06 = 0 \cdot F01/v + 1 \cdot F02/v + 1 \cdot F03/v + 1 \cdot F04/v + 1 \cdot F05/v + 1 \cdot F06/v + 0 \cdot F07/v + 0 \cdot F08/v \quad (165)$$

$$C07 = 0 \cdot F01/v + 0 \cdot F02/v + 1 \cdot F03/v + 1 \cdot F04/v + 1 \cdot F05/v + 1 \cdot F06/v + 1 \cdot F07/v + 0 \cdot F08/v \quad (166)$$

$$C08 = 0 \cdot F01/v + 0 \cdot F02/v + 0 \cdot F03/v + 1 \cdot F04/v + 1 \cdot F05/v + 1 \cdot F06/v + 1 \cdot F07/v + 1 \cdot F08/v \quad (167)$$

$$C09 = 0 \cdot F01/v + 0 \cdot F02/v + 0 \cdot F03/v + 0 \cdot F04/v + 1 \cdot F05/v + 1 \cdot F06/v + 1 \cdot F07/v + 1 \cdot F08/v \quad (168)$$

$$C10 = 0 \cdot F01/v + 0 \cdot F02/v + 0 \cdot F03/v + 0 \cdot F04/v + 0 \cdot F05/v + 1 \cdot F06/v + 1 \cdot F07/v + 1 \cdot F08/v \quad (169)$$

$$C11 = 0 \cdot F01/v + 0 \cdot F02/v + 0 \cdot F03/v + 0 \cdot F04/v + 0 \cdot F05/v + 0 \cdot F06/v + 1 \cdot F07/v + 1 \cdot F08/v \quad (170)$$

$$C12 = 0 \cdot F01/v + 0 \cdot F02/v + 0 \cdot F03/v + 0 \cdot F04/v + 0 \cdot F05/v + 0 \cdot F06/v + 0 \cdot F07/v + 1 \cdot F08/v \quad (171)$$

Equations (160) through (171) can be expressed by equation (172).

$$Cj = \sum_{i=01}^{08} aij \cdot Fi/v \quad (172)$$

In equation (172), j designates the position of the pixel. In this example, j has one of the values from 1 to 12. In equation (172), i designates the position of the foreground value. In this example, i has one of the values from 1 to 8. In equation (172), aij has the value 0 or 1 according to the values of i and j.

Equation (172) can be expressed by equation (173) in consideration of the error.

$$Cj = \sum_{i=01}^{08} aij \cdot Fi/v + ej \quad (173)$$

In equation (173), ej designates the error contained in the designated pixel Cj.

Equation (173) can be modified into equation (174).

$$ej = Cj - \sum_{i=01}^{08} aij \cdot Fi/v \quad (174)$$

In order to apply the method of least squares, the square sum E of the error is defined as equation (175).

$$E = \sum_{j=01}^{12} ej^2 \quad (175)$$

In order to minimize the error, the partial differential value using the variable Fk with respect to the square sum E of the error should be 0. Fk is determined so that equation (176) is satisfied.

$$\frac{\partial E}{\partial Fk} = 2 \cdot \sum_{j=01}^{12} ej \cdot \frac{\partial ej}{\partial Fk} \quad (176)$$

$$= 2 \cdot \sum_{j=01}^{12} \left\{ \left( Cj - \sum_{i=01}^{08} aij \cdot Fi/v \right) \cdot (-akj/v) \right\} = 0$$

In equation (176), since the amount of movement v is a fixed value, equation (177) can be deduced.

$$\sum_{j=01}^{12} akj \cdot \left( Cj - \sum_{i=01}^{08} aij \cdot Fi/v \right) = 0 \quad (177)$$

To expand equation (177) and transpose the terms, equation (178) can be obtained.

$$\sum_{j=01}^{12} \left( akj \cdot \sum_{i=01}^{08} aij \cdot Fi \right) = v \sum_{j=01}^{12} akj \cdot Cj \quad (178)$$

Equation (178) is expanded into eight equations by substituting the individual integers from 1 to 8 into k in equation (178). The obtained eight equations can be expressed by one matrix equation. This equation is referred to as a "normal equation".

An example of the normal equation generated by the equation generator 803 based on the method of least squares is indicated by equation (179).

$$\begin{bmatrix} 5 & 4 & 3 & 2 & 1 & 0 & 0 & 0 \\ 4 & 5 & 4 & 3 & 2 & 1 & 0 & 0 \\ 3 & 4 & 5 & 4 & 3 & 2 & 1 & 0 \\ 2 & 3 & 4 & 5 & 4 & 3 & 2 & 1 \\ 1 & 2 & 3 & 4 & 5 & 4 & 3 & 2 \\ 0 & 1 & 2 & 3 & 4 & 5 & 4 & 3 \\ 0 & 0 & 1 & 2 & 3 & 4 & 5 & 4 \\ 0 & 0 & 0 & 1 & 2 & 3 & 4 & 5 \end{bmatrix} \begin{bmatrix} F01 \\ F02 \\ F03 \\ F04 \\ F05 \\ F06 \\ F07 \\ F08 \end{bmatrix} = v \cdot \begin{bmatrix} \sum_{i=08}^{12} Ci \\ \sum_{i=07}^{11} Ci \\ \sum_{i=06}^{10} Ci \\ \sum_{i=05}^{09} Ci \\ \sum_{i=04}^{08} Ci \\ \sum_{i=03}^{07} Ci \\ \sum_{i=02}^{06} Ci \\ \sum_{i=01}^{05} Ci \end{bmatrix} \quad (179)$$

When equation (179) is expressed by A·F=v·C, C, A, and v are known, and F is unknown. A and v are known when the model is formed, while C becomes known when the pixel value is input in the addition processing.

By calculating the foreground components according to the normal equation based on the method of least squares, the error contained in the pixel C can be distributed.

The equation generator 803 supplies the normal equation generated as discussed above to the adder 804.

The adder 804 sets, based on the unit of processing supplied from the unit-of-processing determining portion 801, the pixel value C contained in the foreground component image in the matrix equation supplied from the equation generator 803. The adder 804 supplies the matrix in which the pixel value C is set to a calculator 805.

The calculator 805 calculates the foreground component Fi/v from which motion blur is eliminated by the processing based on a solution, such as a sweep-out method (Gauss-Jordan elimination), so as to obtain Fi corresponding to i indicating one of the integers from 1 to 8, which is the pixel value from which motion blur is eliminated. The calculator 805 then outputs the foreground component image consisting of the pixel values Fi without motion blur, such as that in FIG. 83, to a motion-blur adder 806 and a selector 807.

Figure 83:
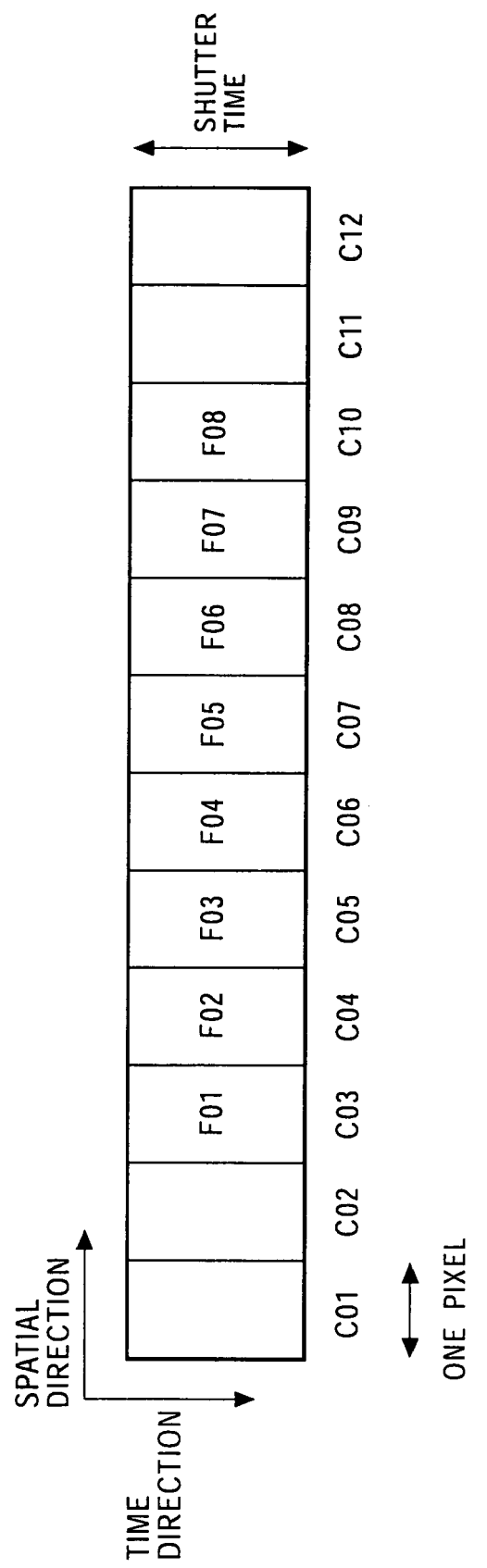
FIG. 83 illustrates a model in which the pixel values of a foreground component image are expanded in the time direction and the period corresponding to the shutter time is divided.

In the foreground component image without motion blur shown in FIG. 83, the reason for setting F01 through F08 in C03 through C10, respectively, is not to change the position of the foreground component image with respect to the screen. However, F01 through F08 may be set in any desired positions.

Figure 84:
FIG. 84 illustrates a model in which the pixel values of a foreground component image are expanded in the time direction and the period corresponding to the shutter time is divided.

The motion-blur adder 806 is able to adjust the amount of motion blur by adding the amount v' by which motion blur is adjusted, which is different from the amount of movement v, for example, the amount v' by which motion blur is adjusted, which is one half the value of the amount of movement v, or the amount v' by which motion blur is adjusted, which is irrelevant to the amount of movement v. For example, as shown in FIG. 84, the motion-blur adder 806 divides the foreground pixel value Fi without motion blur by the amount v' by which motion blur is adjusted so as to obtain the foreground component Fi/v'. The motion-blur adder 806 then calculates the sum of the foreground components Fi/v', thereby generating the pixel value in which the amount of motion blur is adjusted. For example, when the amount v' by which motion blur is adjusted is 3, the pixel value C02 is set to (F01)/v', the pixel value C3 is set to (F01+F02)/v', the pixel value C04 is set to (F01+F02+F03)/v', and the pixel value C05 is set to (F02+F03+F04)/v'.

The motion-blur adder 806 supplies the foreground component image in which the amount of motion blur is adjusted to a selector 807.

The selector 807 selects one of the foreground component image without motion blur supplied from the calculator 805 and the foreground component image in which the amount of motion blur is adjusted supplied from the motion-blur adder 806 based on a selection signal reflecting a user's selection, and outputs the selected foreground component image.

As discussed above, the motion-blur adjusting unit 106 is able to adjust the amount of motion blur based on the selection signal and the amount v' by which motion blur is adjusted.

Figure 85:
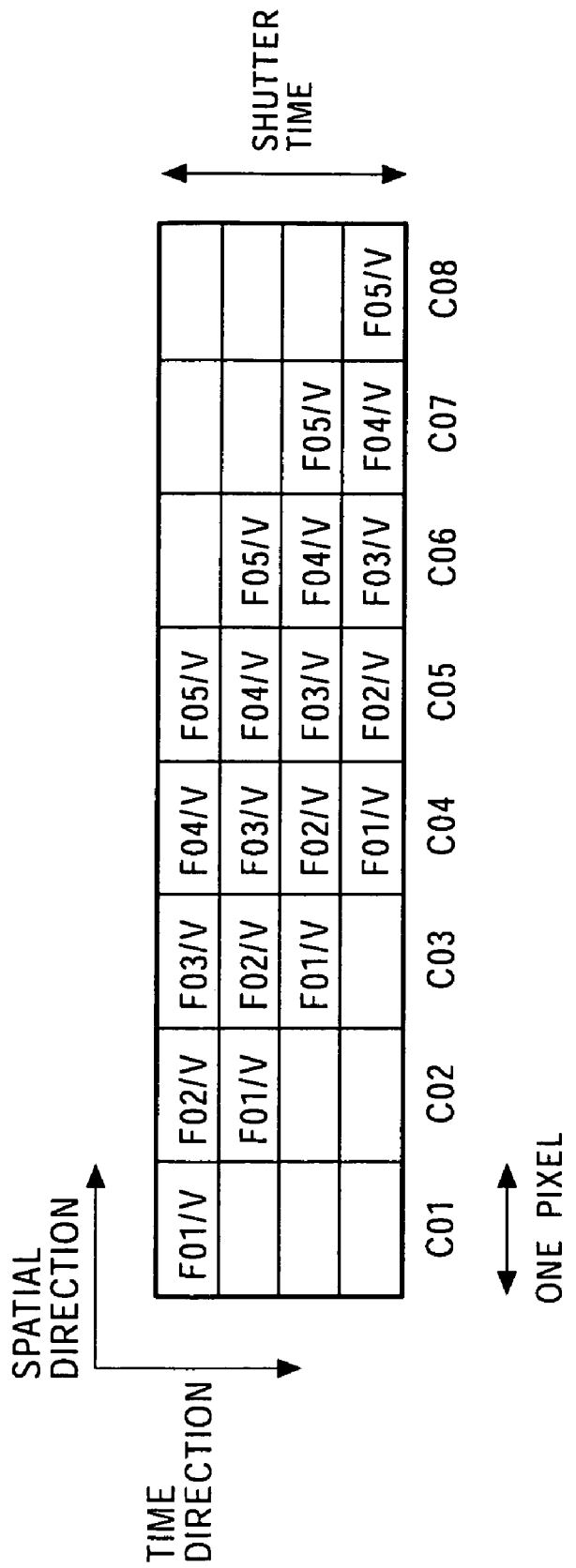
FIG. 85 illustrates a model in which the pixel values of a foreground component image are expanded in the time direction and the period corresponding to the shutter time is divided.

Also, for example, when the number of pixels corresponding to the unit of processing is 8, and the amount of movement v is 4, as shown in FIG. 85, the motion-blur adjusting unit 106 generates a matrix equation expressed by equation (180).

$$\begin{bmatrix} 4 & 3 & 2 & 1 & 0 \\ 3 & 4 & 3 & 2 & 1 \\ 2 & 3 & 4 & 3 & 2 \\ 1 & 2 & 3 & 4 & 3 \\ 0 & 1 & 2 & 3 & 4 \end{bmatrix} \begin{bmatrix} F01 \\ F02 \\ F03 \\ F04 \\ F05 \end{bmatrix} = v \cdot \begin{bmatrix} \sum_{i=05}^{08} Ci \\ \sum_{i=04}^{07} Ci \\ \sum_{i=03}^{06} Ci \\ \sum_{i=02}^{05} Ci \\ \sum_{i=01}^{04} Ci \end{bmatrix} \quad (180)$$

In this manner, the motion-blur adjusting unit 106 calculates Fi, which is the pixel value in which the amount of motion blur is adjusted, by setting up the equation in accordance with the length of the unit of processing. Similarly, for example, when the number of pixels contained in the unit of processing is 100, the equation corresponding to 100 pixels is generated so as to calculate Fi.

Figure 86:
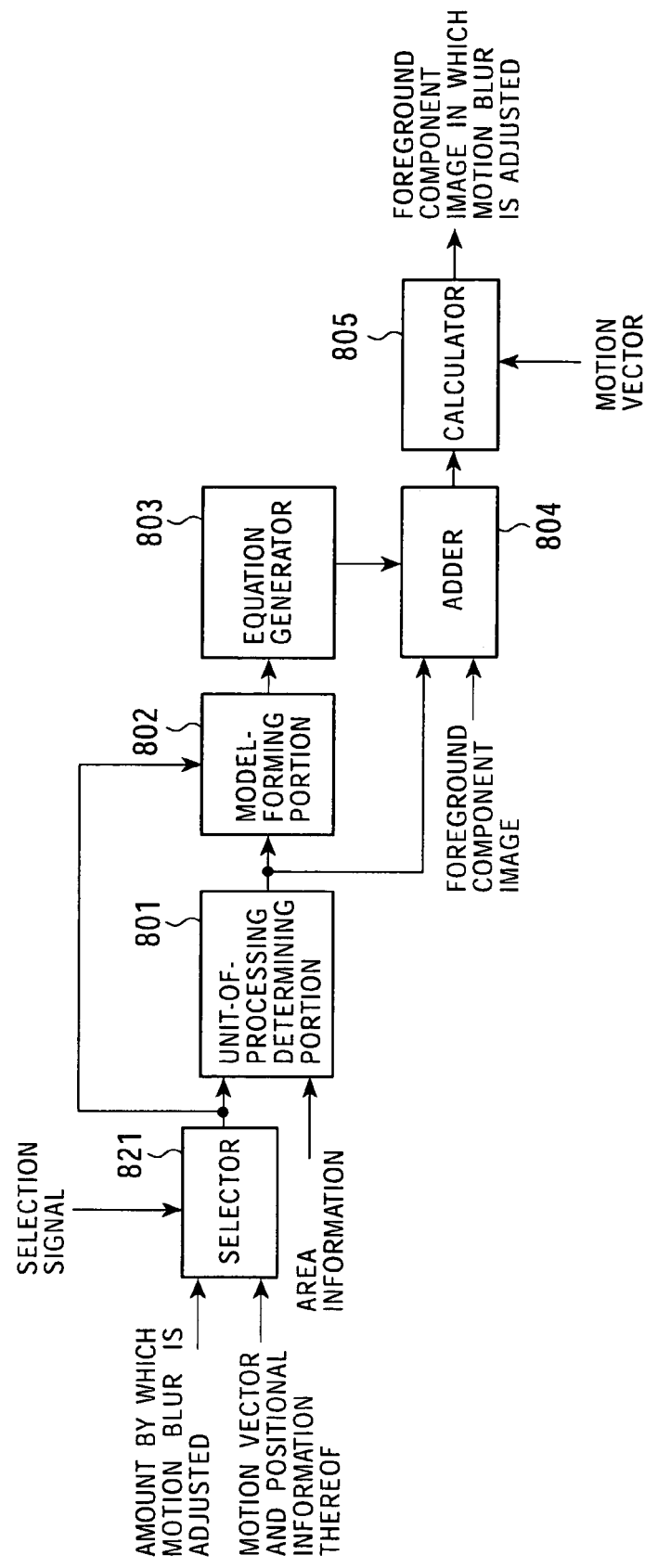
FIG. 86 illustrates an example of another configuration of the motion-blur adjusting unit 106.

FIG. 86 illustrates an example of another configuration of the motion-blur adjusting unit 106. The same elements as those shown in FIG. 80 are designated with like reference numerals, and an explanation thereof is thus omitted.

Based on a selection signal, a selector 821 directly supplies an input motion vector and a positional signal thereof to the unit-of-processing determining portion 801 and the model-forming portion 802. Alternatively, the selector 821 may substitute the magnitude of the motion vector by the amount v' by which motion blur is adjusted, and then supplies the motion vector and the positional signal thereof to the unit-of-processing determining portion 801 and the model-forming unit 802.

With this arrangement, the unit-of-processing determining portion 801 through the calculator 805 of the motion-blur adjusting unit 106 shown in FIG. 86 are able to adjust the amount of motion blur in accordance with the amount of movement v and the amount v' by which motion blur is adjusted. For example, when the amount of movement is 5, and the amount v' by which motion blur is adjusted is 3, the unit-of-processing determining portion 801 through the calculator 805 of the motion-blur adjusting unit 106 shown in FIG. 86 execute computation on the foreground component image in which the amount of movement v is 5 shown in FIG. 82 according to the model shown in FIG. 84 in which the amount v' by which motion blur is adjusted is 3. As a result, the image containing motion blur having the amount of movement v of (amount of movement v)/(amount v' by which motion blur is adjusted)=5/3, i.e., about 1.7 is obtained. In this case, the calculated image does not contain motion blur corresponding to the amount of movement v of 3. Accordingly, it should be noted that the relationship between the amount of movement v and the amount v' by which motion blur is adjusted is different from the result of the motion-blur adder 806.

As discussed above, the motion-blur adjusting unit 106 generates the equation in accordance with the amount of movement v and the unit of processing, and sets the pixel values of the foreground component image in the generated equation, thereby calculating the foreground component image in which the amount of motion blur is adjusted.

Figure 87:
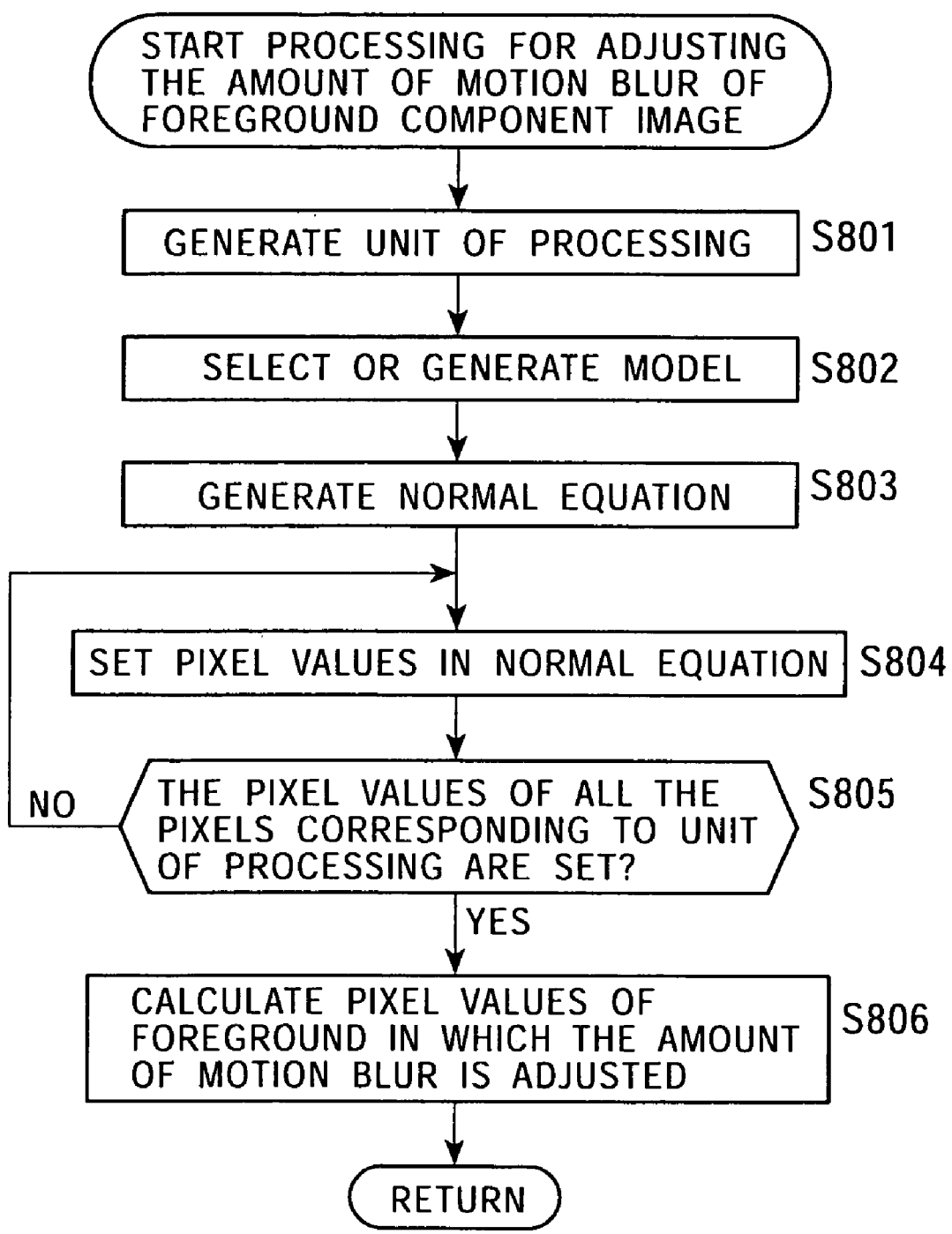
FIG. 87 is a flowchart illustrating the processing for adjusting the amount of motion blur contained in a foreground component image performed by the motion-blur adjusting unit 106.

The processing for adjusting the amount of motion blur contained in the foreground component image executed by the motion-blur adjusting unit 106 is described below with reference to the flowchart of FIG. 87.

In step S801, the unit-of-processing determining portion 801 of the motion-blur adjusting unit 106 generates the unit of processing based on the motion vector and the area information, and supplies the generated unit of processing to the model-forming portion 802.

In step S802, the model-forming portion 802 of the motion-blur adjusting unit 106 selects or generates the model in accordance with the amount of movement v and the unit of processing. In step S803, the equation generator 803 generates the normal equation based on the selected model.

In step S804, the adder 804 sets the pixel values of the foreground component image in the generated normal equation. In step S805, the adder 804 determines whether the pixel values of all the pixels corresponding to the unit of processing are set. If it is determined that the pixel values of all the pixels corresponding to the unit of processing are not yet set, the process returns to step S804, and the processing for setting the pixel values in the normal equation is repeated.

If it is determined in step S805 that the pixel values of all the pixels corresponding to the unit of processing are set, the process proceeds to step S806. In step S806, the calculator 805 calculates the pixel values of the foreground in which the amount of motion blur is adjusted based on the normal equation in which the pixel values are set supplied from the adder 804. The processing is then completed.

As discussed above, the motion-blur adjusting unit 106 is able to adjust the amount of motion blur of the foreground image containing motion blur based on the motion vector and the area information.

That is, it is possible to adjust the amount of motion blur contained in the pixel values, that is, contained in sampled data.

As is seen from the foregoing description, the signal processor 12 shown in FIG. 4 is able to adjust the amount of motion blur contained in the input image. The signal processor 12 configured as shown in FIG. 4 is able to calculate the mixture ratio α, which is embedded information, and outputs the calculated mixture ratio α.

Figure 88:
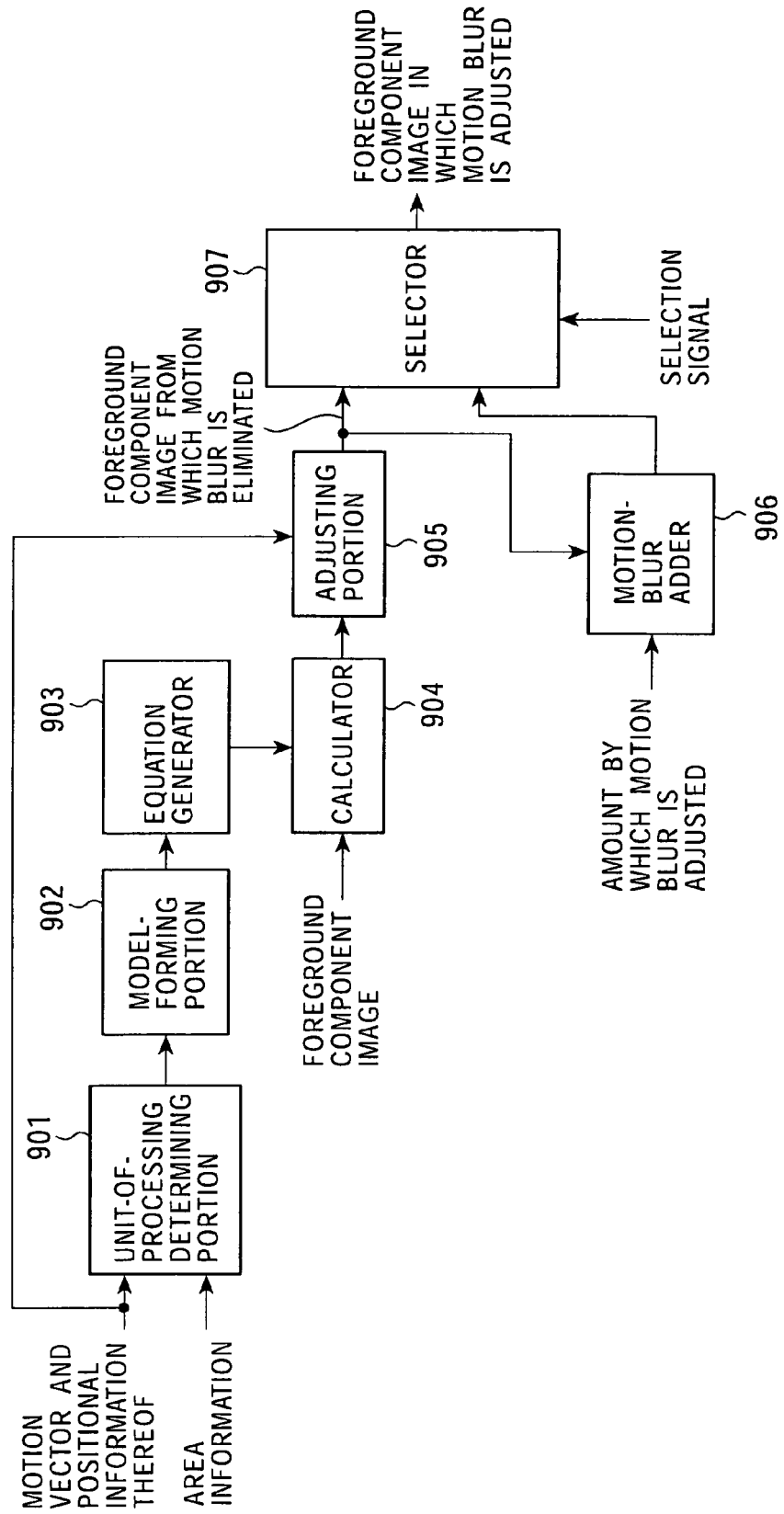
FIG. 88 is a block diagram illustrating an example of another configuration of the motion-blur adjusting unit 106.

FIG. 88 is a block diagram illustrating another example of the configuration of the motion-blur adjusting unit 106. The motion vector and the positional information thereof supplied from the motion detector 102 are supplied to a unit-of-processing determining portion 901 and an adjusting portion 905. The area information supplied from the area specifying unit 103 is supplied to the unit-of-processing determining portion 901. The foreground component image supplied from the foreground/background separator 105 is supplied to a calculator 904.

The unit-of-processing determining portion 901 supplies, together with the motion vector, the unit of processing generated based on the motion vector and the positional information thereof and the area information to a model-forming portion 902.

The model-forming portion 902 forms a model based on the motion vector and the input unit of processing.

An equation generator 903 generates an equation based on the model supplied from the model-forming portion 902.

Figure 89:
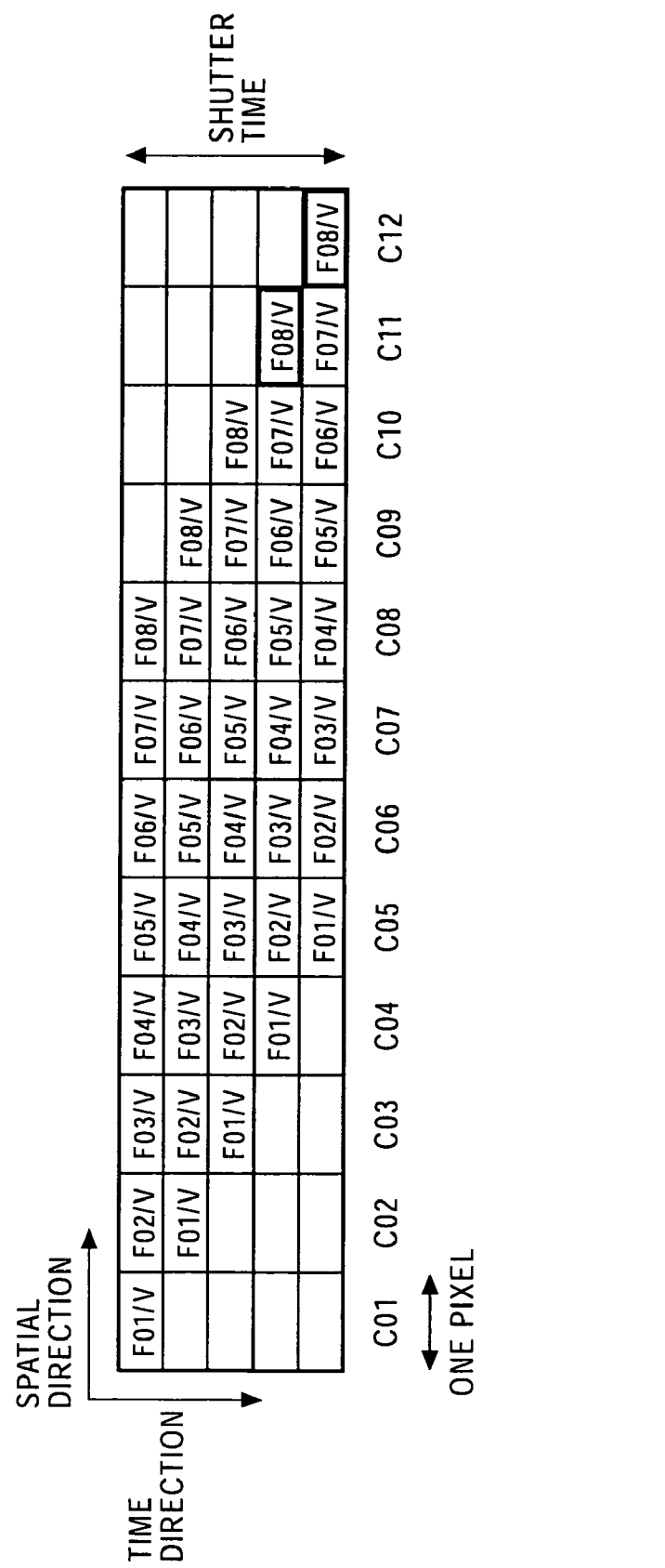
FIG. 89 illustrates an example of a model in which the relationships between pixel values and foreground components are indicated.
Figure 90:
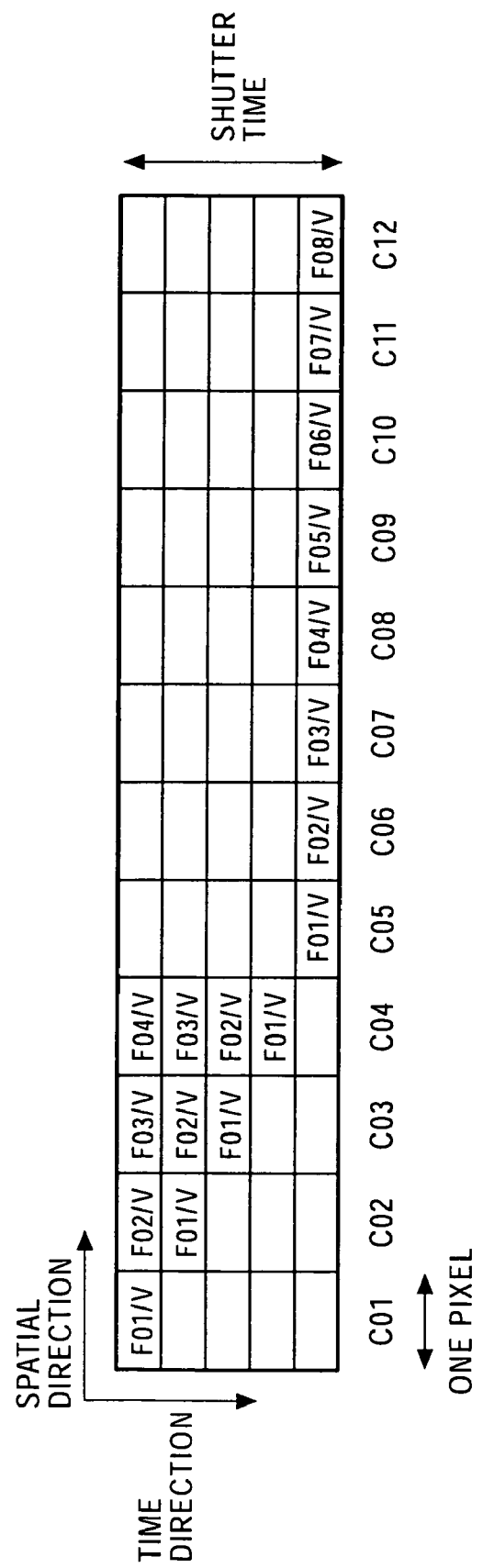
FIG. 90 illustrates the calculation of foreground components.
Figure 91:
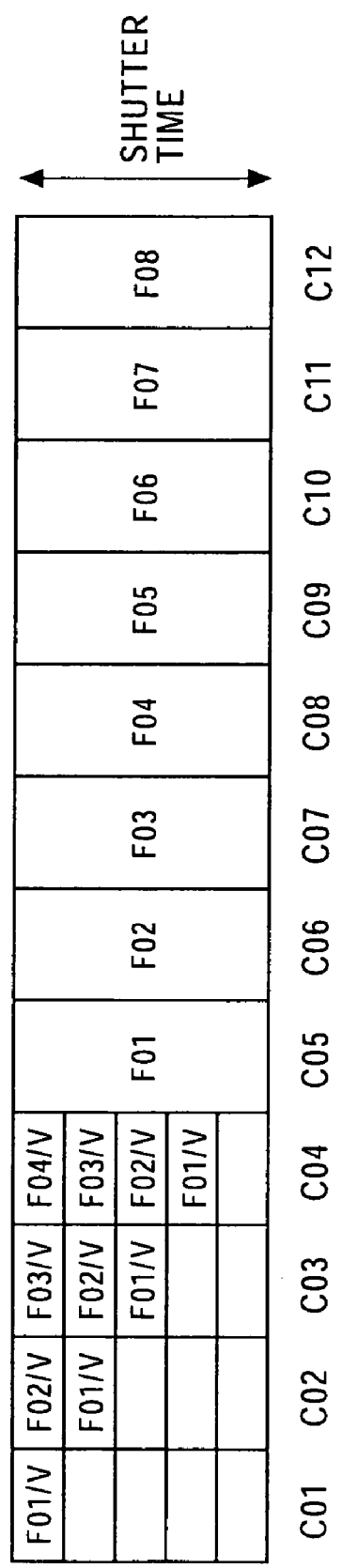
FIG. 91 illustrates the calculation of foreground components.

A description is now given, with reference to the models of foreground component images shown in FIGS. 89 through 91, of an example of the equation generated by the equation generator 903 when the number of foreground components is 8, the number of pixels corresponding to the unit of processing is 12, and the amount of movement v is 5.

When the foreground components contained in the foreground component image corresponding to the shutter time/v are F01/v through F08/v, the relationships between F01/v through F08/v and pixel values C01 through C12 can be expressed by equations (148) through (159), as stated above.

By considering the pixel values C12 and C11, the pixel value C12 contains only the foreground component F08/v, as expressed by equation (181), and the pixel value C11 consists of the product sum of the foreground component F08/v and the foreground component F07/v. Accordingly, the foreground component F07/v can be found by equation (182).

$$F08/v = C12 \tag{181}$$

$$F07/v = C11 - C12 \tag{182}$$

Similarly, by considering the foreground components contained in the pixel values C10 through C01, the foreground components F06/v through F01/v can be found by equations (183) through (188), respectively.

$$F06/v = C10 - C11 \tag{183}$$

$$F05/v = C09 - C10 \tag{184}$$

$$F04/v = C08 - C09 \tag{185}$$

$$F03/v = C07 - C08 + C12 \tag{186}$$

$$F02/v = C06 - C07 + C11 - C12 \tag{187}$$

$$F01/v = C05 - C06 + C10 - C11 \tag{188}$$

The equation generator 903 generates the equations for calculating the foreground components by the difference between the pixel values, as indicated by the examples of equations (181) through (188). The equation generator 903 supplies the generated equations to the calculator 904.

The calculator 904 sets the pixel values of the foreground component image in the equations supplied from the equation generator 903 so as to obtain the foreground components based on the equations in which the pixel values are set. For example, when equations (181) through (188) are supplied from the equation generator 903, the calculator 904 sets the pixel values C05 through C12 in equations (181) through (188).

The calculator 904 calculates the foreground components based on the equations in which the pixel values are set. For example, the calculator 904 calculates the foreground components F01/v through F08/v, as shown in FIG. 90, based on the calculations of equations (181) through (188) in which the pixel values C05 through C12 are set. The calculator 904 supplies the foreground components F01/v through F08/v to the adjusting portion 905.

The adjusting portion 905 multiplies the foreground components supplied from the calculator 904 by the amount of movement v contained in the motion vector supplied from the unit-of-processing determining portion 901 so as to obtain the foreground pixel values from which motion blur is eliminated. For example, when the foreground components F01/v through F08/v are supplied from the calculator 904, the adjusting portion 905 multiples each of the foreground components F01/v through F08/v by the amount of movement v, i.e., 5, so as to obtain the foreground pixel values F01 through F08 from which motion blur is eliminated, as shown in FIG. 91.

The adjusting portion 905 supplies the foreground component image consisting of the foreground pixel values without motion blur calculated as described above to a motion-blur adder 906 and a selector 907.

The motion-blur adder 906 is able to adjust the amount of motion blur by using the amount v' by which motion blur is adjusted, which is different from the amount of movement v, for example, the amount v' by which motion blur is adjusted, which is one half the value of the amount of movement v, or the amount v' by which motion blur is adjusted, which is irrelevant to the amount of movement v. For example, as shown in FIG. 84, the motion-blur adder 906 divides the foreground pixel value Fi without motion blur by the amount v' by which motion blur is adjusted so as to obtain the foreground component Fi/v'. The motion-blur adder 906 then calculates the sum of the foreground components Fi/v', thereby generating the pixel value in which the amount of motion blur is adjusted. For example, when the amount v' by which motion blur is adjusted is 3, the pixel value C02 is set to (F01)/v', the pixel value C3 is set to (F01+F02)/v', the pixel value C04 is set to (F01+F02+F03)/v', and the pixel value C05 is set to (F02+F03+F04)/v'.

The motion-blur adder 906 supplies the foreground component image in which the amount of motion blur is adjusted to the selector 907.

The selector 907 selects either the foreground component image without motion blur supplied from the adjusting portion 905 or the foreground component image in which the amount of motion blur is adjusted supplied from the motion-blur adder 906 based on a selection signal reflecting a user's selection, and outputs the selected foreground component image.

As discussed above, the motion-blur adjusting unit 106 is able to adjust the amount of motion blur based on the selection signal and the amount v' by which motion blur is adjusted.

Figure 92:
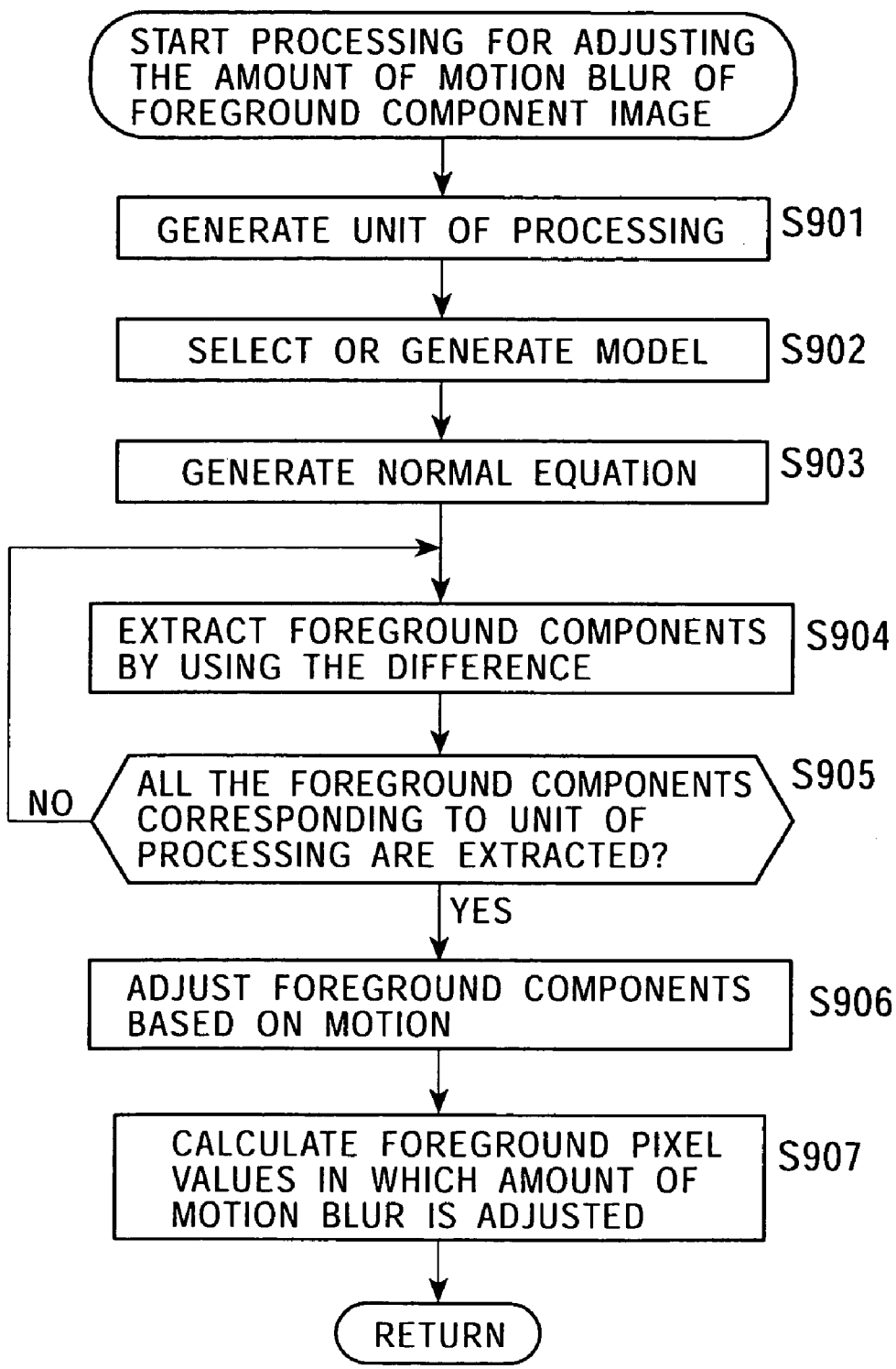
FIG. 92 is a flowchart illustrating the processing for eliminating motion blur contained in a foreground.

The processing for adjusting the amount of motion blur of the foreground executed by the motion-blur adjusting unit 106 configured as shown in FIG. 88 is described below with reference to the flowchart of FIG. 92.

In step S901, the unit-of-processing determining portion 901 of the motion-blur adjusting unit 106 generates the unit of processing based on the motion vector and the area information, and supplies the generated unit of processing to the model-forming portion 902 and the adjusting portion 905.

In step S902, the model-forming portion 902 of the motion-blur adjusting unit 106 selects or generates the model according to the amount of movement v and the unit of processing. In step S903, the equation generator 903 generates, based on the selected or generated model, the equations for calculating the foreground components by the difference between the pixel values of the foreground component image.

In step S904, the calculator 904 sets the pixel values of the foreground component image in the generated equations, and extracts the foreground components by using the difference between the pixel values based on the equations in which the pixel values are set. In step S905, the calculator 904 determines whether all the foreground components corresponding to the unit of processing have been extracted. If it is determined that all the foreground components corresponding to the unit of processing have not been extracted, the process returns to step S904, and the processing for extracting the foreground components is repeated.

If it is determined in step S905 that all the foreground components corresponding to the unit of processing have been extracted, the process proceeds to step S906. In step S906, the adjusting portion 905 adjusts each of the foreground components F01/v through F08/v supplied from the calculator 904 based on the amount of movement v so as to obtain the foreground pixel values F01/v through F08/v from which motion blur is eliminated.

In step S907, the motion-blur adder 906 calculates the foreground pixel values in which the amount of motion blur is adjusted, and the selector 907 selects the image without motion blur or the image in which the amount of motion blur is adjusted, and outputs the selected image. The processing is then completed.

As described above, the motion-blur adjusting unit 106 configured as shown in FIG. 88 is able to more speedily adjust motion blur of the foreground image containing motion blur according to simpler computations.

A known technique for partially eliminating motion blur, such as a Wiener filter, is effective when being used in the ideal state, but is not sufficient for an actual image quantized and containing noise. In contrast, it is proved that the motion-blur adjusting unit 106 configured as shown in FIG. 88 is sufficiently effective for an actual image quantized and containing noise. It is thus possible to eliminate motion blur with high precision.

Figure 93:
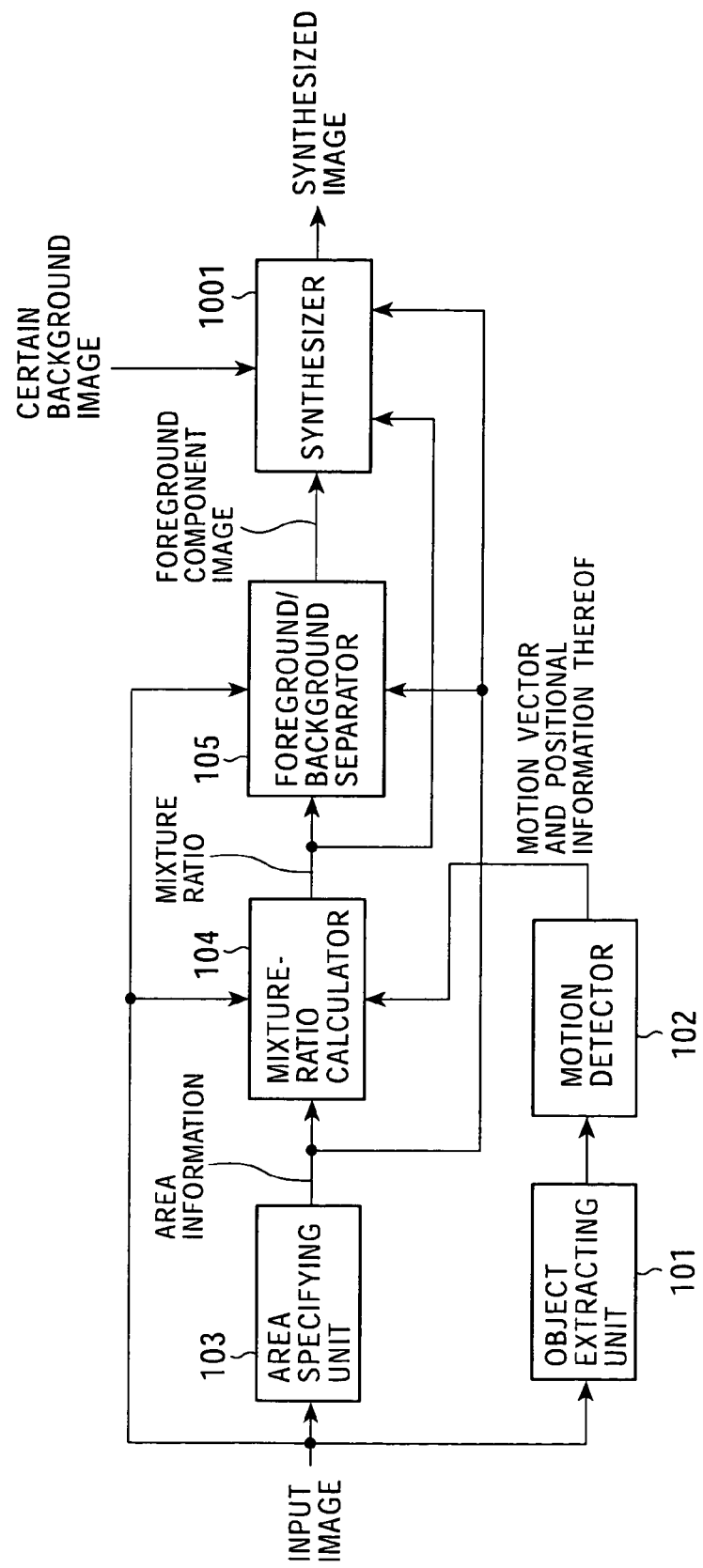
FIG. 93 is a block diagram illustrating another configuration of the function of the signal processor 12.

FIG. 93 is a block diagram illustrating another configuration of the function of the signal processor 12 when the mixture-ratio calculator 104 has the configuration shown in FIG. 63.

The elements similar to those shown in FIG. 4 are designated with like reference numerals, and an explanation thereof is thus omitted.

The area specifying unit 103 supplies area information to the mixture-ratio calculator 104 and a synthesizer 1001. The mixture-ratio calculator 104 supplies the mixture ratio α to the foreground/background separator 105 and the synthesizer 1001.

The foreground/background separator 105 supplies the foreground component image to the synthesizer 1001.

The synthesizer 1001 combines a certain background image with the foreground component image supplied from the foreground/background separator 105 based on the mixture ratio α supplied from the mixture-ratio calculator 104 and the area information supplied from the area specifying unit 103, and outputs the synthesized image in which the certain background image and the foreground component image are combined.

Figure 94:
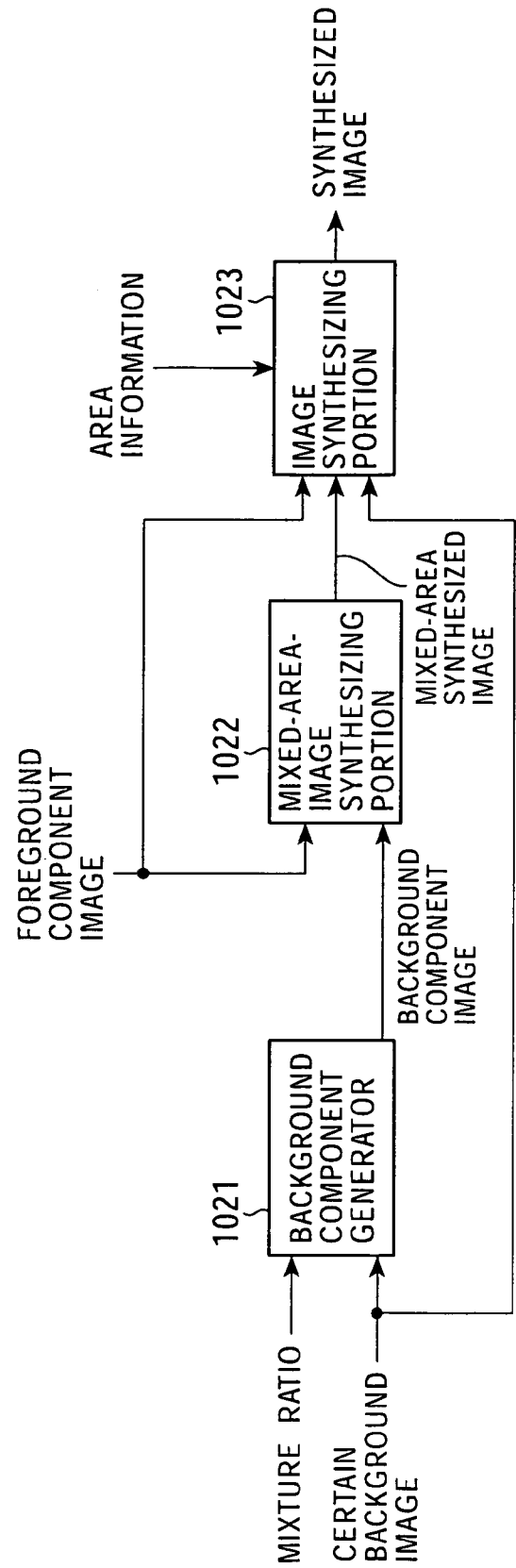
FIG. 94 illustrates the configuration of a synthesizer 1001.

FIG. 94 illustrates the configuration of the synthesizer 1001. A background component generator 1021 generates a background component image based on the mixture ratio α and a certain background image, and supplies the background component image to a mixed-area-image synthesizing portion 1022.

The mixed-area-image synthesizing portion 1022 combines the background component image supplied from the background component generator 1021 with the foreground component image so as to generate a mixed-area synthesized image, and supplies the generated mixture-area synthesized image to an image synthesizing portion 1023.

The image synthesizer 1023 combines the foreground component image, the mixed-area synthesized image supplied from the mixed-area-image synthesizing portion 1022, and the certain background image based on the area information so as to generate a synthesized image, and outputs it.

As discussed above, the synthesizer 1001 is able to combine the foreground component image with a certain background image.

The image obtained by combining a foreground component image with a certain background image based on the mixture ratio α, which is the feature quantity, appears more natural compared to an image obtained by simply combining pixels.

Figure 95:
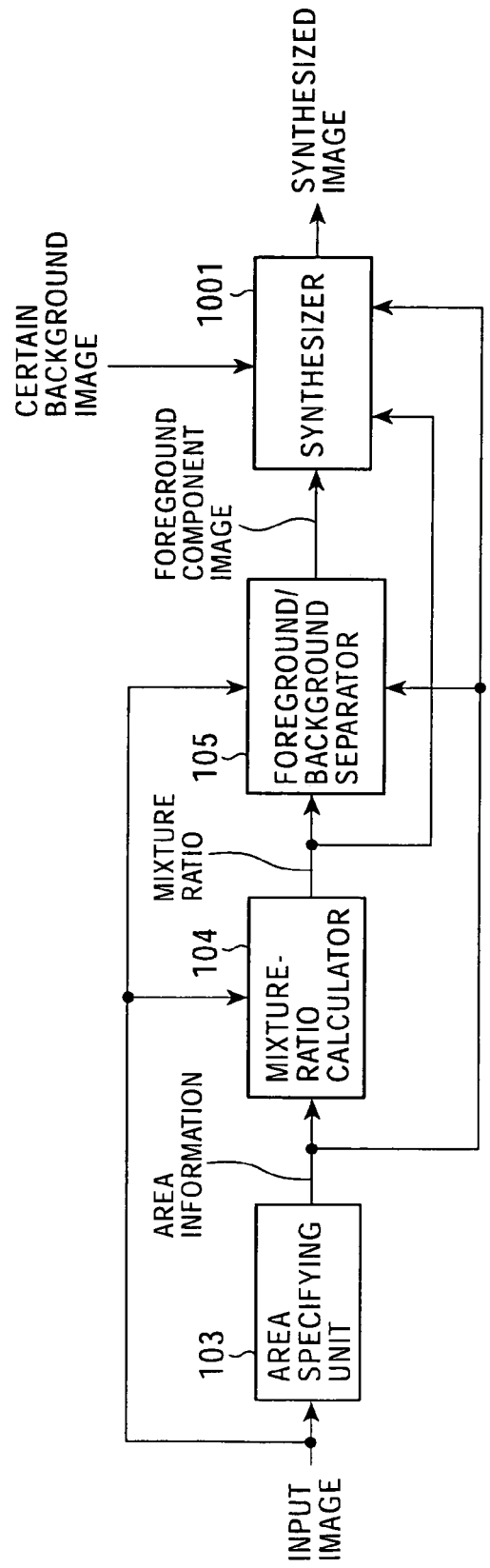
FIG. 95 is a block diagram illustrating another configuration of the function of the signal processor 12.

FIG. 95 is a block diagram illustrating another configuration of the function of the signal processor 12 when the mixture-ratio calculator 104 has the configuration shown in FIG. 49.

The elements similar to those shown in FIG. 4 are designated with like reference numerals, and an explanation thereof is thus omitted.

The area specifying unit 103 supplies area information to the mixture-ratio calculator 104 and a synthesizer 1001.

The mixture-ratio calculator 104 supplies the mixture ratio α to the foreground/background separator 105 and the synthesizer 1001.

The foreground/background separator 105 supplies the foreground component image to the synthesizer 1001.

The synthesizer 1001 combines a certain background image with the foreground component image supplied from the foreground/background separator 105 based on the mixture ratio α supplied from the mixture-ratio calculator 104 and the area information supplied from the area specifying unit 103, and outputs the synthesized image in which the certain background image and the foreground component image are combined.

Figure 96:
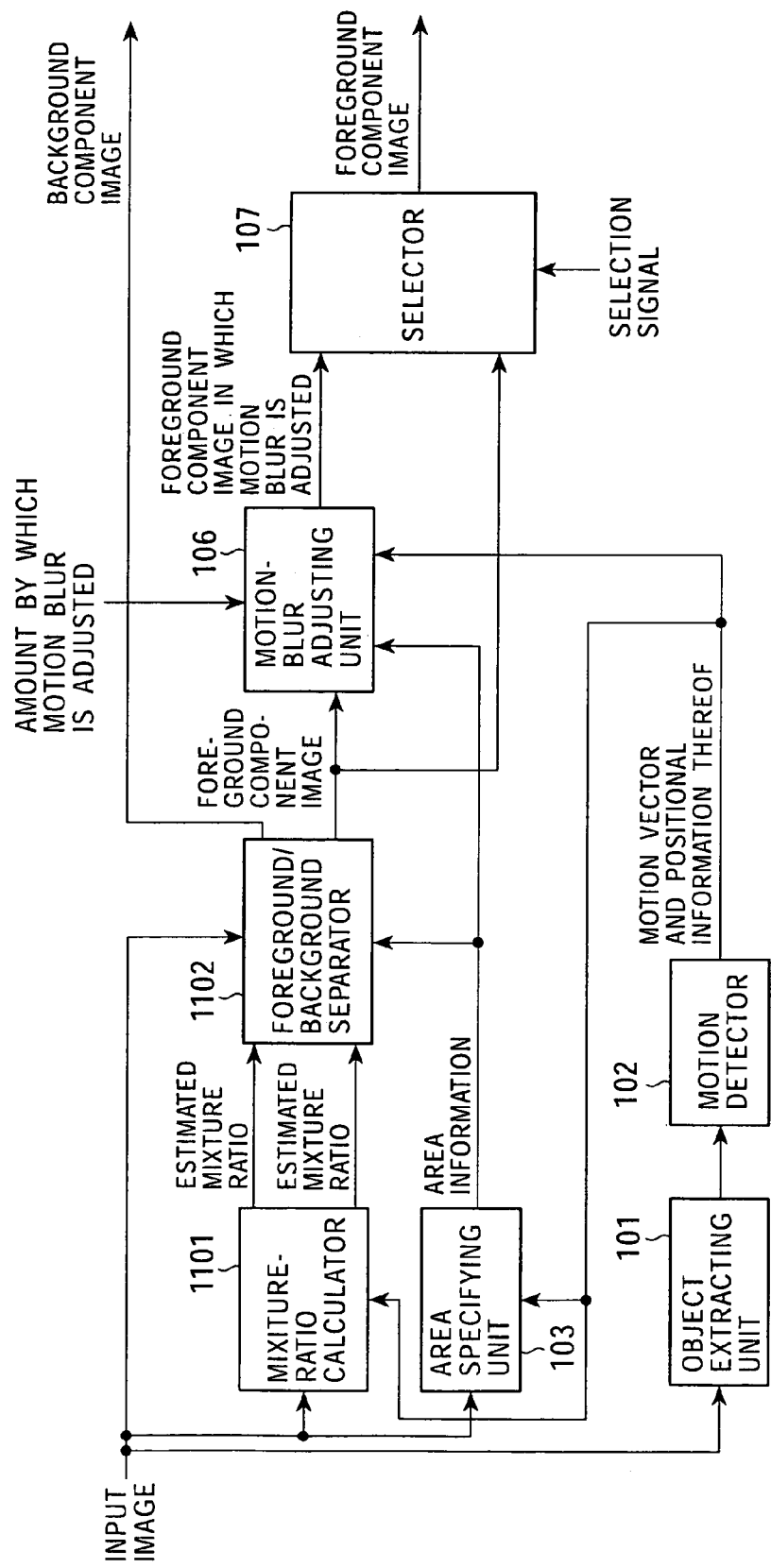
FIG. 96 is a block diagram illustrating still another configuration of the function of the signal processor 12.

FIG. 96 is a block diagram illustrating still another configuration of the function of the signal processor 12 for adjusting the amount of motion blur. The signal processor 12 shown in FIG. 4 sequentially performs the area-specifying operation and the calculation for the mixture ratio α. In contrast, the signal processor 12 shown in FIG. 96 simultaneously performs the area-specifying operation and the calculation for the mixture ratio α.

The functional elements similar to those in the block diagram of FIG. 4 are designated with like reference numerals, and an explanation thereof is thus omitted.

An input image is supplied to a mixture-ratio calculator 1101, a foreground/background separator 1102, the area specifying unit 103, and the object extracting unit 101.

The mixture-ratio calculator 1101 calculates, based on the input image, the estimated mixture ratio when it is assumed that each pixel contained in the input image belongs to the covered background area, and the estimated mixture ratio when it is assumed that each pixel contained in the input image belongs to the uncovered background area, and supplies the estimated mixture ratios calculated as described above to the foreground/background separator 1102.

Figure 97:
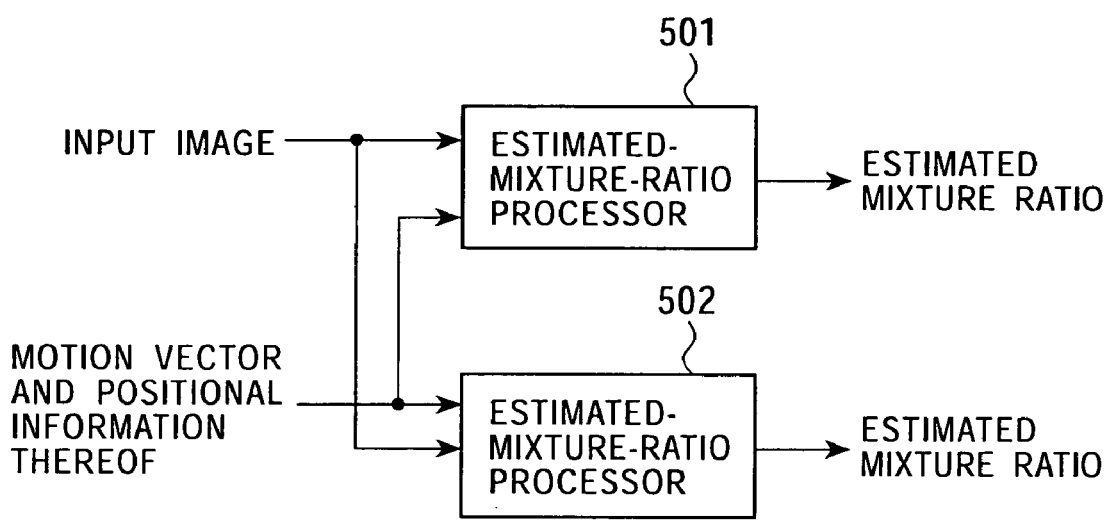
FIG. 97 is a block diagram illustrating the configuration of a mixture-ratio calculator 1101.

FIG. 97 is a block diagram illustrating an example of the configuration of the mixture-ratio calculator 1101 shown in FIG. 96.

An estimated-mixture-ratio processor 501 shown in FIG. 97 is the same as the estimated-mixture-ratio processor 501 shown in FIG. 63. An estimated-mixture-ratio processor 502 shown in FIG. 97 is the same as the estimated-mixture-ratio processor 402 shown in FIG. 63.

The estimated-mixture-ratio processor 501 calculates the estimated mixture ratio for each pixel by the computation corresponding to a model of the covered background area based on the input image, and outputs the calculated estimated mixture ratio.

The estimated-mixture-ratio processor 502 calculates the estimated mixture ratio for each pixel by the computation corresponding to a model of the uncovered background area based on the input image, and outputs the calculated estimated mixture ratio.

The foreground/background separator 1102 generates the foreground component image from the input image based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and supplies the generated foreground component image to the motion-blur adjusting unit 106 and the selector 107.

Figure 98:
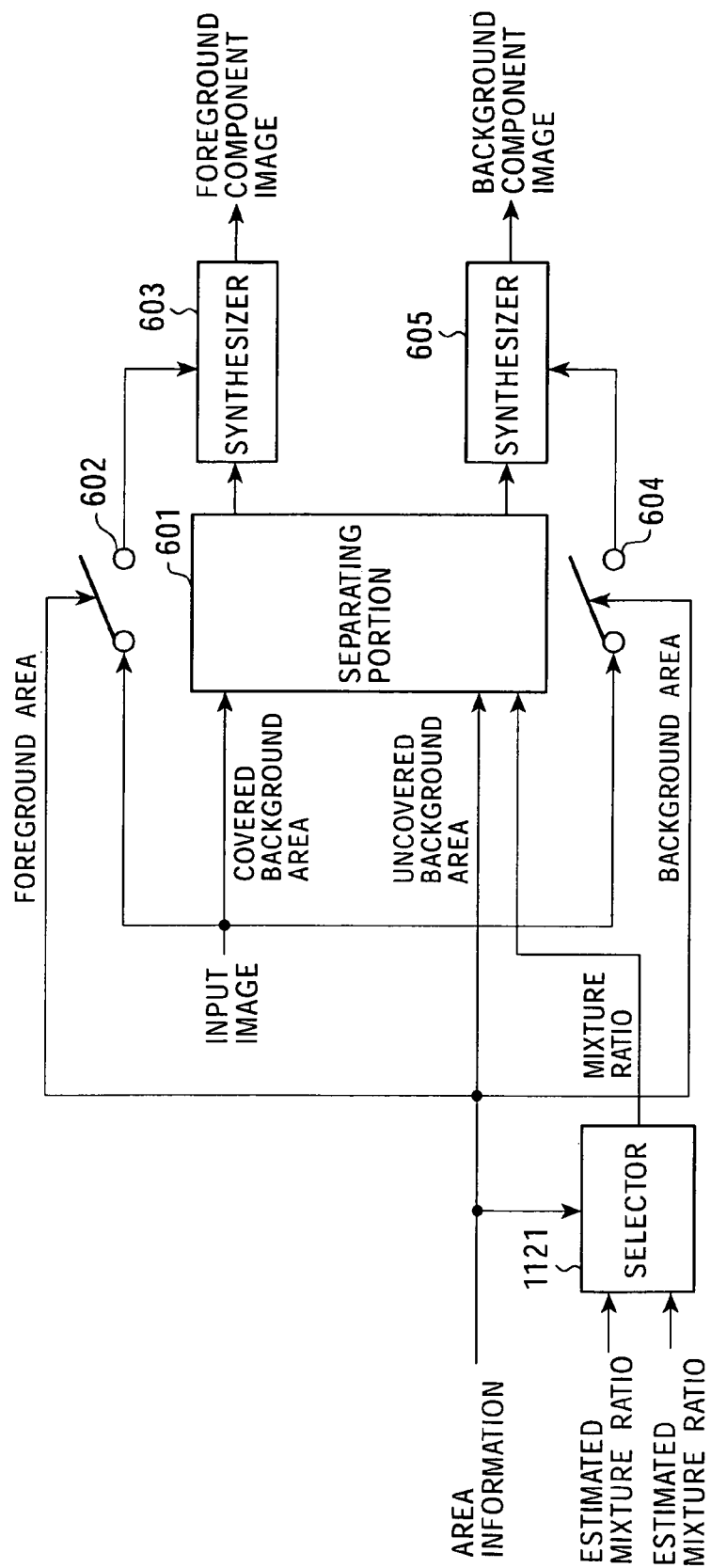
FIG. 98 is a block diagram illustrating the configuration of a foreground/background separator 1102.

FIG. 98 is a block diagram illustrating an example of the configuration of the foreground/background separator 1102.

The elements similar to those of the foreground/background separator 105 shown in FIG. 72 are indicated by like reference numerals, and an explanation thereof is thus omitted.

A selector 1121 selects, based on the area information supplied from the area specifying unit 103, either the estimated mixture ratio calculated when it is assumed that the pixel belongs to the covered background area supplied from the mixture-ratio calculator 1101 or the estimated mixture ratio calculated when it is assumed that the pixel belongs to the uncovered background area supplied from the mixture-ratio calculator 1101, and supplies the selected estimated mixture ratio to the separating portion 601 as the mixture ratio α.

The separating portion 601 extracts the foreground components and the background components from the pixel values of the pixels belonging to the mixed area based on the mixture ratio α supplied from the selector 1121 and the area information, and supplies the extracted foreground components to the synthesizer 603 and also supplies the foreground components to the synthesizer 605.

The separating portion 601 can be configured similarly to the counterpart shown in FIG. 77.

The synthesizer 603 synthesizes the foreground component image and outputs it. The synthesizer 605 synthesizes the background component image and outputs it.

The motion-blur adjusting unit 106 shown in FIG. 96 can be configured similarly to the counterpart shown in FIG. 4. The motion-blur adjusting unit 106 adjusts the amount of motion blur contained in the foreground component image supplied from the foreground/background separator 1102 based on the area information and the motion vector, and outputs the foreground component image in which the amount of motion blur is adjusted.

The selector 107 shown in FIG. 96 selects the foreground component image supplied from the foreground/background separator 1102 or the foreground component image in which the amount of motion blur is adjusted supplied from the motion-blur adjusting unit 106 based on, for example, a selection signal reflecting a user's selection, and outputs the selected foreground component image.

As discussed above, the signal processor 12 shown in FIG. 96 is able to adjust the amount of motion blur contained in an image corresponding to a foreground object of the input image, and outputs the resulting foreground object image. The signal processor 12 having the configuration shown in FIG. 96 is able to calculate the mixture ratio $\alpha$, which is embedded information, and outputs the calculated mixture ratio $\alpha$.

Figure 99:
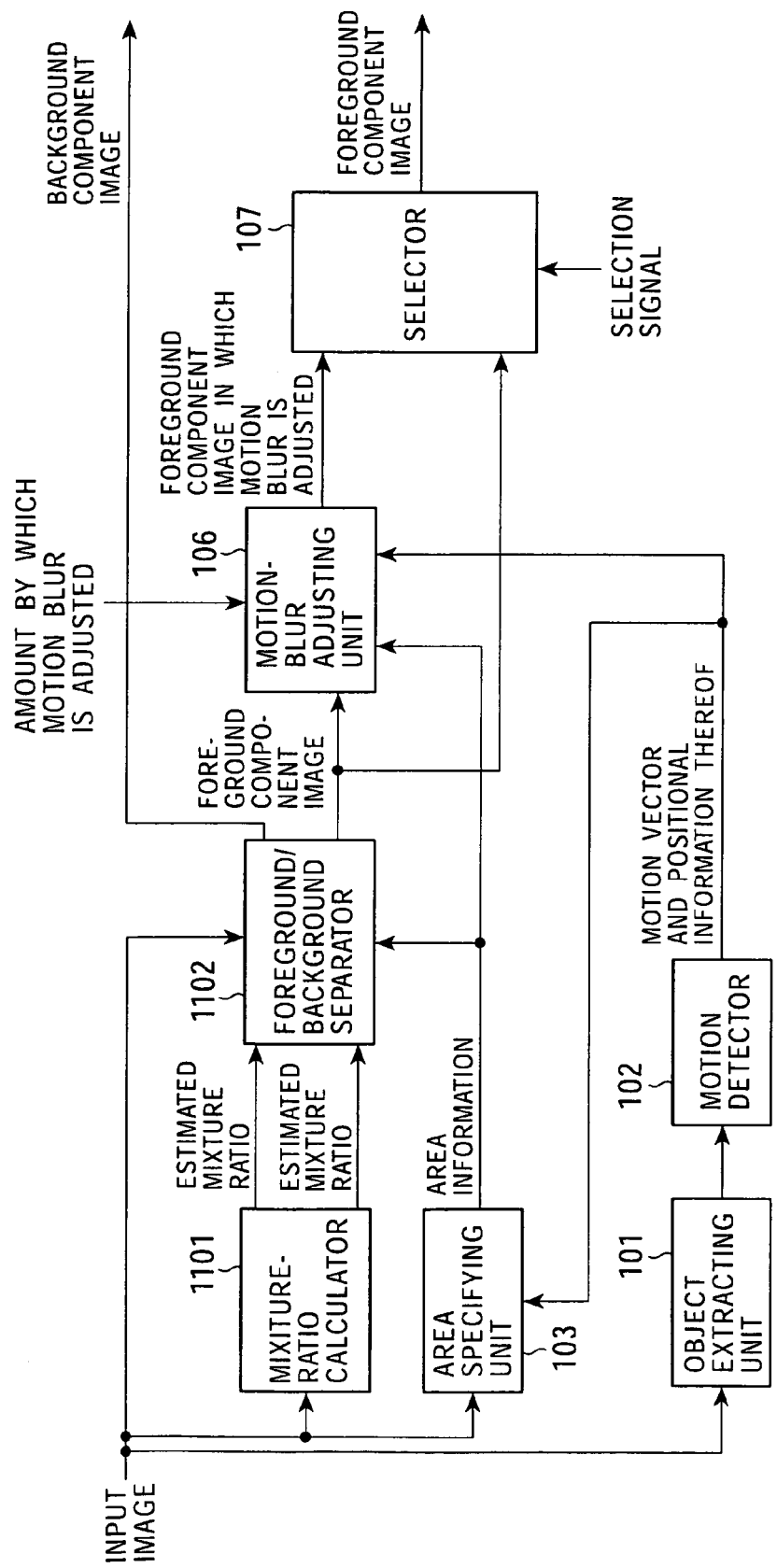
FIG. 99 is a block diagram illustrating still another configuration of the function of the signal processor 12.

FIG. 99 is a block diagram illustrating still another configuration of the function of the signal processor 12 for adjusting the amount of motion blur. The signal processor 12 shown in FIG. 4 sequentially performs the area-specifying operation and the calculation for the mixture ratio $\alpha$. In contrast, the signal processor 12 shown in FIG. 99 simultaneously performs the area-specifying operation and the calculation for the mixture ratio $\alpha$.

The functional elements similar to those in the block diagram of FIG. 4 are designated with like reference numerals, and an explanation thereof is thus omitted.

An input image is supplied to a mixture-ratio calculator 1101, a foreground/background separator 1102, the area specifying unit 103, and the object extracting unit 101.

The mixture-ratio calculator 1101 calculates, based on the input image, the estimated mixture ratio when it is assumed that each pixel contained in the input image belongs to the covered background area, and the estimated mixture ratio when it is assumed that each pixel contained in the input image belongs to the uncovered background area, and supplies the estimated mixture ratios calculated as described above to the foreground/background separator 1102.

Figure 100:
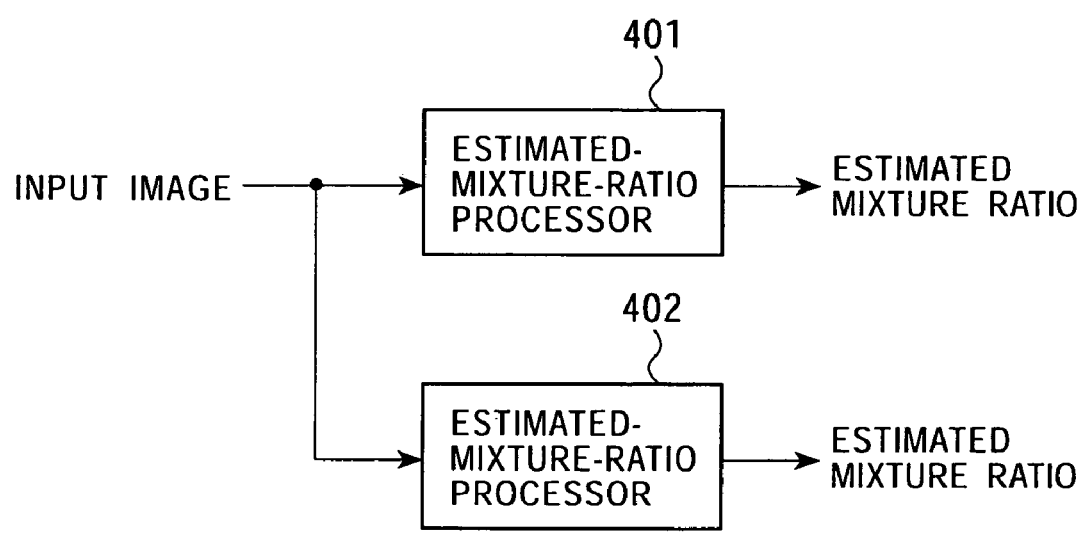
FIG. 100 is a block diagram illustrating the configuration of a mixture-ratio calculator 1101.

FIG. 100 is a block diagram illustrating an example of the configuration of the mixture-ratio calculator 1101 shown in FIG. 99.

An estimated-mixture-ratio processor 401 shown in FIG. 100 is the same as the estimated-mixture-ratio processor 401 shown in FIG. 49. An estimated-mixture-ratio processor 402 shown in FIG. 100 is the same as the estimated-mixture-ratio processor 402 shown in FIG. 49.

The estimated-mixture-ratio processor 401 calculates the estimated mixture ratio for each pixel by the computation corresponding to a model of the covered background area based on the input image, and outputs the calculated estimated mixture ratio.

The estimated-mixture-ratio processor 402 calculates the estimated mixture ratio for each pixel by the computation corresponding to a model of the uncovered background area based on the input image, and outputs the calculated estimated mixture ratio.

The foreground/background separator 1102 generates the foreground component image from the input image based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and supplies the generated foreground component image to the motion-blur adjusting unit 106 and the selector 107.

The motion-blur adjusting unit 106 shown in FIG. 99 can be configured similarly to the counterpart shown in FIG. 4. The motion-blur adjusting unit 106 adjusts the amount of motion blur contained in the foreground component image supplied from the foreground/background separator 1102 based on the area information and the motion vector, and outputs the foreground component image in which the amount of motion blur is adjusted.

The selector 107 shown in FIG. 99 selects the foreground component image supplied from the foreground/background separator 1102 or the foreground component image in which the amount of motion blur is adjusted supplied from the motion-blur adjusting unit 106 based on, for example, a selection signal reflecting a user's selection, and outputs the selected foreground component image.

As discussed above, the signal processor 12 shown in FIG. 99 is able to adjust the amount of motion blur contained in an image corresponding to a foreground object of the input image, and outputs the resulting foreground object image. The signal processor 12 having the configuration shown in FIG. 99 is able to calculate the mixture ratio $\alpha$, which is embedded information, and outputs the calculated mixture ratio $\alpha$.

Figure 101:
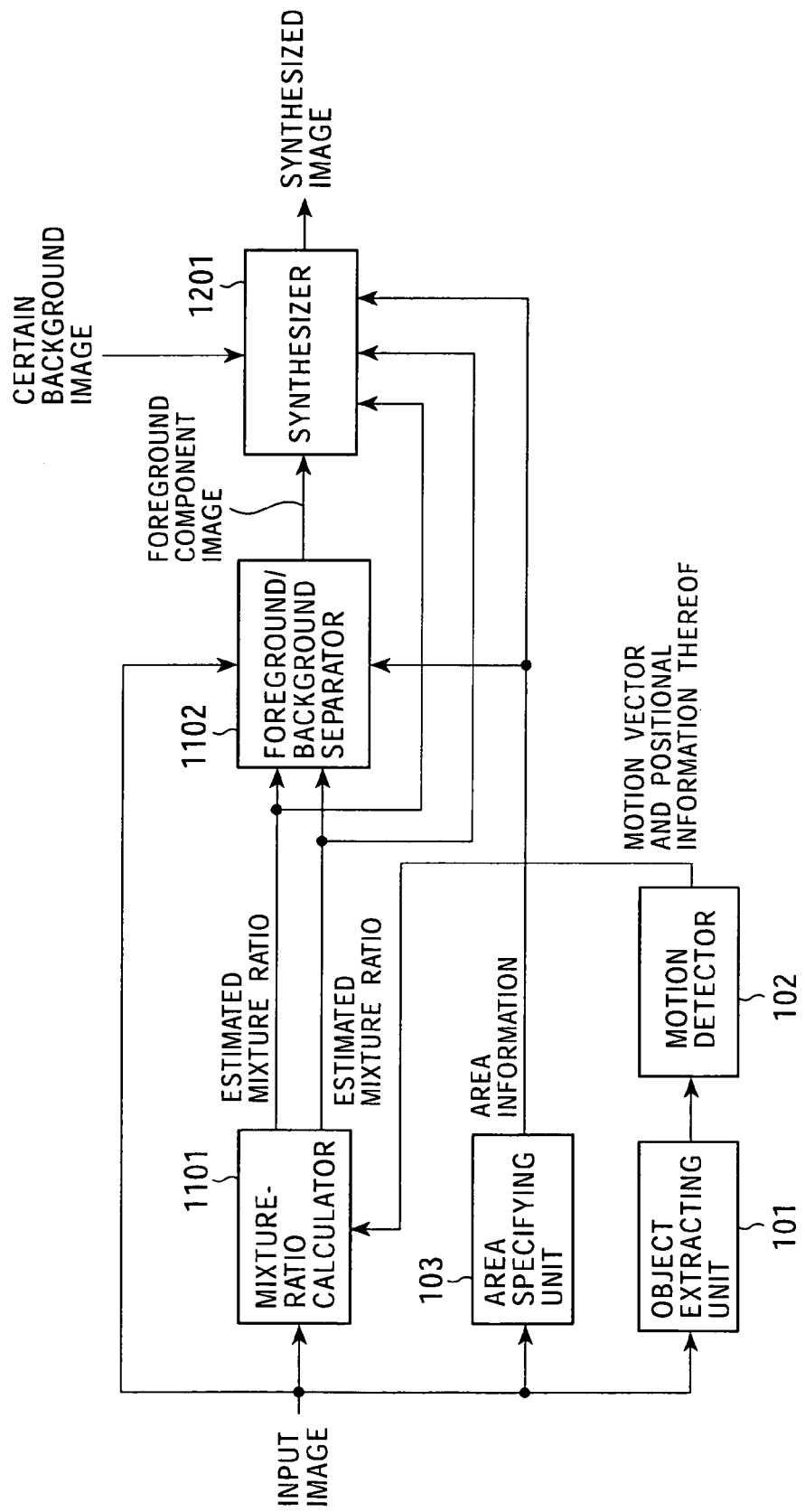
FIG. 101 is a block diagram illustrating still another configuration of the function of the signal processor 12.

FIG. 101 is a block diagram illustrating another configuration of the function of the signal processor 12 for combining a foreground component image with a certain background image. The signal processor 12 shown in FIG. 93 serially performs the area-specifying operation and the calculation for the mixture ratio $\alpha$. In contrast, the signal processor 12 shown in FIG. 101 performs the area-specifying operation and the calculation for the mixture ratio $\alpha$ in a parallel manner.

The functional elements similar to those indicated by the block of FIG. 96 are indicated by like reference numerals, and an explanation thereof is thus omitted.

The mixture-ratio calculator 1101 shown in FIG. 101 calculates, based on the input image, the estimated mixture ratio when it is assumed that each pixel contained in the input image belongs to the covered background area, and the estimated mixture ratio when it is assumed that each pixel contained in the input image belongs to the uncovered background area, and supplies the estimated mixture ratios calculated as described above to the foreground/background separator 1102 and a synthesizer 1201.

The mixture-ratio calculator 1101 shown in FIG. 101 can be configured as shown in FIG. 97.

The foreground/background separator 1102 shown in FIG. 101 generates the foreground component image from the input image based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and supplies the generated foreground component image to the synthesizer 1201.

The synthesizer 1201 combines a certain background image with the foreground component image supplied from the foreground/background separator 1102 based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and outputs the synthesized image in which the background image and the foreground component image are combined.

Figure 102:
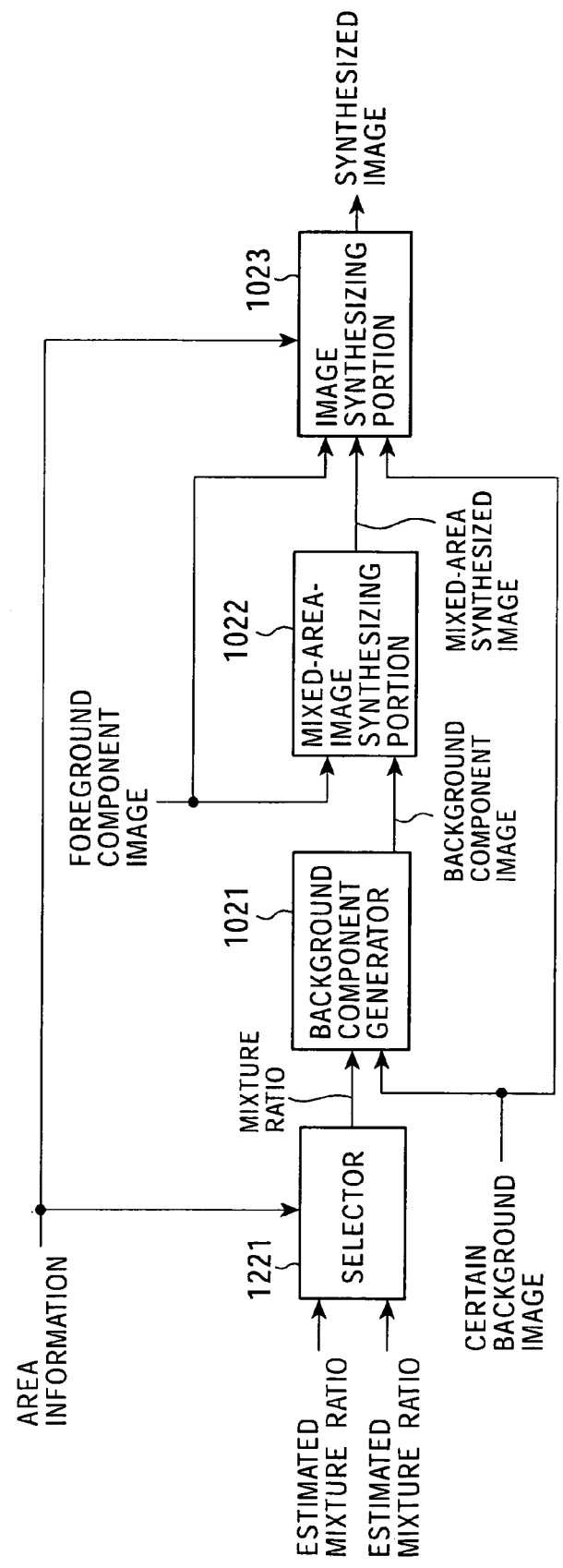
FIG. 102 illustrates the configuration of a synthesizer 1201.

FIG. 102 illustrates the configuration of the synthesizer 1201. The functional elements similar to those of the block diagram of FIG. 94 are designated with like reference numerals, and explanation thereof is thus omitted.

A selector 1221 selects, based on the area information supplied from the area specifying unit 103, either the estimated mixture ratio calculated when it is assumed that the pixel belongs to the covered background area supplied from the mixture-ratio calculator 1101 or the estimated mixture ratio calculated when it is assumed that the pixel belongs to the uncovered background area supplied from the mixture-ratio calculator 1101, and supplies the selected estimated mixture ratio to the background component generator 1021 as the mixture ratio α.

The background component generator 1021 shown in FIG. 102 generates a background component image based on the mixture ratio α supplied from the selector 1221 and a certain background image, and supplies the background component image to the mixed-area-image synthesizing portion 1022.

The mixed-area-image synthesizing portion 1022 shown in FIG. 102 combines the background component image supplied from the background component generator 1021 with the foreground component image so as to generate a mixed-area synthesized image, and supplies the generated mixed-area synthesized image to the image synthesizing portion 1023.

The image synthesizing portion 1023 combines the foreground component image, the mixed-area synthesized image supplied from the mixed-area-image synthesizing portion 1022, and the background image based on the area information so as to generate a synthesized image and outputs it.

In this manner, the synthesizer 1201 is able to combine the foreground component image with a certain background image.

Figure 103:
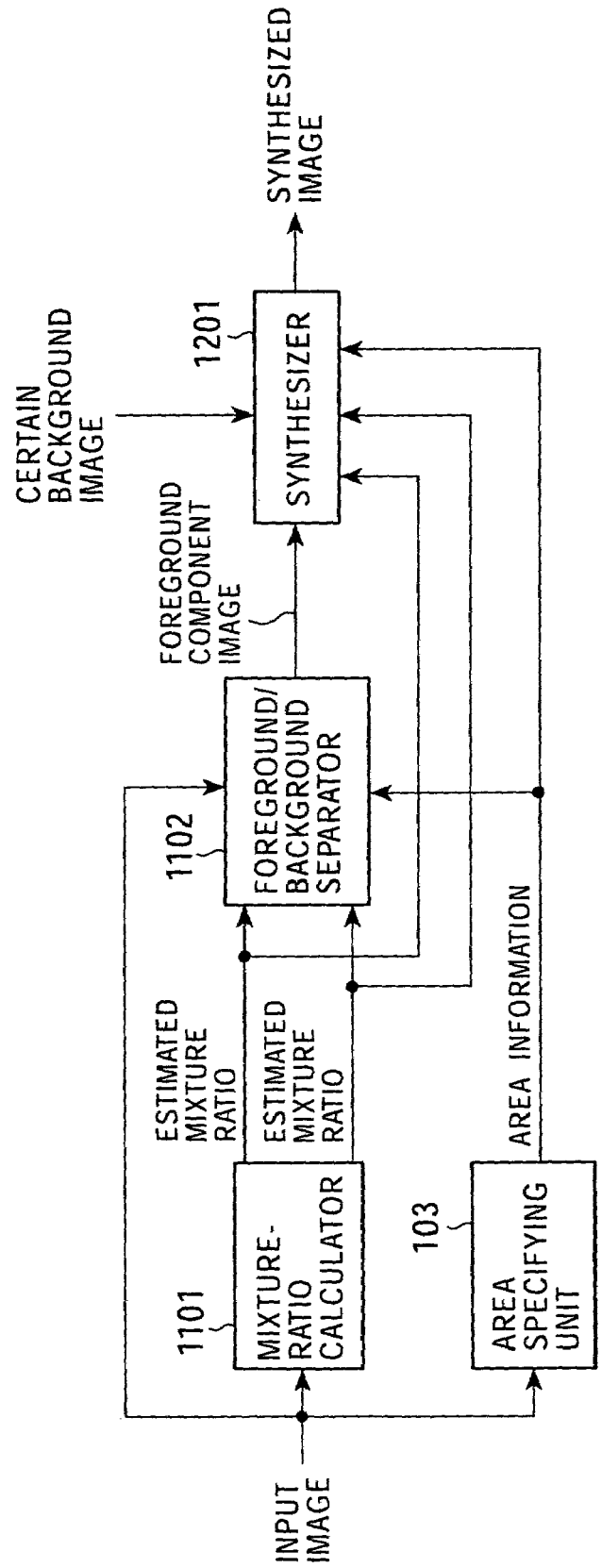
FIG. 103 is a block diagram illustrating still another configuration of the function of the signal processor 12.

FIG. 103 is a block diagram illustrating another configuration of the function of the signal processor 12 for combining a foreground component image with a certain background image. The signal processor 12 shown in FIG. 95 serially performs the area-specifying operation and the calculation for the mixture ratio α. In contrast, the signal processor 12 shown in FIG. 103 performs the area-specifying operation and the calculation for the mixture ratio α in a parallel manner.

The functional elements similar to those indicated by the block of FIG. 99 are indicated by like reference numerals, and an explanation thereof is thus omitted.

The mixture-ratio calculator 1101 shown in FIG. 103 calculates, based on the input image, the estimated mixture ratio when it is assumed that each pixel contained in the input image belongs to the covered background area, and the estimated mixture ratio when it is assumed that each pixel contained in the input image belongs to the uncovered background area, and supplies the estimated mixture ratios calculated as described above to the foreground/background separator 1102 and a synthesizer 1201.

The mixture-ratio calculator 1101 shown in FIG. 103 can be configured as shown in FIG. 100.

The foreground/background separator 1102 shown in FIG. 103 generates the foreground component image from the input image based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and supplies the generated foreground component image to the synthesizer 1201.

The synthesizer 1201 combines a certain background image with the foreground component image supplied from the foreground/background separator 1102 based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and outputs the synthesized image in which the background image and the foreground component image are combined.

As described above, according to the present invention, the mixture ratio indicating the mixture state of a plurality of objects, such as a background object and a moving object image, can be detected.

The embodiment has been discussed above by setting the mixture ratio α to the ratio of the background components contained in the pixel values. However, the mixture ratio α may be set to the ratio of the foreground components contained in the pixel values.

The embodiment has been discussed above by setting the moving direction of the foreground object to the direction from the left to the right. However, the moving direction is not restricted to the above-described direction.

In the above description, a real-space image having a three-dimensional space and time axis information is projected onto a time space having a two-dimensional space and time axis information by using a video camera. However, the present invention is not restricted to this example, and can be applied to the following case. When a greater amount of first information in one-dimensional space is projected onto a smaller amount of second information in a two-dimensional space, distortion generated by the projection can be corrected, significant information can be extracted, or a more natural image can be synthesized.

The sensor 11 is not restricted to a CCD, and may be another type of sensor, such as a solid-state image-capturing device, for example, a BBD (Bucket Brigade Device), a CID (Charge Injection Device), or a CPD (Charge Priming Device), or a CMOS (Complementary Metal Oxide Semiconductor). Also, the sensor does not have to be a sensor in which detection devices are arranged in a matrix, and may be a sensor in which detection devices are arranged in one line.

A recording medium in which a program for performing the signal processing of the present invention is recorded may be formed of a package medium in which the program is recorded, which is distributed for providing the program to a user separately from the computer, as shown in FIG. 3, such as the magnetic disk 51 (including a floppy (registered trade name) disk), the optical disc 52 (CD-ROM (Compact Disc-Read Only Memory) and a DVD (Digital Versatile Disc)), the magneto-optical disk 53 (including MD (Mini-Disc) (registered trade name)), or the semiconductor memory 54. The recording medium may also be formed of the ROM 22 or a hard disk contained in the storage unit 28 in which the program is recorded, such recording medium being provided to the user while being prestored in the computer.

The steps forming the program recorded in a recording medium may be executed chronologically according to the orders described in the specification. However, they do not have to be executed in a time-series manner, and they may be executed concurrently or individually.

INDUSTRIAL APPLICABILITY

According to the first invention, the mixture ratio indicating the mixture state of a plurality of objects, such as a background image and a moving object image, can be detected.

According to the second invention, the mixture ratio indicating the mixture state of a plurality of objects, such as a background image and a moving object image, can be detected.

The invention claimed is:

1. An image processing apparatus for processing image data which is formed of a predetermined number of pixel data obtained by an image-capturing device including a predetermined number of pixels, the pixels having a time integrating function, said image processing apparatus comprising:

an extractor configured to extract, in correspondence with a designated pixel of a designated frame of the image data, mixed pixel data, which is the pixel data, in which a plurality of objects contained in the image data are mixed, from the designated frame and a peripheral frame around the designated frame in accordance with a motion of a foreground object which forms a foreground of the plurality of objects, and also to extract, in correspondence with the mixed pixel data, background pixel data, which is the pixel data, corresponding to a background object which forms a background of the plurality of objects, the background pixel data being associated with the corresponding mixed pixel data, from a frame different from the frames from which the mixed pixel data are extracted in accordance with a motion of the background object so as to generate a plurality of relational expressions indicating relationships between the mixed pixel data and the background pixel data concerning the designated pixel; and a detector configured to detect a mixture ratio indicating a mixture state of the plurality of objects in the real world concerning the designated pixel based on the relational expressions, wherein said extractor generates the plurality of relational expressions based on a first approximation in which components of the foreground object contained in the mixed pixel data change substantially linearly with respect to the positions of the pixels, and a second approximation in which the mixture ratio of the mixed pixel data extracted from the designated frame changes substantially linearly with respect to the positions of the pixels wherein the extractor and detector are implemented in hardware or a combination of hardware and software.

2. An image processing apparatus according to claim 1, further comprising a separator configured to separate the image data into a foreground object image consisting of only the foreground object components which form the foreground object in the image data and a background object image consisting of only background object components which form the background object in the image data based on the mixture ratio corresponding to the designated pixel.

3. An image processing apparatus according to claim 1, wherein said detector detects the mixture ratio by solving the plurality of relational expressions according to a method of least squares.

4. An image processing method for processing image data which is formed of a predetermined number of pixel data obtained by an image-capturing device including a predetermined number of pixels, the pixels having a time integrating function, said image processing method comprising, using a processor to perform the steps of:

a relational-expression generating step of extracting, in correspondence with a designated pixel of a designated frame of the image data, mixed pixel data, which is the pixel data, in which a plurality of objects contained in the image data are mixed, from the designated frame and a peripheral frame around the designated frame in accordance with a motion of a foreground object which forms a foreground of the plurality of objects, and also of extracting, in correspondence with the mixed pixel data, background pixel data, which is the pixel data, corresponding to a background object which forms a background of the plurality of objects, the background pixel data being associated with the corresponding mixed pixel data, from a frame different from the frames from which the mixed pixel data are extracted in accordance with a motion of the background object, so as to generate a plurality of relational expressions indicating relationships between the mixed pixel data and the background pixel data concerning the designated pixel; and a mixture-ratio detection step of detecting a mixture ratio indicating a mixture state of the plurality of objects in the real world concerning the designated pixel based on the relational expressions, wherein in said relational-expression generating step, the plurality of relational expressions are generated based on a first approximation in which components of the foreground object contained in the mixed pixel data change substantially linearly with respect to the positions of the pixels, and a second approximation in which the mixture ratio of the mixed pixel data extracted from the designated frame changes substantially linear with respect to the positions of the pixels.

5. An image processing method according to claim 4, further comprising a foreground/background separation step of separating the image data into a foreground object image consisting of only the foreground object components which form the foreground object in the image data and a background object image consisting of only background object components which form the background object in the image data based on the mixture ratio corresponding to the designated pixel.

6. An image processing method according to claim 4, wherein in said mixture-ratio detection step, the mixture ratio is detected by solving the plurality of relational expressions according to a method of least squares.

7. A computer readable medium storing a computer program used for processing image data which is formed of a predetermined number of pixel data obtained by an image-capturing device including a predetermined number of pixels, the pixels having a time integrating function, said program performing the steps of:

extracting, in correspondence with a designated pixel of a designated frame of the image data, mixed pixel data, which is the pixel data, in which a plurality of objects contained in the image data are mixed, from the designated frame and a peripheral frame around the designated frame in accordance with a motion of a foreground object which forms a foreground of the plurality of objects, and also of extracting, in correspondence with the mixed pixel data, background pixel data, which is the pixel data, corresponding to a background object which forms a background of the plurality of objects, the background pixel data being associated with the corresponding mixed pixel data, from a frame different from the frames from which the mixed pixel data are extracted in accordance with a motion of the background object, so as to generate a plurality of relational expressions indicating relationships between the mixed pixel data and the background pixel data concerning the designated pixel; and detecting a mixture ratio indicating a mixture state of the plurality of objects in the real world concerning the designated pixel based on the relational expressions, wherein in said extracting step, the plurality of relational expressions are generated based on a first approximation in which components of the foreground object contained in the mixed pixel data change substantially linearly with respect to the positions of the pixels, and a second approximation in which the mixture ratio of the mixed pixel data extracted from the designated frame changes substantially linear with respect to the positions of the pixels.

8. A computer readable medium according to claim 7, wherein said program further comprises a foreground/background separation step of separating the image data into a foreground object image consisting of only the foreground object components which form the foreground object in the image data and a background object image consisting of only background object components which form the background object in the image data based on the mixture ratio corresponding to the designated pixel.

9. A computer readable medium according to claim 7, wherein in said detecting step, the mixture ratio is detected by solving the plurality of relational expressions according to a method of least squares.

10. A program embodied in a computer readable medium to control a computer to process image data which is formed of a predetermined number of pixel data obtained by an image-capturing device including a predetermined number of pixels, the pixels having a time integrating function, said program consisting of instructions to control said computer to perform the method comprising the steps of:

extracting, in correspondence with a designated pixel of a designated frame of the image data, mixed pixel data, which is the pixel data, in which a plurality of objects contained in the image data are mixed, from the designated frame and a peripheral frame around the designated frame in accordance with a motion of a foreground object which forms a foreground of the plurality of objects, and also of extracting, in correspondence with the mixed pixel data, background pixel data, which is the pixel data, corresponding to a background object which forms a background of the plurality of objects, the background pixel data being associated with the corresponding mixed pixel data, from a frame different from the frames from which the mixed pixel data are extracted in accordance with a motion of the background object so as to generate a plurality of relational expressions indicating relationships between the mixed pixel data and the background pixel data concerning the designated pixel; and detecting a mixture ratio indicating a mixture state of the plurality of objects in the real world concerning the designated pixel based on the relational expressions, wherein in said extracting step, the plurality of relational expressions are generated based on a first approximation in which components of the foreground object contained in the mixed pixel data change substantially linearly with respect to the positions of the pixels, and a second approximation in which the mixture ratio of the mixed pixel data extracted from the designated frame changes substantially linear with respect to the positions of the pixels.

11. A program according to claim 10, further comprising instructions to control said computer to separate the image data into a foreground object image consisting of only the foreground object components which form the foreground object in the image data and a background object image consisting of only background object components which form the background object in the image data based on the mixture ratio corresponding to the designated pixel.

12. A program according to claim 10, wherein the mixture ratio is detected by solving the plurality of relational expressions according to a method of least squares.

13. An image-capturing apparatus comprising:

an image-capturing device for outputting a subject image captured by an image sensor including a predetermined number of pixels having a time integrating function as image data consisting of a predetermined number of pixel data;

an extractor for extracting, in correspondence with a designated pixel of a designated frame of the image data, mixed pixel data, which is the pixel data, in which a plurality of objects contained in the image data are mixed, from the designated frame and a peripheral frame around the designated frame in accordance with a motion of a foreground object which forms a foreground of the plurality of objects, and also for extracting, in correspondence with the mixed pixel data, background pixel data, which is the pixel data, corresponding to a background object which forms a background of the plurality of objects, the background pixel data being associated with the corresponding mixed pixel data, from a frame different from the frames from which the mixed pixel data are extracted in accordance with a motion of the background object so as to generate a plurality of relational expressions indicating relationships between the mixed pixel data and the background pixel data concerning the designated pixel; and a detector for detecting a mixture ratio indicating a mixture state of the plurality of objects in the real world concerning the designated pixel based on the relational expressions, wherein said extractor generates the plurality of relational expressions based on a first approximation in which components of the foreground object contained in the mixed pixel data change substantially linearly with respect to the positions of the pixels, and a second approximation in which the mixture ratio of the mixed pixel data extracted from the designated frame changes substantially linearly with respect to the positions of the pixels wherein the extractor and detector are implemented in hardware or a combination of hardware and software.

14. An image-capturing apparatus according to claim 13, further comprising a separator for separating the image data into a foreground object image consisting of only the foreground object components which form the foreground object in the image data and a background object image consisting of only background object components which form the background object in the image data based on the mixture ratio corresponding to the designated pixel.

15. An image-capturing apparatus according to claim 13, wherein said detector detects the mixture ratio by solving the plurality of relational expressions according to a method of least squares.

16. An image processing apparatus for processing image data which is formed of a predetermined number of pixel data obtained by an image-capturing device including a predetermined number of pixels, the pixels having a time integrating function, said image processing apparatus comprising:

an extractor configured to extract, in correspondence with a designated pixel of a designated frame of the image data, pixel data of a peripheral frame around the designated frame as background pixel data corresponding to a background object of a plurality of objects of the image data, and also to extract designated pixel data of the designated pixel and proximity pixel data of a pixel located in close proximity with the designated pixel in the designated frame so as to generate a plurality of relational expressions indicating relationships of the designated pixel data, the proximity pixel data, and the background pixel data corresponding to the designated pixel data or the proximity pixel data concerning the designated pixel; and a detector configured to detect a mixture ratio indicating a mixture state of the plurality of objects in the real world concerning the designated pixel based on the relational expressions, wherein said extractor generates the plurality of relational expressions based on an approximation in which the mixture ratio corresponding to the designated pixel and the proximity pixel is uniform wherein the extractor and detector are implemented in hardware or a combination of hardware and software.

17. An image processing apparatus according to claim 16, wherein said extractor generates the plurality of relational expressions based on an approximation in which components of a foreground object of the plurality of objects contained in the designated pixel data and the proximity pixel data are uniform.

18. An image processing apparatus according to claim 16, wherein said extractor generates the plurality of relational expressions based on an approximation in which components of a foreground object of the plurality of objects contained in the designated pixel data and the proximity pixel data change substantially linearly with respect to the positions of the pixels.

19. An image processing apparatus according to claim 16, further comprising a separator configured to separate the image data into a foreground object image consisting of only the foreground object components which form the foreground object in the image data and a background object image consisting of only background object components which form the background object in the image data based on the mixture ratio corresponding to the designated pixel.

20. An image processing apparatus according to claim 16, wherein said detector detects the mixture ratio by solving the plurality of relational expressions according to a method of least squares.

21. An image processing method for processing image data which is formed of a predetermined number of pixel data obtained by an image-capturing device including a predetermined number of pixels, the pixels having a time integrating function, said image processing method comprising, using a processor to perform the steps of:

a relational-expression generating step of extracting, in correspondence with a designated pixel of a designated frame of the image data, pixel data of a peripheral frame around the designated frame as background pixel data corresponding to a background object of a plurality of objects of the image data, and also of extracting designated pixel data of the designated pixel and proximity pixel data of a pixel located in close proximity with the designated pixel in the designated frame so as to generate a plurality of relational expressions indicating relationships of the designated pixel data, the proximity pixel data, and the background pixel data corresponding to the designated pixel data or the proximity pixel data concerning the designated pixel; and a mixture-ratio detection step of detecting a mixture ratio indicating a mixture state of the plurality of objects in the real world concerning the designated pixel based on the relational expressions, wherein in said relational-expression generating step, the plurality of relational expressions are generated based on an approximation in which the mixture ratio corresponding to the designated pixel and the proximity pixel is uniform.

22. An image processing method according to claim 21, wherein in said relational-expression generating step, the plurality of relational expressions are generated based on an approximation in which components of a foreground object of the plurality of objects contained in the designated pixel data and the proximity pixel data are uniform.

23. An image processing method according to claim 21, wherein in said relational-expression generating step, the plurality of relational expressions are generated based on an approximation in which components of a foreground object of the plurality of objects contained in the designated pixel data and the proximity pixel data change substantially linearly with respect to the positions of the pixels.

24. An image processing method according to claim 21, further comprising a foreground/background separation step of separating the image data into a foreground object image consisting of only the foreground object components which form the foreground object in the image data and a background object image consisting of only background object components which form the background object in the image data based on the mixture ratio corresponding to the designated pixel.

25. An image processing method according to claim 21, wherein in said mixture-ratio detection step, the mixture ratio is detected by solving the plurality of relational expressions according to a method of least squares.

26. A computer readable medium storing a computer program used for processing image data which is formed of a predetermined number of pixel data obtained by an image-capturing device including a predetermined number of pixels, the pixels having a time integrating function, said program performing the steps of:

extracting, in correspondence with a designated pixel of a designated frame of the image data, pixel data of a peripheral frame around the designated frame as background pixel data corresponding to a background object of a plurality of objects of the image data, and also of extracting designated pixel data of the designated pixel and proximity pixel data of a pixel located in close proximity with the designated pixel in the designated frame so as to generate a plurality of relational expressions indicating relationships of the designated pixel data, the proximity pixel data, and the background pixel data corresponding to the designated pixel data or the proximity pixel data concerning the designated pixel; and detecting a mixture ratio indicating a mixture state of the plurality of objects in the real world concerning the designated pixel based on the relational expressions, wherein in said extracting step, the plurality of relational expressions are generated based on an approximation in which the mixture ratio corresponding to the designated pixel and the proximity pixel is uniform.

27. A computer readable medium according to claim 26, wherein the plurality of relational expressions are generated based on an approximation in which components of a foreground object of the plurality of objects contained in the designated pixel data and the proximity pixel data are uniform.

28. A computer readable medium according to claim 26, wherein the plurality of relational expressions are generated based on an approximation in which components of a foreground object of the plurality of objects contained in the designated pixel data and the proximity pixel data change substantially linearly with respect to the positions of the pixels.

29. A computer readable medium according to claim 26, wherein said program further performs the step of separating the image data into a foreground object image consisting of only the foreground object components which form the foreground object in the image data and a background object image consisting of only background object components which form the background object in the image data based on the mixture ratio corresponding to the designated pixel.

30. A recording medium according to claim 26, wherein the mixture ratio is detected by solving the plurality of relational expressions according to a method of least squares.

31. A program embodied in a computer readable medium to control a computer to process image data which is formed of a predetermined number of pixel data obtained by an image-capturing device including a predetermined number of pixels, the pixels having a time integrating function, said program consisting of instructions to control said computer to perform the method comprising the steps of:
    extracting, in correspondence with a designated pixel of a designated frame of the image data, pixel data of a peripheral frame around the designated frame as background pixel data corresponding to a background object of a plurality of objects of the image data, and also of extracting designated pixel data of the designated pixel and proximity pixel data of a pixel located in close proximity with the designated pixel in the designated frame so as to generate a plurality of relational expressions indicating relationships of the designated pixel data, the proximity pixel data, and the background pixel data corresponding to the designated pixel data or the proximity pixel data concerning the designated pixel; and
    detecting a mixture ratio indicating a mixture state of the plurality of objects in the real world concerning the designated pixel based on the relational expressions, wherein in said extracting step, the plurality of relational expressions are generated based on an approximation in which the mixture ratio corresponding to the designated pixel and the proximity pixel is uniform.

32. A program according to claim 31, wherein the plurality of relational expressions are generated based on an approximation in which components of a foreground object of the plurality of objects contained in the designated pixel data and the proximity pixel data are uniform.

33. A program according to claim 31, wherein the plurality of relational expressions are generated based on an approximation in which components of a foreground object of the plurality of objects contained in the designated pixel data and the proximity pixel data change substantially linearly with respect to the positions of the pixels.

34. A program according to claim 31, further comprising instructions to control said computer to separate the image data into a foreground object image consisting of only the foreground object components which form the foreground object in the image data and a background object image consisting of only background object components which form the background object in the image data based on the mixture ratio corresponding to the designated pixel.

35. A program according to claim 31, wherein the mixture ratio is detected by solving the plurality of relational expressions according to a method of least squares.

36. An image-capturing apparatus comprising:
    an image-capturing device for outputting a subject image captured by an image sensor including a predetermined number of pixels having a time integrating function as image data consisting of a predetermined number of pixel data;
    an extractor for extracting, in correspondence with a designated pixel of a designated frame of the image data, pixel data of a peripheral frame around the designated frame as background pixel data corresponding to a background object of a plurality of objects of the image data, and also for extracting designated pixel data of the designated pixel and proximity pixel data of a pixel located in close proximity with the designated pixel in the designated frame so as to generate a plurality of relational expressions indicating relationships of the designated pixel data, the proximity pixel data, and the background pixel data corresponding to the designated pixel data or the proximity pixel data concerning the designated pixel; and
    a detector for detecting a mixture ratio indicating a mixture state of the plurality of objects in the real world concerning the designated pixel based on the relational expressions, wherein said extractor generates the plurality of relational expressions based on an approximation in which the mixture ratio corresponding to the designated pixel and the proximity pixel is uniform
    wherein the extractor and detector are implemented in hardware or a combination of hardware and software.

37. An image-capturing apparatus according to claim 36, wherein said extractor generates the plurality of relational expressions based on an approximation in which components of a foreground object of the plurality of objects contained in the designated pixel data and the proximity pixel data are uniform.

38. An image-capturing apparatus according to claim 36, wherein said extractor generates the plurality of relational expressions based on an approximation in which components of a foreground object of the plurality of objects contained in the designated pixel data and the proximity pixel data change substantially linearly with respect to the positions of the pixels.

39. An image-capturing apparatus according to claim 36, further comprising a separator for separating the image data into a foreground object image consisting of only the foreground object components which form the foreground object in the image data and a background object image consisting of only background object components which form the background object in the image data based on the mixture ratio corresponding to the designated pixel.

40. An image-capturing apparatus according to claim 36, wherein said detector detects the mixture ratio by solving the plurality of relational expressions according to a method of least squares.

* * * * *